United States Patent
Goldman et al.

(10) Patent No.: US 11,615,563 B2
(45) Date of Patent: Mar. 28, 2023

(54) NAVIGATION USING POINTS ON SPLINES

(71) Applicant: Mobileye Vision Technologies Ltd., Jerusalem (IL)

(72) Inventors: Yehonatan Goldman, Jerusalem (IL); Amiel Fisher, Neve Daniel (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 17/656,031

(22) Filed: Mar. 23, 2022

(65) Prior Publication Data
US 2022/0215603 A1    Jul. 7, 2022

Related U.S. Application Data

(63) Continuation of application No. PCT/IB2021/000197, filed on Mar. 30, 2021.
(Continued)

(51) Int. Cl.
*G06T 11/20* (2006.01)
*G01C 21/00* (2006.01)
(Continued)

(52) U.S. Cl.
CPC .......... *G06T 11/203* (2013.01); *B60W 30/12* (2013.01); *B60W 30/143* (2013.01); *B60W 30/18009* (2013.01); *B60W 30/18109* (2013.01); *B60W 30/18163* (2013.01); *G01C 21/005* (2013.01); *G01C 21/28* (2013.01); *G01C 21/387* (2020.08);
(Continued)

(58) Field of Classification Search
CPC ........ G06T 11/203; G06T 2207/30256; B60W 30/12; B60W 30/143; B60W 30/18109; B60W 30/18163; G01C 21/28; G01C 21/3815; G01C 21/3848; G01C 21/3896; G06V 20/588
See application file for complete search history.

(56) References Cited

U.S. PATENT DOCUMENTS

| | | |
|---|---|---|
| 2013/0024104 A1 | 1/2013 | Stahlin |
| 2016/0245657 A1* | 8/2016 | Dorum .................. G01C 21/32 |

(Continued)

FOREIGN PATENT DOCUMENTS

EP    3260817 A1    12/2017

OTHER PUBLICATIONS

International Search Report and Written Opinion dated June Sep. 6, 2021, in Application No. PCT/IB2021/000197, 19 pages.

*Primary Examiner* — Kenneth J Malkowski
(74) *Attorney, Agent, or Firm* — Finnegan, Henderson, Farabow, Garrett & Dunner, LLP

(57) ABSTRACT

A system for navigating a host vehicle includes at least one electronic horizon processor to access a map representative of at least a road segment on which the host vehicle travels or is expected to travel, wherein the map includes one or more splines representative of road features associated with the road segment, localize the host vehicle relative to a drivable path for the host vehicle represented among the one or more splines, determine a set of points associated with the one or more splines based on the localization of the host vehicle relative to the drivable path for the host vehicle, and generate a navigation information packet including information associated with the one or more splines and the determined set of points relative to the one or more splines.

29 Claims, 70 Drawing Sheets

Related U.S. Application Data

(60) Provisional application No. 63/152,925, filed on Feb. 24, 2021, provisional application No. 63/001,733, filed on Mar. 30, 2020.

(51) Int. Cl.
| | |
|---|---|
| *G06V 20/56* | (2022.01) |
| *B60W 30/12* | (2020.01) |
| *B60W 30/14* | (2006.01) |
| *B60W 30/18* | (2012.01) |
| *G01C 21/28* | (2006.01) |

(52) U.S. Cl.
CPC ...... *G01C 21/3811* (2020.08); *G01C 21/3815* (2020.08); *G01C 21/3848* (2020.08); *G01C 21/3863* (2020.08); *G01C 21/3889* (2020.08); *G01C 21/3896* (2020.08); *G06V 20/588* (2022.01); *G06T 2207/30256* (2013.01)

(56) References Cited

U.S. PATENT DOCUMENTS

| | | | | |
|---|---|---|---|---|
| 2017/0284812 | A1* | 10/2017 | Kim | G01C 21/3632 |
| 2018/0025235 | A1* | 1/2018 | Fridman | G06T 7/12 |
| | | | | 382/103 |

\* cited by examiner

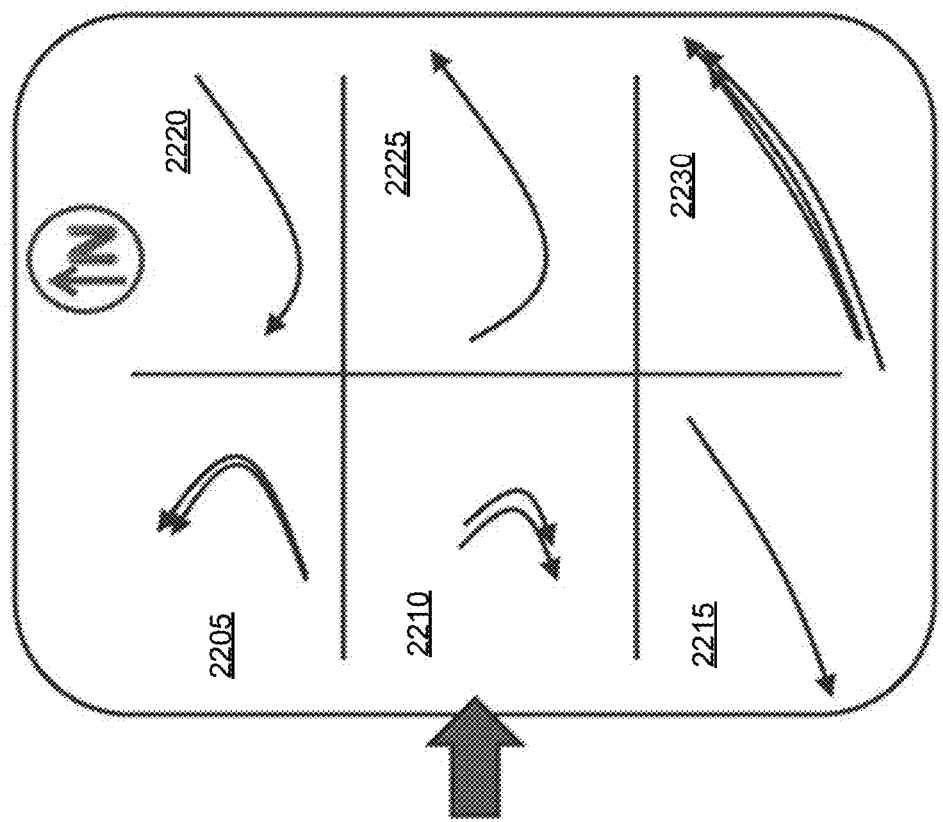
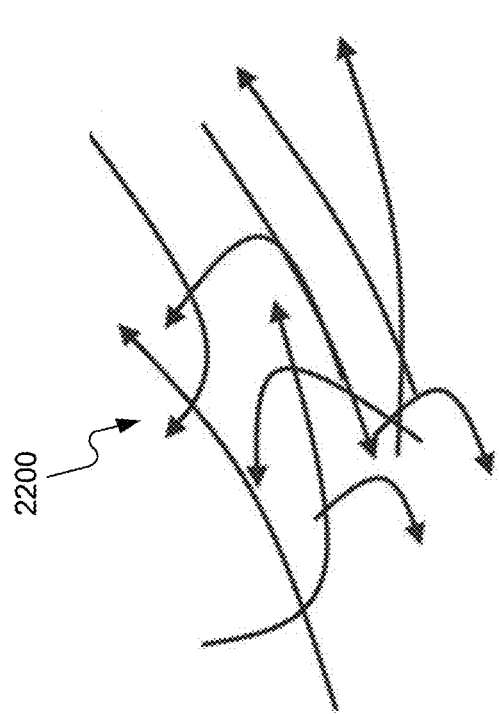
FIG. 22

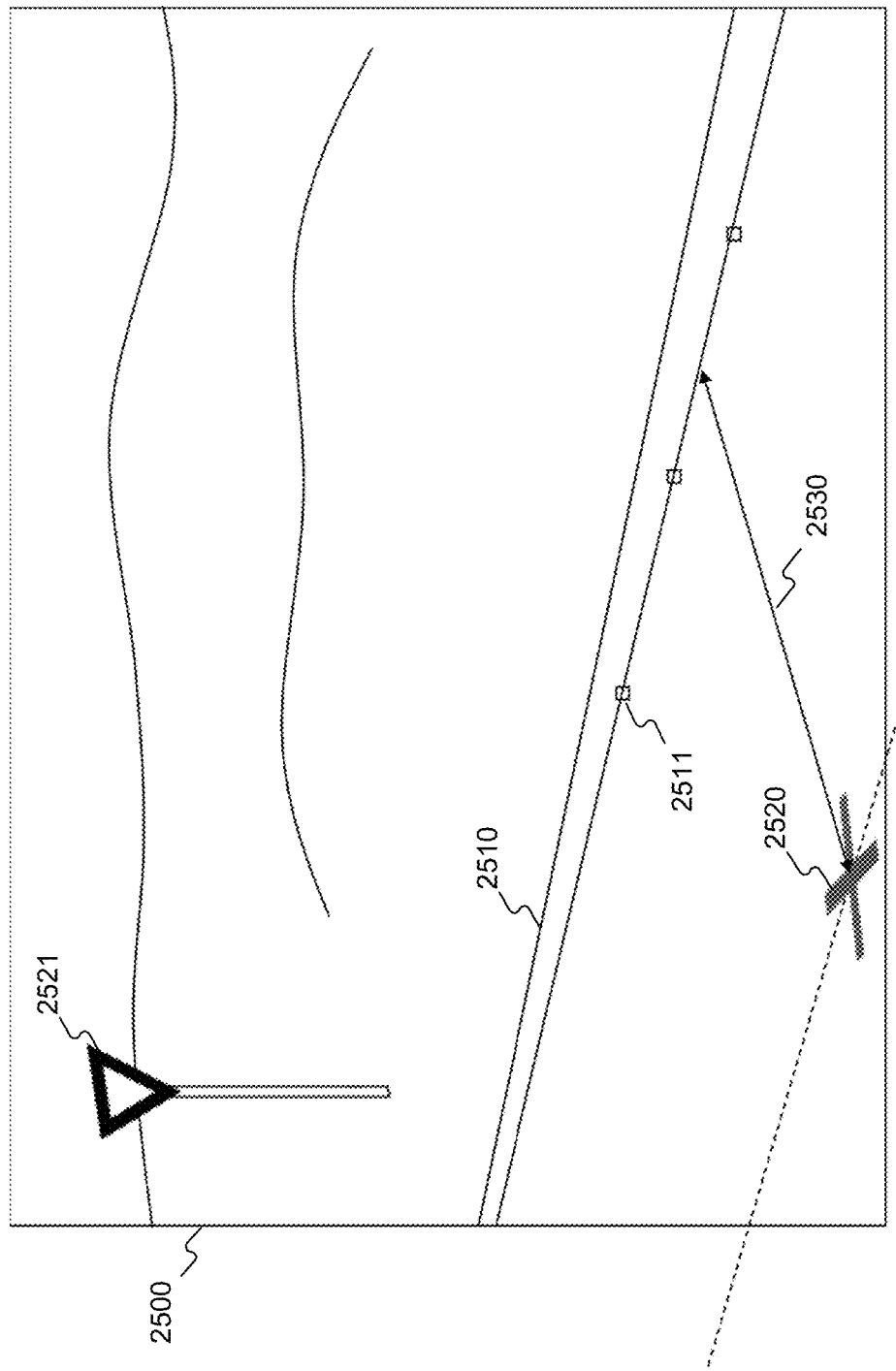

| Version = 1.0 | |
|---|---|
| # of objects = 4 | |
| SegmentID == one SegmentID already contained in SegmentsInEH List | |
| SegmentsInEH | 3 |
| DrivablePathSpline | 32 |
| DrivablePathProfile | 25 |
| SignLandmark | 3 |
| SegmentsInEH [3_segmentIds] | |
| DrivablePathSpline [32 control points, and 36 knots] | |
| DrivablePathProfile [25 v_spline_coordinate and 25 Ave80Speed ] | |
| SignLandmark | |
| SignLandmark | |
| SignLandmark | |

```
┌─────────────────────────────────────────────────────────────────┐
│ ACCESS A MAP REPRESENTATIVE OF AT LEAST A ROAD SEGMENT ON WHICH │
│            A HOST VEHICLE TRAVELS OR IS EXPECTED TO TRAVEL      │
│                              4301                               │
└─────────────────────────────────────────────────────────────────┘
                                 ↓
┌─────────────────────────────────────────────────────────────────┐
│         RECEIVE AN OUTPUT PROVIDED BY AT LEAST ONE VEHICLE SENSOR│
│                              4302                               │
└─────────────────────────────────────────────────────────────────┘
                                 ↓
┌─────────────────────────────────────────────────────────────────┐
│  LOCALIZE THE HOST VEHICLE RELATIVE TO THE MAP BASED ON ANALYSIS│
│     THE AT LEAST ONE IMAGE CAPTURED BY THE ONE OR MORE CAMERAS  │
│                              4303                               │
└─────────────────────────────────────────────────────────────────┘
                                 ↓
┌─────────────────────────────────────────────────────────────────┐
│  DETERMINE AN ELECTRONIC HORIZON FOR THE HOST VEHICLE BASED ON  │
│      THE LOCALIZATION OF THE HOST VEHICLE RELATIVE TO THE MAP   │
│                              4304                               │
└─────────────────────────────────────────────────────────────────┘
                                 ↓
┌─────────────────────────────────────────────────────────────────┐
│  GENERATE A NAVIGATION INFORMATION PACKET INCLUDING INFORMATION │
│       ASSOCIATED WITH THE DETERMINED ELECTRONIC HORIZON         │
│                              4305                               │
└─────────────────────────────────────────────────────────────────┘
                                 ↓
┌─────────────────────────────────────────────────────────────────┐
│ OUTPUT THE GENERATED NAVIGATION INFORMATION PACKET TO ONE OR MORE│
│  NAVIGATION SYSTEM PROCESSORS CONFIGURED TO CAUSE THE HOST VEHICLE│
│  TO EXECUTE AT LEAST ONE NAVIGATIONAL MANEUVER BASED ON THE     │
│       INFORMATION INCLUDED IN THE NAVIGATION INFORMATION PACKET.│
│                              4306                               │
└─────────────────────────────────────────────────────────────────┘
```

┌─────────────────────────────────────────────────────────────┐
│ ACCESS A MAP REPRESENTATIVE OF A ROAD ON WHICH A HOST VEHICLE TRAVELS │
│ OR IS EXPECTED TO TRAVEL                                              │
│ 4401                                                              │
└─────────────────────────────────────────────────────────────┘
                              ↓
┌─────────────────────────────────────────────────────────────┐
│ RECEIVE AN OUTPUT PROVIDED BY AT LEAST ONE VEHICLE SENSOR    │
│ 4402                                                     │
└─────────────────────────────────────────────────────────────┘
                              ↓
┌─────────────────────────────────────────────────────────────┐
│ LOCALIZE THE HOST VEHICLE RELATIVE TO AT LEAST ONE MAPPED FEATURE BASED │
│ ON ANALYSIS OF THE AT LEAST ONE IMAGE CAPTURED BY THE ONE OR MORE       │
│ CAMERAS                                                                 │
│ 4403                                                                │
└─────────────────────────────────────────────────────────────┘
                              ↓
┌─────────────────────────────────────────────────────────────┐
│ DETERMINE AN ELECTRONIC HORIZON FOR THE HOST VEHICLE BASED ON THE │
│ LOCALIZATION OF THE HOST VEHICLE RELATIVE TO THE AT LEAST ONE MAPPED │
│ FEATURE                                                              │
│ 4404                                                             │
└─────────────────────────────────────────────────────────────┘
                              ↓
┌─────────────────────────────────────────────────────────────┐
│ DETERMINE A SET OF INTERNODE ROAD SUB-SEGMENTS THAT ARE INCLUDED IN │
│ THE ELECTRONIC HORIZON                                              │
│ 4405                                                            │
└─────────────────────────────────────────────────────────────┘
                              ↓
┌─────────────────────────────────────────────────────────────┐
│ GENERATE ONE OR MORE NAVIGATION INFORMATION PACKETS INCLUDING │
│ INFORMATION ASSOCIATED WITH THE SET OF INTERNODE ROAD SUB-SEGMENTS │
│ INCLUDED IN THE ELECTRONIC HORIZON                                 │
│ 4406                                                           │
└─────────────────────────────────────────────────────────────┘
                              ↓
┌─────────────────────────────────────────────────────────────┐
│ OUTPUT THE GENERATED ONE OR MORE NAVIGATION INFORMATION PACKETS TO │
│ ONE OR MORE NAVIGATION SYSTEM PROCESSORS CONFIGURED TO CAUSE THE   │
│ HOST VEHICLE TO EXECUTE AT LEAST ONE NAVIGATIONAL MANEUVER BASED ON │
│ THE INFORMATION INCLUDED IN THE NAVIGATION INFORMATION PACKET.      │
│ 4407                                                            │
└─────────────────────────────────────────────────────────────┘

```
ACCESS A MAP REPRESENTATIVE OF AT LEAST A ROAD SEGMENT ON WHICH A HOST
VEHICLE TRAVELS OR IS EXPECTED TO TRAVEL
4701
          ↓
RECEIVE AN OUTPUT PROVIDED BY AT LEAST ONE VEHICLE SENSOR
4702
          ↓
LOCALIZE THE HOST VEHICLE RELATIVE TO A DRIVABLE PATH FOR THE HOST
VEHICLE REPRESENTED AMONG THE ONE OR MORE SPLINES
4703
          ↓
DETERMINE A SET OF POINTS ASSOCIATED WITH THE ONE OR MORE SPLINES
BASED ON THE LOCALIZATION OF THE HOST VEHICLE RELATIVE TO THE DRIVABLE
PATH FOR THE HOST VEHICLE
4704
          ↓
GENERATE A NAVIGATION INFORMATION PACKET INCLUDING INFORMATION
ASSOCIATED WITH THE ONE OR MORE SPLINES AND THE DETERMINED SET OF
POINTS RELATIVE TO THE ONE OR MORE SPLINES
4705
          ↓
OUTPUT THE GENERATED NAVIGATION INFORMATION PACKET TO ONE OR MORE
NAVIGATION SYSTEM PROCESSORS CONFIGURED TO CAUSE THE HOST VEHICLE TO
EXECUTE AT LEAST ONE NAVIGATIONAL MANEUVER BASED ON THE INFORMATION
INCLUDED IN THE NAVIGATION INFORMATION PACKET.
4706
```

FIG. 47

NAVIGATION USING POINTS ON SPLINES

CROSS REFERENCES TO RELATED APPLICATIONS

This application is a continuation of Application No. PCT/162021/000197, filed Mar. 30, 2021, which claims the benefit of priority of U.S. Provisional Application No. 63/001,733, filed on Mar. 30, 2020; and U.S. Provisional Application No. 63/152,925, filed on Feb. 24, 2021. The foregoing applications are incorporated herein by reference in their entireties.

BACKGROUND

Technical Field

The present disclosure relates generally to autonomous vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from one road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for vehicle navigation.

In an embodiment, a system may include at least one electronic horizon processor, which may include circuitry and a memory. The memory may include instructions that when executed by the circuitry may cause the at least one electronic horizon processor to access a map representative of at least a road segment on which the host vehicle travels or is expected to travel, and receive an output provided by at least one vehicle sensor. The at least one vehicle sensor may include one or more cameras configured to capture images of an environment of the host vehicle. The received output may include at least one image captured by the one or more cameras. The instructions may also cause the at least one electronic horizon processor to localize the host vehicle relative to the map based on analysis of the at least one image captured by the one or more cameras. The instructions may further cause the at least one electronic horizon processor to determine an electronic horizon for the host vehicle based on the localization of the host vehicle relative to the map. The instructions may also cause the at least one electronic horizon processor to generate a navigation information packet including information associated with the determined electronic horizon. The navigation information packet may include a header portion and a variable-sized payload portion. The header portion may specify what information is included in the variable-sized payload portion. The instructions may further cause the at least one electronic horizon processor to output the generated navigation information packet to one or more navigation system processors configured to cause the host vehicle to execute at least one navigational maneuver based on the information included in the navigation information packet.

In an embodiment, a non-transitory computer readable medium may contain instructions that when executed by at least one electronic horizon processor, cause the at least one electronic horizon processor to perform operations including accessing a map representative of at least a road segment on which a host vehicle travels or is expected to travel. The operations may also include receiving an output provided by at least one vehicle sensor. The at least one vehicle sensor may include one or more cameras configured to capture images of an environment of the host vehicle. The received output may include at least one image captured by the one or more cameras. The operations may further include localizing the host vehicle relative to the map based on analysis of the at least one image captured by the one or more cameras. The operations may also include determining an electronic horizon for the host vehicle based on the localization of the host vehicle relative to the map. The operations may further include generating a navigation information packet including information associated with the determined electronic horizon. The navigation information packet may include a header portion and a variable-sized payload portion. The header portion may specify what information is included in the variable-sized payload portion. The operations may also include outputting the generated navigation information packet to one or more navigation system processors configured to cause the host vehicle to execute at least one navigational maneuver based on the information included in the navigation information packet.

In an embodiment, a system may include at least one electronic horizon processor, which may include circuitry and a memory. The memory may include instructions that when executed by the circuitry may cause the at least one electronic horizon processor to access a map representative of a road on which the host vehicle travels or is expected to travel. In the map, the road may be represented as an internode road segment between two mapped nodes, and in the map, the internode road segment may be further divided into a plurality of internode road sub-segments. The instructions may also the at least one electronic horizon processor to receive an output provided by at least one vehicle sensor. The at least one vehicle sensor may include one or more cameras configured to capture images of an environment of the host vehicle, and the received output may include at least one image captured by the one or more cameras. The instructions may also cause the at least one electronic horizon processor to localize the host vehicle relative to at least one mapped feature based on analysis of the at least one image captured by the one or more cameras. The instructions may further cause the at least one electronic horizon processor to determine an electronic horizon for the host vehicle based on the localization of the host vehicle relative to the at least one mapped feature. The instructions may also cause the at least one electronic horizon processor to determine a set of internode road sub-segments that are included in the electronic horizon. The instructions may further cause the at least one electronic horizon processor to generate one or more navigation information packets including information associated with the set of internode road sub-segments included in the electronic horizon. The instructions may also cause the at least one electronic horizon processor to output the generated one or more navigation information packets to one or more navigation system processors configured to cause the host vehicle to execute at least one navigational maneuver based on the information included in the navigation information packet.

In an embodiment, a non-transitory computer readable medium may contain instructions that when executed by at least one electronic horizon processor, cause the at least one electronic horizon processor to perform operations including accessing a map representative of a road on which a host vehicle travels or is expected to travel. In the map, the road may be represented as an internode road segment between two mapped nodes, and in the map, the internode road segment may be further divided into a plurality of internode road sub-segments. The operations may also include receiving an output provided by at least one vehicle sensor. The at least one vehicle sensor may include one or more cameras configured to capture images of an environment of the host vehicle, and the received output may include at least one image captured by the one or more cameras. The operations may further include localizing the host vehicle relative to at least one mapped feature based on analysis of the at least one image captured by the one or more cameras. The operations may also include determining an electronic horizon for the host vehicle based on the localization of the host vehicle relative to the at least one mapped feature. The operations may further include determining a set of internode road sub-segments that are included in the electronic horizon. The operations may also include generating one or more navigation information packets including information associated with the set of internode road sub-segments included in the electronic horizon. The operations may further include outputting the generated one or more navigation information packets to one or more navigation system processors configured to cause the host vehicle to execute at least one navigational maneuver based on the information included in the navigation information packet In an embodiment, a system may include at least one electronic horizon processor, which may include circuitry and a memory. The memory may include instructions that when executed by the circuitry may cause the at least one electronic horizon processor to access a map representative of at least a road segment on which the host vehicle travels or is expected to travel. Points in the map may be referenced relative to an initial map origin. The instructions may further cause the at least one electronic horizon processor to receive an output provided by at least one vehicle sensor. The at least one vehicle sensor may include one or more cameras configured to capture images of an environment of the host vehicle, and the received output may include at least one image captured by the one or more cameras. The instructions may further cause the at least one electronic horizon processor to localize the host vehicle relative to the map based on analysis of the at least one image captured by the one or more cameras. The instructions may also cause the at least one electronic horizon processor to determine an electronic horizon for the host vehicle based on the localization of the host vehicle relative to the map. The instructions may further cause the at least one electronic horizon processor to generate a navigation information packet including information associated with mapped features included in the determined electronic horizon. The instructions may also cause the at least one electronic horizon processor to output the generated navigation information packet to one or more navigation system processors configured to cause the host vehicle to execute at least one navigational maneuver based on the information included in the navigation information packet. The instructions may further cause the at least one electronic horizon processor to detect a map origin change event. The instructions may also cause the at least one electronic horizon processor to in response to a detected map origin change event, determine an updated map origin and send to the one or more navigation system processors a notification indicative of a change from the initial map origin to the updated map origin.

In an embodiment, a non-transitory computer readable medium may contain instructions that when executed by at least one electronic horizon processor, cause the at least one electronic horizon processor to perform operations including accessing a map representative of at least a road segment on which the host vehicle travels or is expected to travel. Points in the map may be referenced relative to an initial map origin. The operations may also include receiving an output provided by at least one vehicle sensor. The at least one vehicle sensor may include one or more cameras configured to capture images of an environment of the host vehicle, and the received output may include at least one image captured by the one or more cameras. The operations may further include localizing the host vehicle relative to the map based on analysis of the at least one image captured by the one or more cameras. The operations may also include determining an electronic horizon for the host vehicle based on the localization of the host vehicle relative to the map. The operations may further include generating a navigation information packet including information associated with mapped features included in the determined electronic horizon. The operations may also include outputting the generated navigation information packet to one or more navigation system processors configured to cause the host vehicle to execute at least one navigational maneuver based on the information included in the navigation information packet. The operations may further include detecting a map origin change event. The operations may also include, in response to a detected map origin change event, determining an updated map origin and send to the one or more navigation system processors a notification indicative of a change from the initial map origin to the updated map origin.

In an embodiment, a system may include at least one electronic horizon processor, which may include circuitry and a memory. The memory may include instructions that when executed by the circuitry may cause the at least one electronic horizon processor to access a map representative of at least a road segment on which the host vehicle travels or is expected to travel. The map may include one or more splines representative of road features associated with the road segment. The instructions may also cause the at least one electronic horizon processor to receive an output provided by at least one vehicle sensor. The at least one vehicle sensor may include one or more cameras configured to capture images of an environment of the host vehicle. The received output may include at least one image captured by the one or more cameras. The instructions may also cause the at least one electronic horizon processor to localize the host vehicle relative to a drivable path for the host vehicle represented among the one or more splines. The localization may be based on analysis of the at least one image captured by the one or more cameras. The instructions may further cause the at least one electronic horizon processor to determine a set of points associated with the one or more splines based on the localization of the host vehicle relative to the drivable path for the host vehicle. The instructions may also cause the at least one electronic horizon processor to generate a navigation information packet including information associated with the one or more splines and the determined set of points relative to the one or more splines. The instructions may further cause the at least one electronic horizon processor to output the generated navigation information packet to one or more navigation system processors configured to cause the host vehicle to execute at least one navigational maneuver based on the information included in the navigation information packet.

In an embodiment, a non-transitory computer readable medium may contain instructions that when executed by at least one electronic horizon processor, cause the at least one electronic horizon processor to perform operations including accessing a map representative of at least a road segment on which a host vehicle travels or is expected to travel. The map may include one or more splines representative of road features associated with the road segment and receiving an output provided by at least one vehicle sensor. The at least one vehicle sensor may include one or more cameras configured to capture images of an environment of the host vehicle, and the received output may include at least one image captured by the one or more cameras. The operations may also include localizing the host vehicle relative to a drivable path for the host vehicle represented among the one or more splines. The localization may be based on analysis of the at least one image captured by the one or more cameras. The operations may further include determining a set of points associated with the one or more splines based on the localization of the host vehicle relative to the drivable path for the host vehicle. The operations may also include generating a navigation information packet including information associated with the one or more splines and the determined set of points relative to the one or more splines. The operations may further include outputting the generated navigation information packet to one or more navigation system processors configured to cause the host vehicle to execute at least one navigational maneuver based on the information included in the navigation information packet.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 22 illustrates a process of clustering vehicle trajectories associated with vehicles, consistent with the disclosed embodiments.

FIG. 25A shows an exemplary image of a vehicle's surrounding environment for navigation based on the mapped lane marks consistent with the disclosed embodiments.

FIG. 34 is an example of a message sent by the exemplary system to a vehicle, consistent with disclosed embodiments.

FIG. 43 is a flowchart showing an exemplary process for navigating a vehicle, consistent with disclosed embodiments.

FIG. 44 is a flowchart showing an exemplary process for navigating a vehicle, consistent with disclosed embodiments.

FIG. 47 is a flowchart showing an exemplary process for navigating a vehicle, consistent with disclosed embodiments.

DETAILED DESCRIPTION

Figure 1:
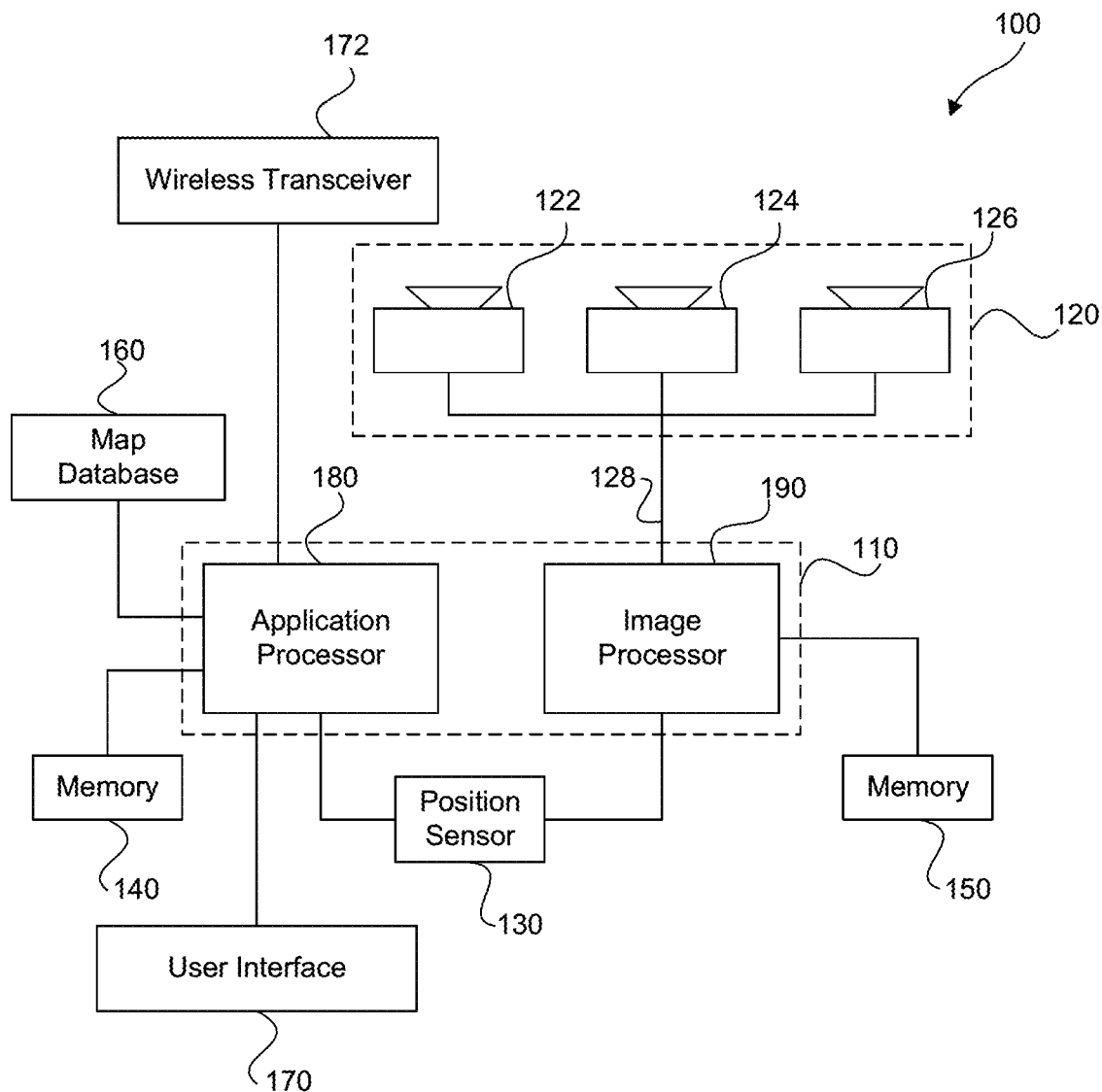
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, followed by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
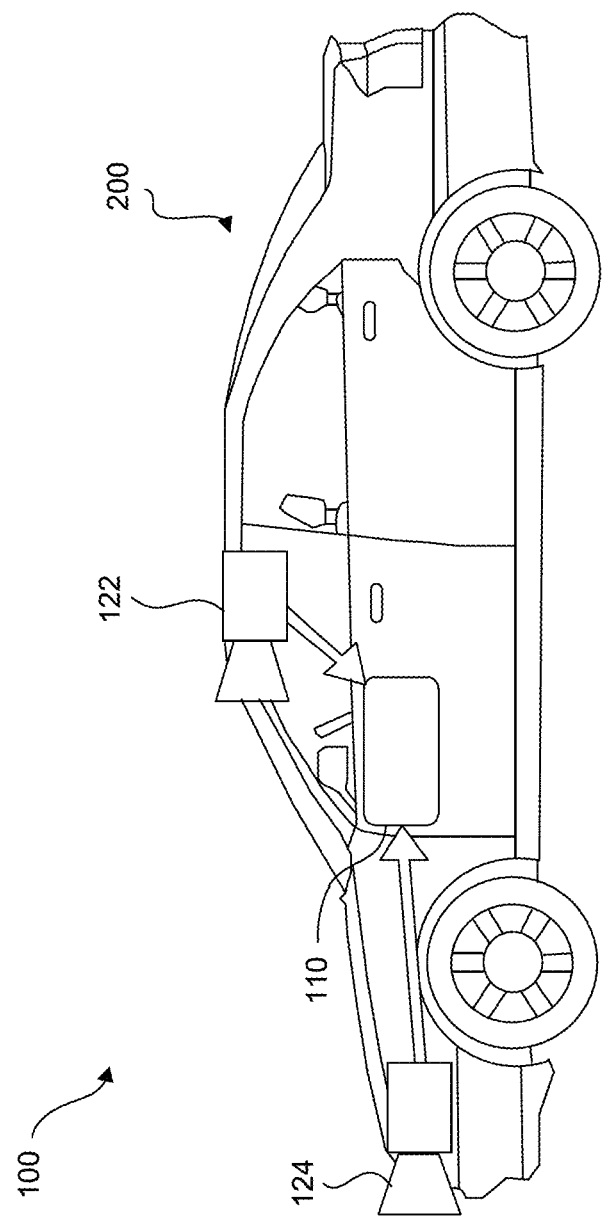
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
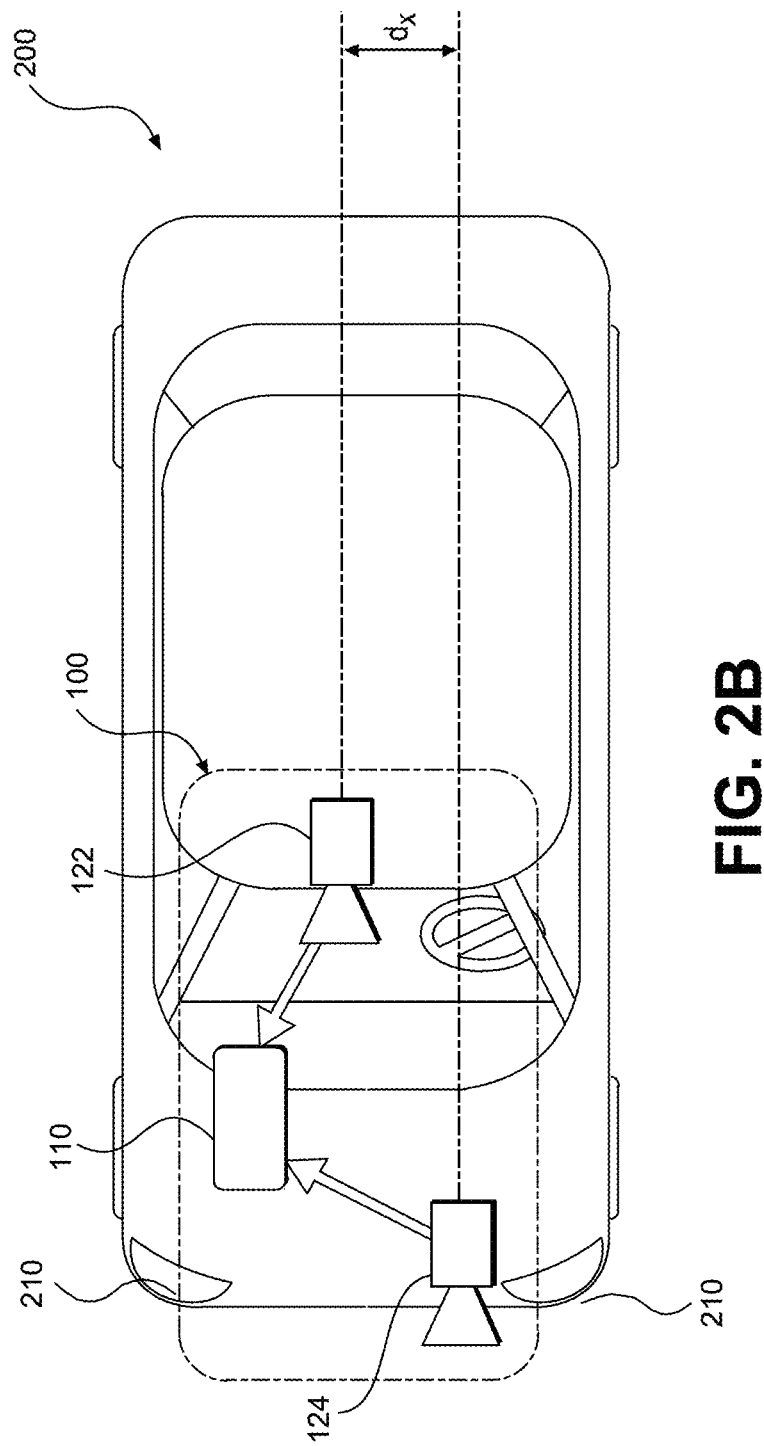
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
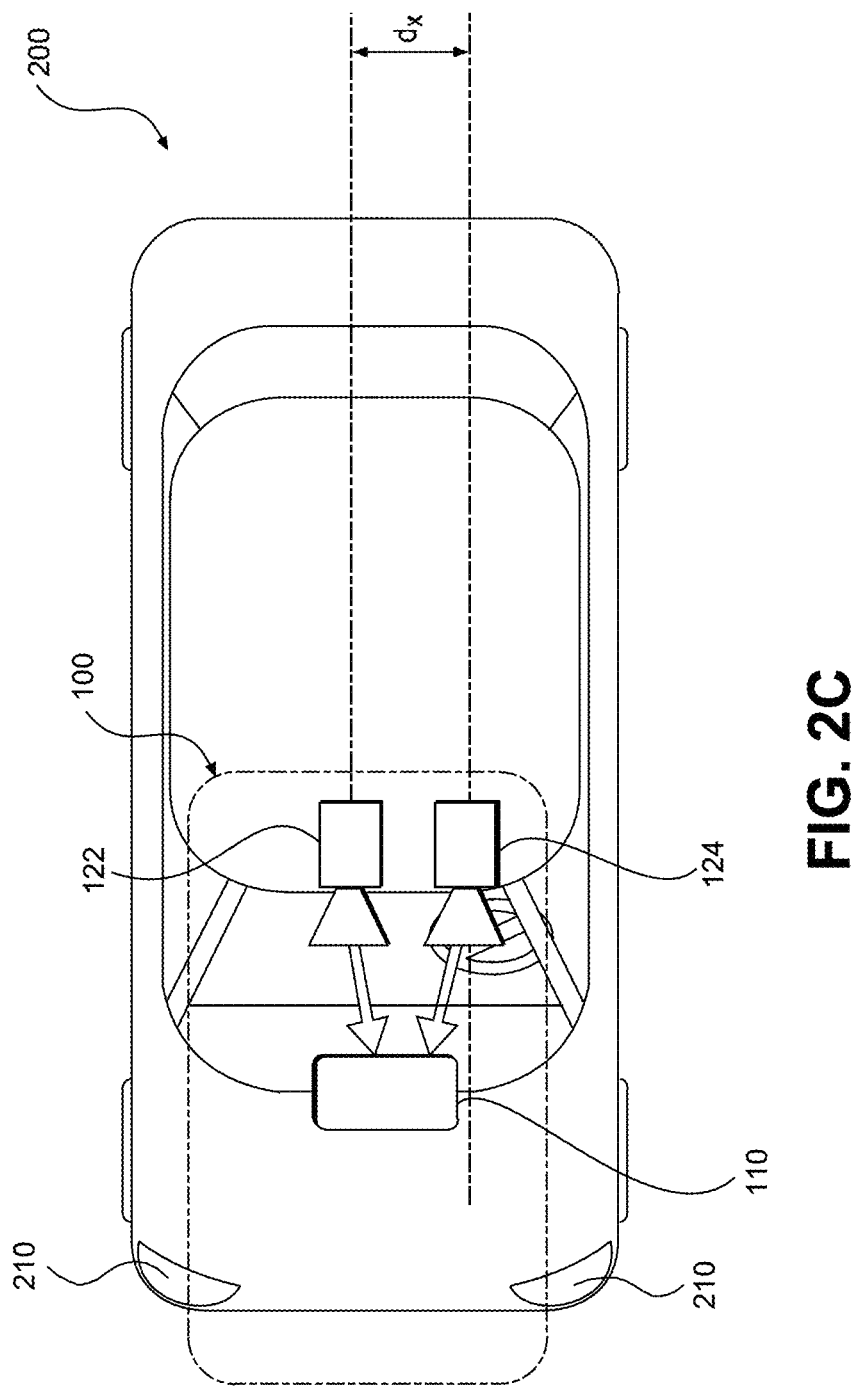
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
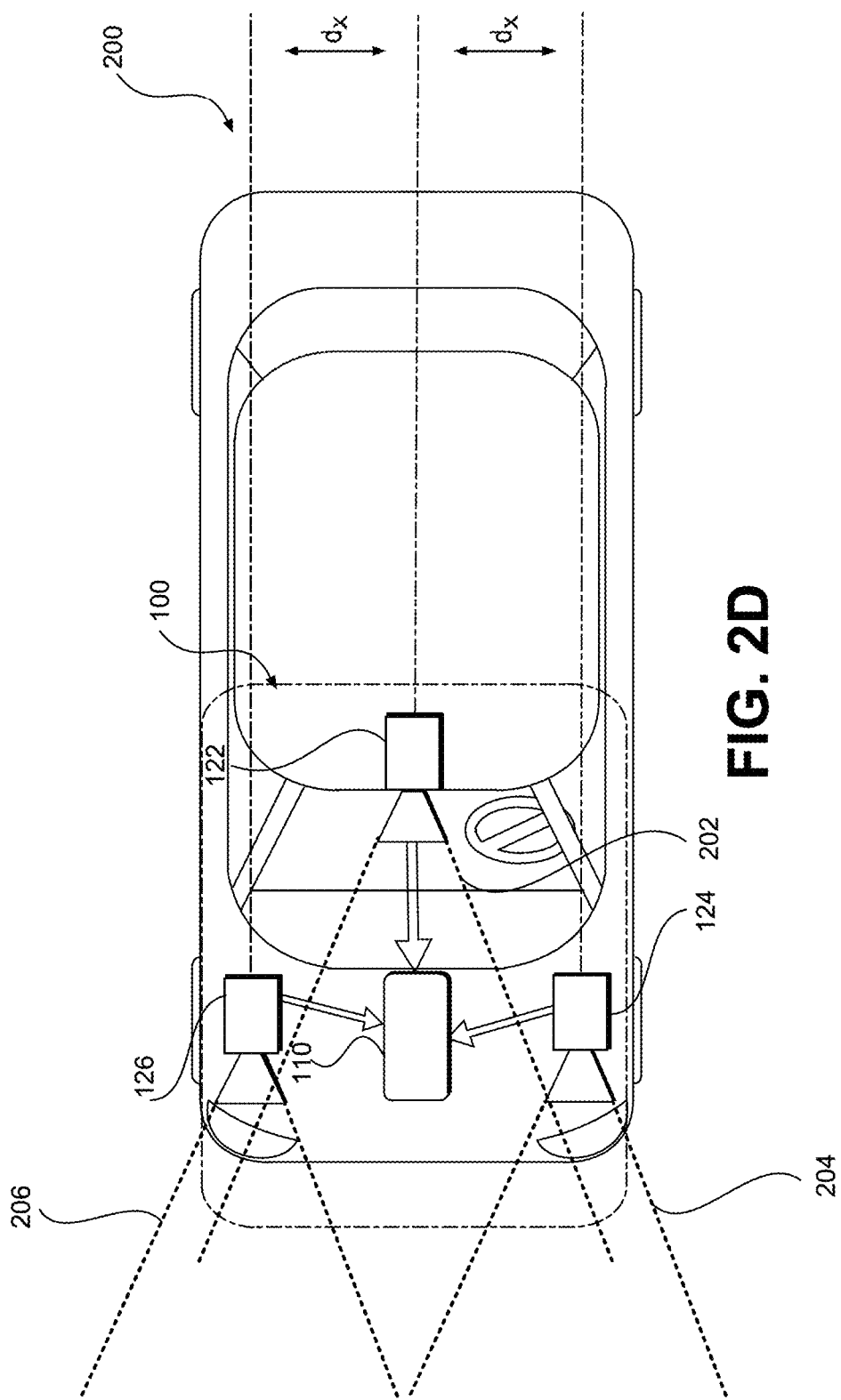
FIG. 2D is a diagrammatic top view representation of yet another embodiment of a vehicle including a system consistent with the disclosed embodiments.
Figure 2E:
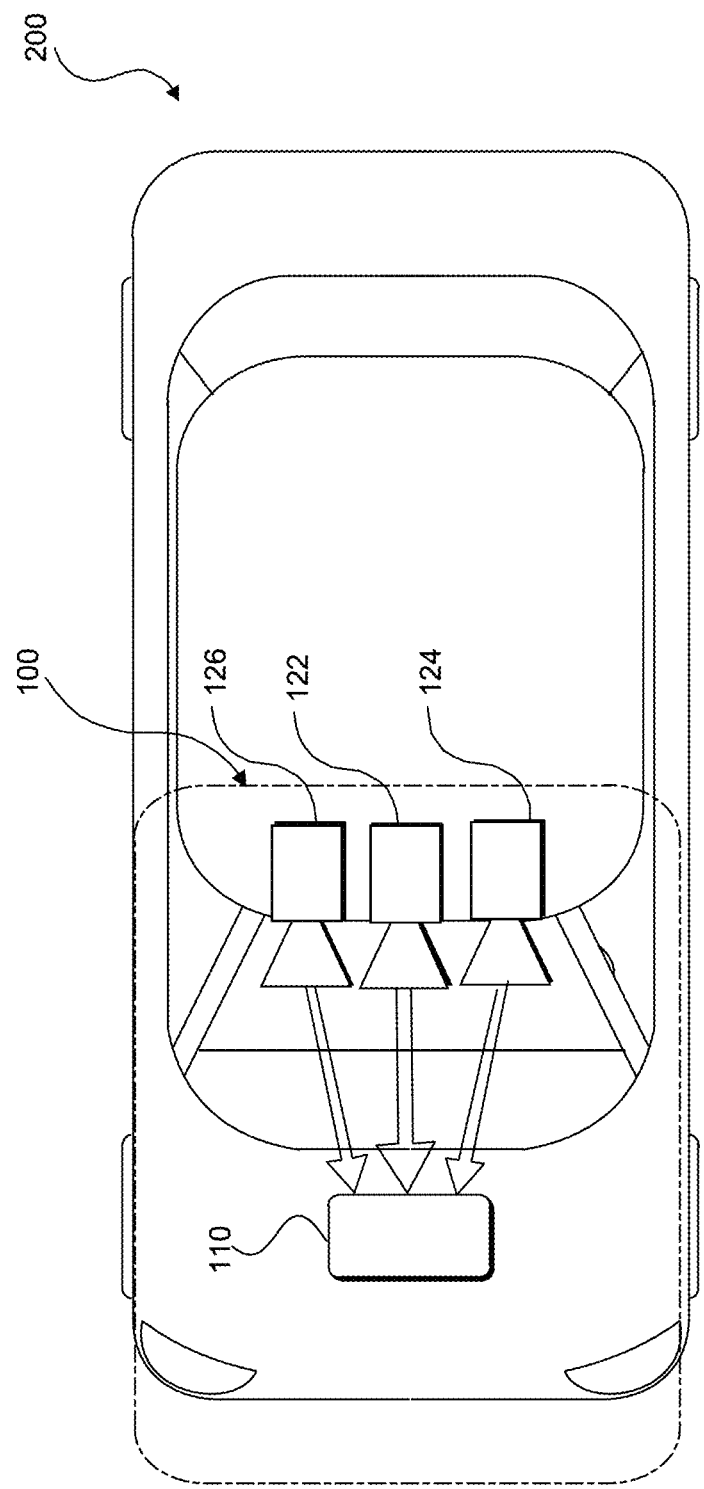
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by dx, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
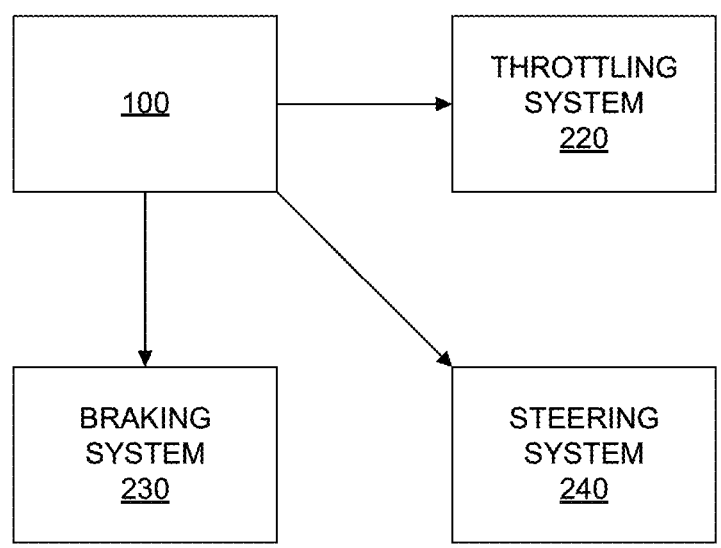
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
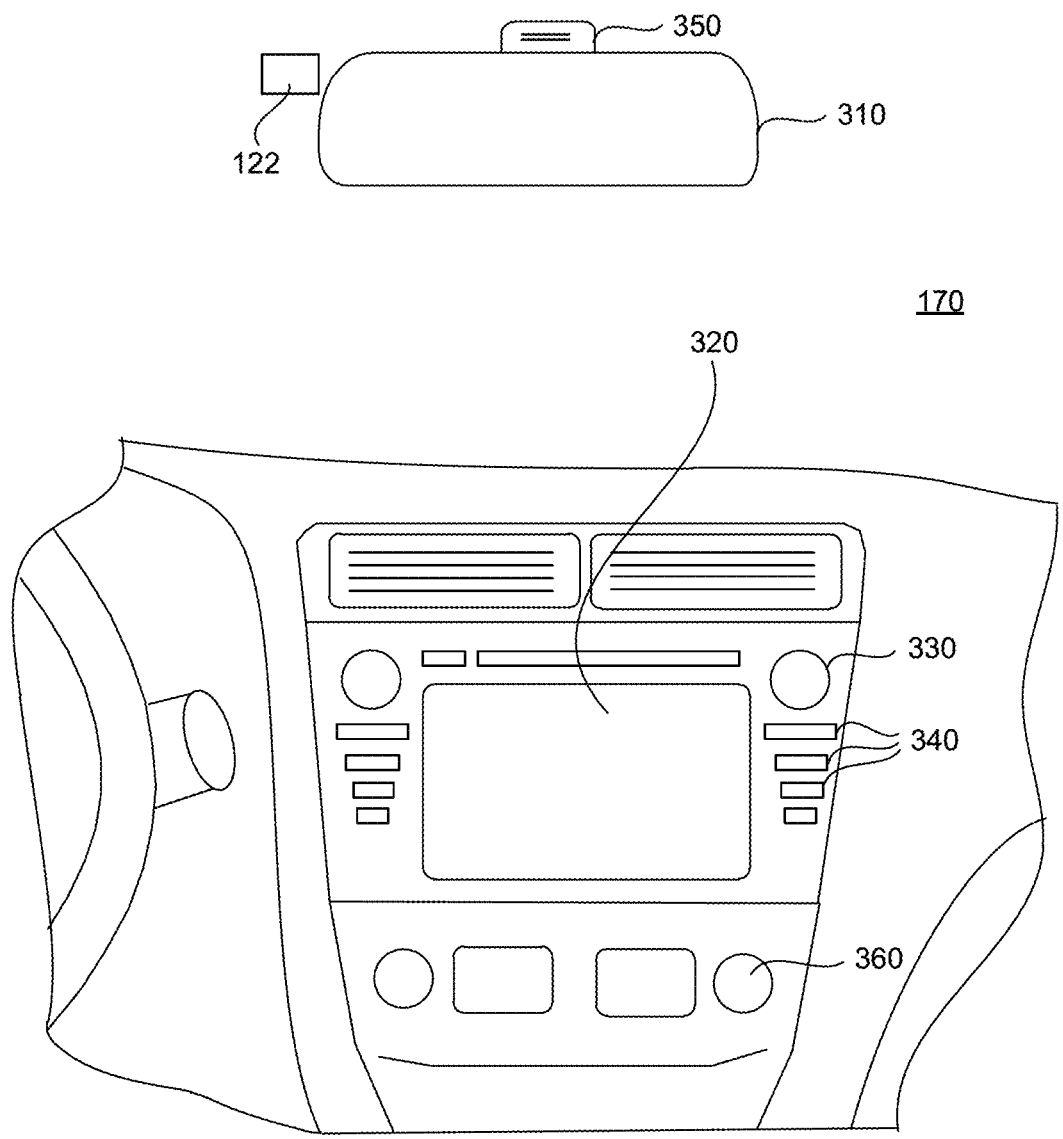
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
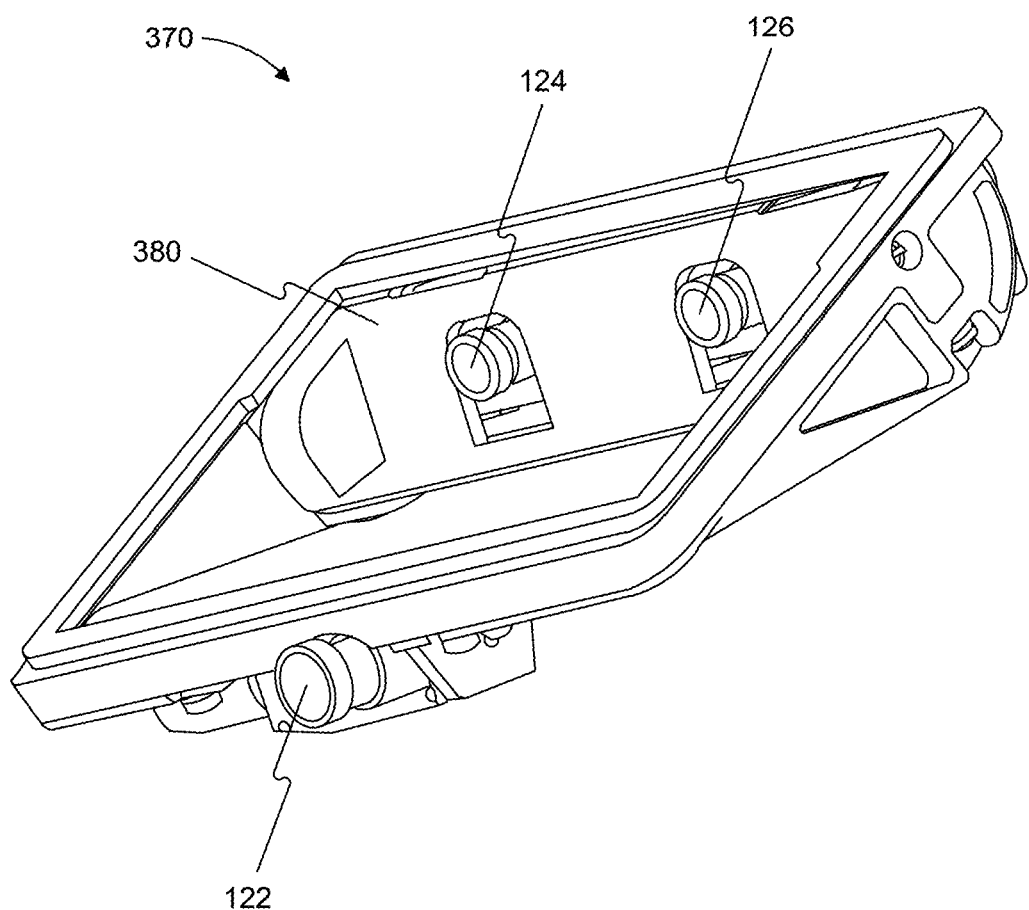
FIG. 3B is an illustration of an example of a camera mount that is configured to be positioned behind a rearview mirror and against a vehicle windshield consistent with the disclosed embodiments.
Figure 3C:
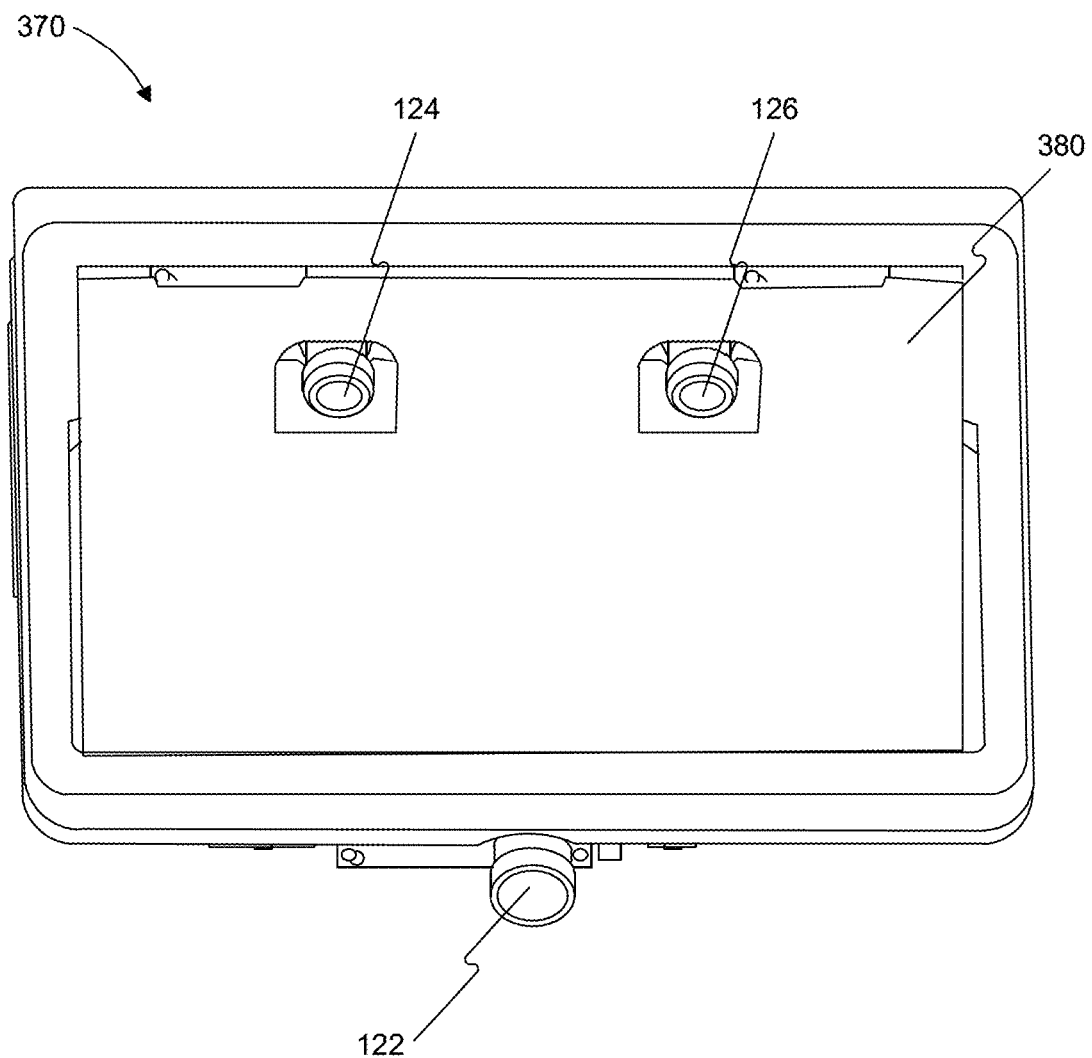
FIG. 3C is an illustration of the camera mount shown in FIG. 3B from a different perspective consistent with the disclosed embodiments.
Figure 3D:
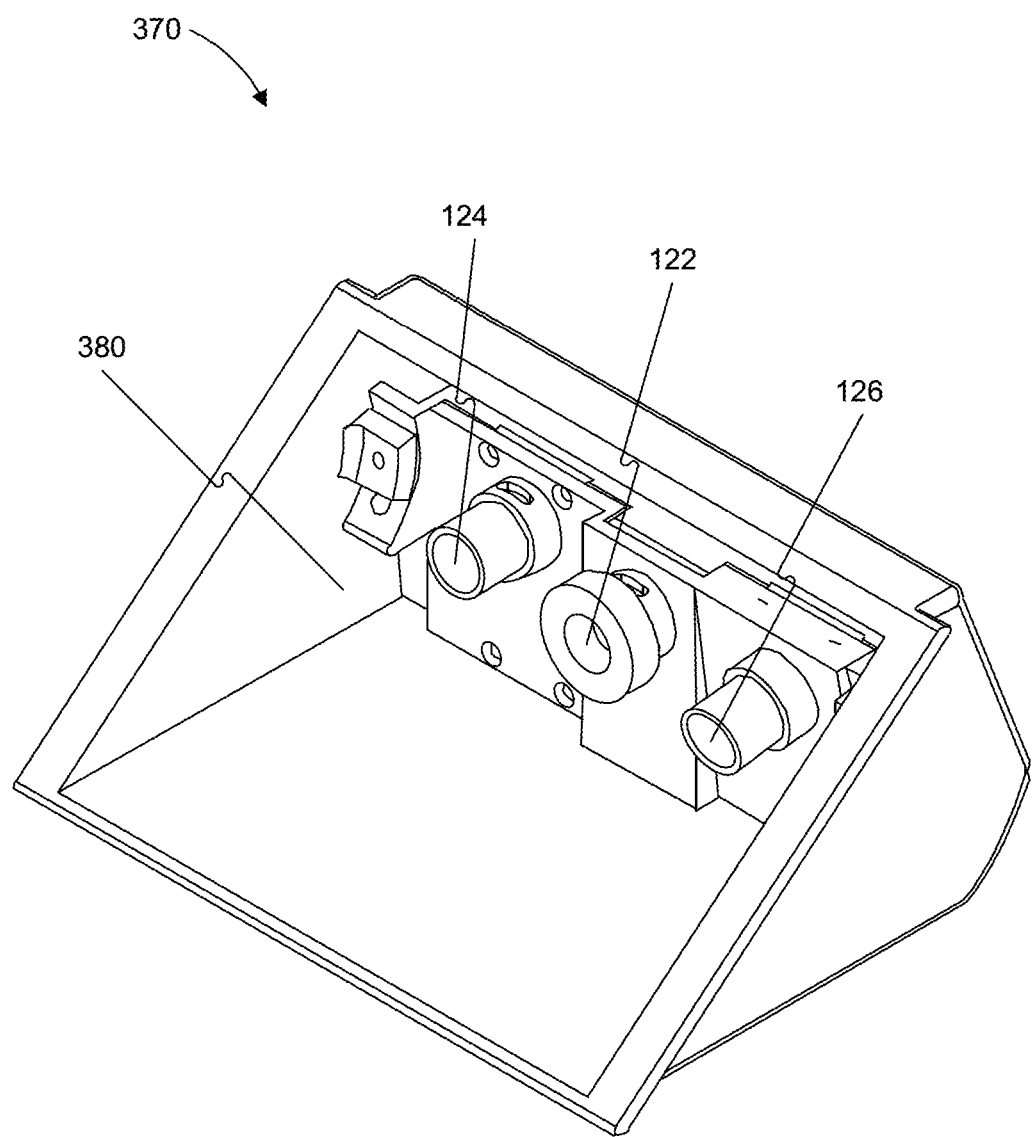
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
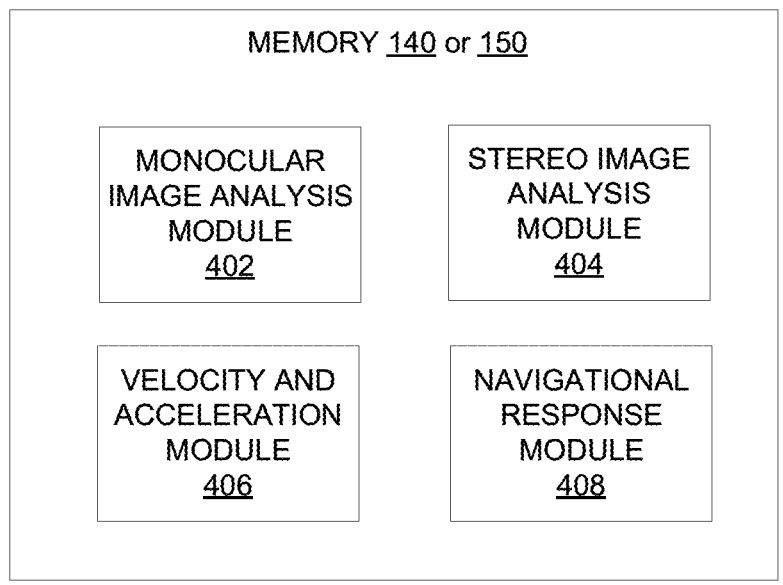
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
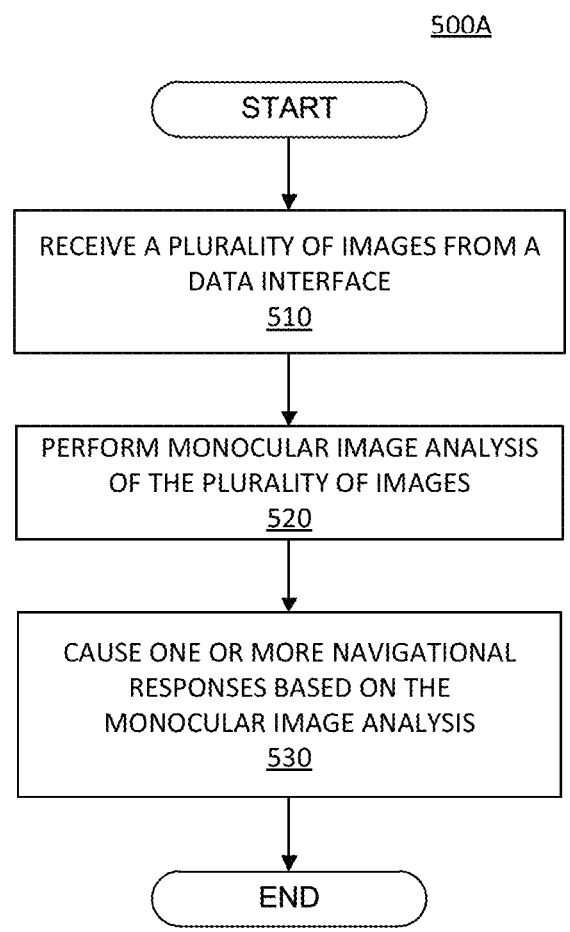
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
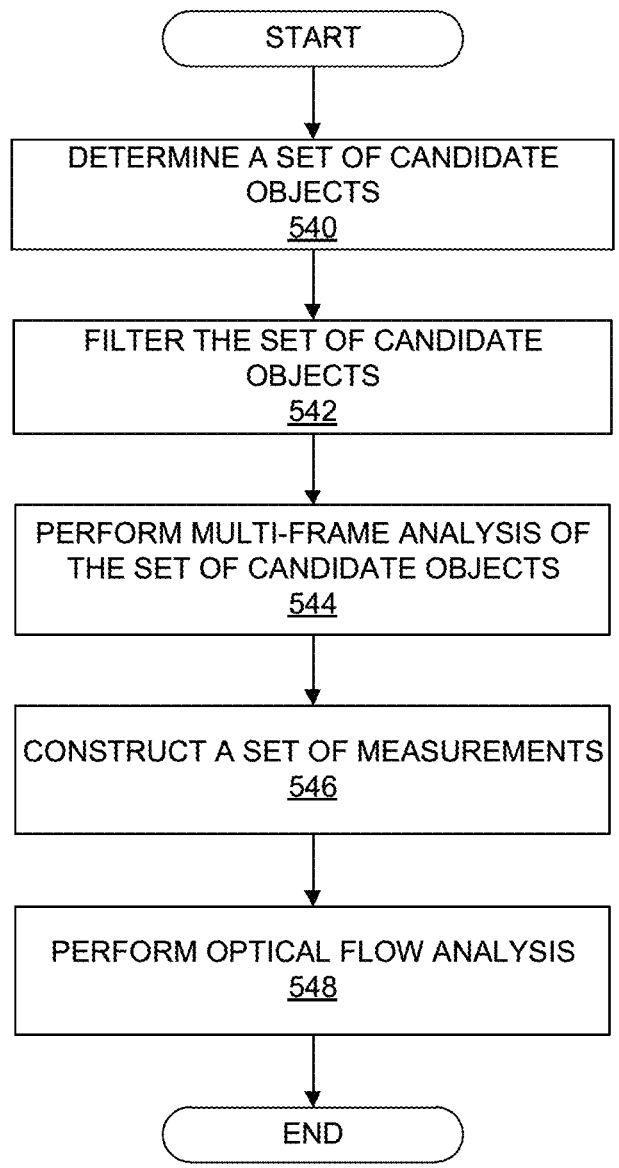
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
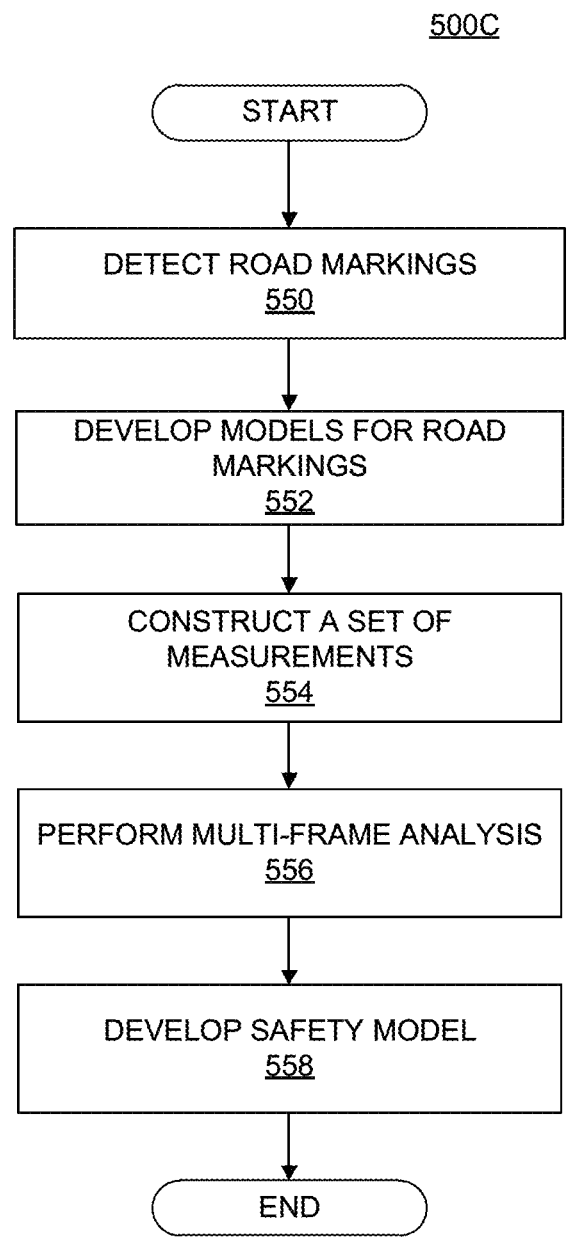
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
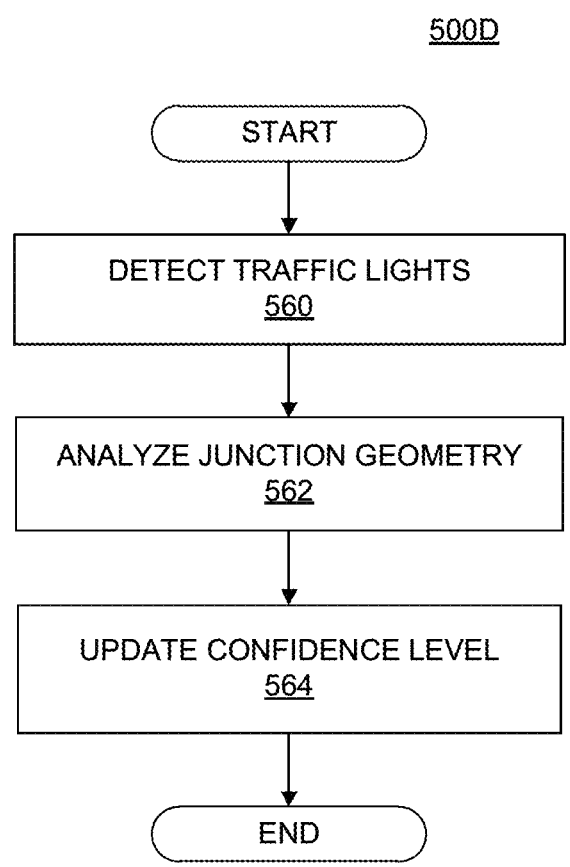
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
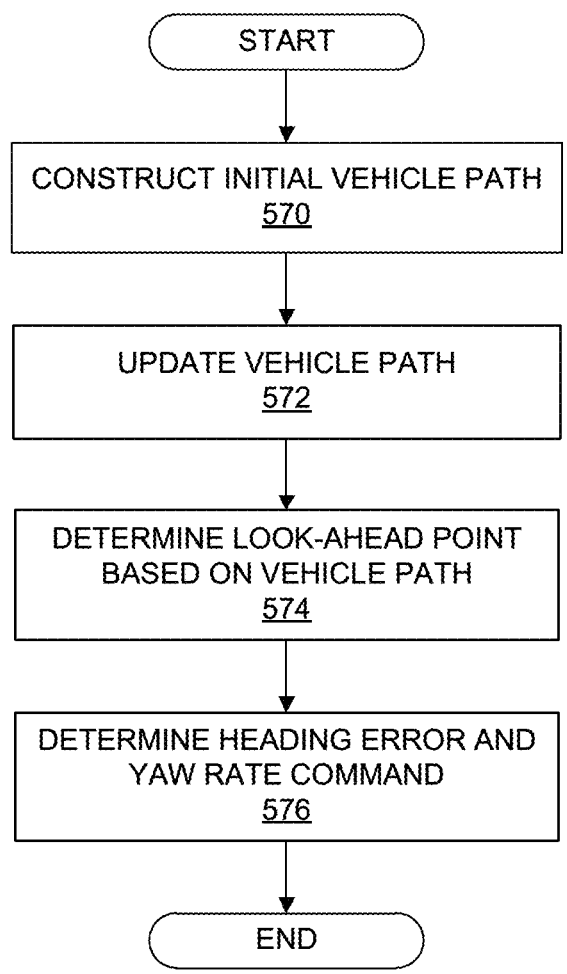
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
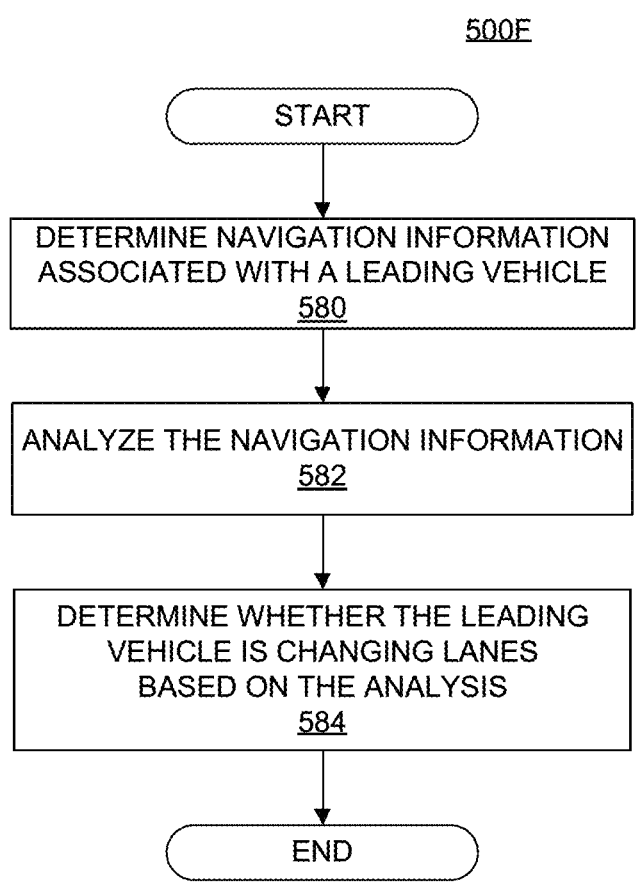
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
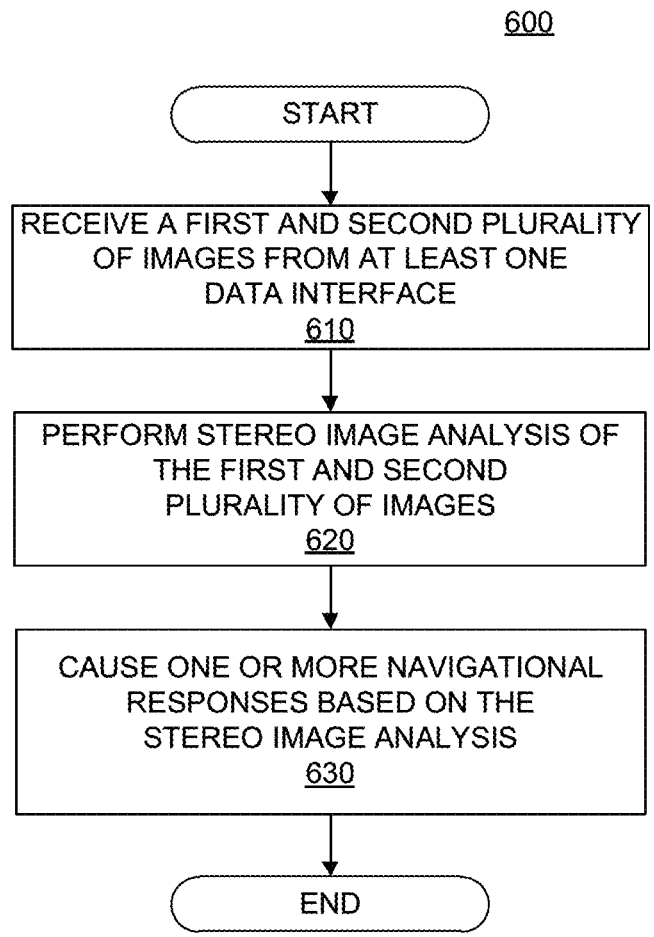
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
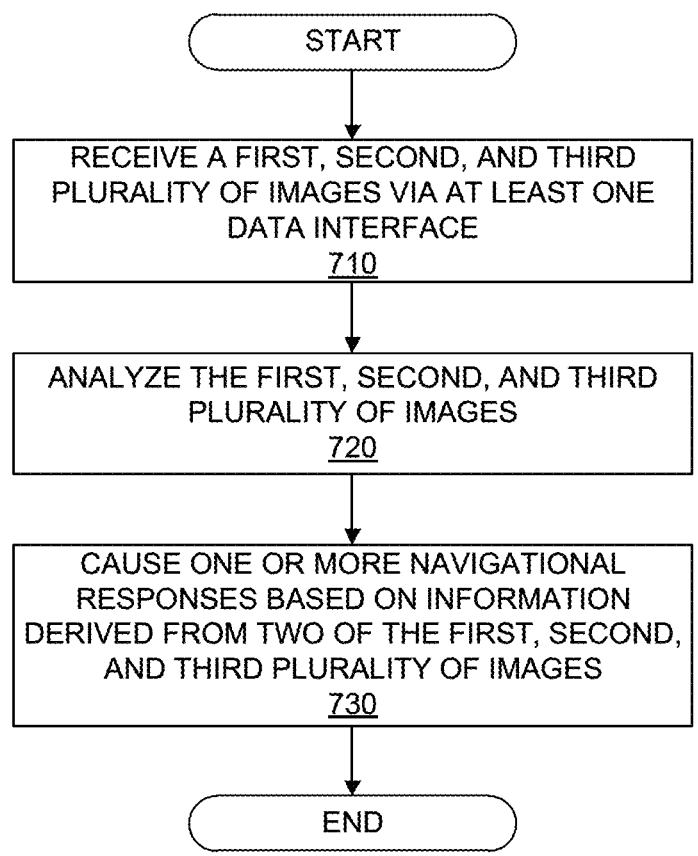
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

The sparse map may include any suitable representation of objects identified along a road segment. In some cases, the objects may be referred to as semantic objects or non-semantic objects. Semantic objects may include, for example, objects associated with a predetermined type classification. This type classification may be useful in reducing the amount of data required to describe the semantic object recognized in an environment, which can be beneficial both in the harvesting phase (e.g., to reduce costs associated with bandwidth use for transferring drive information from a plurality of harvesting vehicles to a server) and during the navigation phase (e.g., reduction of map data can speed transfer of map tiles from a server to a navigating vehicle and can also reduce costs associated with bandwidth use for such transfers). Semantic object classification types may be assigned to any type of objects or features that are expected to be encountered along a roadway.

Semantic objects may further be divided into two or more logical groups. For example, in some cases, one group of semantic object types may be associated with predetermined dimensions. Such semantic objects may include certain speed limit signs, yield signs, merge signs, stop signs, traffic lights, directional arrows on a roadway, manhole covers, or any other type of object that may be associated with a standardized size. One benefit offered by such semantic objects is that very little data may be needed to represent/fully define the objects. For example, if a standardized size of a speed limit size is known, then a harvesting vehicle may need only identify (through analysis of a captured image) the presence of a speed limit sign (a recognized type) along with an indication of a position of the detected speed limit sign (e.g., a 2D position in the captured image (or, alternatively, a 3D position in real world coordinates) of a center of the sign or a certain corner of the sign) to provide sufficient information for map generation on the server side. Where 2D image positions are transmitted to the server, a position associated with the captured image where the sign was detected may also be transmitted so the server can determine a real-world position of the sign (e.g., through structure in motion techniques using multiple captured images from one or more harvesting vehicles). Even with this limited information (requiring just a few bytes to define each detected object), the server may construct the map including a fully represented speed limit sign based on the type classification (representative of a speed limit sign) received from one or more harvesting vehicles along with the position information for the detected sign.

Semantic objects may also include other recognized object or feature types that are not associated with certain standardized characteristics. Such objects or features may include potholes, tar seams, light poles, non-standardized signs, curbs, trees, tree branches, or any other type of recognized object type with one or more variable characteristics (e.g., variable dimensions). In such cases, in addition to transmitting to a server an indication of the detected object or feature type (e.g., pothole, pole, etc.) and position information for the detected object or feature, a harvesting vehicle may also transmit an indication of a size of the object or feature. The size may be expressed in 2D image dimensions (e.g., with a bounding box or one or more dimension values) or real-world dimensions (determined through structure in motion calculations, based on LIDAR or RADAR system outputs, based on trained neural network outputs, etc.).

Non-semantic objects or features may include any detectable objects or features that fall outside of a recognized category or type, but that still may provide valuable information in map generation. In some cases, such non-semantic features may include a detected corner of a building or a corner of a detected window of a building, a unique stone or object near a roadway, a concrete splatter in a roadway shoulder, or any other detectable object or feature. Upon detecting such an object or feature one or more harvesting vehicles may transmit to a map generation server a location of one or more points (2D image points or 3D real world points) associated with the detected object/feature. Additionally, a compressed or simplified image segment (e.g., an image hash) may be generated for a region of the captured image including the detected object or feature. This image hash may be calculated based on a predetermined image processing algorithm and may form an effective signature for the detected non-semantic object or feature. Such a signature may be useful for navigation relative to a sparse map including the non-semantic feature or object, as a vehicle traversing the roadway may apply an algorithm similar to the algorithm used to generate the image hash in order to confirm/verify the presence in a captured image of the mapped non-semantic feature or object. Using this technique, non-semantic features may add to the richness of the sparse maps (e.g., to enhance their usefulness in navigation) without adding significant data overhead.

As noted, target trajectories may be stored in the sparse map. These target trajectories (e.g., 3D splines) may represent the preferred or recommended paths for each available lane of a roadway, each valid pathway through a junction, for merges and exits, etc. In addition to target trajectories, other road feature may also be detected, harvested, and incorporated in the sparse maps in the form of representative splines. Such features may include, for example, road edges, lane markings, curbs, guardrails, or any other objects or features that extend along a roadway or road segment.

Generating a Sparse Map

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8:
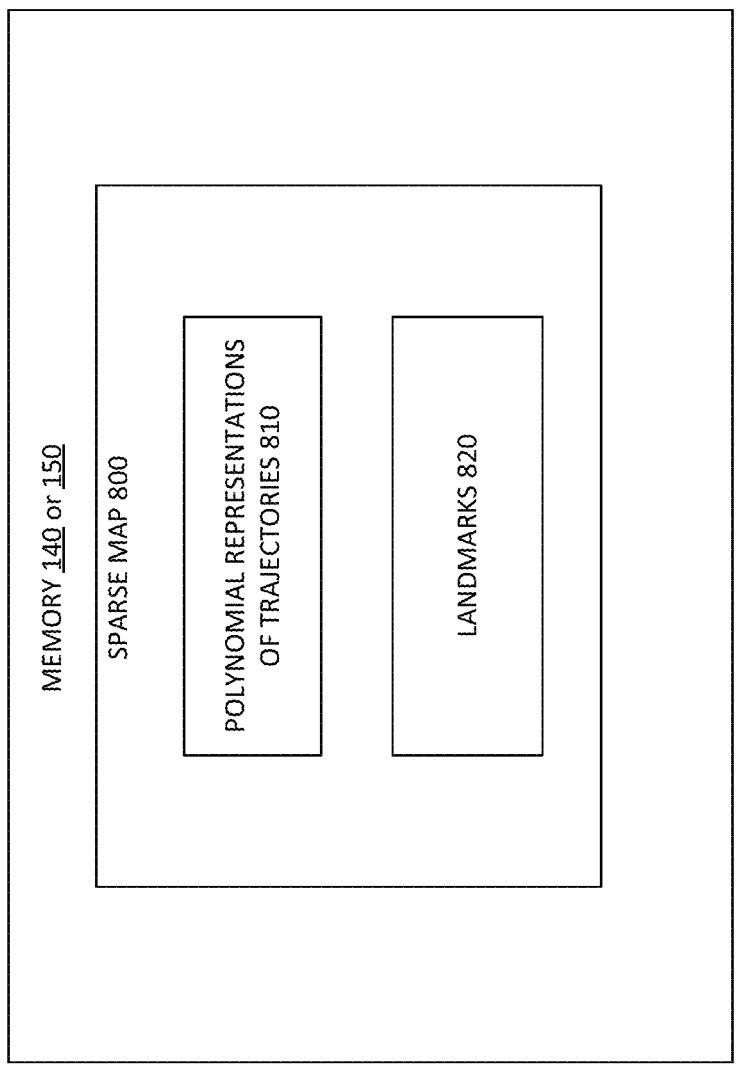
FIG. 8 shows a sparse map for providing autonomous vehicle navigation, consistent with the disclosed embodiments.

FIG. 8 shows a sparse map 800 that one or more vehicles, e.g., vehicle 200 (which may be an autonomous vehicle), may access for providing autonomous vehicle navigation. Sparse map 800 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 800 may be stored in a database (e.g., map database 160) that may be stored in memory 140 or 150, or other types of storage devices.

In some embodiments, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 800 stored in the storage device or computer-readable medium provided onboard vehicle 200 in order to generate navigational instructions for guiding the autonomous vehicle 200 as the vehicle traverses a road segment.

Sparse map 800 need not be stored locally with respect to a vehicle, however. In some embodiments, sparse map 800 may be stored on a storage device or computer-readable medium provided on a remote server that communicates with vehicle 200 or a device associated with vehicle 200. A processor (e.g., processing unit 110) provided on vehicle 200 may receive data included in sparse map 800 from the remote server and may execute the data for guiding the autonomous driving of vehicle 200. In such embodiments, the remote server may store all of sparse map 800 or only a portion thereof. Accordingly, the storage device or computer-readable medium provided onboard vehicle 200 and/or onboard one or more additional vehicles may store the remaining portion(s) of sparse map 800.

Furthermore, in such embodiments, sparse map 800 may be made accessible to a plurality of vehicles traversing various road segments (e.g., tens, hundreds, thousands, or millions of vehicles, etc.). It should be noted also that sparse map 800 may include multiple sub-maps. For example, in some embodiments, sparse map 800 may include hundreds, thousands, millions, or more, of sub-maps (e.g., map tiles) that may be used in navigating a vehicle. Such sub-maps may be referred to as local maps or map tiles, and a vehicle traveling along a roadway may access any number of local maps relevant to a location in which the vehicle is traveling. The local map sections of sparse map 800 may be stored with a Global Navigation Satellite System (GNSS) key as an index to the database of sparse map 800. Thus, while computation of steering angles for navigating a host vehicle in the present system may be performed without reliance upon a GNSS position of the host vehicle, road features, or landmarks, such GNSS information may be used for retrieval of relevant local maps.

In general, sparse map 800 may be generated based on data (e.g., drive information) collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories travelled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, road conditions, etc. Using the collected information, sparse map 800 may be generated and distributed (e.g., for local storage or via on-the-fly data transmission) for use in navigating one or more autonomous vehicles. However, in some embodiments, map generation may not end upon initial generation of the map. As will be discussed in greater detail below, sparse map 800 may be continuously or periodically updated based on data collected from vehicles as those vehicles continue to traverse roadways included in sparse map 800.

Data recorded in sparse map 800 may include position information based on Global Positioning System (GPS) data. For example, location information may be included in sparse map 800 for various map elements, including, for example, landmark locations, road profile locations, etc. Locations for map elements included in sparse map 800 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 800) may be repeated as additional vehicles pass the location of the identified landmark. Some or all of the additional location determinations may be used to refine the location information stored in sparse map 800 relative to the identified landmark. For example, in some embodiments, multiple position measurements relative to a particular feature stored in sparse map 800 may be averaged together. Any other mathematical operations, however, may also be used to refine a stored location of a map element based on a plurality of determined locations for the map element.

In a particular example, harvesting vehicles may traverse a particular road segment. Each harvesting vehicle captures images of their respective environments. The images may be collected at any suitable frame capture rate (e.g., 9 Hz, etc.). Image analysis processor(s) aboard each harvesting vehicle analyze the captured images to detect the presence of semantic and/or non-semantic features/objects. At a high level, the harvesting vehicles transmit to a mapping-server indications of detections of the semantic and/or non-semantic objects/features along with positions associated with those objects/features. In more detail, type indicators, dimension indicators, etc. may be transmitted together with the position information. The position information may include any suitable information for enabling the mapping server to aggregate the detected objects/features into a sparse map useful in navigation. In some cases, the position information may include one or more 2D image positions (e.g., X-Y pixel locations) in a captured image where the semantic or non-semantic features/objects were detected. Such image positions may correspond to a center of the feature/object, a corner, etc. In this scenario, to aid the mapping server in reconstructing the drive information and aligning the drive information from multiple harvesting vehicles, each harvesting vehicle may also provide the server with a location (e.g., a GPS location) where each image was captured.

In other cases, the harvesting vehicle may provide to the server one or more 3D real world points associated with the detected objects/features. Such 3D points may be relative to a predetermined origin (such as an origin of a drive segment) and may be determined through any suitable technique. In some cases, a structure in motion technique may be used to determine the 3D real world position of a detected object/feature. For example, a certain object such as a particular speed limit sign may be detected in two or more captured images. Using information such as the known ego motion (speed, trajectory, GPS position, etc.) of the harvesting vehicle between the captured images, along with observed changes of the speed limit sign in the captured images (change in X-Y pixel location, change in size, etc.), the real-world position of one or more points associated with the speed limit sign may be determined and passed along to the mapping server. Such an approach is optional, as it requires more computation on the part of the harvesting vehicle systems. The sparse map of the disclosed embodiments may enable autonomous navigation of a vehicle using relatively small amounts of stored data. In some embodiments, sparse map 800 may have a data density (e.g., including data representing the target trajectories, landmarks, and any other stored road features) of less than 2 MB per kilometer of roads, less than 1 MB per kilometer of roads, less than 500 kB per kilometer of roads, or less than 100 kB per kilometer of roads. In some embodiments, the data density of sparse map 800 may be less than 10 kB per kilometer of roads or even less than 2 kB per kilometer of roads (e.g., 1.6 kB per kilometer), or no more than 10 kB per kilometer of roads, or no more than 20 kB per kilometer of roads. In some embodiments, most, if not all, of the roadways of the United States may be navigated autonomously using a sparse map having a total of 4 GB or less of data. These data density values may represent an average over an entire sparse map 800, over a local map within sparse map 800, and/or over a particular road segment within sparse map 800.

As noted, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment, for example. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 800 may also include data relating to a plurality of predetermined landmarks 820 associated with particular road segments, local maps, etc. As discussed in greater detail below, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 820 may be identified and stored in sparse map 800 at any suitable spacing. In some embodiments, landmarks may be stored at relatively high densities (e.g., every few meters or more). In some embodiments, however, significantly larger landmark spacing values may be employed. For example, in sparse map 800, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart.

Between landmarks, and therefore between determinations of vehicle position relative to a target trajectory, the vehicle may navigate based on dead reckoning in which the vehicle uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 800 (and their known locations) to remove the dead reckoning-induced errors in position determination. In this way, the identified landmarks included in sparse map 800 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 800.

Moreover, in some embodiments, lane markings may be used for localization of the vehicle during landmark spacings. By using lane markings during landmark spacings, the accumulation of errors during navigation by dead reckoning may be minimized.

Figure 9A:
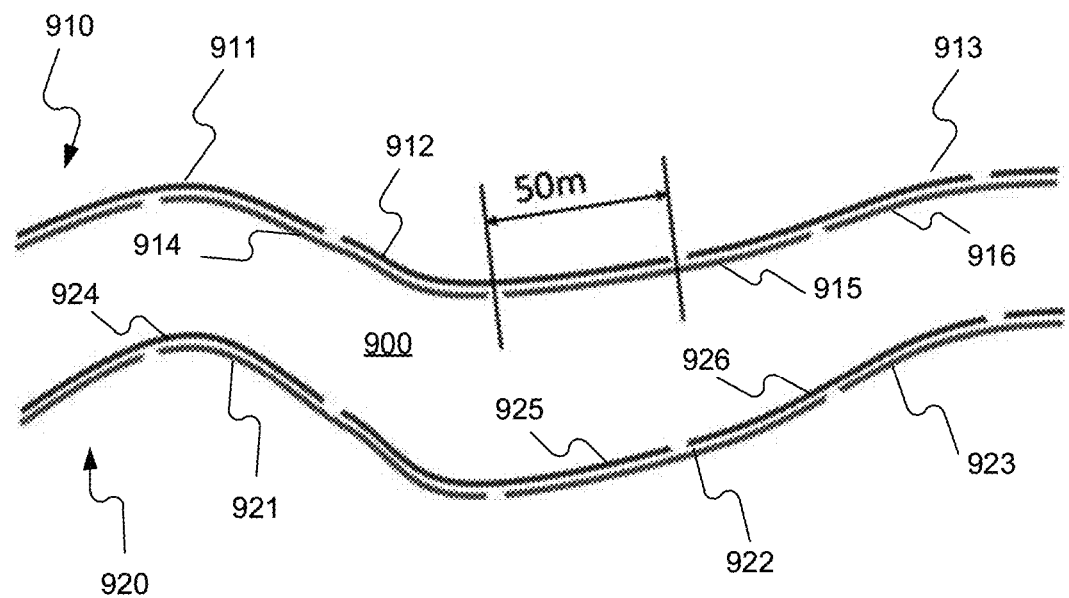
FIG. 9A illustrates a polynomial representation of a portions of a road segment consistent with the disclosed embodiments.

In addition to target trajectories and identified landmarks, sparse map 800 may include information relating to various other road features. For example, FIG. 9A illustrates a representation of curves along a particular road segment that may be stored in sparse map 800. In some embodiments, a single lane of a road may be modeled by a three-dimensional polynomial description of left and right sides of the road. Such polynomials representing left and right sides of a single lane are shown in FIG. 9A. Regardless of how many lanes a road may have, the road may be represented using polynomials in a way similar to that illustrated in FIG. 9A. For example, left and right sides of a multi-lane road may be represented by polynomials similar to those shown in FIG. 9A, and intermediate lane markings included on a multi-lane road (e.g., dashed markings representing lane boundaries, solid yellow lines representing boundaries between lanes traveling in different directions, etc.) may also be represented using polynomials such as those shown in FIG. 9A.

As shown in FIG. 9A, a lane 900 may be represented using polynomials (e.g., a first order, second order, third order, or any suitable order polynomials). For illustration, lane 900 is shown as a two-dimensional lane and the polynomials are shown as two-dimensional polynomials. As depicted in FIG. 9A, lane 900 includes a left side 910 and a right side 920. In some embodiments, more than one polynomial may be used to represent a location of each side of the road or lane boundary. For example, each of left side 910 and right side 920 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 910 and right side 920 may be represented by a plurality of third order polynomials separated into segments of about 100 meters in length (an example of the first predetermined range), and overlapping each other by about 50 meters. The polynomials representing the left side 910 and the right side 920 may or may not have the same order. For example, in some embodiments, some polynomials may be second order polynomials, some may be third order polynomials, and some may be fourth order polynomials.

In the example shown in FIG. 9A, left side 910 of lane 900 is represented by two groups of third order polynomials. The first group includes polynomial segments 911, 912, and 913. The second group includes polynomial segments 914, 915, and 916. The two groups, while substantially parallel to each other, follow the locations of their respective sides of the road. Polynomial segments 911, 912, 913, 914, 915, and 916 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 9A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 9A, right side 920 of lane 900 is further represented by a first group having polynomial segments 921, 922, and 923 and a second group having polynomial segments 924, 925, and 926.

Figure 9B:
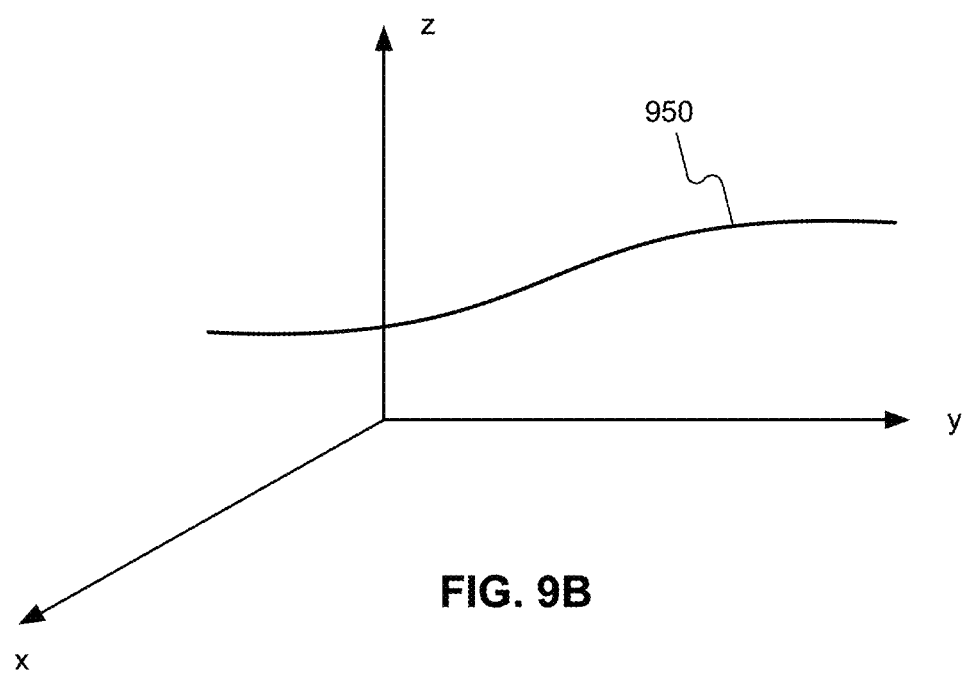
FIG. 9B illustrates a curve in three-dimensional space representing a target trajectory of a vehicle, for a particular road segment, included in a sparse map consistent with the disclosed embodiments.

Returning to the target trajectories of sparse map 800, FIG. 9B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 800 may be represented by one or more three-dimensional polynomials, like the three-dimensional polynomial 950 shown in FIG. 9B. Sparse map 800 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 800, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

Sparse map 800 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

As previously noted, sparse map 800 may include a plurality of predetermined landmarks associated with a road segment. Rather than storing actual images of the landmarks and relying, for example, on image recognition analysis based on captured images and stored images, each landmark in sparse map 800 may be represented and recognized using less data than a stored, actual image would require. Data representing landmarks may still include sufficient information for describing or identifying the landmarks along a road. Storing data describing characteristics of landmarks, rather than the actual images of landmarks, may reduce the size of sparse map 800.

Figure 10:
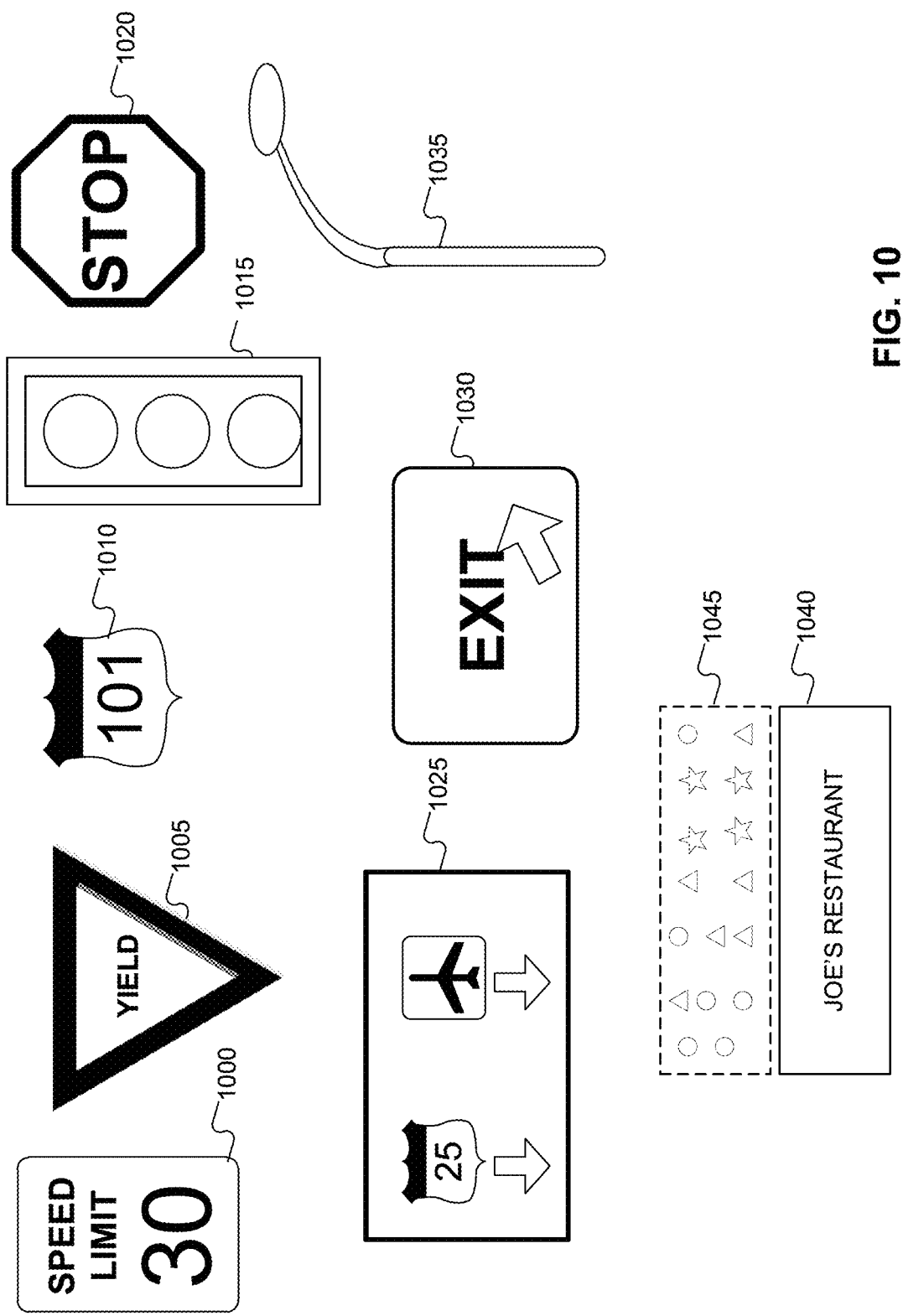
FIG. 10 illustrates example landmarks that may be included in sparse map consistent with the disclosed embodiments.

FIG. 10 illustrates examples of types of landmarks that may be represented in sparse map 800. The landmarks may include any visible and identifiable objects along a road segment. The landmarks may be selected such that they are fixed and do not change often with respect to their locations and/or content. The landmarks included in sparse map 800 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 800.

Examples of landmarks shown in FIG. 10 include traffic signs, directional signs, roadside fixtures, and general signs. Traffic signs may include, for example, speed limit signs (e.g., speed limit sign 1000), yield signs (e.g., yield sign 1005), route number signs (e.g., route number sign 1010), traffic light signs (e.g., traffic light sign 1015), stop signs (e.g., stop sign 1020). Directional signs may include a sign that includes one or more arrows indicating one or more directions to different places. For example, directional signs may include a highway sign 1025 having arrows for directing vehicles to different roads or places, an exit sign 1030 having an arrow directing vehicles off a road, etc. Accordingly, at least one of the plurality of landmarks may include a road sign.

General signs may be unrelated to traffic. For example, general signs may include billboards used for advertisement, or a welcome board adjacent a border between two countries, states, counties, cities, or towns. FIG. 10 shows a general sign 1040 ("Joe's Restaurant"). Although general sign 1040 may have a rectangular shape, as shown in FIG. 10, general sign 1040 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 1035), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 800 may be represented by a data object of a predetermined size. The data representing a landmark may include any suitable parameters for identifying a particular landmark. For example, in some embodiments, landmarks stored in sparse map 800 may include parameters such as a physical size of the landmark (e.g., to support estimation of distance to the landmark based on a known size/scale), a distance to a previous landmark, lateral offset, height, a type code (e.g., a landmark type-what type of directional sign, traffic sign, etc.), a GPS coordinate (e.g., to support global localization), and any other suitable parameters. Each parameter may be associated with a data size. For example, a landmark size may be stored using 8 bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used. Representing landmarks in sparse map 800 in this manner may offer a lean solution for efficiently representing landmarks in the database. In some embodiments, objects may be referred to as standard semantic objects or non-standard semantic objects. A standard semantic object may include any class of object for which there's a standardized set of characteristics (e.g., speed limit signs, warning signs, directional signs, traffic lights, etc. having known dimensions or other characteristics). A non-standard semantic object may include any object that is not associated with a standardized set of characteristics (e.g., general advertising signs, signs identifying business establishments, potholes, trees, etc. that may have variable dimensions). Each non-standard semantic object may be represented with 38 bytes of data (e.g., 8 bytes for size; 12 bytes for distance to previous landmark, lateral offset, and height; 2 bytes for a type code; and 16 bytes for position coordinates). Standard semantic objects may be represented using even less data, as size information may not be needed by the mapping server to fully represent the object in the sparse map.

Sparse map 800 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 800, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr. It should be noted that in some environments (e.g., urban environments) there may be a much higher density of detected objects available for inclusion in the sparse map (perhaps more than one per meter). In some embodiments, a generally rectangular object, such as a rectangular sign, may be represented in sparse map 800 by no more than 100 bytes of data. The representation of the generally rectangular object (e.g., general sign 1040) in sparse map 800 may include a condensed image signature or image hash (e.g., condensed image signature 1045) associated with the generally rectangular object. This condensed image signature/image hash may be determined using any suitable image hashing algorithm and may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 10, sparse map 800 may include or store a condensed image signature 1045 associated with a general sign 1040, rather than an actual image of general sign 1040. For example, after an image capture device (e.g., image capture device 122, 124, or 126) captures an image of general sign 1040, a processor (e.g., image processor 190 or any other processor that can process images either aboard or remotely located relative to a host vehicle) may perform an image analysis to extract/create condensed image signature 1045 that includes a unique signature or pattern associated with general sign 1040. In one embodiment, condensed image signature 1045 may include a shape, color pattern, a brightness pattern, or any other feature that may be extracted from the image of general sign 1040 for describing general sign 1040.

For example, in FIG. 10, the circles, triangles, and stars shown in condensed image signature 1045 may represent areas of different colors. The pattern represented by the circles, triangles, and stars may be stored in sparse map 800, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Accordingly, the plurality of landmarks may be identified through image analysis of the plurality of images acquired as one or more vehicles traverse the road segment. As explained below with respect to "crowdsourcing," in some embodiments, the image analysis to identify the plurality of landmarks may include accepting potential landmarks when a ratio of images in which the landmark does appear to images in which the landmark does not appear exceeds a threshold. Furthermore, in some embodiments, the image analysis to identify the plurality of landmarks may include rejecting potential landmarks when a ratio of images in which the landmark does not appear to images in which the landmark does appear exceeds a threshold.

Figure 11A:
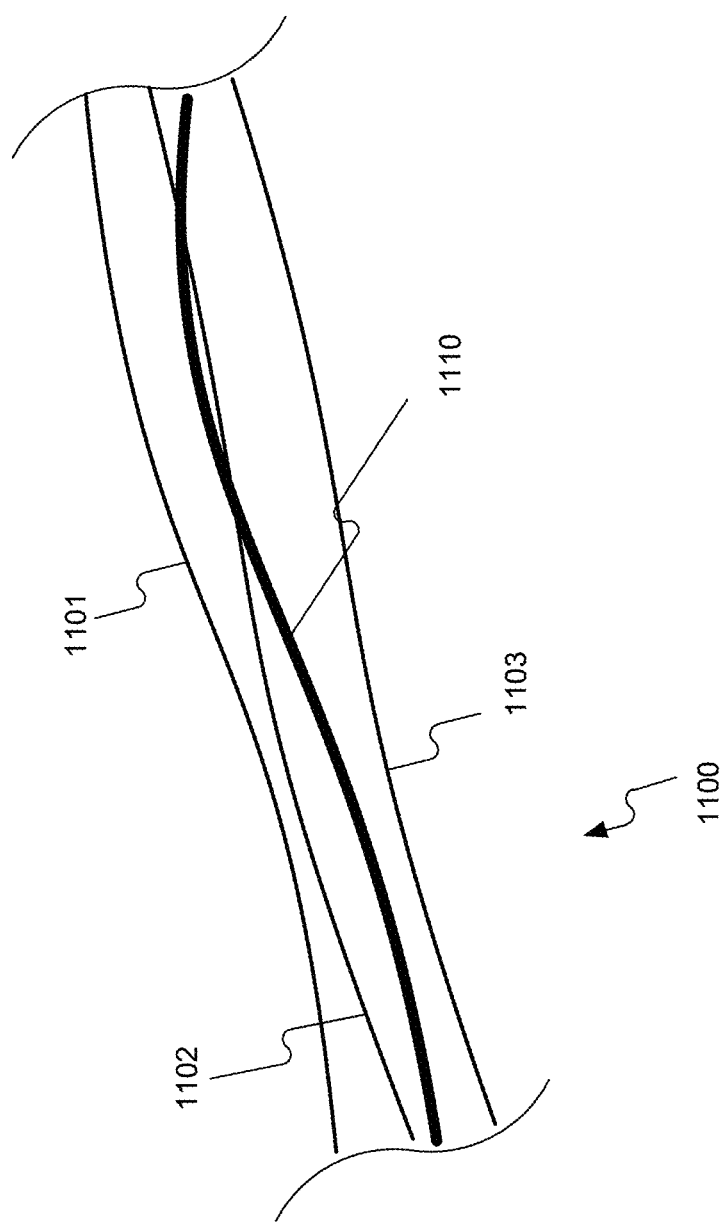
FIG. 11A shows polynomial representations of trajectories consistent with the disclosed embodiments.

Returning to the target trajectories a host vehicle may use to navigate a particular road segment, FIG. 11A shows polynomial representations trajectories capturing during a process of building or maintaining sparse map 800. A polynomial representation of a target trajectory included in sparse map 800 may be determined based on two or more reconstructed trajectories of prior traversals of vehicles along the same road segment. In some embodiments, the polynomial representation of the target trajectory included in sparse map 800 may be an aggregation of two or more reconstructed trajectories of prior traversals of vehicles along the same road segment. In some embodiments, the polynomial representation of the target trajectory included in sparse map 800 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 11A, a road segment 1100 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 11A, a first reconstructed trajectory 1101 may be determined based on data received from a first vehicle traversing road segment 1100 at a first time period (e.g., day 1), a second reconstructed trajectory 1102 may be obtained from a second vehicle traversing road segment 1100 at a second time period (e.g., day 2), and a third reconstructed trajectory 1103 may be obtained from a third vehicle traversing road segment 1100 at a third time period (e.g., day 3). Each trajectory 1101, 1102, and 1103 may be represented by a polynomial, such as a three-dimensional polynomial. It should be noted that in some embodiments, any of the reconstructed trajectories may be assembled onboard the vehicles traversing road segment 1100.

Additionally, or alternatively, such reconstructed trajectories may be determined on a server side based on information received from vehicles traversing road segment 1100. For example, in some embodiments, vehicles 200 may transmit data to one or more servers relating to their motion along road segment 1100 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 1100 at a later time based on the first, second, and third trajectories 1101, 1102, and 1103. While a target trajectory may be associated with a single prior traversal of a road segment, in some embodiments, each target trajectory included in sparse map 800 may be determined based on two or more reconstructed trajectories of vehicles traversing the same road segment. In FIG. 11A, the target trajectory is represented by 1110. In some embodiments, the target trajectory 1110 may be generated based on an average of the first, second, and third trajectories 1101, 1102, and 1103. In some embodiments, the target trajectory 1110 included in sparse map 800 may be an aggregation (e.g., a weighted combination) of two or more reconstructed trajectories.

At the mapping server, the server may receive actual trajectories for a particular road segment from multiple harvesting vehicles traversing the road segment. To generate a target trajectory for each valid path along the road segment (e.g., each lane, each drive direction, each path through a junction, etc.), the received actual trajectories may be aligned. The alignment process may include using detected objects/features identified along the road segment along with harvested positions of those detected objects/features to correlate the actual, harvested trajectories with one another. Once aligned, an average or "best fit" target trajectory for each available lane, etc. may be determined based on the aggregated, correlated/aligned actual trajectories.

Figure 11B:
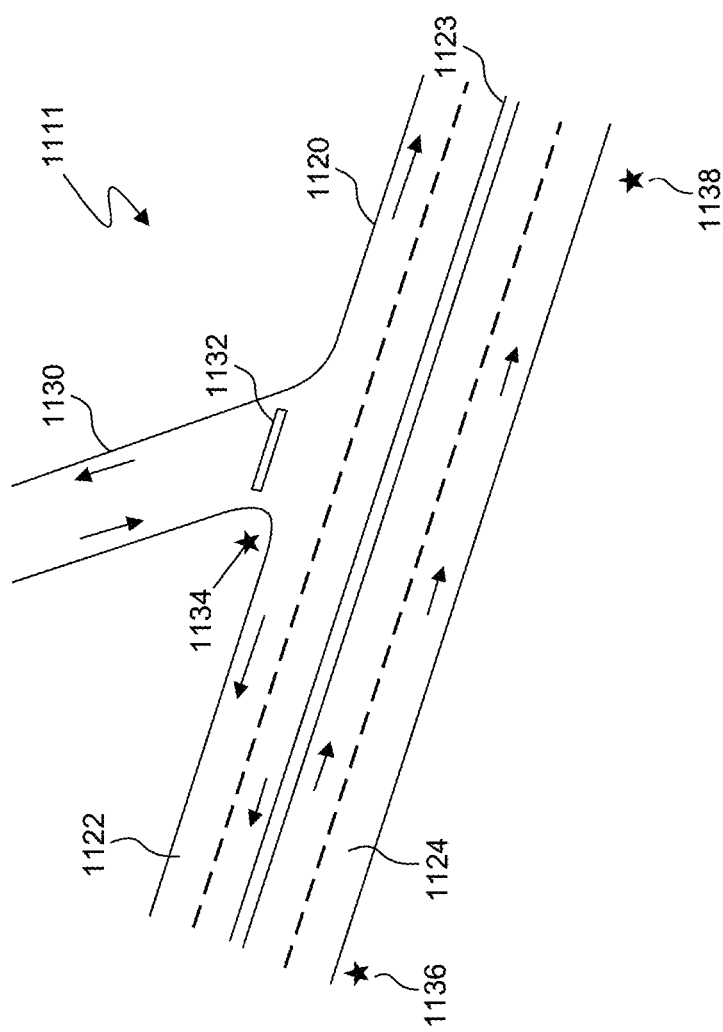
FIGS. 11B and 11C show target trajectories along a multi-lane road consistent with disclosed embodiments.
Figure 11C:
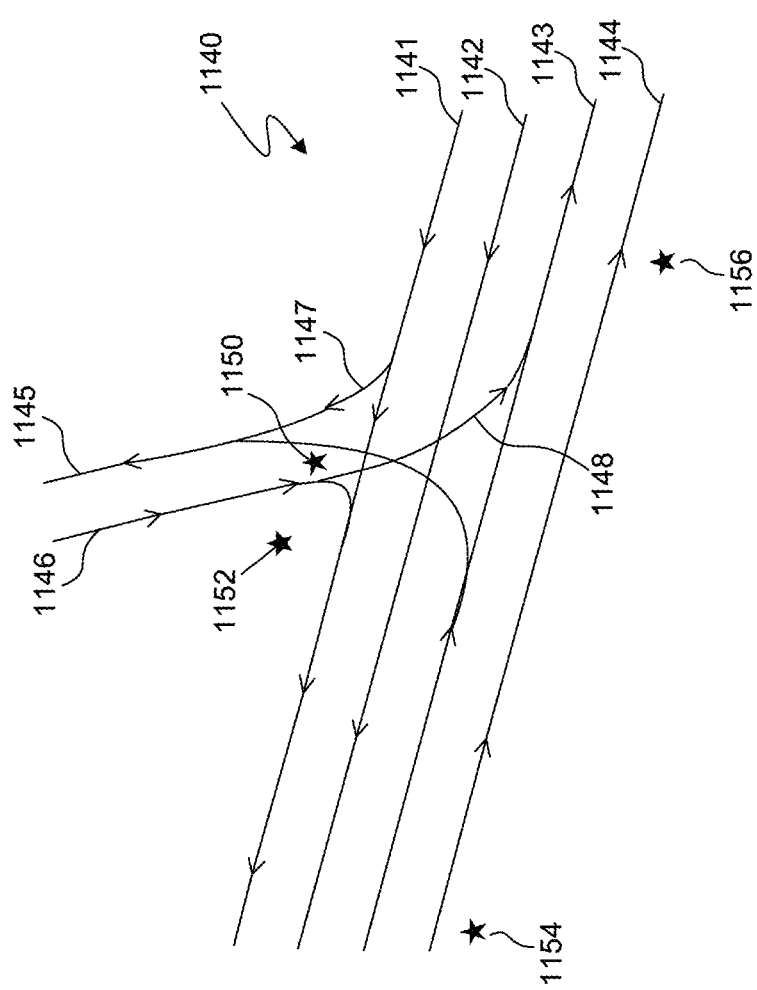

FIGS. 11B and 11C further illustrate the concept of target trajectories associated with road segments present within a geographic region 1111. As shown in FIG. 11B, a first road segment 1120 within geographic region 1111 may include a multilane road, which includes two lanes 1122 designated for vehicle travel in a first direction and two additional lanes 1124 designated for vehicle travel in a second direction opposite to the first direction. Lanes 1122 and lanes 1124 may be separated by a double yellow line 1123. Geographic region 1111 may also include a branching road segment 1130 that intersects with road segment 1120. Road segment 1130 may include a two-lane road, each lane being designated for a different direction of travel. Geographic region 1111 may also include other road features, such as a stop line 1132, a stop sign 1134, a speed limit sign 1136, and a hazard sign 1138.

As shown in FIG. 11C, sparse map 800 may include a local map 1140 including a road model for assisting with autonomous navigation of vehicles within geographic region 1111. For example, local map 1140 may include target trajectories for one or more lanes associated with road segments 1120 and/or 1130 within geographic region 1111. For example, local map 1140 may include target trajectories 1141 and/or 1142 that an autonomous vehicle may access or rely upon when traversing lanes 1122. Similarly, local map 1140 may include target trajectories 1143 and/or 1144 that an autonomous vehicle may access or rely upon when traversing lanes 1124. Further, local map 1140 may include target trajectories 1145 and/or 1146 that an autonomous vehicle may access or rely upon when traversing road segment 1130. Target trajectory 1147 represents a preferred path an autonomous vehicle should follow when transitioning from lanes 1120 (and specifically, relative to target trajectory 1141 associated with a right-most lane of lanes 1120) to road segment 1130 (and specifically, relative to a target trajectory 1145 associated with a first side of road segment 1130. Similarly, target trajectory 1148 represents a preferred path an autonomous vehicle should follow when transitioning from road segment 1130 (and specifically, relative to target trajectory 1146) to a portion of road segment 1124 (and specifically, as shown, relative to a target trajectory 1143 associated with a left lane of lanes 1124.

Sparse map 800 may also include representations of other road-related features associated with geographic region 1111. For example, sparse map 800 may also include representations of one or more landmarks identified in geographic region 1111. Such landmarks may include a first landmark 1150 associated with stop line 1132, a second landmark 1152 associated with stop sign 1134, a third landmark associated with speed limit sign 1154, and a fourth landmark 1156 associated with hazard sign 1138. Such landmarks may be used, for example, to assist an autonomous vehicle in determining its current location relative to any of the shown target trajectories, such that the vehicle may adjust its heading to match a direction of the target trajectory at the determined location.

Figure 11D:
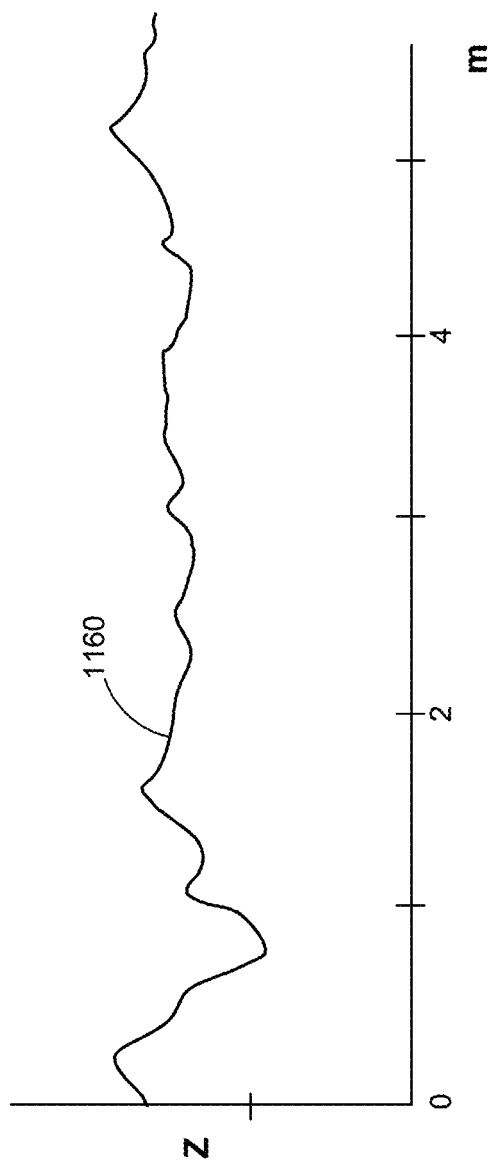
FIG. 11D shows an example road signature profile consistent with disclosed embodiments.

In some embodiments, sparse map 800 may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 11D shows an example of a road signature profile 1160. While profile 1160 may represent any of the parameters mentioned above, or others, in one example, profile 1160 may represent a measure of road surface roughness, as obtained, for example, by monitoring one or more sensors providing outputs indicative of an amount of suspension displacement as a vehicle travels a particular road segment.

Alternatively or concurrently, profile 1160 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 800 may include different trajectories based on different characteristics associated with a user of autonomous vehicles, environmental conditions, and/or other parameters relating to driving. For example, in some embodiments, different trajectories may be generated based on different user preferences and/or profiles. Sparse map 800 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 800 based on different environmental conditions, such as day and night, snow, rain, fog, etc. Autonomous vehicles driving under different environmental conditions may be provided with sparse map 800 generated based on such different environmental conditions. In some embodiments, cameras provided on autonomous vehicles may detect the environmental conditions, and may provide such information back to a server that generates and provides sparse maps. For example, the server may generate or update an already generated sparse map 800 to include trajectories that may be more suitable or safer for autonomous driving under the detected environmental conditions. The update of sparse map 800 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 800 such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Crowdsourcing a Sparse Map

The disclosed sparse maps may be efficiently (and passively) generated through the power of crowdsourcing. For example, any private or commercial vehicle equipped with a camera (e.g., a simple, low resolution camera regularly included as OEM equipment on today's vehicles) and an appropriate image analysis processor can serve as a harvesting vehicle. No special equipment (e.g., high definition imaging and/or positioning systems) are required. As a result of the disclosed crowdsourcing technique, the generated sparse maps may be extremely accurate and may include extremely refined position information (enabling navigation error limits of 10 cm or less) without requiring any specialized imaging or sensing equipment as input to the map generation process. Crowdsourcing also enables much more rapid (and inexpensive) updates to the generated maps, as new drive information is continuously available to the mapping server system from any roads traversed by private or commercial vehicles minimally equipped to also serve as harvesting vehicles. There is no need for designated vehicles equipped with high-definition imaging and mapping sensors. Therefore, the expense associated with building such specialized vehicles can be avoided. Further, updates to the presently disclosed sparse maps may be made much more rapidly than systems that rely upon dedicated, specialized mapping vehicles (which by virtue of their expense and special equipment are typically limited to a fleet of specialized vehicles of far lower numbers than the number of private or commercial vehicles already available for performing the disclosed harvesting techniques).

The disclosed sparse maps generated through crowdsourcing may be extremely accurate because they may be generated based on many inputs from multiple (10s, hundreds, millions, etc.) of harvesting vehicles that have collected drive information along a particular road segment. For example, every harvesting vehicle that drives along a particular road segment may record its actual trajectory and may determine position information relative to detected objects/features along the road segment. This information is passed along from multiple harvesting vehicles to a server. The actual trajectories are aggregated to generate a refined, target trajectory for each valid drive path along the road segment. Additionally, the position information collected from the multiple harvesting vehicles for each of the detected objects/features along the road segment (semantic or non-semantic) can also be aggregated. As a result, the mapped position of each detected object/feature may constitute an average of hundreds, thousands, or millions of individually determined positions for each detected object/feature. Such a technique may yield extremely accurate mapped positions for the detected objects/features.

In some embodiments, the disclosed systems and methods may generate a sparse map for autonomous vehicle navigation. For example, disclosed systems and methods may use crowdsourced data for generation of a sparse map that one or more autonomous vehicles may use to navigate along a system of roads. As used herein, "crowdsourcing" means that data are received from various vehicles (e.g., autonomous vehicles) travelling on a road segment at different times, and such data are used to generate and/or update the road model, including sparse map tiles. The model or any of its sparse map tiles may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation).

The vehicle trajectory data that a vehicle may upload to a server may correspond with the actual reconstructed trajectory for the vehicle or may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 800 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as the vehicle travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 800. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign.

The vehicle may determine a distance from the vehicle to the landmark or a position associated with the landmark (e.g., any semantic or non-semantic object or feature along a road segment) based on the analysis of the one or more images. In some embodiments, the distance may be determined based on analysis of images of the landmark using a suitable image analysis method, such as a scaling method and/or an optical flow method. As previously noted, a position of the object/feature may include a 2D image position (e.g., an X-Y pixel position in one or more captured images) of one or more points associated with the object/feature or may include a 3D real-world position of one or more points (e.g., determined through structure in motion/optical flow techniques, LIDAR or RADAR information, etc.). In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, during navigation, a navigating vehicle may capture an image that includes a representation of the landmark, process the image (e.g., using a classifier), and compare the result landmark in order to confirm detection of the mapped landmark and to use the mapped landmark in localizing the navigating vehicle relative to the sparse map.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. For example, as discussed below with respect to FIG. 19, the server may generate a sparse map having the unified road model using the uploaded curves and landmarks.

The server may also distribute the model to clients (e.g., vehicles). For example, the server may distribute the sparse map to one or more vehicles. The server may continuously or periodically update the model when receiving new data from the vehicles. For example, the server may process the new data to evaluate whether the data includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated. For example, while an autonomous vehicle is traveling along another road segment before reaching the road segment with which an update is associated, the server may distribute the updates or updated model to the autonomous vehicle before the vehicle reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment. For example, the remote server may align the trajectories to generate a crowdsourced sparse map from the collected trajectories.

The server may average landmark properties received from multiple vehicles that travelled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles travelled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles travelled along the common road segment and recognized the same landmark. The averaged lateral portion may be used to support lane assignment. The server may average the GPS coordinates of the landmark measured by multiple vehicles travelled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation. For example, as discussed further below, the server may use crowdsourced data to filter out "ghost" landmarks detected by vehicles.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Figure 12:
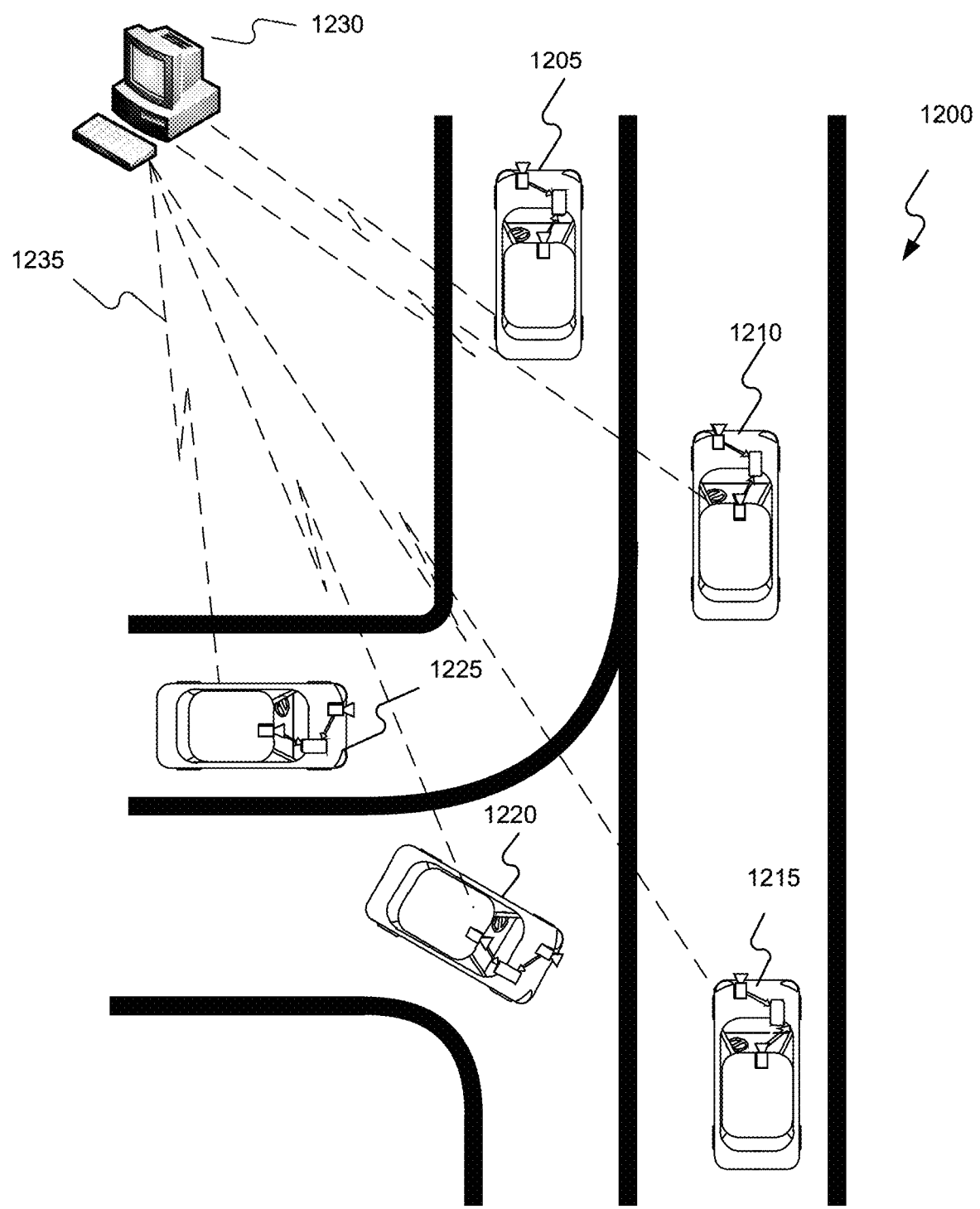
FIG. 12 is a schematic illustration of a system that uses crowd sourcing data received from a plurality of vehicles for autonomous vehicle navigation, consistent with the disclosed embodiments.

FIG. 12 is a schematic illustration of a system that uses crowdsourcing to generate a sparse map (as well as distribute and navigate using a crowdsourced sparse map). FIG. 12 shows a road segment 1200 that includes one or more lanes. A plurality of vehicles 1205, 1210, 1215, 1220, and 1225 may travel on road segment 1200 at the same time or at different times (although shown as appearing on road segment 1200 at the same time in FIG. 12). At least one of vehicles 1205, 1210, 1215, 1220, and 1225 may be an autonomous vehicle. For simplicity of the present example, all of the vehicles 1205, 1210, 1215, 1220, and 1225 are presumed to be autonomous vehicles.

Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 1230 via one or more networks (e.g., over a cellular network and/or the Internet, etc.) through wireless communication paths 1235, as indicated by the dashed lines. Each vehicle may transmit data to server 1230 and receive data from server 1230. For example, server 1230 may collect data from multiple vehicles travelling on the road segment 1200 at different times, and may process the collected data to generate an autonomous vehicle road navigation model, or an update to the model. Server 1230 may transmit the autonomous vehicle road navigation model or the update to the model to the vehicles that transmitted data to server 1230. Server 1230 may transmit the autonomous vehicle road navigation model or the update to the model to other vehicles that travel on road segment 1200 at later times.

As vehicles 1205, 1210, 1215, 1220, and 1225 travel on road segment 1200, navigation information collected (e.g., detected, sensed, or measured) by vehicles 1205, 1210, 1215, 1220, and 1225 may be transmitted to server 1230. In some embodiments, the navigation information may be associated with the common road segment 1200. The navigation information may include a trajectory associated with each of the vehicles 1205, 1210, 1215, 1220, and 1225 as each vehicle travels over road segment 1200. In some embodiments, the trajectory may be reconstructed based on data sensed by various sensors and devices provided on vehicle 1205. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 1205 sensed by a speed sensor. In addition, in some embodiments, the trajectory may be determined (e.g., by a processor onboard each of vehicles 1205, 1210, 1215, 1220, and 1225) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 1205 may be determined by a processor provided aboard vehicle 1205 and transmitted to server 1230. In other embodiments, server 1230 may receive data sensed by the various sensors and devices provided in vehicle 1205, and determine the trajectory based on the data received from vehicle 1205.

In some embodiments, the navigation information transmitted from vehicles 1205, 1210, 1215, 1220, and 1225 to server 1230 may include data regarding the road surface, the road geometry, or the road profile. The geometry of road segment 1200 may include lane structure and/or landmarks. The lane structure may include the total number of lanes of road segment 1200, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 1230 may store the navigation information on a non-transitory computer-readable medium, such as a hard drive, a compact disc, a tape, a memory, etc. Server 1230 may generate (e.g., through a processor included in server 1230) at least a portion of an autonomous vehicle road navigation model for the common road segment 1200 based on the navigation information received from the plurality of vehicles 1205, 1210, 1215, 1220, and 1225 and may store the model as a portion of a sparse map. Server 1230 may determine a trajectory associated with each lane based on crowdsourced data (e.g., navigation information) received from multiple vehicles (e.g., 1205, 1210, 1215, 1220, and 1225) that travel on a lane of road segment at different times. Server 1230 may generate the autonomous vehicle road navigation model or a portion of the model (e.g., an updated portion) based on a plurality of trajectories determined based on the crowd sourced navigation data. Server 1230 may transmit the model or the updated portion of the model to one or more of autonomous vehicles 1205, 1210, 1215, 1220, and 1225 traveling on road segment 1200 or any other autonomous vehicles that travel on road segment at a later time for updating an existing autonomous vehicle road navigation model provided in a navigation system of the vehicles. The autonomous vehicle road navigation model may be used by the autonomous vehicles in autonomously navigating along the common road segment 1200.

As explained above, the autonomous vehicle road navigation model may be included in a sparse map (e.g., sparse map 800 depicted in FIG. 8). Sparse map 800 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 800, and may use map data from sparse map 800 when the model is executed for navigation. In some embodiments, the autonomous vehicle road navigation model may use map data included in sparse map 800 for determining target trajectories along road segment 1200 for guiding autonomous navigation of autonomous vehicles 1205, 1210, 1215, 1220, and 1225 or other vehicles that later travel along road segment 1200. For example, when the autonomous vehicle road navigation model is executed by a processor included in a navigation system of vehicle 1205, the model may cause the processor to compare the trajectories determined based on the navigation information received from vehicle 1205 with predetermined trajectories included in sparse map 800 to validate and/or correct the current traveling course of vehicle 1205.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 1200) or a lane of the road segment 1200.

As explained above, the autonomous vehicle road navigation model included in the sparse map may include other information, such as identification of at least one landmark along road segment 1200. The landmark may be visible within a field of view of a camera (e.g., camera 122) installed on each of vehicles 1205, 1210, 1215, 1220, and 1225. In some embodiments, camera 122 may capture an image of a landmark. A processor (e.g., processor 180, 190, or processing unit 110) provided on vehicle 1205 may process the image of the landmark to extract identification information for the landmark. The landmark identification information, rather than an actual image of the landmark, may be stored in sparse map 800. The landmark identification information may require much less storage space than an actual image. Other sensors or systems (e.g., GPS system) may also provide certain identification information of the landmark (e.g., position of landmark). The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an RFID device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 800.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 1205, 1210, 1215, 1220, and 1225. In some embodiments, the position of the landmark may be determined by averaging the position measurements detected, collected, or received by sensor systems on different vehicles 1205, 1210, 1215, 1220, and 1225 through multiple drives. For example, vehicles 1205, 1210, 1215, 1220, and 1225 may transmit position measurements data to server 1230, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 1205) may estimate the physical size of the landmark based on the analysis of the images. Server 1230 may receive multiple estimates of the physical size of the same landmark from different vehicles over different drives. Server 1230 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*R/D$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, $\omega$ is an image length (like the object width), and $\Delta\omega$ is the change of that image length in a unit of time.

When the physical size of the landmark is known, the distance to the landmark may also be determined based on the following equation: $Z=f*W/\omega$, where f is the focal length, W is the size of the landmark (e.g., height or width), ω is the number of pixels when the landmark leaves the image. From the above equation, a change in distance Z may be calculated using $\Delta Z = f^* W^* \Delta\omega/\omega^2 + f^* \Delta W/\omega$, where ΔW decays to zero by averaging, and where Δω is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely ΔW and Δω). Their contribution to the distance error is given by $\Delta Z = f^* W^* \Delta\omega/\omega^2 + f^* \Delta W/\omega$. However, ΔW decays to zero by averaging; hence ΔZ is determined by Δω (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 13:
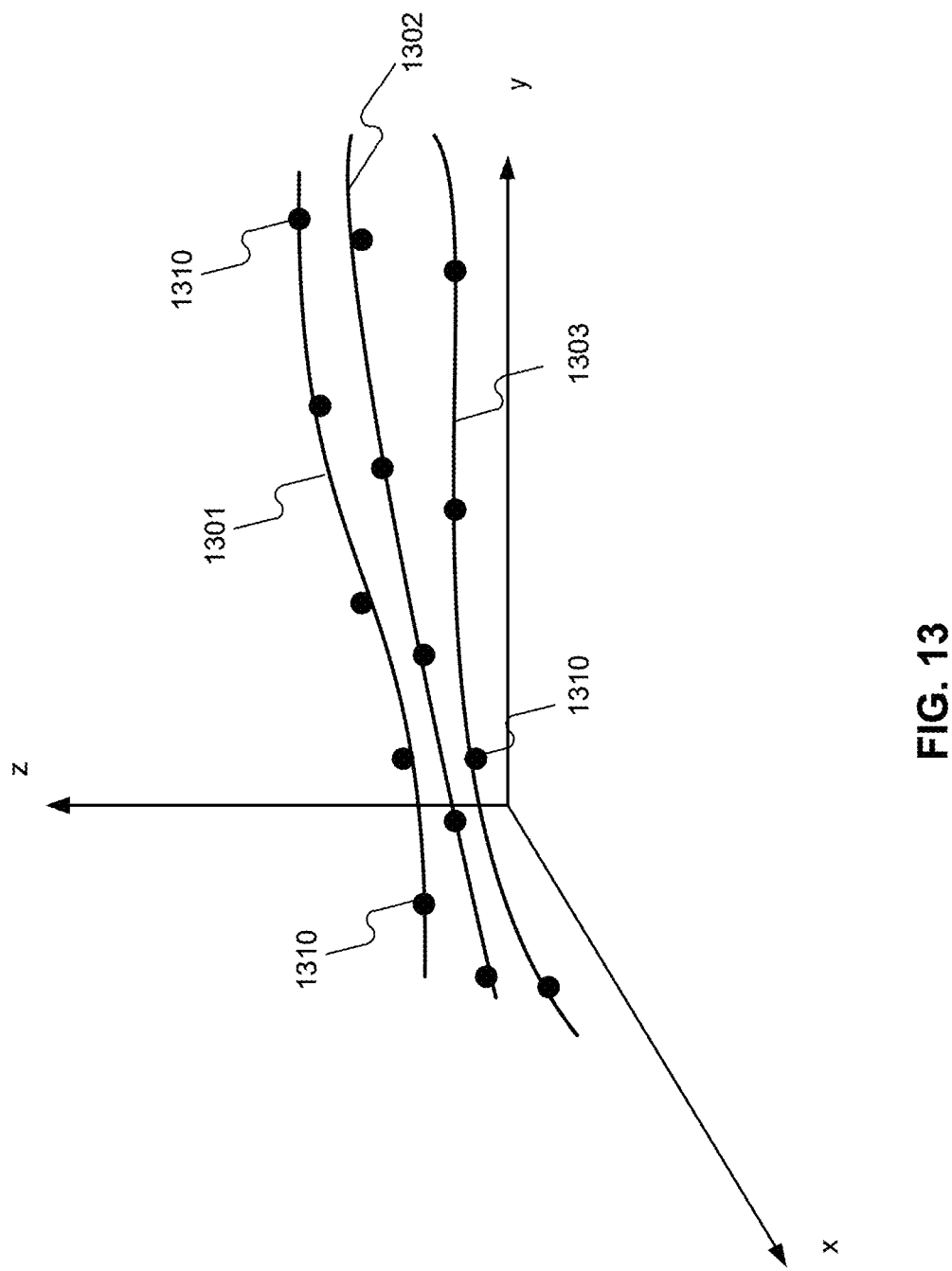
FIG. 13 illustrates an example autonomous vehicle road navigation model represented by a plurality of three dimensional splines, consistent with the disclosed embodiments.

FIG. 13 illustrates an example autonomous vehicle road navigation model represented by a plurality of three dimensional splines 1301, 1302, and 1303. The curves 1301, 1302, and 1303 shown in FIG. 13 are for illustration purpose only. Each spline may include one or more three dimensional polynomials connecting a plurality of data points 1310. Each polynomial may be a first order polynomial, a second order polynomial, a third order polynomial, or a combination of any suitable polynomials having different orders. Each data point 1310 may be associated with the navigation information received from vehicles 1205, 1210, 1215, 1220, and 1225. In some embodiments, each data point 1310 may be associated with data related to landmarks (e.g., size, location, and identification information of landmarks) and/or road signature profiles (e.g., road geometry, road roughness profile, road curvature profile, road width profile). In some embodiments, some data points 1310 may be associated with data related to landmarks, and others may be associated with data related to road signature profiles.

Figure 14:
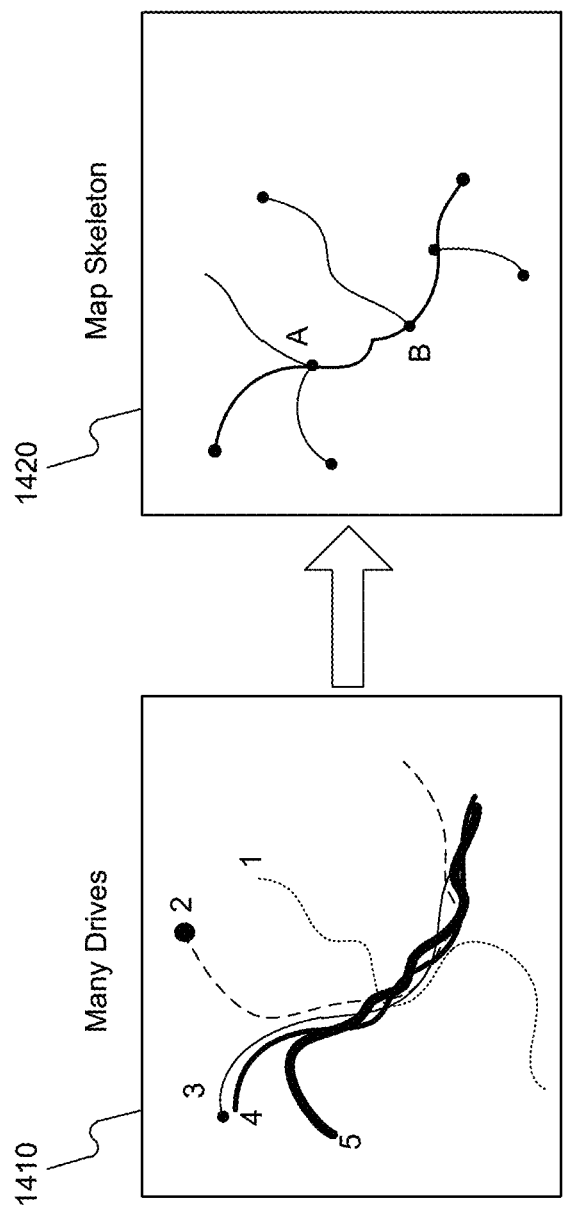
FIG. 14 shows a map skeleton generated from combining location information from many drives, consistent with the disclosed embodiments.

FIG. 14 illustrates raw location data 1410 (e.g., GPS data) received from five separate drives. One drive may be separate from another drive if it was traversed by separate vehicles at the same time, by the same vehicle at separate times, or by separate vehicles at separate times. To account for errors in the location data 1410 and for differing locations of vehicles within the same lane (e.g., one vehicle may drive closer to the left of a lane than another), server 1230 may generate a map skeleton 1420 using one or more statistical techniques to determine whether variations in the raw location data 1410 represent actual divergences or statistical errors. Each path within skeleton 1420 may be linked back to the raw data 1410 that formed the path. For example, the path between A and B within skeleton 1420 is linked to raw data 1410 from drives 2, 3, 4, and 5 but not from drive 1. Skeleton 1420 may not be detailed enough to be used to navigate a vehicle (e.g., because it combines drives from multiple lanes on the same road unlike the splines described above) but may provide useful topological information and may be used to define intersections.

Figure 15:
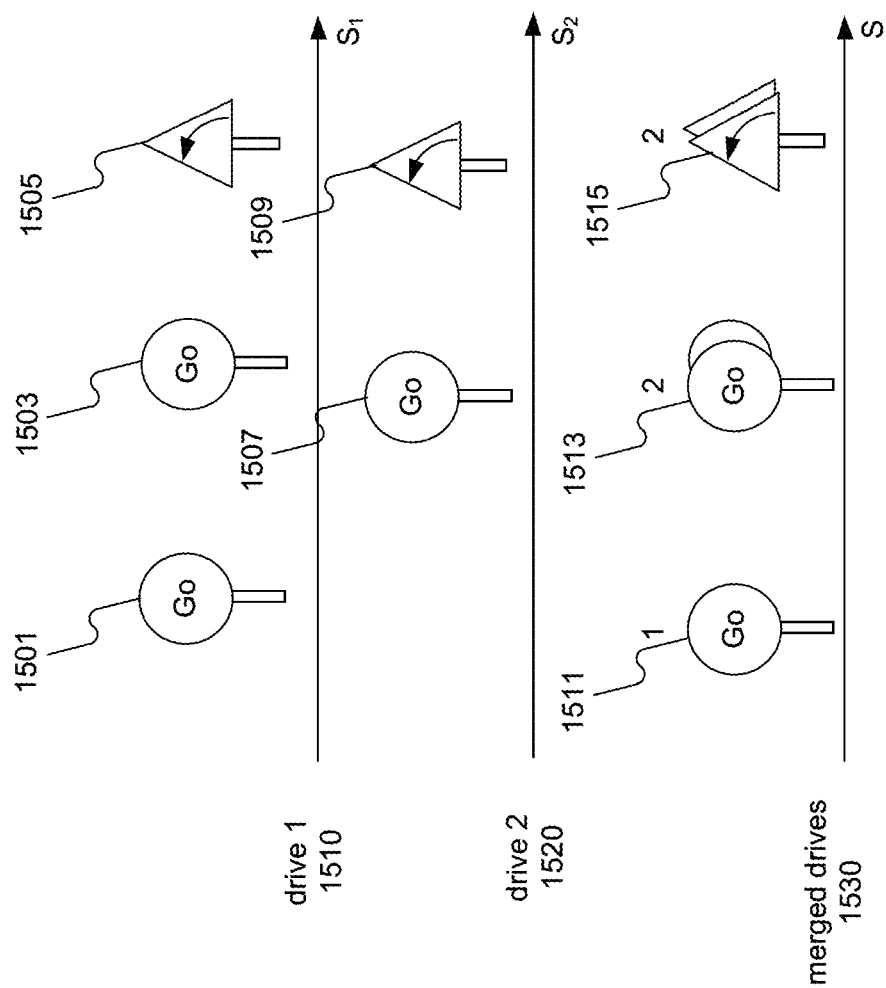
FIG. 15 shows an example of a longitudinal alignment of two drives with example signs as landmarks, consistent with the disclosed embodiments.

FIG. 15 illustrates an example by which additional detail may be generated for a sparse map within a segment of a map skeleton (e.g., segment A to B within skeleton 1420). As depicted in FIG. 15, the data (e.g. ego-motion data, road markings data, and the like) may be shown as a function of position S (or $S_1$ or $S_2$) along the drive. Server 1230 may identify landmarks for the sparse map by identifying unique matches between landmarks 1501, 1503, and 1505 of drive 1510 and landmarks 1507 and 1509 of drive 1520. Such a matching algorithm may result in identification of landmarks 1511, 1513, and 1515. One skilled in the art would recognize, however, that other matching algorithms may be used. For example, probability optimization may be used in lieu of or in combination with unique matching. Server 1230 may longitudinally align the drives to align the matched landmarks. For example, server 1230 may select one drive (e.g., drive 1520) as a reference drive and then shift and/or elastically stretch the other drive(s) (e.g., drive 1510) for alignment.

Figure 16:
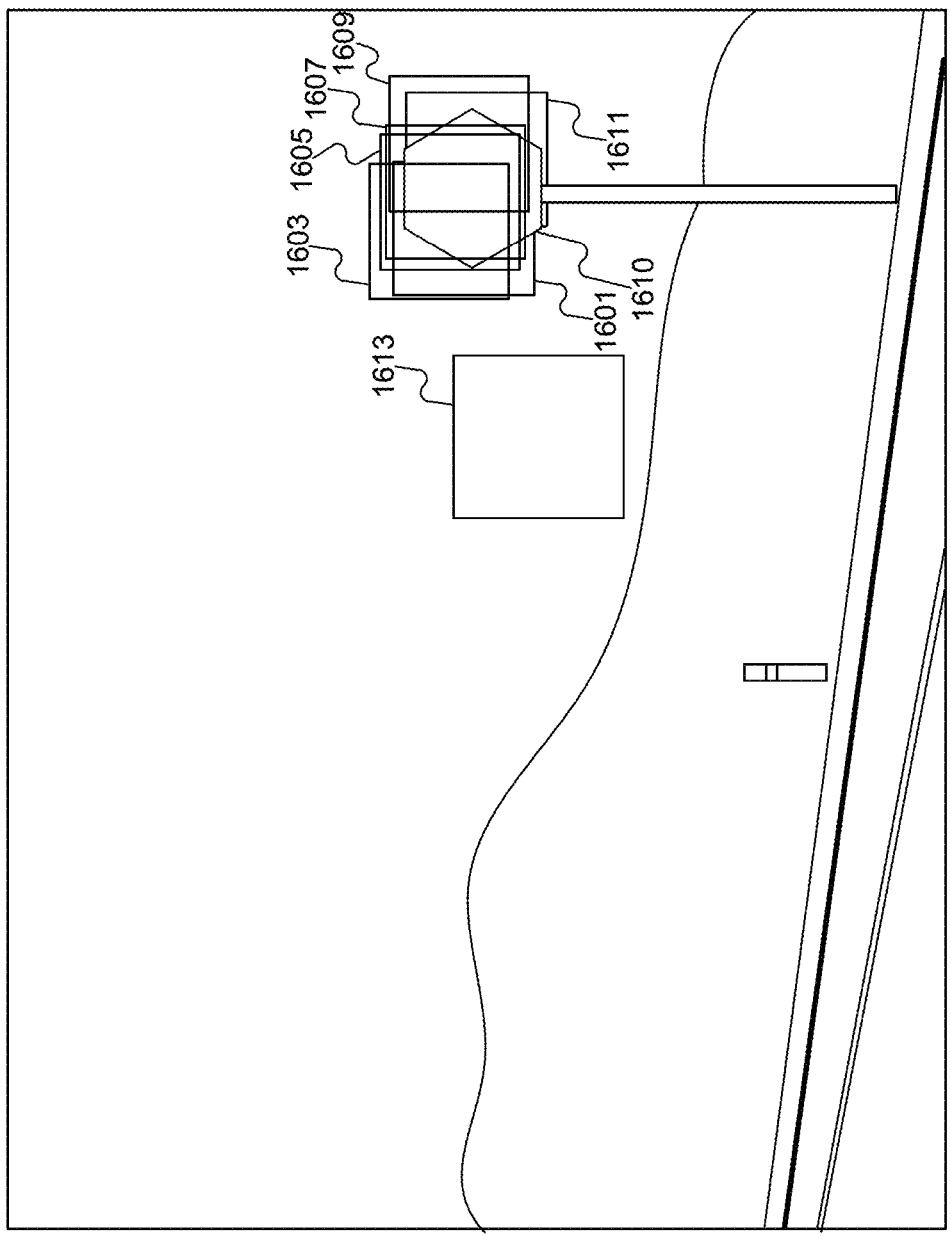
FIG. 16 shows an example of a longitudinal alignment of many drives with an example sign as a landmark, consistent with the disclosed embodiments.

FIG. 16 shows an example of aligned landmark data for use in a sparse map. In the example of FIG. 16, landmark 1610 comprises a road sign. The example of FIG. 16 further depicts data from a plurality of drives 1601, 1603, 1605, 1607, 1609, 1611, and 1613. In the example of FIG. 16, the data from drive 1613 consists of a "ghost" landmark, and the server 1230 may identify it as such because none of drives 1601, 1603, 1605, 1607, 1609, and 1611 include an identification of a landmark in the vicinity of the identified landmark in drive 1613. Accordingly, server 1230 may accept potential landmarks when a ratio of images in which the landmark does appear to images in which the landmark does not appear exceeds a threshold and/or may reject potential landmarks when a ratio of images in which the landmark does not appear to images in which the landmark does appear exceeds a threshold.

Figure 17:
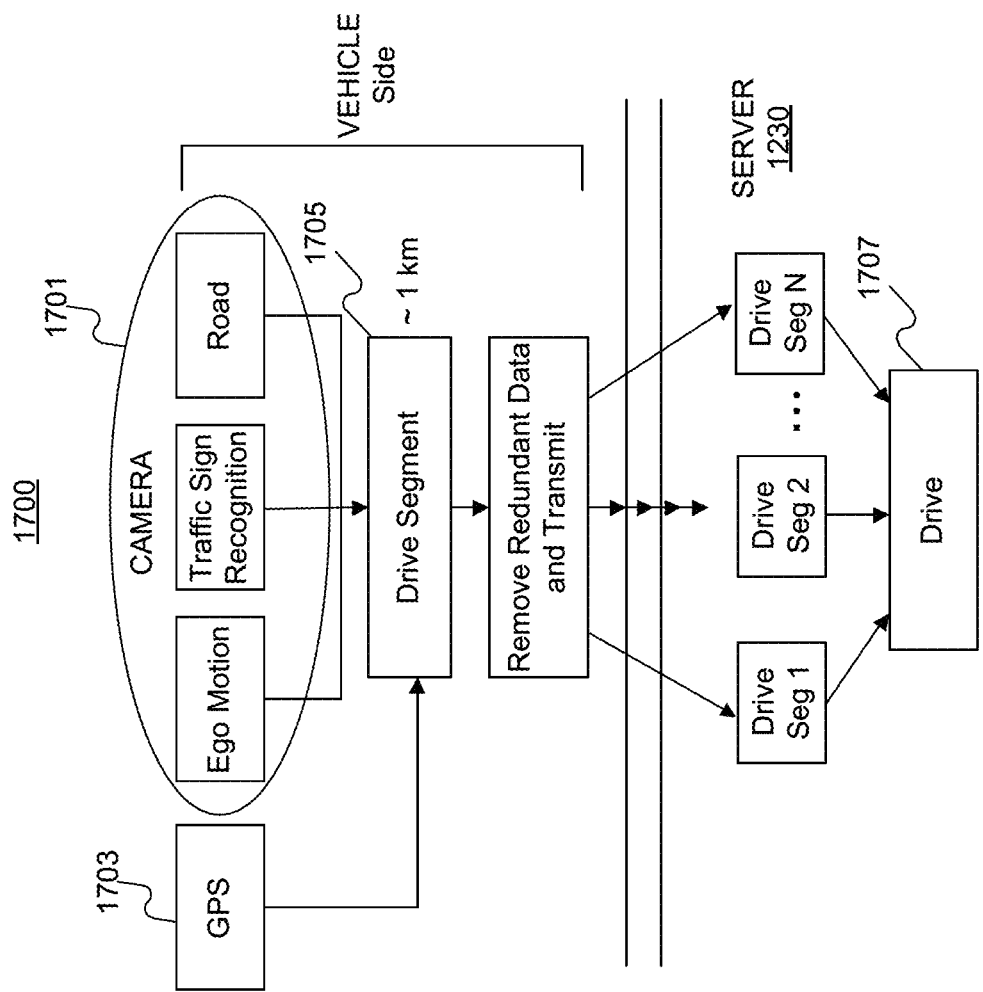
FIG. 17 is a schematic illustration of a system for generating drive data using a camera, a vehicle, and a server, consistent with the disclosed embodiments.

FIG. 17 depicts a system 1700 for generating drive data, which may be used to crowdsource a sparse map. As depicted in FIG. 17, system 1700 may include a camera 1701 and a locating device 1703 (e.g., a GPS locator). Camera 1701 and locating device 1703 may be mounted on a vehicle (e.g., one of vehicles 1205, 1210, 1215, 1220, and 1225). Camera 1701 may produce a plurality of data of multiple types, e.g., ego motion data, traffic sign data, road data, or the like. The camera data and location data may be segmented into drive segments 1705. For example, drive segments 1705 may each have camera data and location data from less than 1 km of driving.

In some embodiments, system 1700 may remove redundancies in drive segments 1705. For example, if a landmark appears in multiple images from camera 1701, system 1700 may strip the redundant data such that the drive segments 1705 only contain one copy of the location of and any metadata relating to the landmark. By way of further example, if a lane marking appears in multiple images from camera 1701, system 1700 may strip the redundant data such that the drive segments 1705 only contain one copy of the location of and any metadata relating to the lane marking.

System 1700 also includes a server (e.g., server 1230). Server 1230 may receive drive segments 1705 from the vehicle and recombine the drive segments 1705 into a single drive 1707. Such an arrangement may allow for reduce bandwidth requirements when transferring data between the vehicle and the server while also allowing for the server to store data relating to an entire drive.

Figure 18:
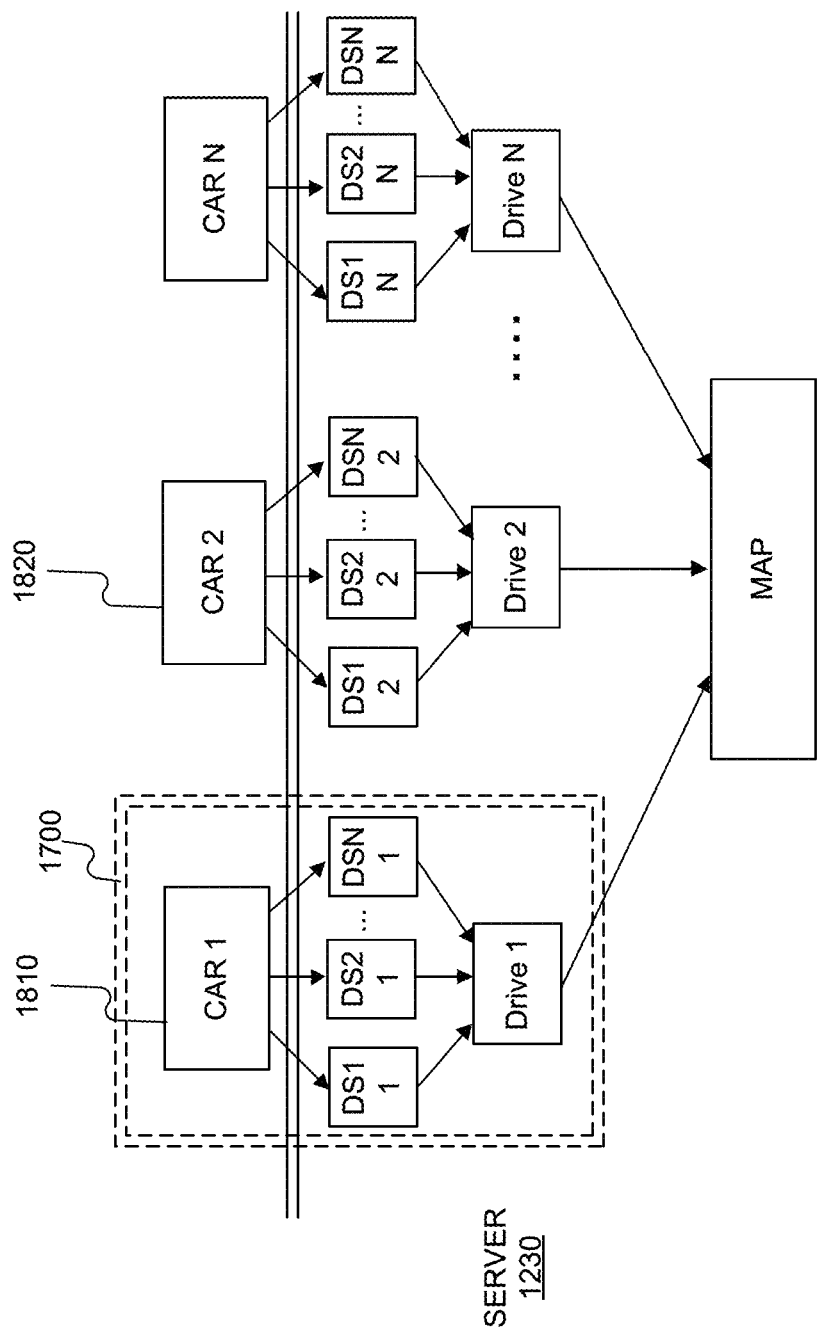
FIG. 18 is a schematic illustration of a system for crowdsourcing a sparse map, consistent with the disclosed embodiments.

FIG. 18 depicts system 1700 of FIG. 17 further configured for crowdsourcing a sparse map. As in FIG. 17, system 1700 includes vehicle 1810, which captures drive data using, for example, a camera (which produces, e.g., ego motion data, traffic sign data, road data, or the like) and a locating device (e.g., a GPS locator). As in FIG. 17, vehicle 1810 segments the collected data into drive segments (depicted as "DS1 1," "DS2 1," "DSN 1" in FIG. 18). Server 1230 then receives the drive segments and reconstructs a drive (depicted as "Drive 1" in FIG. 18) from the received segments.

As further depicted in FIG. 18, system 1700 also receives data from additional vehicles. For example, vehicle 1820 also captures drive data using, for example, a camera (which produces, e.g., ego motion data, traffic sign data, road data, or the like) and a locating device (e.g., a GPS locator). Similar to vehicle 1810, vehicle 1820 segments the collected data into drive segments (depicted as "DS1 2," "DS2 2," "DSN 2" in FIG. 18). Server 1230 then receives the drive segments and reconstructs a drive (depicted as "Drive 2" in FIG. 18) from the received segments. Any number of additional vehicles may be used. For example, FIG. 18 also includes "CAR N" that captures drive data, segments it into drive segments (depicted as "DS1 N," "DS2 N," "DSN N" in FIG. 18), and sends it to server 1230 for reconstruction into a drive (depicted as "Drive N" in FIG. 18).

As depicted in FIG. 18, server 1230 may construct a sparse map (depicted as "MAP") using the reconstructed drives (e.g., "Drive 1," "Drive 2," and "Drive N") collected from a plurality of vehicles (e.g., "CAR 1" (also labeled vehicle 1810), "CAR 2" (also labeled vehicle 1820), and "CAR N").

Figure 19:
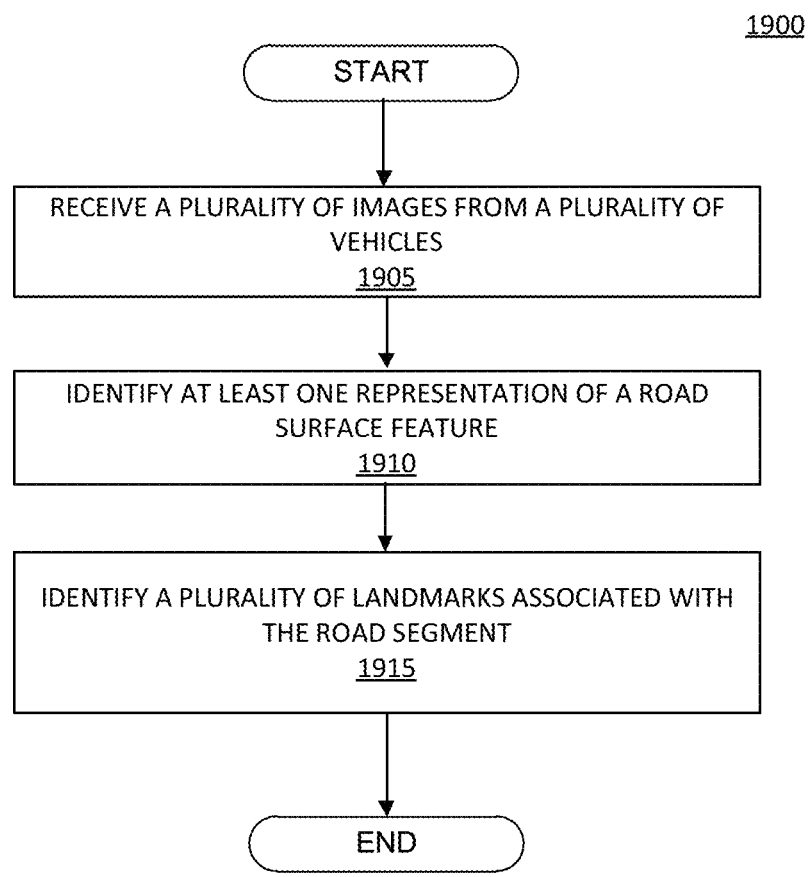
FIG. 19 is a flowchart showing an exemplary process for generating a sparse map for autonomous vehicle navigation along a road segment, consistent with the disclosed embodiments.

FIG. 19 is a flowchart showing an example process 1900 for generating a sparse map for autonomous vehicle navigation along a road segment. Process 1900 may be performed by one or more processing devices included in server 1230.

Process 1900 may include receiving a plurality of images acquired as one or more vehicles traverse the road segment (step 1905). Server 1230 may receive images from cameras included within one or more of vehicles 1205, 1210, 1215, 1220, and 1225. For example, camera 122 may capture one or more images of the environment surrounding vehicle 1205 as vehicle 1205 travels along road segment 1200. In some embodiments, server 1230 may also receive stripped down image data that has had redundancies removed by a processor on vehicle 1205, as discussed above with respect to FIG. 17.

Process 1900 may further include identifying, based on the plurality of images, at least one line representation of a road surface feature extending along the road segment (step 1910). Each line representation may represent a path along the road segment substantially corresponding with the road surface feature. For example, server 1230 may analyze the environmental images received from camera 122 to identify a road edge or a lane marking and determine a trajectory of travel along road segment 1200 associated with the road edge or lane marking. In some embodiments, the trajectory (or line representation) may include a spline, a polynomial representation, or a curve. Server 1230 may determine the trajectory of travel of vehicle 1205 based on camera ego motions (e.g., three dimensional translation and/or three dimensional rotational motions) received at step 1905.

Process 1900 may also include identifying, based on the plurality of images, a plurality of landmarks associated with the road segment (step 1910). For example, server 1230 may analyze the environmental images received from camera 122 to identify one or more landmarks, such as road sign along road segment 1200. Server 1230 may identify the landmarks using analysis of the plurality of images acquired as one or more vehicles traverse the road segment. To enable crowdsourcing, the analysis may include rules regarding accepting and rejecting possible landmarks associated with the road segment. For example, the analysis may include accepting potential landmarks when a ratio of images in which the landmark does appear to images in which the landmark does not appear exceeds a threshold and/or rejecting potential landmarks when a ratio of images in which the landmark does not appear to images in which the landmark does appear exceeds a threshold.

Process 1900 may include other operations or steps performed by server 1230. For example, the navigation information may include a target trajectory for vehicles to travel along a road segment, and process 1900 may include clustering, by server 1230, vehicle trajectories related to multiple vehicles travelling on the road segment and determining the target trajectory based on the clustered vehicle trajectories, as discussed in further detail below. Clustering vehicle trajectories may include clustering, by server 1230, the multiple trajectories related to the vehicles travelling on the road segment into a plurality of clusters based on at least one of the absolute heading of vehicles or lane assignment of the vehicles. Generating the target trajectory may include averaging, by server 1230, the clustered trajectories. By way of further example, process 1900 may include aligning data received in step 1905. Other processes or steps performed by server 1230, as described above, may also be included in process 1900.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle may determine its position and orientation relative to the map. It seems natural to use a GPS device on board, in order to position the vehicle on the map and in order to find the rotation transformation between the body reference frame and the world reference frame (e.g., North, East and Down). Once the body reference frame is aligned with the map reference frame, then the desired route may be expressed in the body reference frame and the steering commands may be computed or generated.

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include a sparse map having the geometry of the road, its lane structure, and landmarks that may be used to determine the location or position of vehicles along a trajectory included in the model. As discussed above, generation of the sparse map may be performed by a remote server that communicates with vehicles travelling on the road and that receives data from the vehicles. The data may include sensed data, trajectories reconstructed based on the sensed data, and/or recommended trajectories that may represent modified reconstructed trajectories. As discussed below, the server may transmit the model back to the vehicles or other vehicles that later travel on the road to aid in autonomous navigation.

Figure 20:
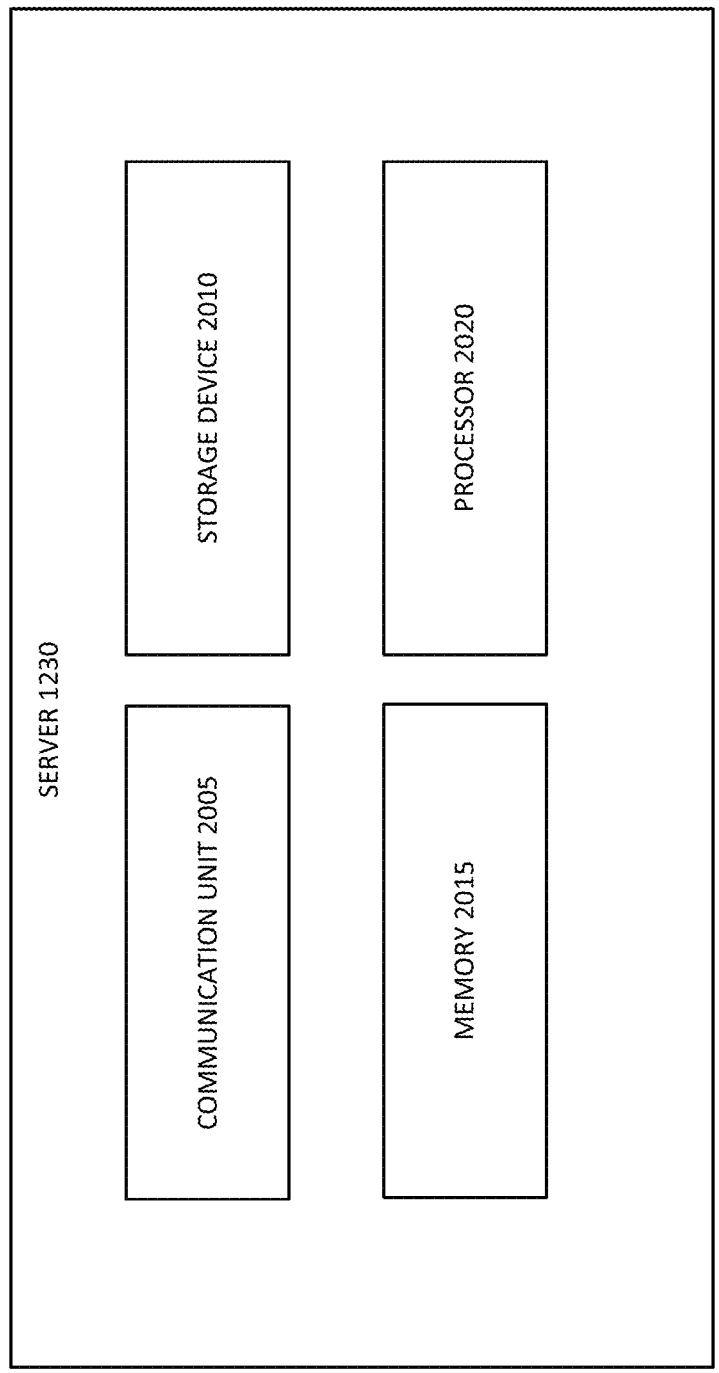
FIG. 20 illustrates a block diagram of a server consistent with the disclosed embodiments.

FIG. 20 illustrates a block diagram of server 1230. Server 1230 may include a communication unit 2005, which may include both hardware components (e.g., communication control circuits, switches, and antenna), and software components (e.g., communication protocols, computer codes). For example, communication unit 2005 may include at least one network interface. Server 1230 may communicate with vehicles 1205, 1210, 1215, 1220, and 1225 through communication unit 2005. For example, server 1230 may receive, through communication unit 2005, navigation information transmitted from vehicles 1205, 1210, 1215, 1220, and 1225. Server 1230 may distribute, through communication unit 2005, the autonomous vehicle road navigation model to one or more autonomous vehicles.

Server 1230 may include at least one non-transitory storage medium 2010, such as a hard drive, a compact disc, a tape, etc. Storage device 1410 may be configured to store data, such as navigation information received from vehicles 1205, 1210, 1215, 1220, and 1225 and/or the autonomous vehicle road navigation model that server 1230 generates based on the navigation information. Storage device 2010 may be configured to store any other information, such as a sparse map (e.g., sparse map 800 discussed above with respect to FIG. 8).

In addition to or in place of storage device 2010, server 1230 may include a memory 2015. Memory 2015 may be similar to or different from memory 140 or 150. Memory 2015 may be a non-transitory memory, such as a flash memory, a random access memory, etc. Memory 2015 may be configured to store data, such as computer codes or instructions executable by a processor (e.g., processor 2020), map data (e.g., data of sparse map 800), the autonomous vehicle road navigation model, and/or navigation information received from vehicles 1205, 1210, 1215, 1220, and 1225.

Server 1230 may include at least one processing device 2020 configured to execute computer codes or instructions stored in memory 2015 to perform various functions. For example, processing device 2020 may analyze the navigation information received from vehicles 1205, 1210, 1215, 1220, and 1225, and generate the autonomous vehicle road navigation model based on the analysis. Processing device 2020 may control communication unit 1405 to distribute the autonomous vehicle road navigation model to one or more autonomous vehicles (e.g., one or more of vehicles 1205, 1210, 1215, 1220, and 1225 or any vehicle that travels on road segment 1200 at a later time). Processing device 2020 may be similar to or different from processor 180, 190, or processing unit 110.

Figure 21:
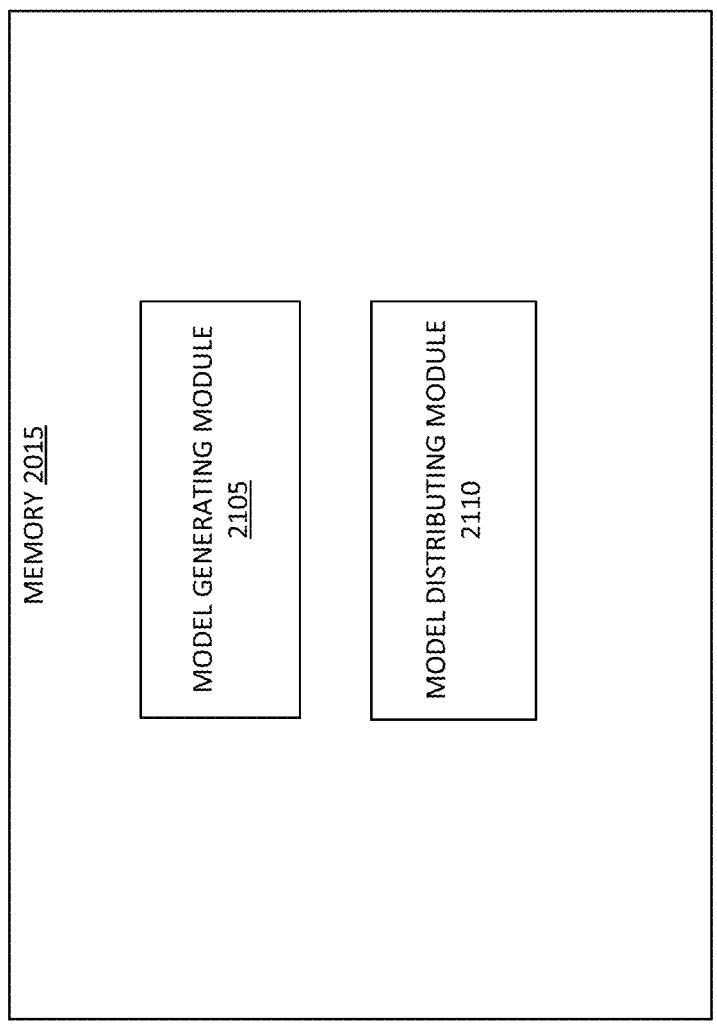
FIG. 21 illustrates a block diagram of a memory consistent with the disclosed embodiments.

FIG. 21 illustrates a block diagram of memory 2015, which may store computer code or instructions for performing one or more operations for generating a road navigation model for use in autonomous vehicle navigation. As shown in FIG. 21, memory 2015 may store one or more modules for performing the operations for processing vehicle navigation information. For example, memory 2015 may include a model generating module 2105 and a model distributing module 2110. Processor 2020 may execute the instructions stored in any of modules 2105 and 2110 included in memory 2015.

Model generating module 2105 may store instructions which, when executed by processor 2020, may generate at least a portion of an autonomous vehicle road navigation model for a common road segment (e.g., road segment 1200) based on navigation information received from vehicles 1205, 1210, 1215, 1220, and 1225. For example, in generating the autonomous vehicle road navigation model, processor 2020 may cluster vehicle trajectories along the common road segment 1200 into different clusters. Processor 2020 may determine a target trajectory along the common road segment 1200 based on the clustered vehicle trajectories for each of the different clusters. Such an operation may include finding a mean or average trajectory of the clustered vehicle trajectories (e.g., by averaging data representing the clustered vehicle trajectories) in each cluster. In some embodiments, the target trajectory may be associated with a single lane of the common road segment 1200.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks data, and lane assignment along traveling path to server 1230. Various vehicles travelling along the same road segment at multiple drives may have different trajectories. Server 1230 may identify routes or trajectories associated with each lane from the trajectories received from vehicles through a clustering process.

FIG. 22 illustrates a process of clustering vehicle trajectories associated with vehicles 1205, 1210, 1215, 1220, and 1225 for determining a target trajectory for the common road segment (e.g., road segment 1200). The target trajectory or a plurality of target trajectories determined from the clustering process may be included in the autonomous vehicle road navigation model or sparse map 800. In some embodiments, vehicles 1205, 1210, 1215, 1220, and 1225 traveling along road segment 1200 may transmit a plurality of trajectories 2200 to server 1230. In some embodiments, server 1230 may generate trajectories based on landmark, road geometry, and vehicle motion information received from vehicles 1205, 1210, 1215, 1220, and 1225. To generate the autonomous vehicle road navigation model, server 1230 may cluster vehicle trajectories 1600 into a plurality of clusters 2205, 2210, 2215, 2220, 2225, and 2230, as shown in FIG. 22.

Clustering may be performed using various criteria. In some embodiments, all drives in a cluster may be similar with respect to the absolute heading along the road segment 1200. The absolute heading may be obtained from GPS signals received by vehicles 1205, 1210, 1215, 1220, and 1225. In some embodiments, the absolute heading may be obtained using dead reckoning. Dead reckoning, as one of skill in the art would understand, may be used to determine the current position and hence heading of vehicles 1205, 1210, 1215, 1220, and 1225 by using previously determined position, estimated speed, etc. Trajectories clustered by absolute heading may be useful for identifying routes along the roadways.

In some embodiments, all the drives in a cluster may be similar with respect to the lane assignment (e.g., in the same lane before and after a junction) along the drive on road segment 1200. Trajectories clustered by lane assignment may be useful for identifying lanes along the roadways. In some embodiments, both criteria (e.g., absolute heading and lane assignment) may be used for clustering.

In each cluster 2205, 2210, 2215, 2220, 2225, and 2230, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 1230 may select a reference frame of an arbitrary trajectory C0. For all other trajectories (C1, . . . , Cn), server 1230 may find a rigid transformation that maps Ci to C0, where i=1, 2, . . . , n, where n is a positive integer number, corresponding to the total number of trajectories included in the cluster. Server 1230 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 1230 may select a reference frame of an arbitrary lane. Server 1230 may map partially overlapping lanes to the selected reference frame. Server 1230 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of road segment 120 may be associated with a target trajectory and certain landmarks. The target trajectory or a plurality of such target trajectories may be included in the autonomous vehicle road navigation model, which may be used later by other autonomous vehicles travelling along the same road segment 1200. Landmarks identified by vehicles 1205, 1210, 1215, 1220, and 1225 while the vehicles travel along road segment 1200 may be recorded in association with the target trajectory. The data of the target trajectories and landmarks may be continuously or periodically updated with new data received from other vehicles in subsequent drives.

For localization of an autonomous vehicle, the disclosed systems and methods may use an Extended Kalman Filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 800. The known landmark may have a known location (e.g., GPS data) along a target trajectory stored in the road model and/or sparse map 800. Based on the current speed and images of the landmark, the distance from the vehicle to the landmark may be estimated. The location of the vehicle along a target trajectory may be adjusted based on the distance to the landmark and the landmark's known location (stored in the road model or sparse map 800). The landmark's position/location data (e.g., mean values from multiple drives) stored in the road model and/or sparse map 800 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 second ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 23:
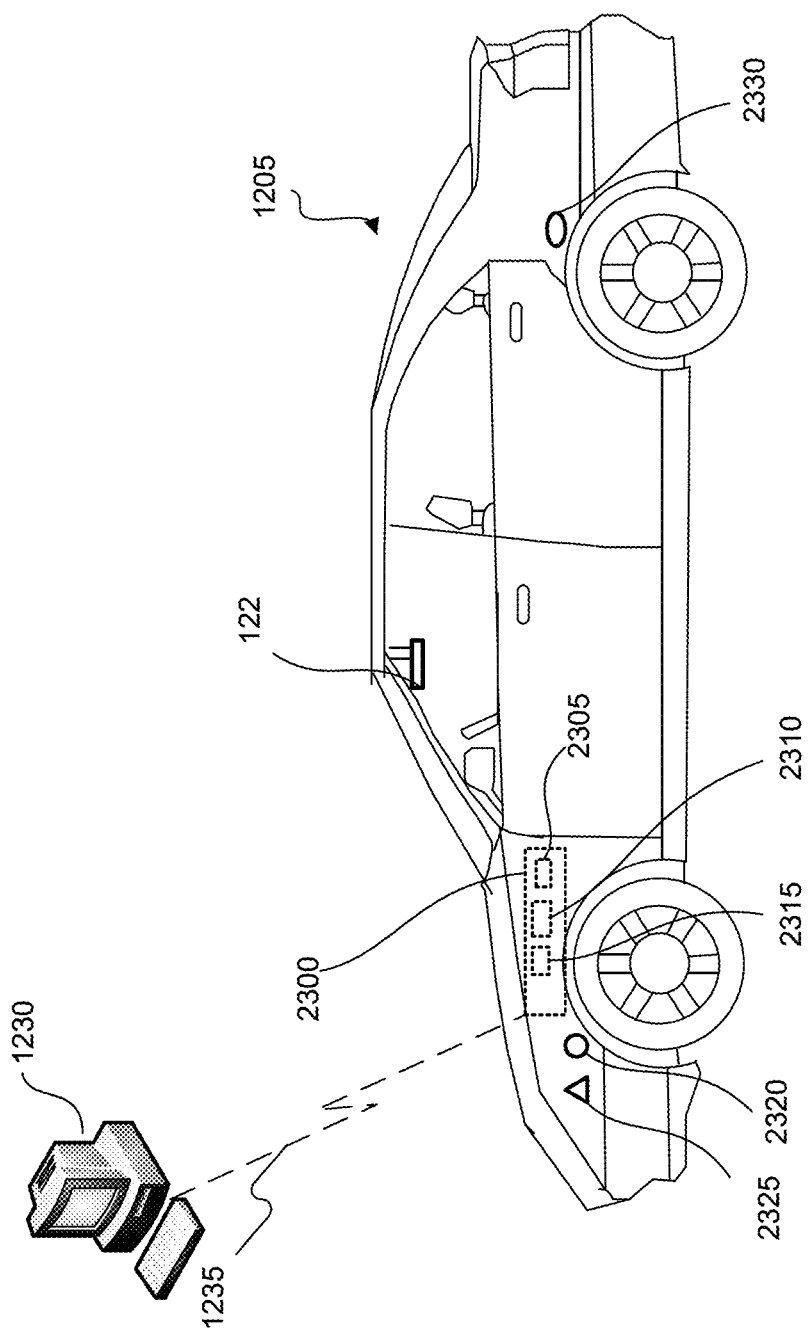
FIG. 23 illustrates a navigation system for a vehicle, which may be used for autonomous navigation, consistent with the disclosed embodiments.

FIG. 23 illustrates a navigation system for a vehicle, which may be used for autonomous navigation using a crowdsourced sparse map. For illustration, the vehicle is referenced as vehicle 1205. The vehicle shown in FIG. 23 may be any other vehicle disclosed herein, including, for example, vehicles 1210, 1215, 1220, and 1225, as well as vehicle 200 shown in other embodiments. As shown in FIG. 12, vehicle 1205 may communicate with server 1230. Vehicle 1205 may include an image capture device 122 (e.g., camera 122). Vehicle 1205 may include a navigation system 2300 configured for providing navigation guidance for vehicle 1205 to travel on a road (e.g., road segment 1200). Vehicle 1205 may also include other sensors, such as a speed sensor 2320 and an accelerometer 2325. Speed sensor 2320 may be configured to detect the speed of vehicle 1205. Accelerometer 2325 may be configured to detect an acceleration or deceleration of vehicle 1205. Vehicle 1205 shown in FIG. 23 may be an autonomous vehicle, and the navigation system 2300 may be used for providing navigation guidance for autonomous driving. Alternatively, vehicle 1205 may also be a non-autonomous, human-controlled vehicle, and navigation system 2300 may still be used for providing navigation guidance.

Navigation system 2300 may include a communication unit 2305 configured to communicate with server 1230 through communication path 1235. Navigation system 2300 may also include a GPS unit 2310 configured to receive and process GPS signals. Navigation system 2300 may further include at least one processor 2315 configured to process data, such as GPS signals, map data from sparse map 800 (which may be stored on a storage device provided onboard vehicle 1205 and/or received from server 1230), road geometry sensed by a road profile sensor 2330, images captured by camera 122, and/or autonomous vehicle road navigation model received from server 1230. The road profile sensor 2330 may include different types of devices for measuring different types of road profile, such as road surface roughness, road width, road elevation, road curvature, etc. For example, the road profile sensor 2330 may include a device that measures the motion of a suspension of vehicle 2305 to derive the road roughness profile. In some embodiments, the road profile sensor 2330 may include radar sensors to measure the distance from vehicle 1205 to road sides (e.g., barrier on the road sides), thereby measuring the width of the road. In some embodiments, the road profile sensor 2330 may include a device configured for measuring the up and down elevation of the road. In some embodiment, the road profile sensor 2330 may include a device configured to measure the road curvature. For example, a camera (e.g., camera 122 or another camera) may be used to capture images of the road showing road curvatures. Vehicle 1205 may use such images to detect road curvatures.

The at least one processor 2315 may be programmed to receive, from camera 122, at least one environmental image associated with vehicle 1205. The at least one processor 2315 may analyze the at least one environmental image to determine navigation information related to the vehicle 1205. The navigation information may include a trajectory related to the travel of vehicle 1205 along road segment 1200. The at least one processor 2315 may determine the trajectory based on motions of camera 122 (and hence the vehicle), such as three dimensional translation and three dimensional rotational motions. In some embodiments, the at least one processor 2315 may determine the translation and rotational motions of camera 122 based on analysis of a plurality of images acquired by camera 122. In some embodiments, the navigation information may include lane assignment information (e.g., in which lane vehicle 1205 is travelling along road segment 1200). The navigation information transmitted from vehicle 1205 to server 1230 may be used by server 1230 to generate and/or update an autonomous vehicle road navigation model, which may be transmitted back from server 1230 to vehicle 1205 for providing autonomous navigation guidance for vehicle 1205.

The at least one processor 2315 may also be programmed to transmit the navigation information from vehicle 1205 to server 1230. In some embodiments, the navigation information may be transmitted to server 1230 along with road information. The road location information may include at least one of the GPS signal received by the GPS unit 2310, landmark information, road geometry, lane information, etc. The at least one processor 2315 may receive, from server 1230, the autonomous vehicle road navigation model or a portion of the model. The autonomous vehicle road navigation model received from server 1230 may include at least one update based on the navigation information transmitted from vehicle 1205 to server 1230. The portion of the model transmitted from server 1230 to vehicle 1205 may include an updated portion of the model. The at least one processor 2315 may cause at least one navigational maneuver (e.g., steering such as making a turn, braking, accelerating, passing another vehicle, etc.) by vehicle 1205 based on the received autonomous vehicle road navigation model or the updated portion of the model.

The at least one processor 2315 may be configured to communicate with various sensors and components included in vehicle 1205, including communication unit 1705, GPS unit 2315, camera 122, speed sensor 2320, accelerometer 2325, and road profile sensor 2330. The at least one processor 2315 may collect information or data from various sensors and components, and transmit the information or data to server 1230 through communication unit 2305. Alternatively or additionally, various sensors or components of vehicle 1205 may also communicate with server 1230 and transmit data or information collected by the sensors or components to server 1230.

In some embodiments, vehicles 1205, 1210, 1215, 1220, and 1225 may communicate with each other, and may share navigation information with each other, such that at least one of the vehicles 1205, 1210, 1215, 1220, and 1225 may generate the autonomous vehicle road navigation model using crowdsourcing, e.g., based on information shared by other vehicles. In some embodiments, vehicles 1205, 1210, 1215, 1220, and 1225 may share navigation information with each other and each vehicle may update its own the autonomous vehicle road navigation model provided in the vehicle. In some embodiments, at least one of the vehicles 1205, 1210, 1215, 1220, and 1225 (e.g., vehicle 1205) may function as a hub vehicle. The at least one processor 2315 of the hub vehicle (e.g., vehicle 1205) may perform some or all of the functions performed by server 1230. For example, the at least one processor 2315 of the hub vehicle may communicate with other vehicles and receive navigation information from other vehicles. The at least one processor 2315 of the hub vehicle may generate the autonomous vehicle road navigation model or an update to the model based on the shared information received from other vehicles. The at least one processor 2315 of the hub vehicle may transmit the autonomous vehicle road navigation model or the update to the model to other vehicles for providing autonomous navigation guidance.

Navigation Based on Sparse Maps

As previously discussed, the autonomous vehicle road navigation model including sparse map 800 may include a plurality of mapped lane marks and a plurality of mapped objects/features associated with a road segment. As discussed in greater detail below, these mapped lane marks, objects, and features may be used when the autonomous vehicle navigates. For example, in some embodiments, the mapped objects and features may be used to localized a host vehicle relative to the map (e.g., relative to a mapped target trajectory). The mapped lane marks may be used (e.g., as a check) to determine a lateral position and/or orientation relative to a planned or target trajectory. With this position information, the autonomous vehicle may be able to adjust a heading direction to match a direction of a target trajectory at the determined position.

Vehicle 200 may be configured to detect lane marks in a given road segment. The road segment may include any markings on a road for guiding vehicle traffic on a roadway. For example, the lane marks may be continuous or dashed lines demarking the edge of a lane of travel. The lane marks may also include double lines, such as a double continuous lines, double dashed lines or a combination of continuous and dashed lines indicating, for example, whether passing is permitted in an adjacent lane. The lane marks may also include freeway entrance and exit markings indicating, for example, a deceleration lane for an exit ramp or dotted lines indicating that a lane is turn-only or that the lane is ending. The markings may further indicate a work zone, a temporary lane shift, a path of travel through an intersection, a median, a special purpose lane (e.g., a bike lane, HOV lane, etc.), or other miscellaneous markings (e.g., crosswalk, a speed hump, a railway crossing, a stop line, etc.).

Vehicle 200 may use cameras, such as image capture devices 122 and 124 included in image acquisition unit 120, to capture images of the surrounding lane marks. Vehicle 200 may analyze the images to detect point locations associated with the lane marks based on features identified within one or more of the captured images. These point locations may be uploaded to a server to represent the lane marks in sparse map 800. Depending on the position and field of view of the camera, lane marks may be detected for both sides of the vehicle simultaneously from a single image. In other embodiments, different cameras may be used to capture images on multiple sides of the vehicle. Rather than uploading actual images of the lane marks, the marks may be stored in sparse map 800 as a spline or a series of points, thus reducing the size of sparse map 800 and/or the data that must be uploaded remotely by the vehicle.

Figure 24A:
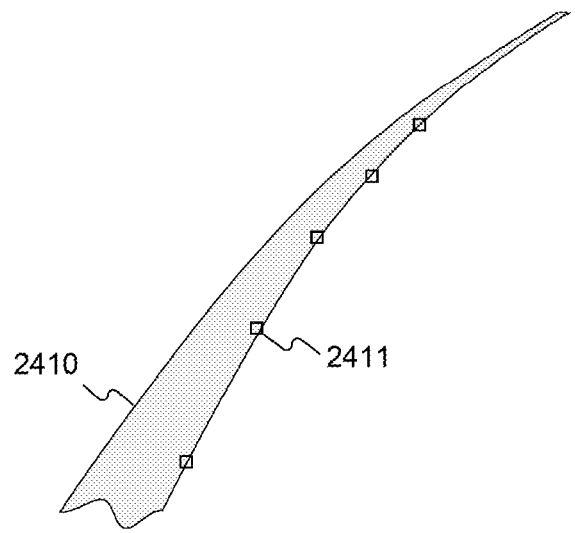
FIGS. 24A, 24B, 24C, and 24D illustrate exemplary lane marks that may be detected consistent with the disclosed embodiments.

FIGS. 24A-24D illustrate exemplary point locations that may be detected by vehicle 200 to represent particular lane marks. Similar to the landmarks described above, vehicle 200 may use various image recognition algorithms or software to identify point locations within a captured image. For example, vehicle 200 may recognize a series of edge points, corner points or various other point locations associated with a particular lane mark. FIG. 24A shows a continuous lane mark 2410 that may be detected by vehicle 200. Lane mark 2410 may represent the outside edge of a roadway, represented by a continuous white line. As shown in FIG. 24A, vehicle 200 may be configured to detect a plurality of edge location points 2411 along the lane mark. Location points 2411 may be collected to represent the lane mark at any intervals sufficient to create a mapped lane mark in the sparse map. For example, the lane mark may be represented by one point per meter of the detected edge, one point per every five meters of the detected edge, or at other suitable spacings. In some embodiments, the spacing may be determined by other factors, rather than at set intervals such as, for example, based on points where vehicle 200 has a highest confidence ranking of the location of the detected points. Although FIG. 24A shows edge location points on an interior edge of lane mark 2410, points may be collected on the outside edge of the line or along both edges. Further, while a single line is shown in FIG. 24A, similar edge points may be detected for a double continuous line. For example, points 2411 may be detected along an edge of one or both of the continuous lines.

Figure 24B:
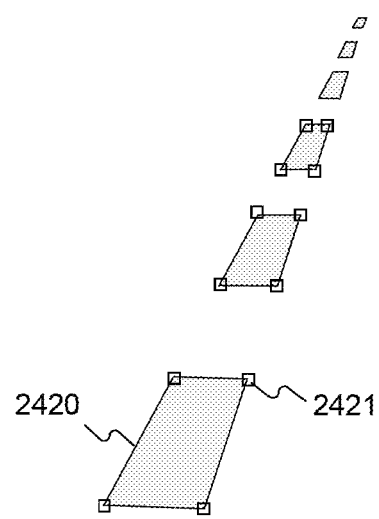

Vehicle 200 may also represent lane marks differently depending on the type or shape of lane mark. FIG. 24B shows an exemplary dashed lane mark 2420 that may be detected by vehicle 200. Rather than identifying edge points, as in FIG. 24A, vehicle may detect a series of corner points 2421 representing corners of the lane dashes to define the full boundary of the dash. While FIG. 24B shows each corner of a given dash marking being located, vehicle 200 may detect or upload a subset of the points shown in the figure. For example, vehicle 200 may detect the leading edge or leading corner of a given dash mark, or may detect the two corner points nearest the interior of the lane. Further, not every dash mark may be captured, for example, vehicle 200 may capture and/or record points representing a sample of dash marks (e.g., every other, every third, every fifth, etc.) or dash marks at a predefined spacing (e.g., every meter, every five meters, every 10 meters, etc.) Corner points may also be detected for similar lane marks, such as markings showing a lane is for an exit ramp, that a particular lane is ending, or other various lane marks that may have detectable corner points. Corner points may also be detected for lane marks consisting of double dashed lines or a combination of continuous and dashed lines.

Figure 24C:
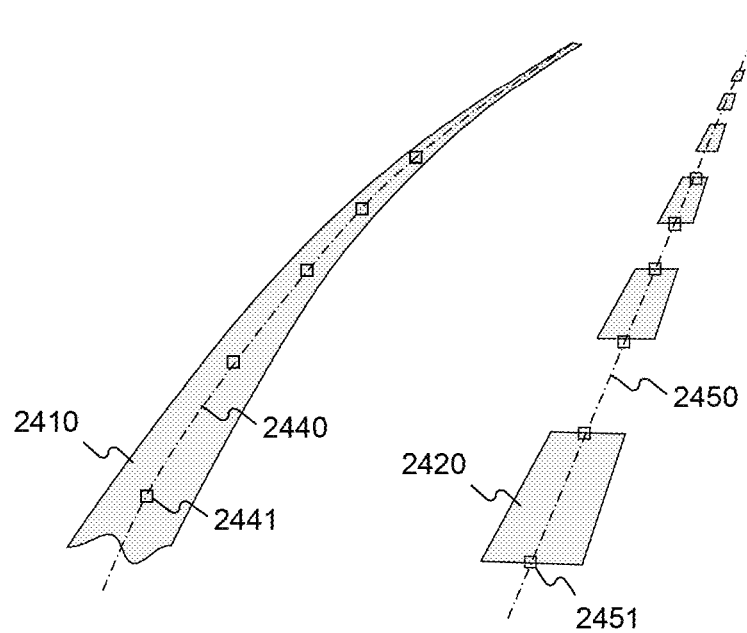

In some embodiments, the points uploaded to the server to generate the mapped lane marks may represent other points besides the detected edge points or corner points. FIG. 24C illustrates a series of points that may represent a centerline of a given lane mark. For example, continuous lane 2410 may be represented by centerline points 2441 along a centerline 2440 of the lane mark. In some embodiments, vehicle 200 may be configured to detect these center points using various image recognition techniques, such as convolutional neural networks (CNN), scale-invariant feature transform (SIFT), histogram of oriented gradients (HOG) features, or other techniques. Alternatively, vehicle 200 may detect other points, such as edge points 2411 shown in FIG. 24A, and may calculate centerline points 2441, for example, by detecting points along each edge and determining a midpoint between the edge points. Similarly, dashed lane mark 2420 may be represented by centerline points 2451 along a centerline 2450 of the lane mark. The centerline points may be located at the edge of a dash, as shown in FIG. 24C, or at various other locations along the centerline. For example, each dash may be represented by a single point in the geometric center of the dash. The points may also be spaced at a predetermined interval along the centerline (e.g., every meter, 5 meters, 10 meters, etc.). The centerline points 2451 may be detected directly by vehicle 200, or may be calculated based on other detected reference points, such as corner points 2421, as shown in FIG. 24B. A centerline may also be used to represent other lane mark types, such as a double line, using similar techniques as above.

Figure 24D:
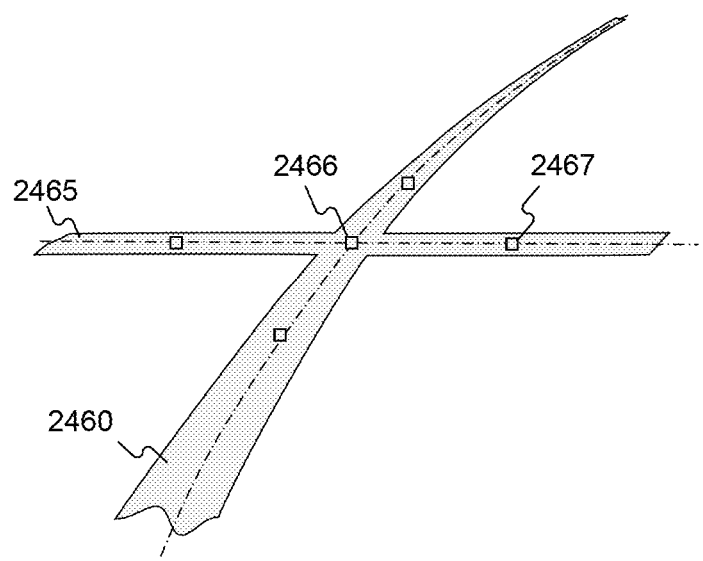

In some embodiments, vehicle 200 may identify points representing other features, such as a vertex between two intersecting lane marks. FIG. 24D shows exemplary points representing an intersection between two lane marks 2460 and 2465. Vehicle 200 may calculate a vertex point 2466 representing an intersection between the two lane marks. For example, one of lane marks 2460 or 2465 may represent a train crossing area or other crossing area in the road segment. While lane marks 2460 and 2465 are shown as crossing each other perpendicularly, various other configurations may be detected. For example, the lane marks 2460 and 2465 may cross at other angles, or one or both of the lane marks may terminate at the vertex point 2466. Similar techniques may also be applied for intersections between dashed or other lane mark types. In addition to vertex point 2466, various other points 2467 may also be detected, providing further information about the orientation of lane marks 2460 and 2465.

Vehicle 200 may associate real-world coordinates with each detected point of the lane mark. For example, location identifiers may be generated, including coordinate for each point, to upload to a server for mapping the lane mark. The location identifiers may further include other identifying information about the points, including whether the point represents a corner point, an edge point, center point, etc. Vehicle 200 may therefore be configured to determine a real-world position of each point based on analysis of the images. For example, vehicle 200 may detect other features in the image, such as the various landmarks described above, to locate the real-world position of the lane marks. This may involve determining the location of the lane marks in the image relative to the detected landmark or determining the position of the vehicle based on the detected landmark and then determining a distance from the vehicle (or target trajectory of the vehicle) to the lane mark. When a landmark is not available, the location of the lane mark points may be determined relative to a position of the vehicle determined based on dead reckoning. The real-world coordinates included in the location identifiers may be represented as absolute coordinates (e.g., latitude/longitude coordinates), or may be relative to other features, such as based on a longitudinal position along a target trajectory and a lateral distance from the target trajectory. The location identifiers may then be uploaded to a server for generation of the mapped lane marks in the navigation model (such as sparse map 800). In some embodiments, the server may construct a spline representing the lane marks of a road segment. Alternatively, vehicle 200 may generate the spline and upload it to the server to be recorded in the navigational model.

Figure 24E:
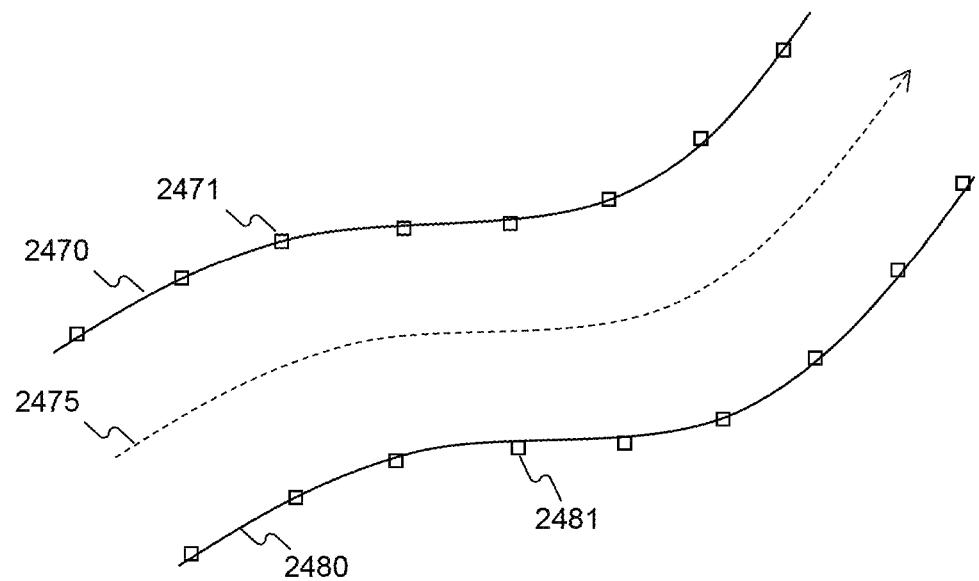
FIG. 24E shows exemplary mapped lane marks consistent with the disclosed embodiments.

FIG. 24E shows an exemplary navigation model or sparse map for a corresponding road segment that includes mapped lane marks. The sparse map may include a target trajectory 2475 for a vehicle to follow along a road segment. As described above, target trajectory 2475 may represent an ideal path for a vehicle to take as it travels the corresponding road segment, or may be located elsewhere on the road (e.g., a centerline of the road, etc.). Target trajectory 2475 may be calculated in the various methods described above, for example, based on an aggregation (e.g., a weighted combination) of two or more reconstructed trajectories of vehicles traversing the same road segment.

In some embodiments, the target trajectory may be generated equally for all vehicle types and for all road, vehicle, and/or environment conditions. In other embodiments, however, various other factors or variables may also be considered in generating the target trajectory. A different target trajectory may be generated for different types of vehicles (e.g., a private car, a light truck, and a full trailer). For example, a target trajectory with relatively tighter turning radii may be generated for a small private car than a larger semi-trailer truck. In some embodiments, road, vehicle and environmental conditions may be considered as well. For example, a different target trajectory may be generated for different road conditions (e.g., wet, snowy, icy, dry, etc.), vehicle conditions (e.g., tire condition or estimated tire condition, brake condition or estimated brake condition, amount of fuel remaining, etc.) or environmental factors (e.g., time of day, visibility, weather, etc.). The target trajectory may also depend on one or more aspects or features of a particular road segment (e.g., speed limit, frequency and size of turns, grade, etc.). In some embodiments, various user settings may also be used to determine the target trajectory, such as a set driving mode (e.g., desired driving aggressiveness, economy mode, etc.).

The sparse map may also include mapped lane marks 2470 and 2480 representing lane marks along the road segment. The mapped lane marks may be represented by a plurality of location identifiers 2471 and 2481. As described above, the location identifiers may include locations in real world coordinates of points associated with a detected lane mark. Similar to the target trajectory in the model, the lane marks may also include elevation data and may be represented as a curve in three-dimensional space. For example, the curve may be a spline connecting three dimensional polynomials of suitable order the curve may be calculated based on the location identifiers. The mapped lane marks may also include other information or metadata about the lane mark, such as an identifier of the type of lane mark (e.g., between two lanes with the same direction of travel, between two lanes of opposite direction of travel, edge of a roadway, etc.) and/or other characteristics of the lane mark (e.g., continuous, dashed, single line, double line, yellow, white, etc.). In some embodiments, the mapped lane marks may be continuously updated within the model, for example, using crowdsourcing techniques. The same vehicle may upload location identifiers during multiple occasions of travelling the same road segment or data may be selected from a plurality of vehicles (such as 1205, 1210, 1215, 1220, and 1225) travelling the road segment at different times. Sparse map 800 may then be updated or refined based on subsequent location identifiers received from the vehicles and stored in the system. As the mapped lane marks are updated and refined, the updated road navigation model and/or sparse map may be distributed to a plurality of autonomous vehicles.

Figure 24F:
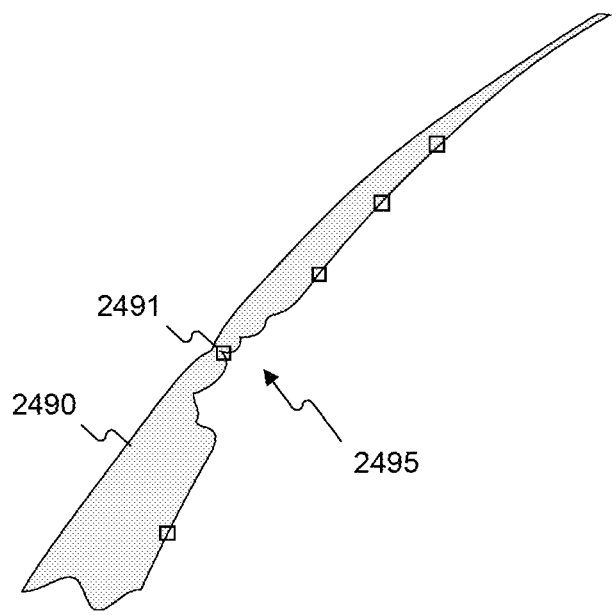
FIG. 24F shows an exemplary anomaly associated with detecting a lane mark consistent with the disclosed embodiments.

Generating the mapped lane marks in the sparse map may also include detecting and/or mitigating errors based on anomalies in the images or in the actual lane marks themselves. FIG. 24F shows an exemplary anomaly 2495 associated with detecting a lane mark 2490. Anomaly 2495 may appear in the image captured by vehicle 200, for example, from an object obstructing the camera's view of the lane mark, debris on the lens, etc. In some instances, the anomaly may be due to the lane mark itself, which may be damaged or worn away, or partially covered, for example, by dirt, debris, water, snow or other materials on the road. Anomaly 2495 may result in an erroneous point 2491 being detected by vehicle 200. Sparse map 800 may provide the correct the mapped lane mark and exclude the error. In some embodiments, vehicle 200 may detect erroneous point 2491 for example, by detecting anomaly 2495 in the image, or by identifying the error based on detected lane mark points before and after the anomaly. Based on detecting the anomaly, the vehicle may omit point 2491 or may adjust it to be in line with other detected points. In other embodiments, the error may be corrected after the point has been uploaded, for example, by determining the point is outside of an expected threshold based on other points uploaded during the same trip, or based on an aggregation of data from previous trips along the same road segment.

The mapped lane marks in the navigation model and/or sparse map may also be used for navigation by an autonomous vehicle traversing the corresponding roadway. For example, a vehicle navigating along a target trajectory may periodically use the mapped lane marks in the sparse map to align itself with the target trajectory. As mentioned above, between landmarks the vehicle may navigate based on dead reckoning in which the vehicle uses sensors to determine its ego motion and estimate its position relative to the target trajectory. Errors may accumulate over time and vehicle's position determinations relative to the target trajectory may become increasingly less accurate. Accordingly, the vehicle may use lane marks occurring in sparse map 800 (and their known locations) to reduce the dead reckoning-induced errors in position determination. In this way, the identified lane marks included in sparse map 800 may serve as navigational anchors from which an accurate position of the vehicle relative to a target trajectory may be determined.

FIG. 25A shows an exemplary image 2500 of a vehicle's surrounding environment that may be used for navigation based on the mapped lane marks. Image 2500 may be captured, for example, by vehicle 200 through image capture devices 122 and 124 included in image acquisition unit 120. Image 2500 may include an image of at least one lane mark 2510, as shown in FIG. 25A. Image 2500 may also include one or more landmarks 2521, such as road sign, used for navigation as described above. Some elements shown in FIG. 25A, such as elements 2511, 2530, and 2520 which do not appear in the captured image 2500 but are detected and/or determined by vehicle 200 are also shown for reference.

Using the various techniques described above with respect to FIGS. 24A-D and 24F, a vehicle may analyze image 2500 to identify lane mark 2510. Various points 2511 may be detected corresponding to features of the lane mark in the image. Points 2511, for example, may correspond to an edge of the lane mark, a corner of the lane mark, a midpoint of the lane mark, a vertex between two intersecting lane marks, or various other features or locations. Points 2511 may be detected to correspond to a location of points stored in a navigation model received from a server. For example, if a sparse map is received containing points that represent a centerline of a mapped lane mark, points 2511 may also be detected based on a centerline of lane mark 2510.

The vehicle may also determine a longitudinal position represented by element 2520 and located along a target trajectory. Longitudinal position 2520 may be determined from image 2500, for example, by detecting landmark 2521 within image 2500 and comparing a measured location to a known landmark location stored in the road model or sparse map 800. The location of the vehicle along a target trajectory may then be determined based on the distance to the landmark and the landmark's known location. The longitudinal position 2520 may also be determined from images other than those used to determine the position of a lane mark. For example, longitudinal position 2520 may be determined by detecting landmarks in images from other cameras within image acquisition unit 120 taken simultaneously or near simultaneously to image 2500. In some instances, the vehicle may not be near any landmarks or other reference points for determining longitudinal position 2520. In such instances, the vehicle may be navigating based on dead reckoning and thus may use sensors to determine its ego motion and estimate a longitudinal position 2520 relative to the target trajectory. The vehicle may also determine a distance 2530 representing the actual distance between the vehicle and lane mark 2510 observed in the captured image(s). The camera angle, the speed of the vehicle, the width of the vehicle, or various other factors may be accounted for in determining distance 2530.

Figure 25B:
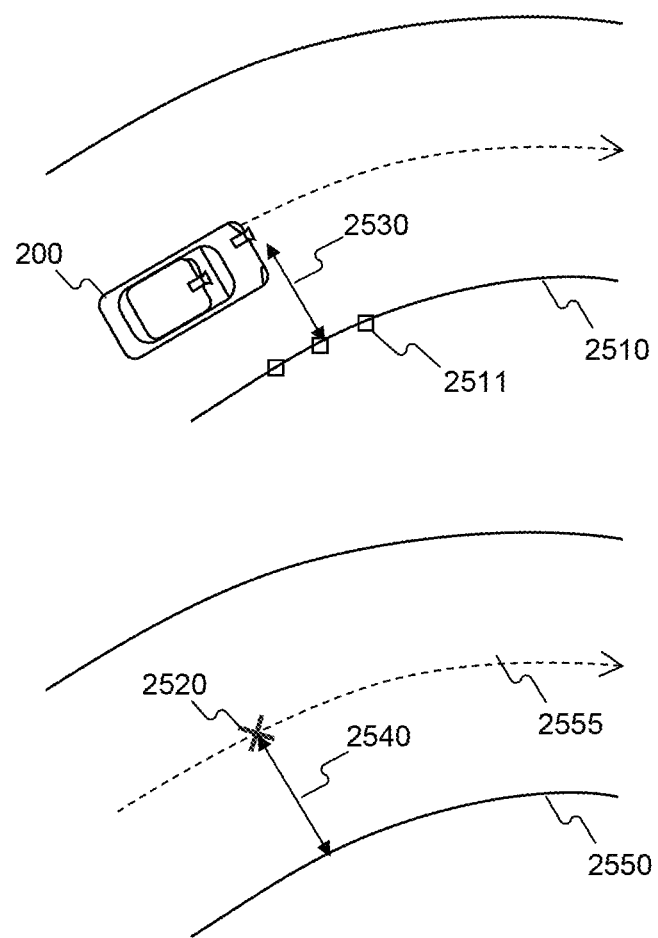
FIG. 25B illustrates a lateral localization correction of a vehicle based on mapped lane marks in a road navigation model consistent with the disclosed embodiments.

FIG. 25B illustrates a lateral localization correction of the vehicle based on the mapped lane marks in a road navigation model. As described above, vehicle 200 may determine a distance 2530 between vehicle 200 and a lane mark 2510 using one or more images captured by vehicle 200. Vehicle 200 may also have access to a road navigation model, such as sparse map 800, which may include a mapped lane mark 2550 and a target trajectory 2555. Mapped lane mark 2550 may be modeled using the techniques described above, for example using crowdsourced location identifiers captured by a plurality of vehicles. Target trajectory 2555 may also be generated using the various techniques described previously. Vehicle 200 may also determine or estimate a longitudinal position 2520 along target trajectory 2555 as described above with respect to FIG. 25A. Vehicle 200 may then determine an expected distance 2540 based on a lateral distance between target trajectory 2555 and mapped lane mark 2550 corresponding to longitudinal position 2520. The lateral localization of vehicle 200 may be corrected or adjusted by comparing the actual distance 2530, measured using the captured image(s), with the expected distance 2540 from the model.

Figure 25C:
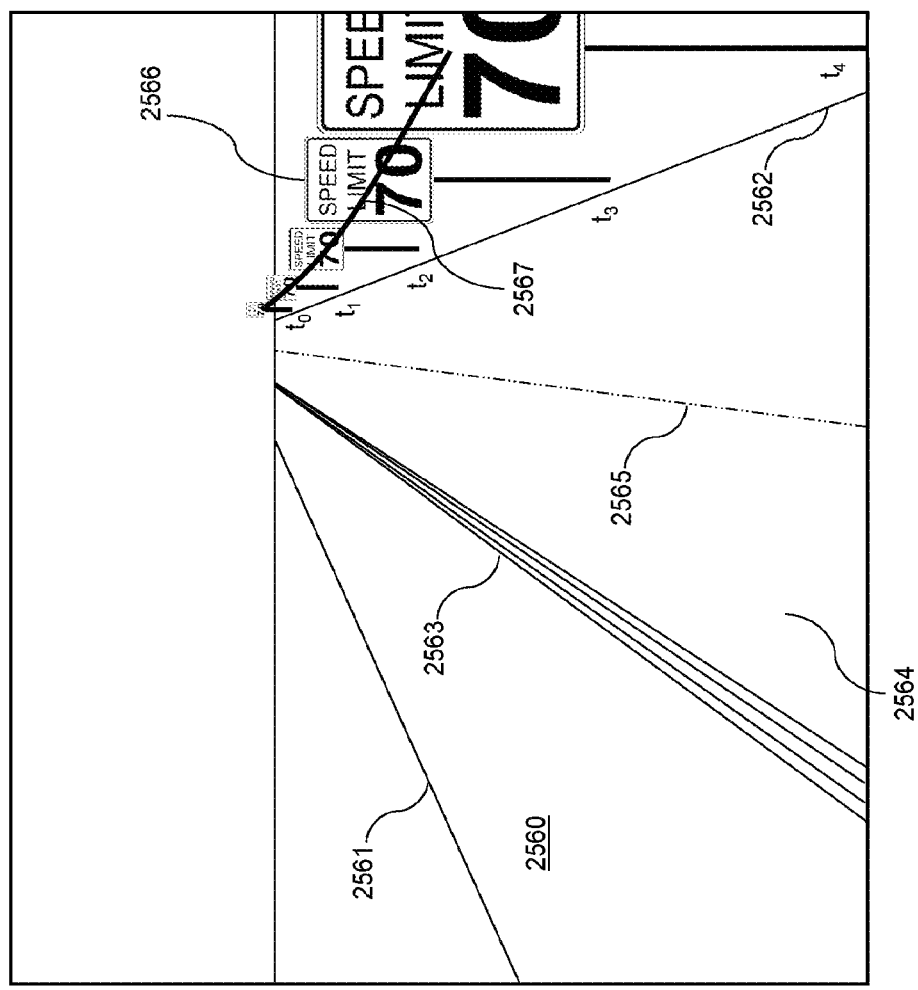
FIGS. 25C and 25D provide conceptual representations of a localization technique for locating a host vehicle along a target trajectory using mapped features included in a sparse map.
Figure 25D:
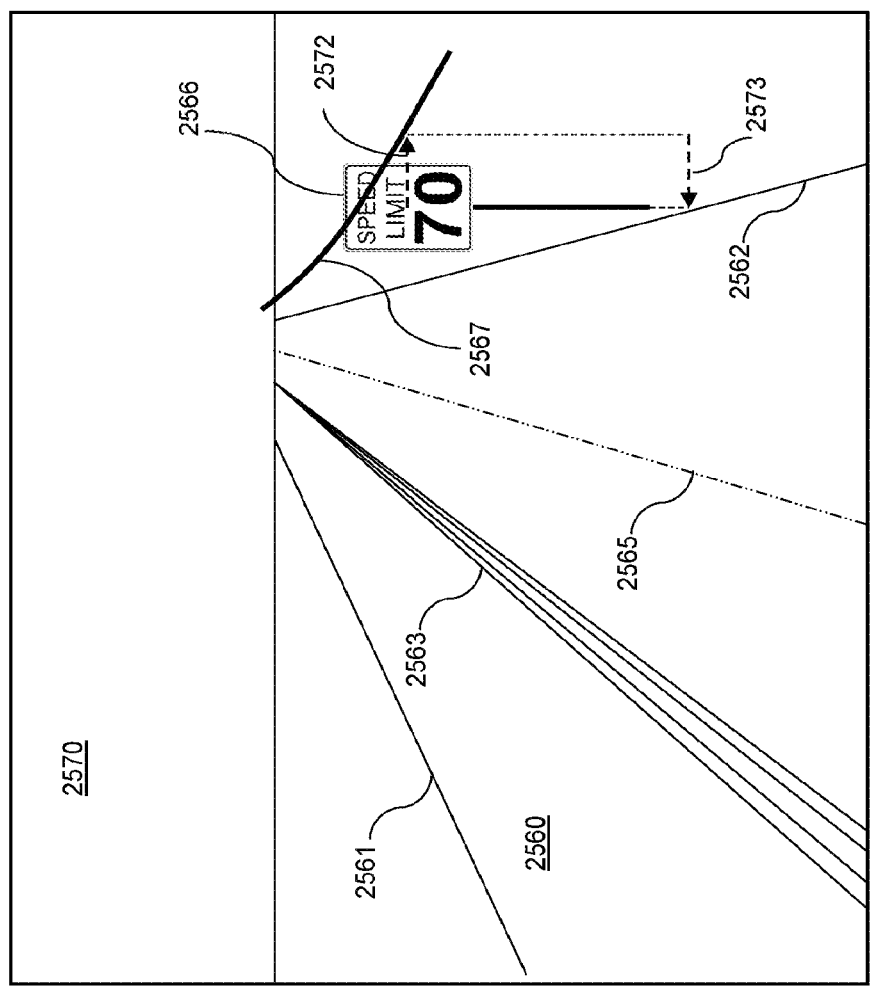

FIGS. 25C and 25D provide illustrations associated with another example for localizing a host vehicle during navigation based on mapped landmarks/objects/features in a sparse map. FIG. 25C conceptually represents a series of images captured from a vehicle navigating along a road segment 2560. In this example, road segment 2560 includes a straight section of a two-lane divided highway delineated by road edges 2561 and 2562 and center lane marking 2563. As shown, the host vehicle is navigating along a lane 2564, which is associated with a mapped target trajectory 2565. Thus, in an ideal situation (and without influencers such as the presence of target vehicles or objects in the roadway, etc.) the host vehicle should closely track the mapped target trajectory 2565 as it navigates along lane 2564 of road segment 2560. In reality, the host vehicle may experience drift as it navigates along mapped target trajectory 2565. For effective and safe navigation, this drift should be maintained within acceptable limits (e.g., +/−10 cm of lateral displacement from target trajectory 2565 or any other suitable threshold). To periodically account for drift and to make any needed course corrections to ensure that the host vehicle follows target trajectory 2565, the disclosed navigation systems may be able to localize the host vehicle along the target trajectory 2565 (e.g., determine a lateral and longitudinal position of the host vehicle relative to the target trajectory 2565) using one or more mapped features/objects included in the sparse map.

As a simple example, FIG. 25C shows a speed limit sign 2566 as it may appear in five different, sequentially captured images as the host vehicle navigates along road segment 2560. For example, at a first time, to, sign 2566 may appear in a captured image near the horizon. As the host vehicle approaches sign 2566, in subsequentially captured images at times $t_1$, $t_2$, $t_3$, and $t_4$, sign 2566 will appear at different 2D X-Y pixel locations of the captured images. For example, in the captured image space, sign 2566 will move downward and to the right along curve 2567 (e.g., a curve extending through the center of the sign in each of the five captured image frames). Sign 2566 will also appear to increase in size as it is approached by the host vehicle (i.e., it will occupy a great number of pixels in subsequently captured images).

These changes in the image space representations of an object, such as sign 2566, may be exploited to determine a localized position of the host vehicle along a target trajectory. For example, as described in the present disclosure, any detectable object or feature, such as a semantic feature like sign 2566 or a detectable non-semantic feature, may be identified by one or more harvesting vehicles that previously traversed a road segment (e.g., road segment 2560). A mapping server may collect the harvested drive information from a plurality of vehicles, aggregate and correlate that information, and generate a sparse map including, for example, a target trajectory 2565 for lane 2564 of road segment 2560. The sparse map may also store a location of sign 2566 (along with type information, etc.). During navigation (e.g., prior to entering road segment 2560), a host vehicle may be supplied with a map tile including a sparse map for road segment 2560. To navigate in lane 2564 of road segment 2560, the host vehicle may follow mapped target trajectory 2565.

The mapped representation of sign 2566 may be used by the host vehicle to localize itself relative to the target trajectory. For example, a camera on the host vehicle will capture an image 2570 of the environment of the host vehicle, and that captured image 2570 may include an image representation of sign 2566 having a certain size and a certain X-Y image location, as shown in FIG. 25D. This size and X-Y image location can be used to determine the host vehicle's position relative to target trajectory 2565. For example, based on the sparse map including a representation of sign 2566, a navigation processor of the host vehicle can determine that in response to the host vehicle traveling along target trajectory 2565, a representation of sign 2566 should appear in captured images such that a center of sign 2566 will move (in image space) along line 2567. If a captured image, such as image 2570, shows the center (or other reference point) displaced from line 2567 (e.g., the expected image space trajectory), then the host vehicle navigation system can determine that at the time of the captured image it was not located on target trajectory 2565. From the image, however, the navigation processor can determine an appropriate navigational correction to return the host vehicle to the target trajectory 2565. For example, if analysis shows an image location of sign 2566 that is displaced in the image by a distance 2572 to the left of the expected image space location on line 2567, then the navigation processor may cause a heading change by the host vehicle (e.g., change the steering angle of the wheels) to move the host vehicle leftward by a distance 2573. In this way, each captured image can be used as part of a feedback loop process such that a difference between an observed image position of sign 2566 and expected image trajectory 2567 may be minimized to ensure that the host vehicle continues along target trajectory 2565 with little to no deviation. Of course, the more mapped objects that are available, the more often the described localization technique may be employed, which can reduce or eliminate drift-induced deviations from target trajectory 2565.

The process described above may be useful for detecting a lateral orientation or displacement of the host vehicle relative to a target trajectory. Localization of the host vehicle relative to target trajectory 2565 may also include a determination of a longitudinal location of the target vehicle along the target trajectory. For example, captured image 2570 includes a representation of sign 2566 as having a certain image size (e.g., 2D X-Y pixel area). This size can be compared to an expected image size of mapped sign 2566 as it travels through image space along line 2567 (e.g., as the size of the sign progressively increases, as shown in FIG. 25C). Based on the image size of sign 2566 in image 2570, and based on the expected size progression in image space relative to mapped target trajectory 2565, the host vehicle can determine its longitudinal position (at the time when image 2570 was captured) relative to target trajectory 2565. This longitudinal position coupled with any lateral displacement relative to target trajectory 2565, as described above, allows for full localization of the host vehicle relative to target trajectory 2565, as the host vehicle navigates along road 2560.

FIGS. 25C and 25D provide just one example of the disclosed localization technique using a single mapped object and a single target trajectory. In other examples, there may be many more target trajectories (e.g., one target trajectory for each viable lane of a multi-lane highway, urban street, complex junction, etc.) and there may be many more mapped available for localization. For example, a sparse map representative of an urban environment may include many objects per meter available for localization.

Figure 26A:
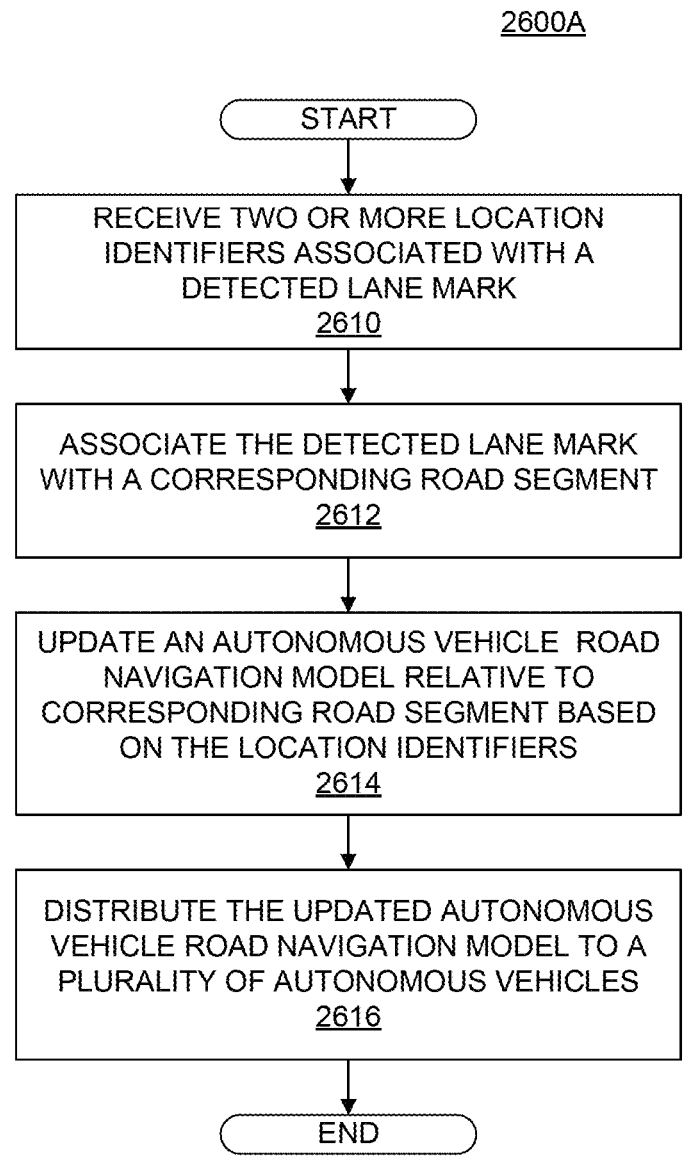
FIG. 26A is a flowchart showing an exemplary process for mapping a lane mark for use in autonomous vehicle navigation consistent with the disclosed embodiments.

FIG. 26A is a flowchart showing an exemplary process 2600A for mapping a lane mark for use in autonomous vehicle navigation, consistent with disclosed embodiments. At step 2610, process 2600A may include receiving two or more location identifiers associated with a detected lane mark. For example, step 2610 may be performed by server 1230 or one or more processors associated with the server. The location identifiers may include locations in real-world coordinates of points associated with the detected lane mark, as described above with respect to FIG. 24E. In some embodiments, the location identifiers may also contain other data, such as additional information about the road segment or the lane mark. Additional data may also be received during step 2610, such as accelerometer data, speed data, landmarks data, road geometry or profile data, vehicle positioning data, ego motion data, or various other forms of data described above. The location identifiers may be generated by a vehicle, such as vehicles 1205, 1210, 1215, 1220, and 1225, based on images captured by the vehicle. For example, the identifiers may be determined based on acquisition, from a camera associated with a host vehicle, of at least one image representative of an environment of the host vehicle, analysis of the at least one image to detect the lane mark in the environment of the host vehicle, and analysis of the at least one image to determine a position of the detected lane mark relative to a location associated with the host vehicle. As described above, the lane mark may include a variety of different marking types, and the location identifiers may correspond to a variety of points relative to the lane mark. For example, where the detected lane mark is part of a dashed line marking a lane boundary, the points may correspond to detected corners of the lane mark. Where the detected lane mark is part of a continuous line marking a lane boundary, the points may correspond to a detected edge of the lane mark, with various spacings as described above. In some embodiments, the points may correspond to the centerline of the detected lane mark, as shown in FIG. 24C, or may correspond to a vertex between two intersecting lane marks and at least one two other points associated with the intersecting lane marks, as shown in FIG. 24D.

At step 2612, process 2600A may include associating the detected lane mark with a corresponding road segment. For example, server 1230 may analyze the real-world coordinates, or other information received during step 2610, and compare the coordinates or other information to location information stored in an autonomous vehicle road navigation model. Server 1230 may determine a road segment in the model that corresponds to the real-world road segment where the lane mark was detected.

At step 2614, process 2600A may include updating an autonomous vehicle road navigation model relative to the corresponding road segment based on the two or more location identifiers associated with the detected lane mark. For example, the autonomous road navigation model may be sparse map 800, and server 1230 may update the sparse map to include or adjust a mapped lane mark in the model. Server 1230 may update the model based on the various methods or processes described above with respect to FIG. 24E. In some embodiments, updating the autonomous vehicle road navigation model may include storing one or more indicators of position in real world coordinates of the detected lane mark. The autonomous vehicle road navigation model may also include a at least one target trajectory for a vehicle to follow along the corresponding road segment, as shown in FIG. 24E.

At step 2616, process 2600A may include distributing the updated autonomous vehicle road navigation model to a plurality of autonomous vehicles. For example, server 1230 may distribute the updated autonomous vehicle road navigation model to vehicles 1205, 1210, 1215, 1220, and 1225, which may use the model for navigation. The autonomous vehicle road navigation model may be distributed via one or more networks (e.g., over a cellular network and/or the Internet, etc.), through wireless communication paths 1235, as shown in FIG. 12.

In some embodiments, the lane marks may be mapped using data received from a plurality of vehicles, such as through a crowdsourcing technique, as described above with respect to FIG. 24E. For example, process 2600A may include receiving a first communication from a first host vehicle, including location identifiers associated with a detected lane mark, and receiving a second communication from a second host vehicle, including additional location identifiers associated with the detected lane mark. For example, the second communication may be received from a subsequent vehicle travelling on the same road segment, or from the same vehicle on a subsequent trip along the same road segment. Process 2600A may further include refining a determination of at least one position associated with the detected lane mark based on the location identifiers received in the first communication and based on the additional location identifiers received in the second communication. This may include using an average of the multiple location identifiers and/or filtering out "ghost" identifiers that may not reflect the real-world position of the lane mark.

Figure 26B:
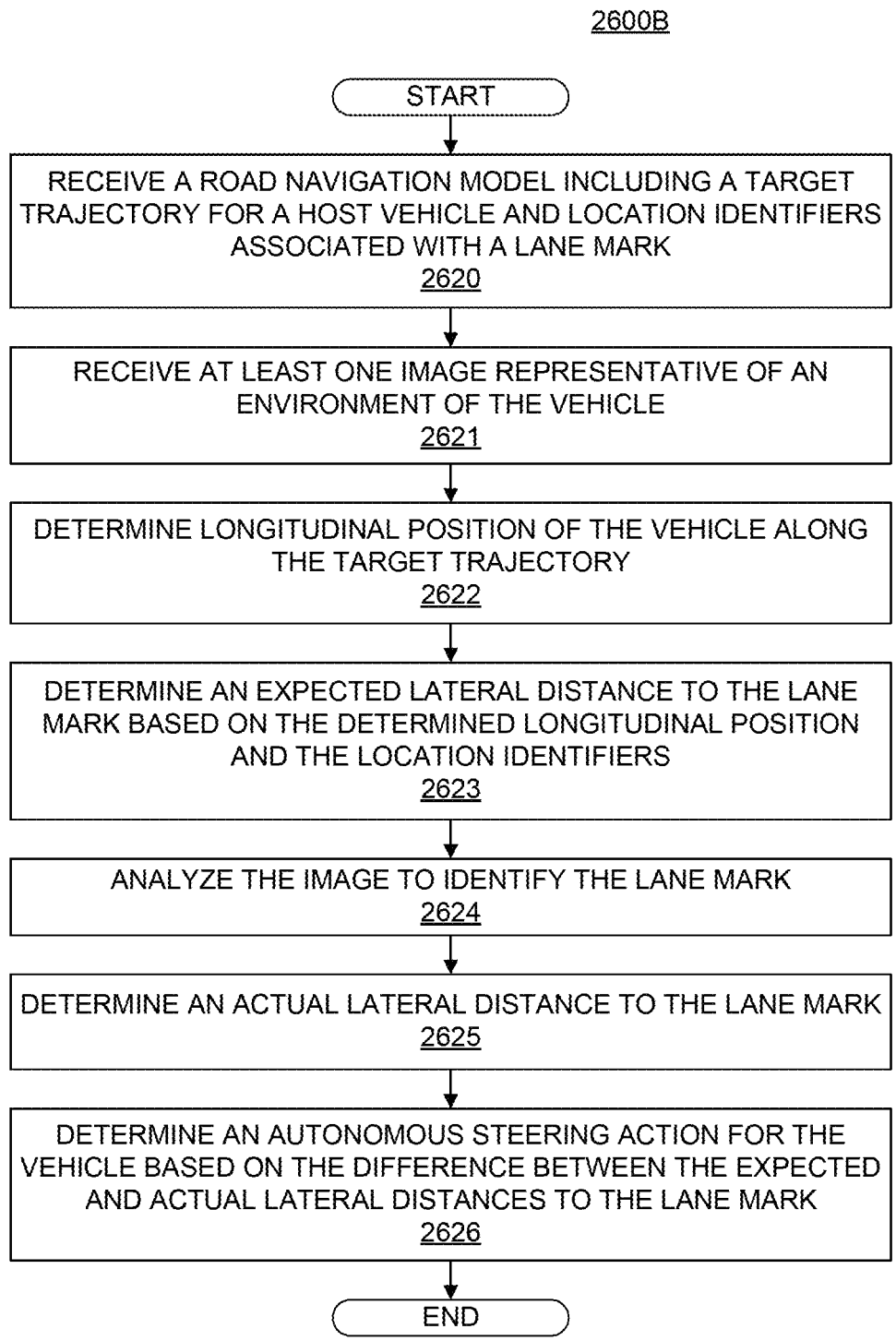
FIG. 26B is a flowchart showing an exemplary process for autonomously navigating a host vehicle along a road segment using mapped lane marks consistent with disclosed embodiments.

FIG. 26B is a flowchart showing an exemplary process 2600B for autonomously navigating a host vehicle along a road segment using mapped lane marks. Process 2600B may be performed, for example, by processing unit 110 of autonomous vehicle 200. At step 2620, process 2600B may include receiving from a server-based system an autonomous vehicle road navigation model. In some embodiments, the autonomous vehicle road navigation model may include a target trajectory for the host vehicle along the road segment and location identifiers associated with one or more lane marks associated with the road segment. For example, vehicle 200 may receive sparse map 800 or another road navigation model developed using process 2600A. In some embodiments, the target trajectory may be represented as a three-dimensional spline, for example, as shown in FIG. 9B. As described above with respect to FIGS. 24A-F, the location identifiers may include locations in real world coordinates of points associated with the lane mark (e.g., corner points of a dashed lane mark, edge points of a continuous lane mark, a vertex between two intersecting lane marks and other points associated with the intersecting lane marks, a centerline associated with the lane mark, etc.).

At step 2621, process 2600B may include receiving at least one image representative of an environment of the vehicle. The image may be received from an image capture device of the vehicle, such as through image capture devices 122 and 124 included in image acquisition unit 120. The image may include an image of one or more lane marks, similar to image 2500 described above.

At step 2622, process 2600B may include determining a longitudinal position of the host vehicle along the target trajectory. As described above with respect to FIG. 25A, this may be based on other information in the captured image (e.g., landmarks, etc.) or by dead reckoning of the vehicle between detected landmarks.

At step 2623, process 2600B may include determining an expected lateral distance to the lane mark based on the determined longitudinal position of the host vehicle along the target trajectory and based on the two or more location identifiers associated with the at least one lane mark. For example, vehicle 200 may use sparse map 800 to determine an expected lateral distance to the lane mark. As shown in FIG. 25B, longitudinal position 2520 along a target trajectory 2555 may be determined in step 2622. Using spare map 800, vehicle 200 may determine an expected distance 2540 to mapped lane mark 2550 corresponding to longitudinal position 2520.

At step 2624, process 2600B may include analyzing the at least one image to identify the at least one lane mark. Vehicle 200, for example, may use various image recognition techniques or algorithms to identify the lane mark within the image, as described above. For example, lane mark 2510 may be detected through image analysis of image 2500, as shown in FIG. 25A.

At step 2625, process 2600B may include determining an actual lateral distance to the at least one lane mark based on analysis of the at least one image. For example, the vehicle may determine a distance 2530, as shown in FIG. 25A, representing the actual distance between the vehicle and lane mark 2510. The camera angle, the speed of the vehicle, the width of the vehicle, the position of the camera relative to the vehicle, or various other factors may be accounted for in determining distance 2530.

At step 2626, process 2600B may include determining an autonomous steering action for the host vehicle based on a difference between the expected lateral distance to the at least one lane mark and the determined actual lateral distance to the at least one lane mark. For example, as described above with respect to FIG. 25B, vehicle 200 may compare actual distance 2530 with an expected distance 2540. The difference between the actual and expected distance may indicate an error (and its magnitude) between the vehicle's actual position and the target trajectory to be followed by the vehicle. Accordingly, the vehicle may determine an autonomous steering action or other autonomous action based on the difference. For example, if actual distance 2530 is less than expected distance 2540, as shown in FIG. 25B, the vehicle may determine an autonomous steering action to direct the vehicle left, away from lane mark 2510. Thus, the vehicle's position relative to the target trajectory may be corrected. Process 2600B may be used, for example, to improve navigation of the vehicle between landmarks.

Processes 2600A and 2600B provide examples only of techniques that may be used for navigating a host vehicle using the disclosed sparse maps. In other examples, processes consistent with those described relative to FIGS. 25C and 25D may also be employed.

Map Management Using an Electronic Horizon

Although processing power and storage capacity has increased and become less costly, it may still be desirable to use them more efficiently. The systems and methods disclosed herein may allow a vehicle to dynamically receive and load map data that is pertinent to its travel route, rather than loading a large set of map data that the vehicle may not use during a trip. In doing so, the systems and methods may reduce hardware requirements of a vehicle by receiving and processing the map data that the vehicle is likely to need. Additionally, the systems and methods may also allow reduction in transmission costs of data exchanged between a vehicle and, for example, a central server that deploys the map data. Furthermore, the disclosed systems and methods may allow the vehicle to receive the most recent map data that the vehicle may need more frequently. For example, the systems and methods may determine a potential travel area (or a potential travel envelope) for the vehicle based on navigational information, such as the vehicle's location, speed, driving direction, etc. The systems and methods may also be configured to determine one or more road segments associated with the potential travel area from the vehicle and transmit the map data relating to the road segments to the vehicle. The vehicle (and/or the driver) may navigate according to the received map data.

Figure 27:
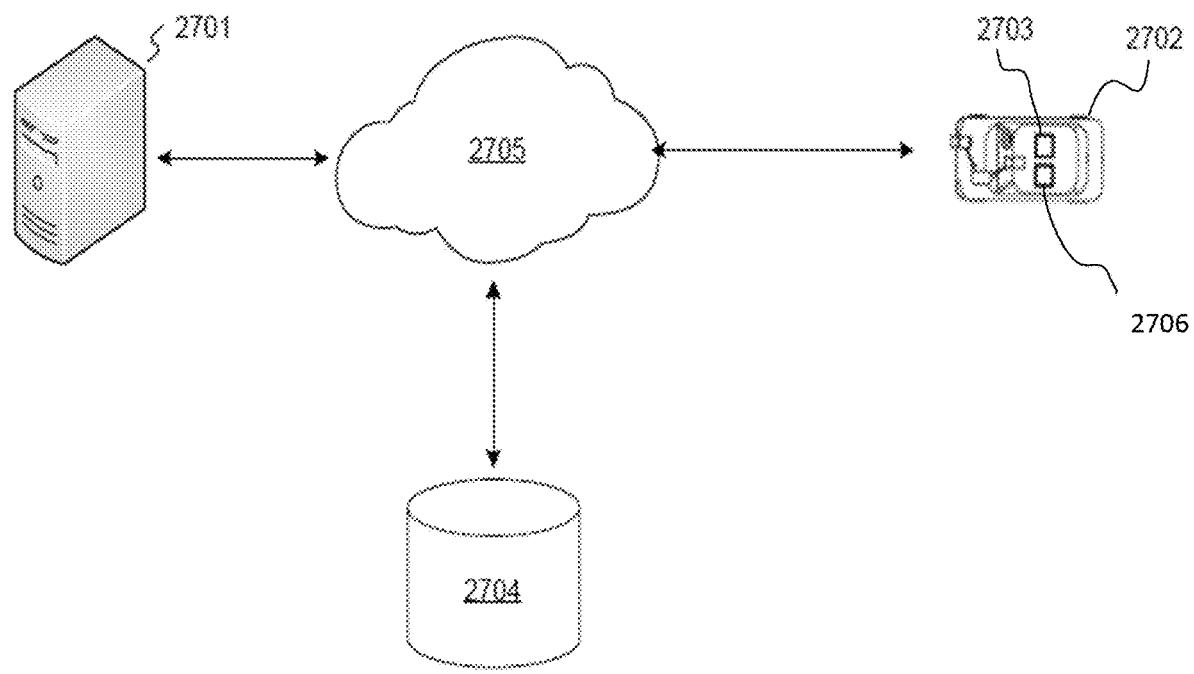
FIG. 27 illustrates an exemplary system for providing one or more map segments to one or more vehicles, consistent with the disclosed embodiments.

FIG. 27 illustrates an exemplary system 2700 for providing one or more map segments to one or more vehicles, consistent with the disclosed embodiments. As illustrated in FIG. 27, system 2700 may include a server 2701, one or more vehicles 2702, and one or more vehicle devices 2703 associated with a vehicle, a database 2704, a network 2705, and a processing unit 2706 associated with one or more image capture devices mountable on the vehicle. Server 2701 may be configured to providing one or more map segments to one or more vehicles based on navigational information received from one or more vehicles (and/or one or more vehicle devices associated with a vehicle). For example, processing unit 2706 and/or vehicle device 2703 may be configured to collect navigational information and transmit the navigational information to server 2701. Server 2701 may send to processing unit 2706 and/or vehicle device 2703 one or more map segments including map information for a geographical region based on the received navigational information. Database 2704 may be configured to store information for the components of system 2700 (e.g., server 2701, vehicle device 2703, and/or processing unit 2706). Network 2705 may be configured to facilitate communications among the components of system 2700.

Server 2701 may be configured to receive navigational information from vehicle device 2703 and/or processing unit 2706. In some embodiments, navigational information may include the location of vehicle 2702, the speed of vehicle 2702, and the direction of travel of vehicle 2702. Server 2701 may also be configured to analyze the received navigational information and determine a potential travel envelope for vehicle 2702. A potential travel envelope of a vehicle may be an area surrounding the vehicle. For example, a potential travel envelope of a vehicle may include an area covering a first predetermined distance from the vehicle in the driving direction of the vehicle, a second predetermined distance from the vehicle in a direction opposite to the driving direction of the vehicle, a third predetermined distance from the vehicle to the left of the vehicle, and a fourth predetermined distance from the vehicle to the right of the vehicle. In some embodiments, the first predetermined distance from the vehicle in the driving direction of the vehicle may include a predetermined distance ahead of the vehicle that may constitute an electronic horizon of the vehicle. In some embodiments, a potential travel envelope of a vehicle may include one or more distances (one, two, three, . . . , n), or any equivalents of distance (e.g., a certain time period given a speed parameter, etc.) from the vehicle in one or more (or all) possible driving directions for the vehicle relative to its current position. In some embodiments, a potential travel envelope of a vehicle may include one or more distances (one, two, three, . . . , n) from the vehicle in one or more (or all) possible driving directions for the vehicle relative to its current position, and in a direction where it is possible for the vehicle to drive relative to its current position (e.g., a driving direction may be included in the potential travel envelope of the vehicle if the vehicle can drive in that travel direction relative to its current position. For example, in a road where a vehicle may be capable of making a U-turn, a potential travel envelope of the vehicle may include a predetermined distance from the vehicle in the opposite direction in addition to a predetermined distance in at least the forward direction, since the vehicle may perform a U-turn and may navigate in a direction that is (generally) opposite to its current motion direction. As another example, if traveling at the opposite direction is not possible (e.g., there is a physical barrier) at the current location, and no U-turn is possible for some distance ahead of the current location, a potent travel envelop may not include a distance in the opposite direction. Thus, if the potential travel envelope of a vehicle is, for example, 1000 meters, and there is a U-turn starting at 800 meters ahead of the vehicle's current location, the potential travel envelope may include a distance of 1000 meters in the current direction of travel of the vehicle and 200 meters in the reverse (after the U-turn) direction of travel, starting from 800 meters ahead of the vehicle's current location (in its direction of travel). Similarly, if a U-turn is possible starting at 350 meters away from the current location, and the potential travel envelope includes a distance of 500 meters, the potential travel envelope may include a distance of 500 meters in the current direction of travel of the vehicle and 150 meters in the reverse (after the U-turn) direction of travel, starting from 350 meters ahead of the vehicle's current location (in its direction of travel). Multiple U-turns may be possible in different (possible) directions within the potential travel envelope, and for each such U-turn, a distance in the travel direction after the U-turn may be included in the potential travel envelope. Similar to an actual horizon in the real world, the electronic horizon may be correlated to a potential travel distance of the vehicle within a certain time parameter, such as a time window (30 seconds, 1 minutes, 3 minutes, 15 minutes, 1 hour, 2 hours, etc.) and based on a speed parameters, such as based on a current speed, an estimated speed, a typical speed for the relevant road segments included in the potential travel envelope of the host vehicle and a current direction of travel. Server 2701 may further be configured to send to vehicle device 2703 and/or processing unit 2706 one or more map segments including map information for a geographical region at least partially overlapping with the potential travel envelope of vehicle 2702.

In some embodiments, server 2701 may be a cloud server that performs the functions disclosed herein. The term "cloud server" refers to a computer platform that provides services via a network, such as the Internet. In this example configuration, server 2701 may use virtual machines that may not correspond to individual hardware. For example, computational and/or storage capabilities may be implemented by allocating appropriate portions of desirable computation/storage power from a scalable repository, such as a data center or a distributed computing environment. In one example, server 2701 may implement the methods described herein using customized hard-wired logic, one or more Application Specific Integrated Circuits (ASICs) or Field Programmable Gate Arrays (FPGAs), firmware, and/or program logic which, in combination with the computer system, cause server 2701 to be a special-purpose machine.

Processing unit 2706 and/or vehicle device 2703 may be configured to collect navigational information and transmit the navigational information to server 2701. For example, processing unit 2706 and/or vehicle device 2703 may be configured to receive data from one or more sensors and determine navigational information, such as the vehicle's location, speed, and/or driving direction, based on the received data. In some embodiments, navigational information may include sensor data received from one or more sensors associated with vehicle 2702 (e.g., from a GPS device, a speed sensor, an accelerometer, a suspension sensor, a camera, a LIDAR device, a Visual Detection and Ranging (VIDAR) device, or the like, or a combination thereof). Processing unit 2706 and/or vehicle device 2703 may also be configured to transmit the navigational information to server 2701 via, for example, network 2705. Alternatively or additionally, processing unit 2706 and/or vehicle device 2703 may be configured to transmit sensor data to server 2701. Processing unit 2706 and/or vehicle device 2703 may also be configured to receive map information from server 2701 via, for example, network 2705. In one example, processing unit 2706 communicate with server 2701 to obtain the map information and thereafter convey relevant map information to vehicle device 2703. Map information may include data relating to the position in a reference coordinate system of various items, including, for example, roads, water features, geographic features, businesses, points of interest, restaurants, gas stations, a sparse data model including polynomial representations of certain road features (e.g., lane markings), target trajectories for the host vehicle, or the like, or a combination thereof. In some embodiments, processing unit 2706 and/or vehicle device

2703 may be configured to plan a routing path and/or navigate vehicle 2702 according to the map information. For example, processing unit 2706 and/or vehicle device 2703 may be configured to determine a route to a destination based on the map information. Alternatively or additionally, processing unit 2706 and/or vehicle device 2703 may be configured to determine at least one navigational action (e.g., making a turn, stopping at a location, etc.) based on the received map information. In some embodiments, processing unit 2706 may include a device having a similar configuration and/or performing similar functions as processing unit 110 described above. Alternatively or additionally, vehicle device 2703 may control or communicate with at least one of throttling system 220, braking system 230, or steering system 240.

Database 2704 may include a map database configured to store map data for the components of system 2700 (e.g., server 2701, processing unit 2706, and/or vehicle device 2703). In some embodiments, server 2701, processing unit 2706, and/or vehicle device 2703 may be configured to access database 2704, and obtain data stored from and/or upload data to database 2704 via network 2705. For example, server 2701 may transmit data relating to map information to database 2704 for storage. Processing unit 2706 and/or vehicle device 2703 may download map information and/or data from database 2704. In some embodiments, database 2704 may include data relating to the position, in a reference coordinate system, of various items, including roads, water features, geographic features, businesses, points of interest, restaurants, gas stations, or the like, or a combination thereof. In some embodiments, database 2704 may include a database similar to map database 160 described elsewhere in this disclosure.

Network 2705 may be any type of network (including infrastructure) that provides communications, exchanges information, and/or facilitates the exchange of information between the components of system 2700. For example, network 2705 may include or be part of the Internet, a Local Area Network, wireless network (e.g., a Wi-Fi/302.11 network), or other suitable connections. In other embodiments, one or more components of system 2700 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

Figure 28A:
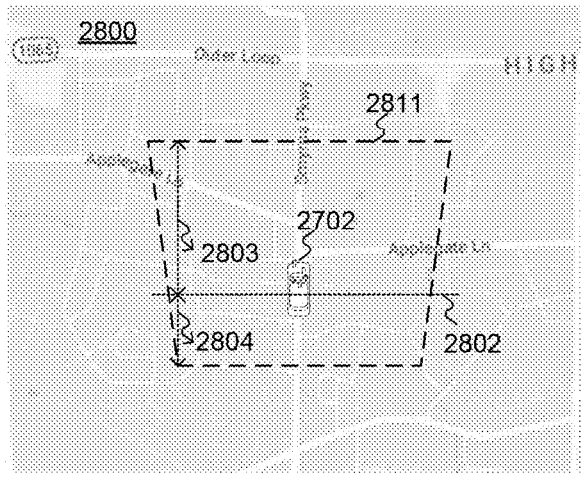
FIGS. 28A, 28B, 28C, and 28D illustrate exemplary potential travel envelopes for a vehicle, consistent with disclosed embodiments.
Figure 28B:
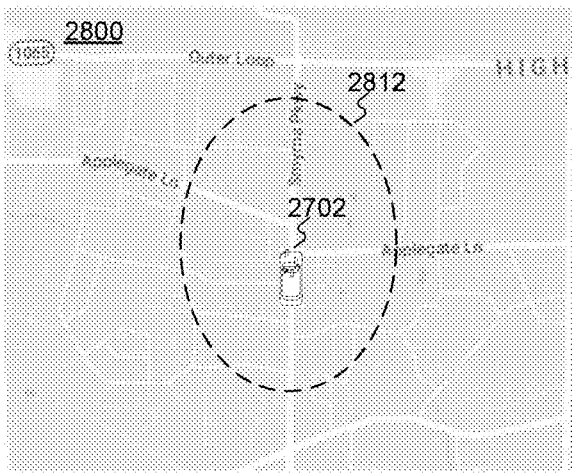
Figure 28C:
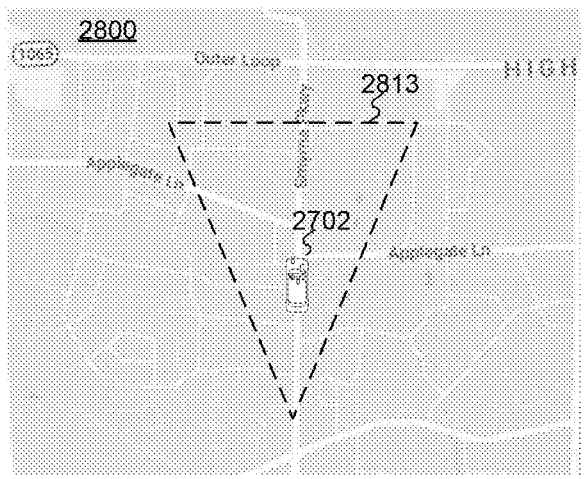
Figure 28D:
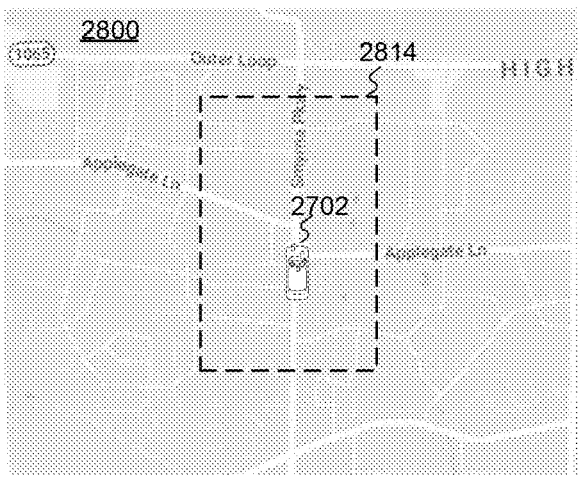

As described elsewhere in this disclosure, processing unit 2706 may transmit navigational information associated with vehicle 2702 to server 2701 via network 2705. Server 2701 may analyze the navigational information received from processing unit 2706 and determine a potential travel envelope for vehicle 2702 based on the analysis of the navigational information. A potential travel envelop may encompass the location of vehicle 2702. In some embodiments, the potential travel envelop may take on any shape (arbitrary shape) and is determined by a distance between two points in any possible driving direction relative to the vehicle's current position and the vehicle's current traveling direction. In some embodiments, a potential travel envelope may include a boundary. The boundary of the potential travel envelope may have a shape, including, for example, a triangular shape, a quadrilateral shape, a parallelogram shape, a rectangular shape, a square (or substantially square) shape, a trapezoid shape, a diamond shape, a hexagon shape, an octagon shape, a circular (or substantially circular) shape, an oval shape, an egg shape, an irregular shape, or the like, or a combination thereof. FIGS. 28A-28D illustrate exemplary potential travel envelopes for a vehicle in an area 2800, consistent with disclosed embodiments. As illustrated in FIG. 28A, server 2701 may determine a potential travel envelope having a boundary 2811, which may include a trapezoid shape, for vehicle 2702. As another example, as illustrated in FIG. 28B, server 2701 may determine a potential travel envelope having a boundary 2812, which may include an oval shape, for vehicle 2702. As another example, as illustrated in FIG. 28C, server 2701 may determine a potential travel envelope having a boundary 2813, which may include a triangle shape, for vehicle 2702. As another example, as illustrated in FIG. 28D, server 2701 may determine a potential travel envelope having a boundary 2814, which may include a rectangular shape, for vehicle 2702. Alternatively or additionally, the shape of the potential travel envelope may have a boundary that is determined by one or more potential paths that the vehicle may travel on starting from a location (e.g., a current location) of the vehicle. One skilled in the art would understand that the shape of a potential travel envelope is not limited to the exemplary shapes described in this disclosure. Other shapes are also possible. For example, a potential travel envelope may be associated with non-distance related constraints, such as countries, states, counties, cities, and/or roads), and end-of-the-road constraints. The potential travel envelope can include an irregular shape, for example, to accommodate such non-distance related constraints and/or a portion of any of the shapes described herein.

As described elsewhere in this disclosure, server 2701 may also be configured to transmit to processing unit 2706 one or more map segments including map information for a geographical region at least partially overlapping with the potential travel envelope of the vehicle. In some embodiments, the one or more map segments sent to processing unit 2706 and/or vehicle device 2703 may include one or more tiles representing a region of a predetermined dimension. The size and/or shape of a tile may vary. In some embodiments, the dimension of a tile in a region may be in a range of 0.25 to 100 square kilometers, which may be restricted into a subrange of 0.25 square kilometers to 1 square kilometer, 1 square kilometers to 10 square kilometers, and 10 to 25 square kilometers, 25 to 50 square kilometers, and 50 to 100 square kilometers. In some embodiments, the predetermined dimension of the tile(s) may be less than or equal to ten square kilometers. Alternatively, the predetermined dimension of the tile(s) may be less than or equal to one square kilometer. Alternatively, the predetermined dimension of the tile(s) may be less than or equal to ten square kilometers. Alternatively or additionally, the size of a tile may vary based on the type of the region in which a tile is. For example, the size of a tile in a rural area or an area with fewer roads than may be larger than the size of a tile in an urban area or area with more roads. In some embodiments, the size of the tile may be determined based on the density of the information around a current location of the vehicle (or the location where the data is obtained), possible paths for the vehicle, the number of possible routes in the area, the type of routes (e.g., main, urban, rural, dirt, etc.) in the area and general navigational patterns, and/or trends in the relevant area. For example, if a large percentage of vehicles typically remain on a main road in a particular area or region, map information for a small distance along side roads may be retrieved. If a vehicle does in fact navigate onto a side road that is typically less traveled, then more map information for the side road (e.g., for a greater distance along the side road) may be obtained and/or transmitted to the vehicle. In some embodiments, a tile may have a rectangle shape, a square shape, a hexagon shape, or the like, or a combination thereof. One skilled in the art would understand that the shape of a tile is not limited to the shapes described in this disclosure. For example, a tile may include an irregular shape (e.g., determined according to at least a boundary of a jurisdiction (states, counties, cities, or towns) or other regions (e.g., streets, highways) and constraints). Alternatively or additionally, a tile may include a portion of any shape disclosed herein.

Figure 28E:
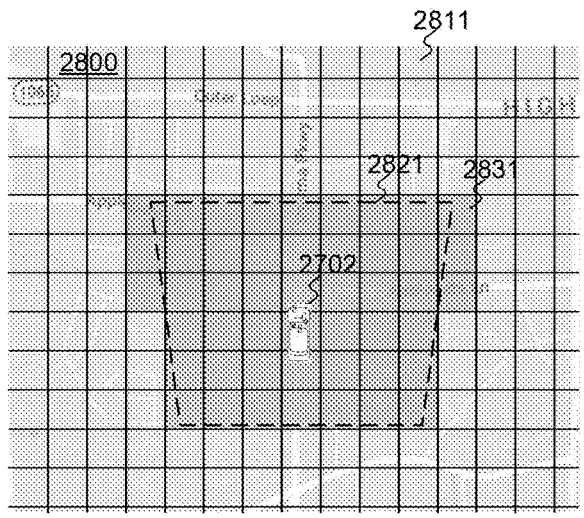
FIGS. 28E, 28F, 28G, and 28H illustrates exemplary map tiles associated with potential travel envelopes for a vehicle, consistent with disclosed embodiments.
Figure 28F:
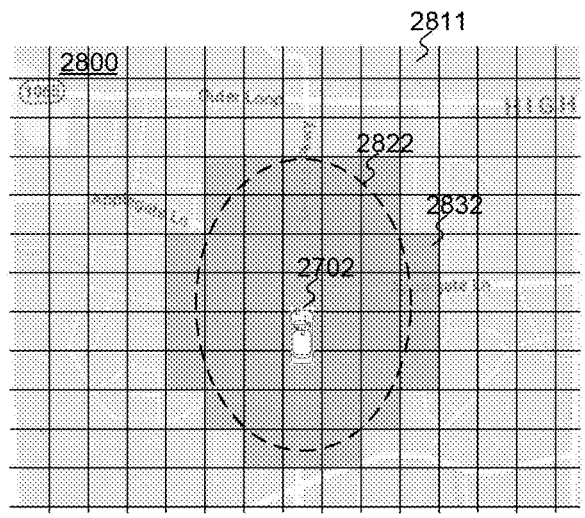
Figure 28G:
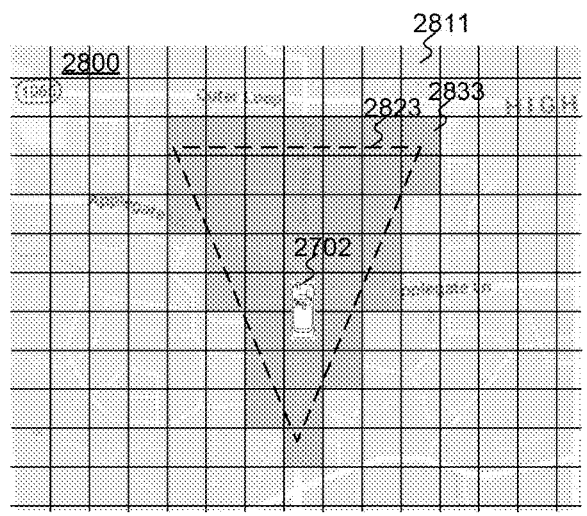
Figure 28H:
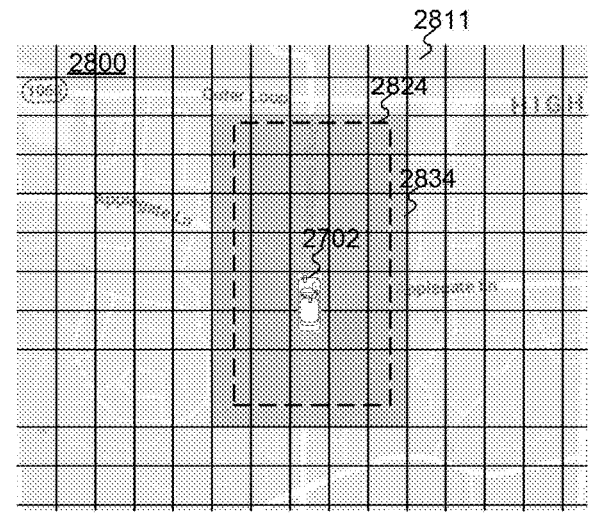

FIGS. 28E-28H illustrates exemplary map tiles for potential travel envelopes for a vehicle, consistent with disclosed embodiments. As illustrated in FIGS. 28E-28H, server 2701 may divide area 2800 (or a smaller or a larger area) into multiple tiles 2811. Server 2701 may also be configured to determine one or more tiles that at least partially overlap with the potential travel envelope of vehicle 2702. For example, as illustrated in FIG. 28E, server 2701 may determine an area 2831 having tiles that intersect with or are within boundary 2821 of a potential travel envelope for vehicle 2702. As another example, as illustrated in FIG. 28F, server 2701 may determine an area 2832 having tiles that intersect with or are within boundary 2822 of a potential travel envelope for vehicle 2702. As another example, as illustrated in FIG. 28G, server 2701 may determine an area 2833 having tiles that intersect with or are within boundary 2823 of a potential travel envelope for vehicle 2702. As another example, as illustrated in FIG. 28H, server 2701 may determine an area 2834 having tiles that intersect with or are within boundary 2824 of a potential travel envelope for vehicle 2702. In some embodiments, server 2701 may transmit the map information and/or data relating to one or more road segments in the determined area to vehicle 2702.

Figure 29A:
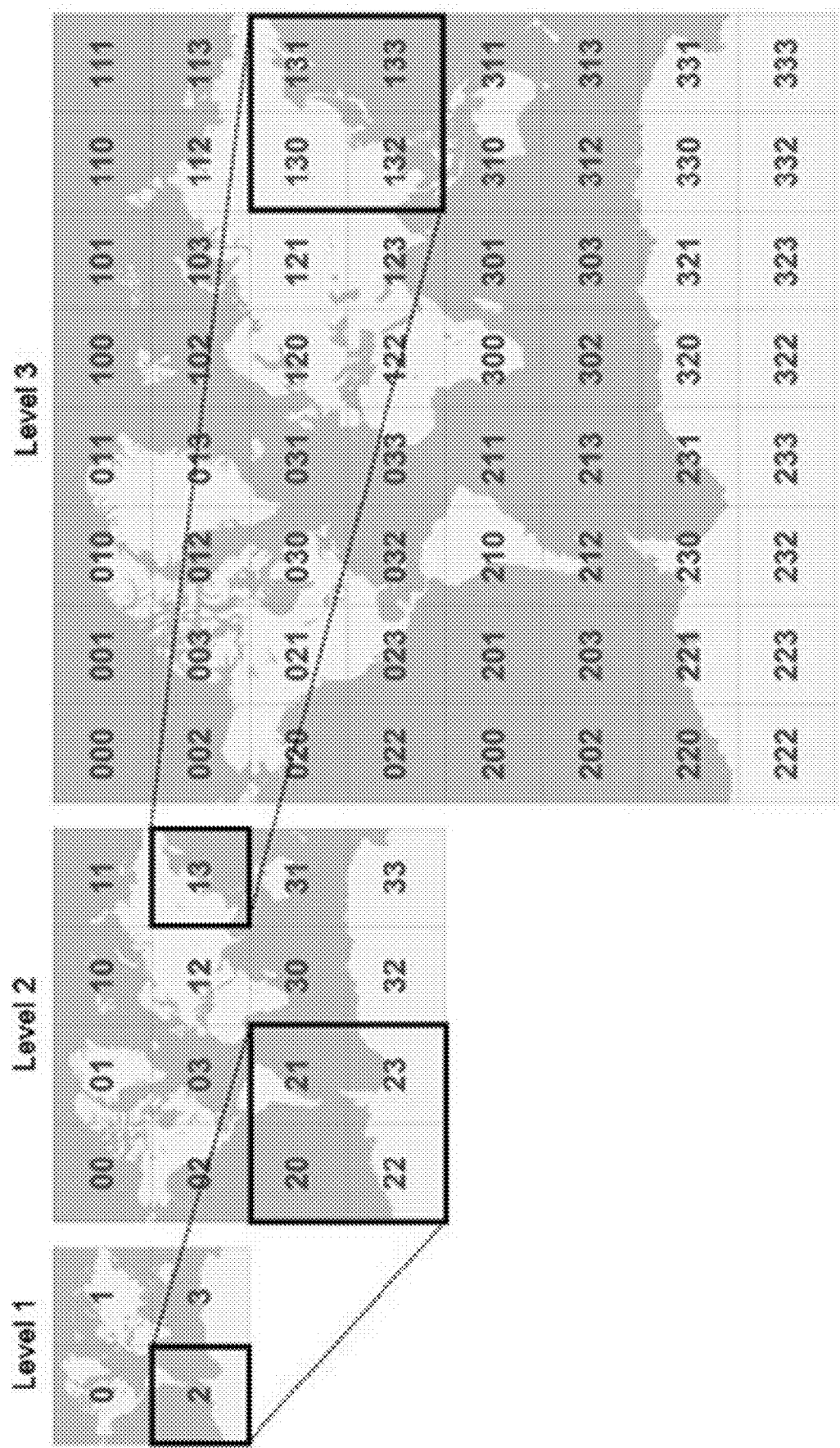
FIGS. 29A and 29B illustrate exemplary map tiles, consistent with disclosed embodiments.
Figure 29B:
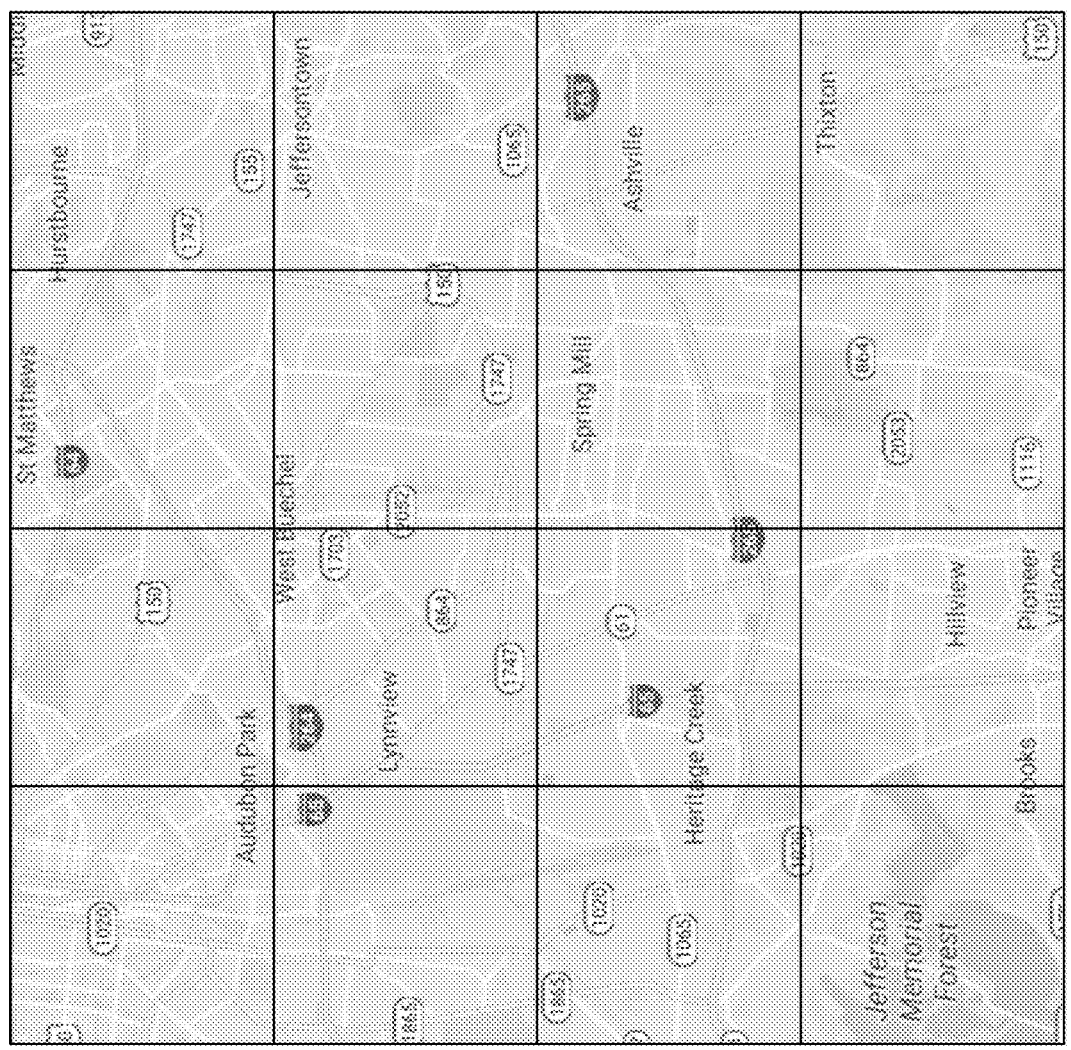

FIGS. 29A and 29B illustrate exemplary map tiles, consistent with disclosed embodiments. As illustrated in FIG. 29A, an area (or a map) may be divided into a plurality of tiles at different levels. For example, in some embodiments, an area may be divided in a plurality of tiles at level 1, each of which may be divided into a plurality of tiles at level 2. Each of the tiles at level 2 may be divided into a plurality of tiles at level 3, and so on. FIG. 29B illustrates a plurality of tiles in a region. Alternatively or additionally, a region or a country may be divided into a plurality of tiles based on jurisdictions (e.g., states, counties, cities, towns) and/or other regions (e.g., streets, highways). In some embodiments, the dimension of a tile may vary. For example, as illustrated in FIGS. 29A and 29B, an area (or a map) may be divided into different levels, and a tile at a particular level may have a particular dimension.

In some embodiments, a tile may be presented in a data blob, which may include a metadata block (e.g., 64 bytes), a signature block (e.g., 256 bytes), and an encoded map data block (e.g., various sizes in the MapBox format).

In some embodiments, server 2701 may retrieve data relating to one or more tiles in a region and transmit the data to processing unit 2706 via, for example, network 2705.

Alternatively or additionally, processing unit 2706 may retrieve the data relating to one or more tiles from a storage device. For example, processing unit 2706 may receive one or more road segments from server 2701 as described elsewhere in this disclosure. Processing unit 2706 may also store the received one or more road segments into a local storage and load one or more tiles included in the one or more road segments into a memory for processing. Alternatively, rather than receiving one or more road segments from server 2701, processing unit 2706 may communicate with a local storage configured to store one or more road segments and retrieve the data relating to the one or more road segments from the local storage.

In some embodiments, processing unit 2706 may retrieve the data (e.g., map information) relating to one or more tiles based on the location of the vehicle. For example, processing unit 2706 may determine the vehicle's current location (as described elsewhere in this disclosure) and determine a first tile in which the current location resides. Processing unit 2706 may also retrieve the first tile and one or more (or all) tiles adjacent to the first tile. Alternatively or additionally, Processing unit 2706 may retrieve one or more (or all) tiles within a predetermined distance from the first tile. Alternatively or additionally, processing unit 2706 may retrieve one or more (or all) tiles within a predetermined degree of separation from the first tile (e.g., one or more (or all) tiles that are within the second degree of separation; that is, one or more (or all) tiles that are adjacent to the first tile or adjacent to a title that is adjacent to the first tile). When vehicle 2702 moves to a second tile, processing unit 2706 may retrieve the second tile. Processing unit 2706 may also retrieve the first tile and one or more (or all) tiles adjacent to the second tile. Alternatively or additionally, processing unit 2706 may retrieve one or more (or all) tiles within a predetermined distance from the second tile. Alternatively or additionally, processing unit 2706 may retrieve one or more (or all) tiles within a predetermined degree of separation from the second tile (e.g., one or more (or all) tiles that are within the second degree of separation; that is, one or more (or all) tiles that are adjacent to the second tile or adjacent to a title that is adjacent to the second tile). In some embodiments, processing unit 2706 may also delete (or overwrite) the first tile and/or the previously retrieved tiles that are not adjacent to the second tile. Alternatively or additionally, processing unit 2706 may delete (or overwrite) one or more previously retrieved tiles that are not within a predetermined distance from the second tile. Alternatively or additionally, processing unit 2706 may delete (or overwrite) one or more (or all) previously retrieved tiles that are not within a predetermined degree of separation from the second tile.

Figure 30:
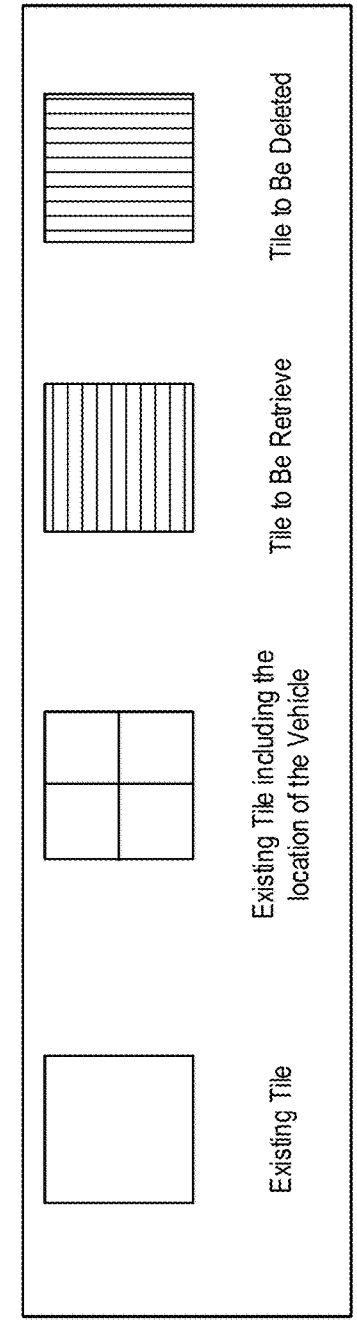
FIG. 30 illustrates an exemplary process for retrieving map tiles, consistent with disclosed embodiments.

FIG. 30 illustrates an exemplary process for retrieving one or more tiles. As illustrated in FIG. 30, processing unit 2706 (and/or server 2701) may be configured to determine that the location of vehicle 2702 is in tile 5 at time point 1. Processing unit 2706 may also be configured to retrieve (or load) adjacent tiles 1-4 and 6-9. At time point 2, processing unit 2706 (and/or server 2701) may be configured to determine that the location of vehicle 2702 moves to tile 3 from tile 5. Processing unit 2706 may be configured to retrieve (or load) new tiles 10-14, which are adjacent to tile 3. Processing unit 2706 may also be configured to keep tiles 2, 3, 5, and 6, and delete tiles 1, 4, and 7-9. As such, processing unit 2706 may retrieve (or load) a subset of the tiles (e.g., 9 tiles) at a time to reduce the memory usage and/or computation load. In some embodiments, processing unit 2706 may be configured to decode a tile before loading the data into the memory.

Figure 31A:
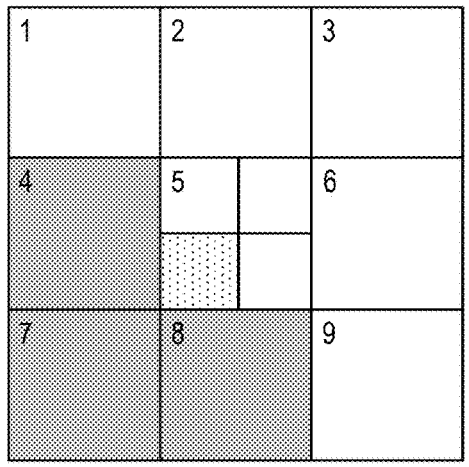
FIGS. 31A, 31B, 31C, and 31D illustrate an exemplary process for decoding map tiles, consistent with disclosed embodiments.
Figure 31B:
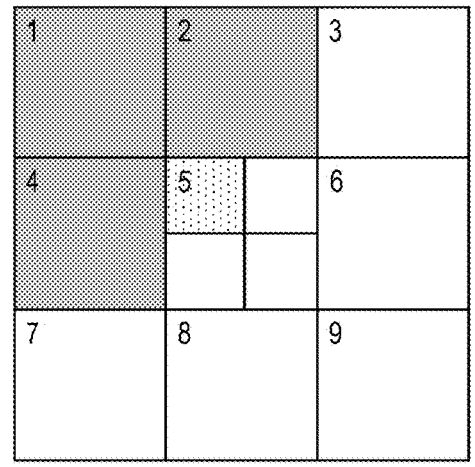
Figure 31C:
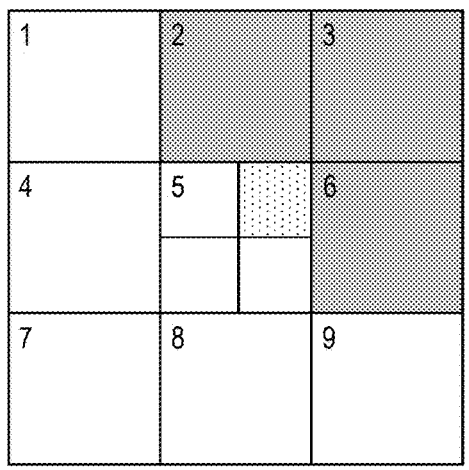
Figure 31D:
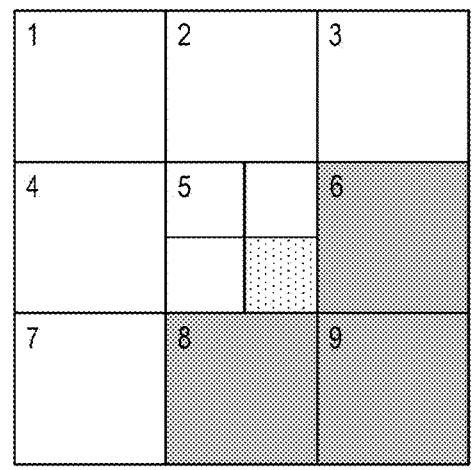

Alternatively or additionally, processing unit 2706 may determine a subpart of a tile that its location falls within the tile and load the tiles adjacent to the subpart. By way of example, as illustrated in FIG. 31A, processing unit 2706 may determine that the location of vehicle 2702 is in a sub-tile (a sub-tile having a pattern of dots in tile 5) and load map data of the tiles that are adjacent to the sub-tile (i.e., tiles 4, 7, and 9) into the memory for processing. As another example, as illustrated in FIG. 31B, processing unit 2706 may determine that the location of vehicle 2702 is in the left-top sub-tile of tile 5. Processing unit 2706 may also load the tiles adjacent to the left-top sub-tile of tile 5 (i.e., tiles 1, 2, and 4). As such, processing unit 2706 may retrieve (or load) a subset of the tiles (e.g., 4 tiles) at a time to reduce the memory usage and/or computation load. As another example, as illustrated in FIG. 31C, processing unit 2706 may determine that the location of vehicle 2702 is in the right-top sub-tile and load map data of the tiles that are adjacent to the sub-tile (i.e., tiles 2, 3, and 6) into the memory for processing. As another example, as illustrated in FIG. 31D, processing unit 2706 may determine that the location of vehicle 2702 is in the right-bottom sub-tile and load map data of the tiles that are adjacent to the sub-tile (i.e., tiles 6, 8, and 9) into the memory for processing. In some embodiments, processing unit 2706 may be configured to decode a tile before loading the data into the memory.

Figure 32:
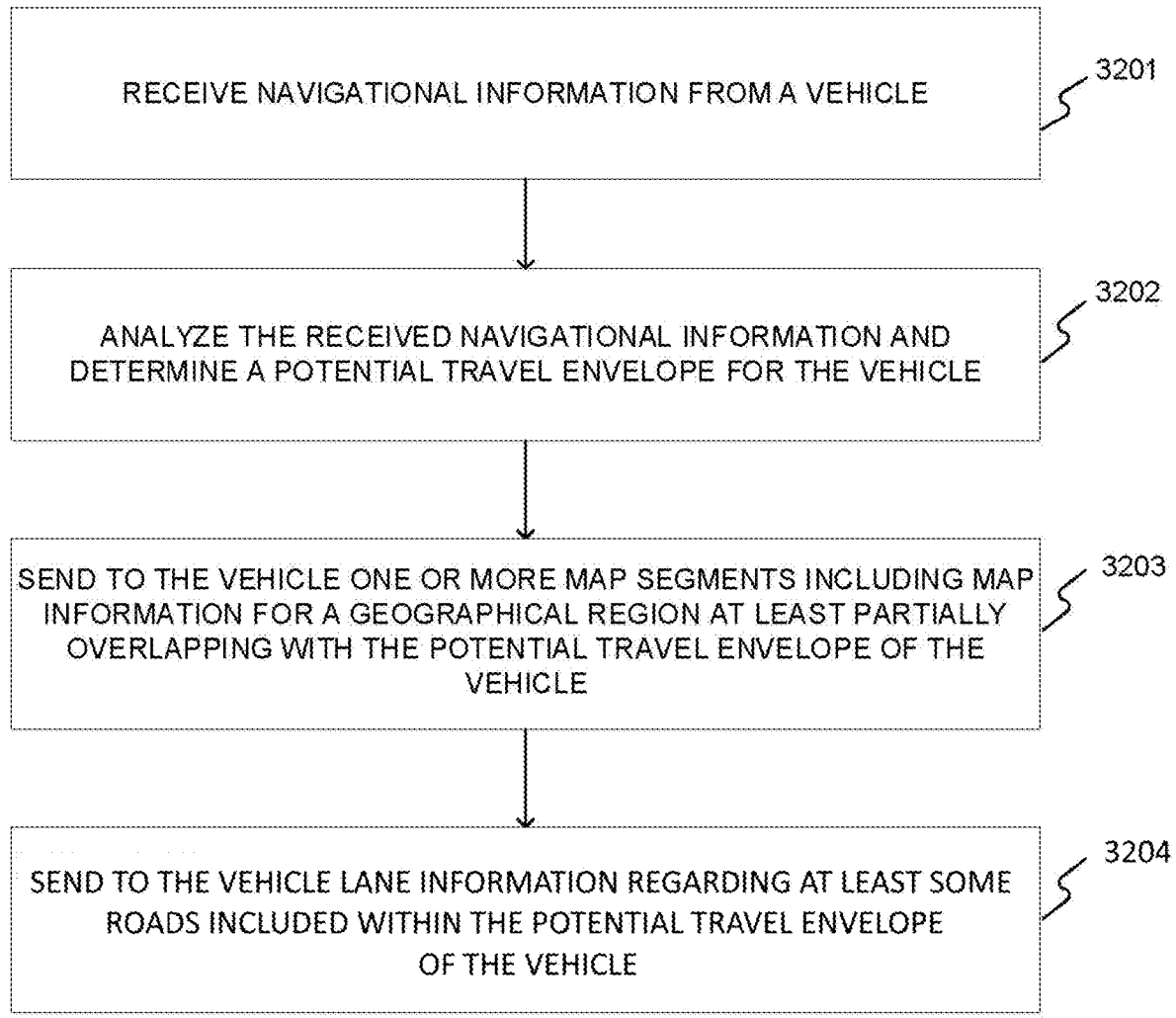
FIG. 32 is a flowchart showing an exemplary process for providing one or more map segments to one or more vehicles, consistent with the disclosed embodiments.

FIG. 32 is a flowchart showing an exemplary process for providing one or more map segments to one or more vehicles, consistent with the disclosed embodiments. One or more steps of process 3200 may be performed by a processing device (e.g., processing unit 2706), a device associated with the host vehicle (e.g., vehicle device 2703), and/or a server (e.g., server 2701). While the descriptions of process 3200 provided below use server 2701 as an example, one skilled in the art would appreciate that one or more steps of process 3200 may be performed by a processing device (e.g., processing unit 2706) and a vehicle device (e.g., vehicle device 2703). For example, processing unit 2706 may determine a potential travel envelope based on navigational information. In additional to or alternative to receiving map data from server 2701, processing unit 2706 may retrieve portion of map data relating to the potential travel envelope from a local storage and load the retrieved data into a memory for processing.

At step 3201, navigational information may be received from a vehicle. For example, server 2701 may receive navigational information from processing unit 2706 via, for example, network 2705. In some embodiments, the navigational information received from processing unit 2706 may include an indicator of a location of the vehicle, an indicator of a speed of the vehicle, and an indicator of a direction of travel of the vehicle. For example, processing unit 2706 may be configured to receive data from vehicle device 2703 or directly from one or more sensors, including, for example, a GPS device, a speed sensor, an accelerometer, a suspension sensor, or the like, or a combination thereof. Processing unit 2706 may also be configured to determine navigational information, such as the vehicle's location, speed, and/or driving direction, based on the received data. Processing unit 2706 may also be configured to transmit the navigational information to server 2701 via, for example, network 2705. Alternatively or additionally, processing unit 2706 may be configured to transmit the sensor data to server 2701. Server 2701 may be configured to determine navigational information, which may include the location of vehicle 2702, speed of vehicle 2702, and/or direction of travel of vehicle 2702, based on the received sensor data.

In some embodiments, processing unit 2706 may transmit the navigational information (and/or sensor data) to server 2701 continuously. Alternatively, processing unit 2706 may transmit the navigational information (and/or sensor data) to server 2701 intermittently. For example, processing unit 2706 may transmit the navigational information (and/or sensor data) to server 2701 a number of times over a period of time. By way of example, processing unit 2706 may transmit the navigational information (and/or sensor data) to server 2701 once per minute. Alternatively, processing unit 2706 may transmit the navigational information when it has access to a more reliable and/or faster network (e.g., having a stronger wireless signal, via a WIFI connection, etc.).

At step 3202, the received navigational information may be analyzed and a potential travel envelope for the vehicle may be determined. For example, server 2701 may analyze vehicle 2702's location, speed, and/or driving direction, and determine a potential travel envelope, which may include a determined area relative to vehicle 2702. By way of example, as illustrated in FIG. 28A, server 2701 may determine an area that encompasses the location of vehicle 2702 and determine a potential travel envelope having a boundary 2811, based on the determined area.

In some embodiments, server 2701 may be configured to determine a potential travel envelope extending from the location of vehicle 2702 and surrounding the location of vehicle 2702. For example, as illustrated in FIG. 28A, server 2701 may determine a line 2802 passing the location of vehicle 2702 (or the centroid of vehicle 2702). Server 2701 may also be configured to determine a side of the boundary of the potential travel envelope in the direction of travel of vehicle 2702 and determine another side of the boundary of the potential travel envelope in a direction opposite to the direction of travel. By way of example, server 2701 may determine the upper boundary of the potential travel envelope in the direction of travel of vehicle 2702 and determine the lower boundary of the potential travel envelope in the direction opposite to the direction of travel of vehicle 2702. In some embodiments, the potential travel envelope may extend further along the direction of travel of the vehicle than in a direction opposite to the direction of travel of the vehicle. For example, as illustrated in FIG. 28A, the upper boundary of the potential travel envelope may have a distance 2803 from line 2802 (or a first distance from the location of vehicle 2702), and the lower boundary of the potential travel envelope have a distance 2804 from line 2802 (or a second distance from the location of vehicle 2702). Distance 2803 may be greater than distance 2804 (and/or the first distance may be greater than the second distance). In some embodiments, the location of a centroid of the boundary may be offset from the location of vehicle 2702 along the direction of travel of vehicle 2702.

Alternatively or additionally, in determining the potential travel envelope for vehicle 2702, server 2701 may take a potential travel distance over a period of time (or a time window) into account. For example, server 2701 may determine a potential travel distance over a predetermined amount of time and determine the potential travel envelope including the potential travel distance. In some embodiments, the potential travel distance over the predetermined amount of time may be determined based on the location of vehicle 2702 and/or the speed of vehicle 2702. In some embodiments, server 2701 may determine the potential travel envelope further based on a selected or predetermined time window. The time window may be selected or determined based on the indicator of the speed of the vehicle. The predetermined amount of time (or a time window) may be in the range of 0.1 seconds to 24 hours. In some embodiments, the predetermined amount of time (or a time window) may be restricted into subranges of 0.1 seconds to 1 second, 1 second to 5 seconds, 5 to 10 seconds, 7.5 to 50 seconds 15 to 60 seconds, 1 minute to 5 minutes, 5 to 10 minutes, 10 to 60 minutes, 1 hour to 5 hours, 5 to 10 hours, and 10 to 24 hours. In some embodiments, the predetermined amount of time (or a time window) may be determined based on the transmission frequency of the navigational information from vehicle 2702 to server 2701. For example, server 2701 may determine the predetermined amount of time (or a time window) based on the interval between two transmissions of the navigational information from vehicle 2702. Server 2701 may determine a longer time period for determining the potential travel distance for a longer transmission interval.

In some embodiments, a potential travel envelope may include a boundary. The boundary of the potential travel envelope may have a shape, including, for example, a triangular shape, a quadrilateral shape, a parallelogram shape, a rectangular shape, a square (or substantially square) shape, a trapezoid shape, a diamond shape, a hexagon shape, an octagon shape, a circular (or substantially circular) shape, an oval shape, an egg shape, an irregular shape, or the like, or a combination thereof. FIGS. 28A-28D illustrate exemplary potential travel envelopes for a vehicle in an area 2800, consistent with disclosed embodiments. As illustrated in FIG. 28A, server 2701 may determine a potential travel envelope having a boundary 2811, which may include a trapezoid shape, for vehicle 2702. As another example, as illustrated in FIG. 28B, server 2701 may determine a potential travel envelope having a boundary 2812, which may include an oval shape, for vehicle 2702. As another example, as illustrated in FIG. 28, server 2701 may determine a potential travel envelope having a boundary 2813, which may include a triangle shape, for vehicle 2702. As another example, as illustrated in FIG. 28, server 2701 may determine a potential travel envelope having a boundary 2814, which may include a rectangular shape, for vehicle 2702.

In other embodiments, processing unit 2706 (and/or vehicle device 2703) may determine a potential travel envelope based on the navigational information.

At step 3203, one or more map segments may be sent to vehicle 2702. In some embodiments, the map segment(s) may include map information for a geographical region at least partially overlapping with the potential travel envelope of vehicle 2702. For example, server 2701 may send to processing unit 2706 the one or more map segments including map data of a geographical region at least partially overlapping with the potential travel envelope of vehicle 2702 via network 2705.

In some embodiments, the one or more map segments include one or more tiles representing a region of a predetermined dimension. For example, as illustrated in FIG. 28E, server 2701 may determine one or more tiles 2831 that at least partially overlaps with the potential travel envelope of vehicle 2702 (i.e., the potential travel envelope having boundary 2821) and transmit map data relating to tiles 2831 to vehicle 2702 via network 2705.

In some embodiments, the dimension of a tile sent to processing unit 2706 may vary. For example, as illustrated in FIGS. 29A and 29B, an area (or a map) may be divided into different levels, and a tile at a particular level may have a particular dimension. In some embodiments, the predetermined dimension of the tile(s) sent to processing unit 2706 may be in a range of 0.25 to 100 square kilometers, which may be restricted in a subrange of 0.25 square kilometers to 1 square kilometer, 1 square kilometers to 10 square kilometers, and 10 to 25 square kilometers, 25 to square kilometers, and 50 to 100 square kilometers. In some embodiments, the predetermined dimension of the tile(s) may be less than or equal to ten square kilometers. Alternatively, the predetermined dimension of the tile(s) may be less than or equal to one square kilometer. Alternatively, the predetermined dimension of the tile(s) may be less than or equal to ten square kilometers. In some embodiments, a tile may have a rectangle shape, a square shape, a hexagon shape, or the like, or a combination thereof.

In some embodiments, the map information sent to processing unit 2706 may include a polynomial representation of a target trajectory along the one or more road segments, as described elsewhere in this disclosure. For example, the map information may include a polynomial representation of a portion of a road segment consistent with the disclosed embodiments illustrated in FIG. 9A, FIG. 9B, and FIG. 11A. For example, the map information may include a polynomial representation of a target trajectory that is determined based on two or more reconstructed trajectories of prior traversals of vehicles along the one or more road segments.

In some embodiments, after receiving the one or more road segments, processing unit 2706 and/or vehicle device 2703 may navigate vehicle 2702 according to the one or more road segments, as described elsewhere in this disclosure. For example, vehicle 2702 may be configured to perform one or more navigational actions (e.g., making a turn, stopping at a location, etc.) based on the received one or more road segments. Alternatively or additionally, vehicle 2702 may be configured to perform one or more navigational actions based on the polynomial representation of a target trajectory along the one or more road segments.

In some embodiments, processing unit 2706 may receive the one or more road segments and store the one or more road segments into a storage device. Processing unit 2706 may also load one or more tiles included in the one or more road segments into a memory for processing. For example, as illustrated in FIG. 30, processing unit 2706 (and/or server 2701) may be configured to determine that the location of vehicle 2702 is in tile 5 at time point 1. Processing unit 2706 may also be configured to retrieve (or load) adjacent tiles 1-4 and 6-9. At time point 2, processing unit 2706 (and/or server 2701) may be configured to determine that the location of vehicle 2702 moves to tile 3 from tile 5. Processing unit 2706 may be configured to retrieve (or load) new tiles 10-14, which are adjacent to tile 3. Vehicle 2702 may also be configured to keep tiles 2, 3, 5, and 6, and delete tiles 1, 4, and 7-9.

Alternatively or additionally, processing unit 2706 may determine a subpart of a tile that its location falls within a tile and load the tiles adjacent to the subpart. By way of example, as illustrated in FIG. 31A, processing unit 2706 may determine that the location of vehicle 2702 is in a sub-tile (a sub-tile having a pattern of dots in tile 5) and load map data of the tiles that are adjacent to the sub-tile (i.e., tiles 4, 7, and 9) into the memory for processing. As another example, as illustrated in FIG. 31B, processing unit 2706 may determine that the location of vehicle 2702 is in the left-top sub-tile of tile 5. Processing unit 2706 may also load the tiles adjacent to the left-top sub-tile of tile 5 (i.e., tiles 1, 2, and 4). In some embodiments, processing unit 2706 may be configured to decode the tiles before loading the data into the memory.

In some embodiments, rather than receiving the one or more road segments from server 2701 through network 2705, processing unit 2706 may retrieve the one or more road segments from a local storage. For example, processing unit 2706 may determine the potential travel envelope based on the analysis of the navigational information and determine one or more road segments including map information for a geographical region at least partially overlapping with the potential travel envelope of vehicle 2702. Processing unit 2706 may also retrieve the data of the one or more road segments from a local storage. In some embodiments, processing unit 2706 may load the data of the one or more road segments into its memory for processing.

Electronic Horizon: Lane Information

Consistent with the present disclosure, the disclosed system provides vehicles with relevant information tailored to each particular vehicle. For example, server 2701 may determine one or more tiles 2831 that at least partially overlaps with the potential travel envelope of vehicle 2702, but instead of (or in addition to) transmitting map data relating to tiles 2831 to processing unit 2706, server 2701 may transmit relevant lane information. Alternatively, as discussed above, server 2701 may retrieve data relating to one or more tiles in a region and transmit the map data to processing unit 2706 via, for example, network 2705. Thereafter, processing unit 2706 may determine from the received map data relevant lane information tailored to each particular vehicle, and covey the relevant lane information to vehicle device 2703. The relevant lane information may include details regarding objects that vehicle 2702 may encounter along its driving path (e.g., spline, road geometries, road structures and features, etc.). In one embodiment, the relevant information may be determined based on the location and/or the direction of travel of a particular vehicle. For example, processing unit 2706 (or server 2701) may determine which lane vehicle 2702 is currently in from among the available lanes (i.e., the ego lane) and pass along to vehicle device 2703 information associated with that lane. Processing unit 2706 (or server 2701) may also determine and convey to vehicle device 2703 the position along a spline representative of a target travel path in the lane. The relevant information may be delivered in a customized manner. For example, different vehicle manufactures may request that different data be delivered to their vehicles. Additionally, the relevant information delivered to vehicle device 2703 may be divided into subsegments for easier deletion and management. In another embodiment, processing unit 2706 (or server 2701) may use a dynamic data field (e.g., a dynamic header) when transmitting data to vehicle device 2703. The dynamic data field may include relevant map information and/or relevant lane information to vehicle 2702. Specifically, the relevant information provided to vehicle device 2703 may be varied dynamically during a driving session based on encountered scenarios. To address the changes in the relevant information, processing unit 2706 (or server 2701) may use a dynamic data field in the data packets sent to vehicle device 2703. The dynamic data field may allow processing unit 2706 (or server 2701) to vary the information included in the transmitted data packets in a manner that enables vehicle device 2703 to know what is being sent, where it is located in the packet, how long, etc.

Returning now to FIG. 32, at step 3204, lane information may be provided to vehicle device 2703. In some embodiments, the lane information may be specific to one or more roads included within the potential travel envelope of vehicle 2702. For example, processing unit 2706 (or server 2701) may provide lane information for roads included within the potential travel envelope of vehicle 2702. Consistent with some embodiments, rather than having vehicle device 2703 calculating and determining the lane information based on data stored in a local memory, vehicle device 2703 may receive the relevant lane information from processing unit 2706 (or server 2701). For example, server 2701 may determine the potential travel envelope based on the analysis of the navigational information and processing unit 2706 may determine lane information that may include lane assignment and/or description of the lanes in any part of the roads included within a geographical region at least partially overlapping with the potential travel envelope of vehicle 2702. Receiving the relevant lane information from processing unit 2706 (or server 2701) may save vehicle device 2703 from receiving and storing a large amount of data for one or more map segments and from processing the data to determine the relevant lane information. Moreover, the lane information determined by processing unit 2706 may be more accurate than any lane information determined locally by vehicle device 2703.

In a first aspect of the disclosure, the lane information may include lane assignment information relevant to vehicle 2702. Consistent with the present disclosure, the lane assignment information may include a description of the lanes in a determined distance ahead of vehicle 2702. The determined distance may be in the range of 1 meter and 5 kilometers. In some embodiments, the distance may be restricted into any subranges, for example, 1 to 50 meters, 5 to 500 meters, 10 to 200 meters, 10 to 750 meters, 5 meters to 1 kilometer, 50 meters to 2 kilometers, 100 meters to 2.5 kilometers, and more. The distance may also be derived from a time parameter and a speed parameter as described above with reference to section relating to "Map Management Using an Electronic Horizon." Specifically, the lane information may include a list of lanes in the part of road that vehicle 2702 currently rides and an indication as to which lane is the ego one. Each lane may include a list of right neighbor lanes, a list of left neighbor lanes, and a list of successors. Each lane may also include a Boolean indication as to whether it is a lane in the direction of a driving direction of vehicle 2702 or an oncoming lane. For example, the lane assignment information may include details regarding an ego lane associated with vehicle 2702 and one or two neighboring lanes to the right and/or to the left of the ego lane. In one embodiment, the output of the system may be configurable such that the number of lanes for which assignment information is provided may vary. In some embodiments, a more detailed designation (two bits, a byte, etc.) of lanes may be used to accommodate designation of lanes in multiple possible directions (e.g., lanes diverging from an intersection, multiple possible U-turns, etc.).

In a second aspect of the disclosure, the lane information may include a description of the lanes in any part of the roads included within the potential travel envelope of vehicle 2702. Consistent with the present disclosure, the description of the lanes may include at least one of: a location of vehicle 2702 in the ego lane, a driving path profile (e.g., a suggested driving path profile (vertical, longitudinal, or both) in the ego lane), stop points (e.g., points on the ego lane where there is a stop line or a virtual stop line that is marked on the map but not physically apparent. In some cases, virtual stop lines may be created based on crowd sourcing information regarding the typical stopping position of vehicles at a particular location), lane marks points (e.g., points on the ego lane where the lane marks changes, for example, from dashed line to solid line), lane topology (e.g., the relations between lanes), and more. In one embodiment, the description of the lanes may include a description of the lanes ahead of vehicle 2702. For example, the description of the lanes may include a list of lanes and the topology relations (i.e., the connectivity) between them. Specifically, each lane may have successors, predecessors and neighbors. In case of lane split, a lane has more than one successor, and in case of lanes merge a lane has more than one predecessor. Provisioning of the lane information may enable vehicle device 2703 to navigate vehicle 2702 autonomously, or to supervise decisions made by a human driver, and potentially intervene in case of bad judgement and/or dangerous decisions by the driver (e.g., decisions that may violate a safety policy or a driving policy such as RSS developed by Mobileye Vision Technology Ltd of Jerusalem, Israel). For example, the vehicle's navigation system associated with vehicle device 2703 may use the description of the lanes (and the lane assignment information) to control the driving path of the vehicle 2702, in initiating a lane change maneuver, in staying within lane boundaries, and more. In another embodiment, the description of the lanes may also assist vehicle device 2703 in navigating relative to detected target vehicles. For example, vehicle device 2703 may be able to determine or predict a path one or more target vehicle will travel based on mapped and sampled drivable paths for adjacent or intersecting lanes. The lane information may also be useful when vehicle device 2703 is collecting information relating to a road segmenting (e.g., automatically determining and reporting on an average speed traveled within a certain lane by vehicle 2702, target vehicles, etc.).

In some embodiments, the lane information may include lane assignment information and a description of the lanes in roads that vehicle 2702 may access during a determined time window. For example, the time widow may be selected or determined based on the indicator of the speed of the vehicle. The determined time window may be in the range of 0.1 seconds to 24 hours. In some embodiments, the time window may be restricted into subranges of 0.1 seconds to 1 second, 1 second to 5 seconds, 5 to 10 seconds, 7.5 to 50 seconds, 15 to 60 seconds, 1 minute to 5 minutes, 5 to 10 minutes, 10 to 60 minutes, 1 hour to 5 hours, 5 to 10 hours, and 10 to 24 hours. As mentioned above, the time window may be determined based on the transmission frequency of the navigational information from vehicle 2702 and server 2701.

The communication between server 2701 and vehicle device 2703 and/or the communication between processing unit 2706 and vehicle device 2703 may be governed by a dedicated communication protocol. In some cases, the communication protocol may be a single-direction protocol such that data may be sent from processing unit 2706 (or server 2701) to vehicle device 2703. A message in the single-direction communication protocol may include at least two parts: a dynamic data field (e.g., a dynamic header) for describing the objects included in the message and payload data may include different types of objects associated with the lane information. The payload data may be arranged in the same order as it appears in the dynamic header (e.g., the type of objects and their length fields). The single-direction protocol may present an efficient tradeoff. By using pre-configured parameters (e.g., how many seconds or what distance worth of data needs to be included in the potential travel envelope) communication may be streamlined and/or simplified. Potentially, the use of the single direction protocol may also provide security advantages since processing unit 2706 (or server 2701) is not exposed to corrupt information. In other cases, the communication protocol may be a two-direction protocol such that data may be sent from processing unit 2706 (or server 2701) to vehicle device 2703 and data may also be sent from vehicle device 2703 to processing unit 2706 (or server 2701). A response message in the two-direction communication protocol from vehicle device 2703 to processing unit 2706 (or server 2701) may include details on the accuracy of the information sent by the processing unit 2706 (or server 2701). For example, the response message may be used to confirm the location and/or identify of certain objects in the environment of vehicle 2702.

Figure 33:
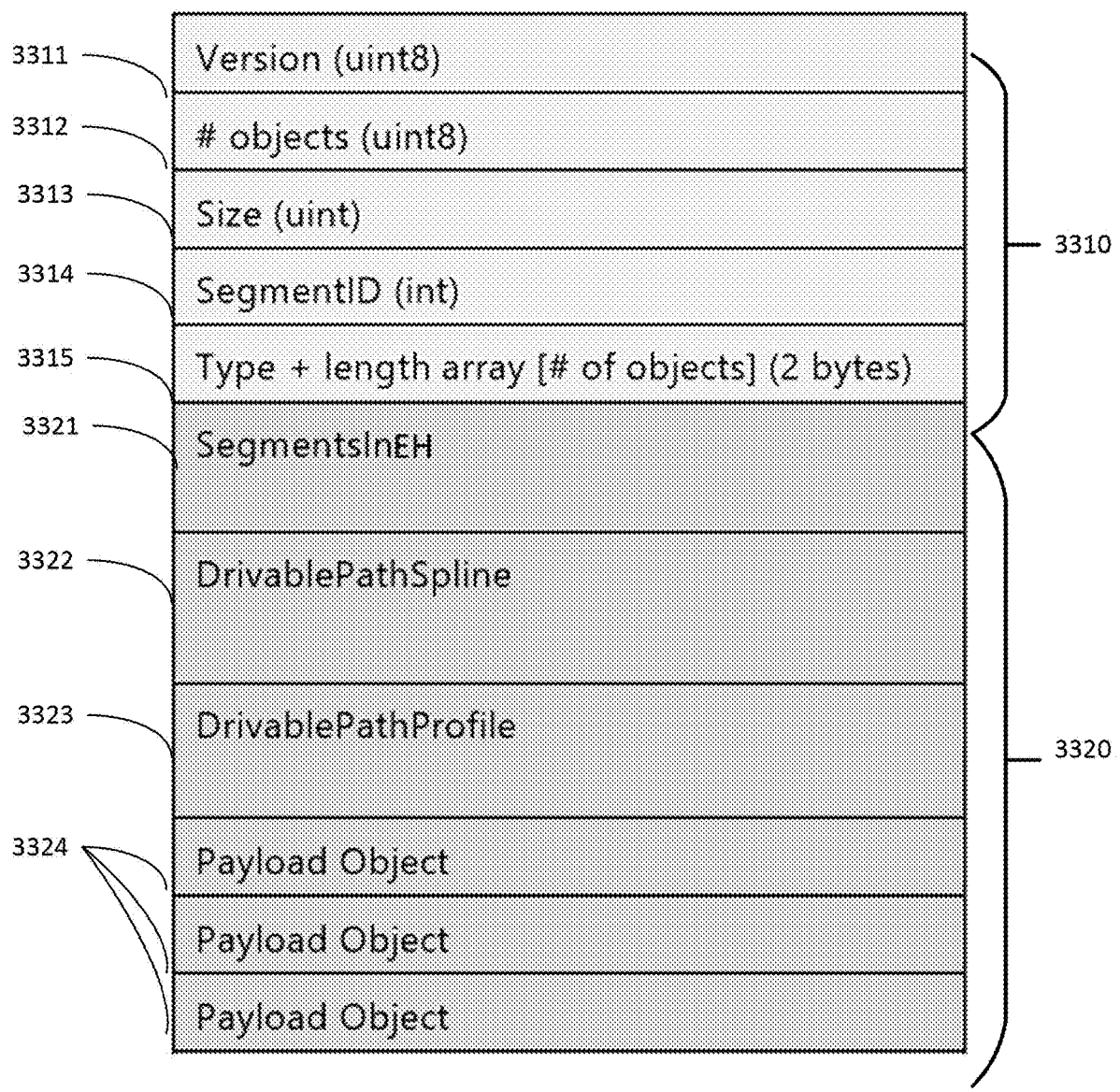
FIG. 33 is a schematic diagram that depicts the structure of a message sent by the exemplary to a vehicle, consistent with disclosed embodiments.

FIG. 33 is a schematic diagram that depicts a structure of messages that may be sent to vehicle device 2703 from processing unit 2706 (or server 2701). Consistent with the present disclosure, message 3300 includes a dynamic header that describes structure of the message, the size of each object in the message and content of each object within the message payload. Header 3310 may be used as a dictionary for parsing the message payload and reconstructing the lane information. In one embodiment, header 3310 may also provide information on how to decode the data provided in payload 3320. Header 3310 may include a version field 3311 (i.e., the number of version used); a number of objects field 3312 (i.e., the number of objects contained in the message); a size field 3313 (i.e., the size of payload objects in the current message), a segment ID field 3314 (i.e., the IDs of map segments included in this message); and a type and length array of the objects field 3315 (i.e., a list of object descriptors that specify for each of the objects in the message its type and size. The length of this list may be the number of objects in the payload. The dynamic nature of header 3310 may enable processing unit 2706 (or server 2701) to transmit messages containing information likely to be used by vehicle device 2703 and avoid sending irrelevant information to vehicle device 2703. Thus, for example, the dynamic nature of header 3310 may reduce the size of messages exchanged through network 2705.

In some embodiments, payload 3302 may include a SegmentsInEH object 3321, a DrivablePathSpline object 3322, a DrivablePathProfile object 3323, and one or more payload objects 3324. SegmentsInEH object 3321 may be sent by processing unit 2706 (or server 2701) every time there is a change in the list of included map segments within the potential travel envelope of vehicle 2702 (new map segment added, or old map segment removed). In one example, SegmentsInEH object 3321 may be a vector of segmentIDs (e.g., 32-bit unsigned integer each) listing the map segment IDs that are covered in the potential travel envelope of vehicle 2702. Vehicle device 2703 may delete from its local memory data associated with SegmentsInEH that is not included in the list. DrivablePathSpline object 3322 may include data of a spline associated with the drivable path. In one example, DrivablePathSpline object 3322 may include the spline ID and lane information that describes relationship between the drivable path spline and the lanes in any part of the roads included within the potential travel envelope of vehicle 2702. DrivablePathProfile object 3323 may include an array of values along the drivable path spline. For example, the data within the drivable path profile may include the average speed on different points (e.g., longitudinal position) on the driving path.

In some embodiments, the lane information transmitted to vehicle device 2703 from processing unit 2706 (or server 2701) may be included in payload objects 3324. Examples for payload objects 3324 may include at least one of: a lane topology object that describes the relations between lanes in the driving path; a lane mask object that represents the lanes to which a spline relates; driving path borders objects that describe congruent of a lane mark spline or road edge spline to the driving path; merge/split points that includes informing of a split or merge point in the map coordinate system; a road edge changed points object that contains an array of velocity points on the spline at which road edge type change occurs; a sign landmark object that describes traffic signs and traffic lights; a pole landmark object that includes details on poles located adjacent the ego lane; and more. In other words, payload objects 3324 transmitted to vehicle device 2703 may describe the road geometrics, the semantics (e.g., the lanes topology in any part of the roads included within the potential travel envelope of vehicle 2702), and an indication where the host vehicle is located relative to the lanes' topology. For example, when driving in a highway, vehicle device 2703 may receive through message 3300 an indication that the right lane will become a lane for exiting the highway in 350 meters. FIG. 34 depicts an example of an actual message sent to a host vehicle.

In additional embodiments, after receiving the one or more map segments and the lane information, vehicle device 2703 may navigate vehicle 2702 as described elsewhere in this disclosure. For example, vehicle device 2703 may be configured to perform one or more navigational actions (e.g., making a turn, stopping at a location, accelerating, braking, etc.) based on the received one or more map segments and the lane information. Alternatively or additionally, vehicle device 2703 may be configured to perform one or more navigational actions based on the polynomial representation of a target trajectory. In yet other embodiments, after receiving the one or more map segments and the lane information, vehicle device 2703 may use computer vision and AI to create an environmental model at any given point or location. In yet other embodiments, after receiving the one or more map segments and the lane information, vehicle device 2703 may create a map (e.g., such as a sparse map) discussed in further detail earlier in this disclosure. In yet other embodiments, after receiving the environmental model, the one or more map segments and the lane information, vehicle device 2703 may apply driving policies to supervise a human driver and intervene (e.g., cause the vehicle to perform one or more navigational actions, such as turning, stopping at a location, accelerating, braking, etc.) if one or more actions by the human driver would lead to a violation of at least one driving policy rule and/or a safety constraint associated with a driving policy.

Additional Electronic Horizon Features

As described elsewhere in this disclosure, the disclosed systems and methods may use an electronic horizon to efficiently load or use map data in a pre-defined area (e.g., in a region having a predetermined radius). The disclosed systems and methods may optimize bandwidth consumption and provide map users with the most relevant data while considering vehicle position, ego speed and trajectory. This disclosure describes the Electronic Horizon ("EH") logic and building blocks as they are extrapolated from the map and transferred via the relevant protocols, which may be used by the disclosed systems and methods to achieve one or more functions disclosed herein.

In some embodiments, a system may include one or more EH processors (which may also be referred herein as an EH constructor) programmed to determine map data for an area ahead of (or surrounding) a host vehicle and output the determined map data to one or more navigation system processors. For example, one or more EH processors may determine map data for a predetermined radius (which may also be referred herein as an EH radius) ahead of the vehicle. The EH radius may cover a period of time (e.g., a fraction of a second or a few seconds) ahead of the host vehicle over which the host vehicle may travel at the current speed. Alternatively or additionally, the EH radius may have a minimum distance (e.g., 100 meters). The period of time and/or the minimum distance of the EH radius may be configured. By way of example, if the period of time is set as 15 seconds and the host vehicle is travelling at 60 km per hour, the one or more EH processors may obtain map data of all road segments (or a portion thereof) that the host vehicle may reach within an EH radius of 250 meters.

Figure 35:
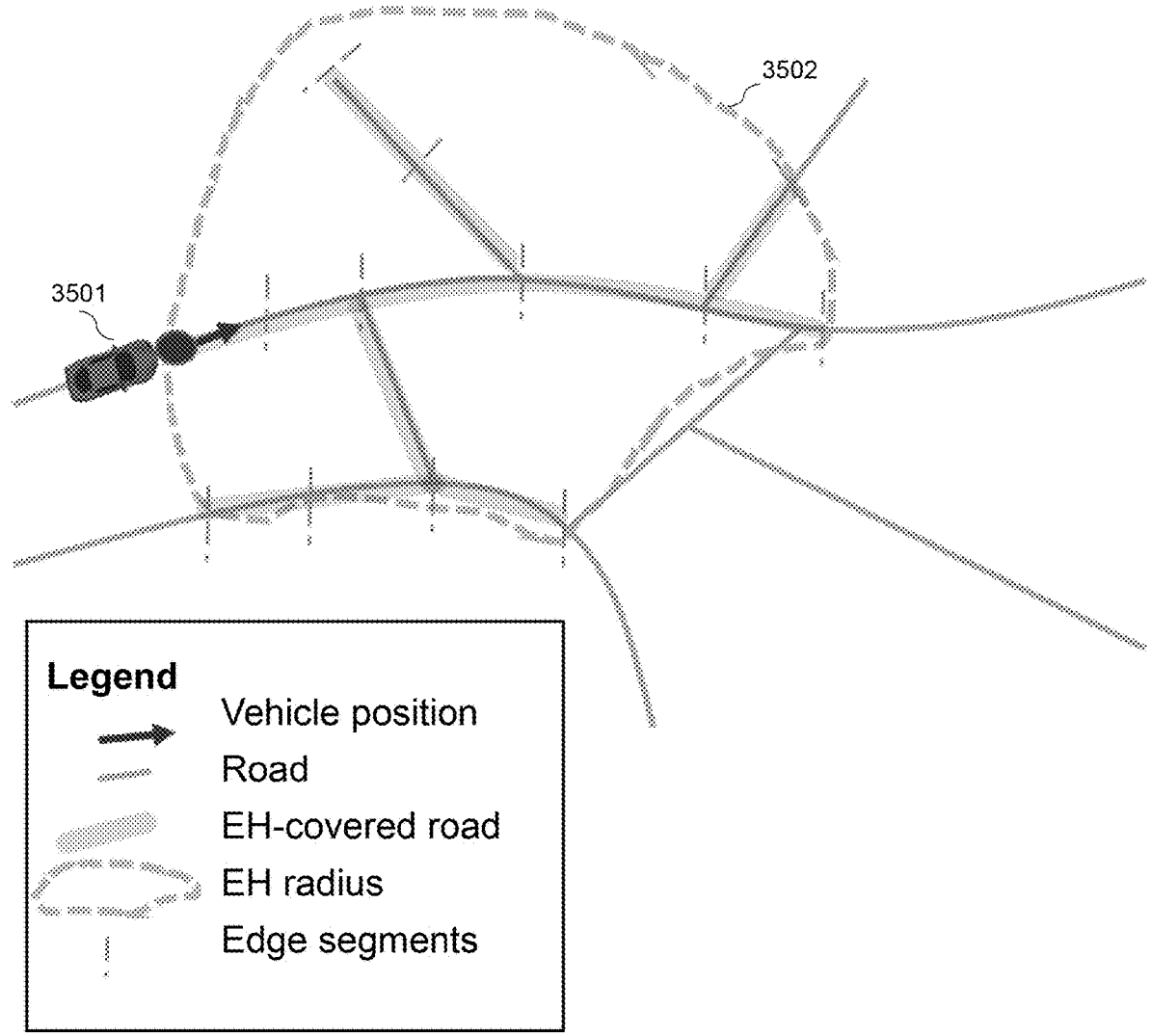
FIG. 35 is a schematic diagram of exemplary electronic horizon map data, consistent with disclosed embodiments.

FIG. 35 is a schematic illustration of exemplary electronic horizon map data, consistent with disclosed embodiments. As illustrated in FIG. 35, vehicle 3501 may travel along a road segment. One or more EH processors may determine an area 3502 covered by an EH radius and obtain map data of all the road segments within area 3502. The one or more electronic horizon processors may output the map data to one or more navigation system processors.

The one or more navigation system processors may control the navigation system of the host vehicle according to the map data received from the one or more EH processors. For example, the one or more navigation system processors may be programmed to determine the location of the host vehicle relative to the map associated with the map data based on output provided by one or more onboard sensors. The one or more navigation system processors may also be programmed to cause the host vehicle (e.g., via the navigation system thereof) to execute at least one navigational maneuver according to the location of the host vehicle relative to the map. In some embodiments, the output map data may be represented in the map coordinates system (e.g., being represented with latitude/longitude points).

This disclosure provides exemplary features, functionalities, and protocols for managing electronic horizon data as described below. These exemplary features, functionalities, and protocols may be used in the disclosed systems and methods, but should not be construed as limiting examples.

Acronyms and Terminology

For purposes of brevity, the following terms and abbreviations listed in Table 1 are used in this disclosure.

TABLE 1

Acronyms and Terminology

| Term | Description |
|------|-------------|
| ACC | Adaptive/Active Cruise Control - enhancement of traditional cruise control that uses on board sensing to detect vehicles ahead to maintain a set distance between the host vehicle and preceding vehicle |
| CORA | Center of real axle |
| CP | Control Point |
| DBC | Design by Contract - file describing structure of messaging in controller area network (CAN) Protocol (possibly Universal Asynchronous Receiver Transmitter (UART) too) |
| DP | Drivable Path |
| HD | High Dynamic |
| EH | Electronic Horizon |
| LM | Lane mark |
| ME | Mobileye |

TABLE 1-continued

Acronyms and Terminology

| Term | Description |
|---|---|
| NED | North, East, Down |
| OEM | Original Equipment Manufacturer |
| PP | Predicted Path |
| RB | Roadbook |
| RE | Road edge |
| REM | Road Experience Management |
| RP | Road Profile |
| RT | Rotation - translation |
| SPI | Serial Peripheral Interface - serial communication channel used in one or more RH processors, mainly to communicate between one or more RH processors and one or more navigation system processors |

Data Type Definitions

The following data types listed in Table 2 may be used by the disclosed systems and methods.

TABLE 2

Exemplary Data Types

| Data Type | Definition |
|---|---|
| uint8 | 8-bit unsigned integer |
| uint16 | 16-bit unsigned integer |
| Int | 32-bit integer |
| Float | 32-bit float |

Electronic Horizon Functionalities

The EH protocol may serve as the interface through which the map data is sent to the outer functions and/or re-constructor (e.g., one or more navigation system processors). In some embodiments, an EH signal may have a maximal output frequency. In other words, map data may be output at a maximal frequency. For example, map data may be output at a maximal frequency of 36 Hz (i.e., 36 times per second). In some embodiments, each map element (e.g., a map tile as described elsewhere in this disclosure) may be sent only once. The re-constructor (e.g., one or more navigation system processors) may be responsible for buffering and managing EH map data. The EH protocol may enable an EH processor to signal the re-constructor when map data is no longer covered by the EH radius, and the map data may be deleted from the buffer that stores the EH map data output by the one or more electronic horizon processors.

Map Data Segmentation

In some embodiments, a map (e.g., a sparse map) may be constructed of edges. An edge may be a road between two junctions, roundabouts, roads-merges, or roads-splits. Every RB element (drivable path, lane mark, road edge, traffic signs, poles, etc.) may be contained within an edge. An Edge Segment may be a logical unit containing map data sent by the constructor. The EH constructor may divide every edge into several segments. The EH constructor may signal the re-constructor to delete data at a granularity of edge segments. Dividing edges into sub-segments may reduce memory consumption at both sides (the constructor and re-constructor) since edges can be quite long.

In some embodiments, an edge segment may be identified by three parameters:

EdgeID: ID of the original edge that the segment belongs to.

tStart: start point in meters of this segment in the original edge.

tEnd: end in meters of this segment in the original edge.

The constructor may allocate an identifier (ID) to each edge segment, which is referred herein in as segmentId. The constructor may send a list of segmentIDs to the re-constructor to indicate which edge segments are included in the EH radius. Every time the list of edge segments included in the EH radius changes, the constructor may send an updated list of segmentIDs in a separate "control" slot.

In some embodiments, the constructor may signals the re-constructor that an edge segment can be deleted by sending an updated segmentIDs list without this segment ID. The re-constructor can delete any segmentID that is not included in the list and was already received. The re-constructor may be responsible to delete any passed edge segment data that needs to be deleted on its side. In some embodiments, segments which are already presented by the re-constructer may not deleted because of a speed change during a drive.

In some embodiments, edges may be divided into segments having a predetermined number of (or X) meter(s), or at a point where the number of lanes is being changed, whichever yields the minimum segment size required. If a segment is smaller than X/4, a new segment may not be created, and this data may be included in the previous segment.

In some embodiments, each edge segment may contain all the RB elements included in the physical part of the edge it represents.

In some embodiments, splines (e.g., drivable paths, lane marks, road edges, etc.) may also be split in the edge segmentation process. A spline may be constructed of control points (CPs) and knots arrays. The CPs and the knots may describe a b-spline mathematic model of the spline. The segmentation process may cut a spline. The cut segment may include four CPs and four knots from the previous segment at the beginning of the spline arrays, and four knots (and no CPs) from the next segments at the end of the knots array. This may enable the re-constructor to evaluate the data of an edge segment independently.

Map (Roadbook) Elements

Each transferred segment may include map objects packed in a pre-defined format. For example, a segment may include at least one of: a spline (laneMarks, RoadEdges and DrivablePaths), a pole, a traffic sign, the number of lanes in segment, a relation between splines and lanes (which spline belongs to which lane), a drivable path profile, an average speed/legal speed in points on the DP spline, a lane mark change points (type change), a lane mark color (paired information about the changed lane mark), a road edge type change points, a lane topology, a lane border, or the like, or a combination thereof.

Protocol Description

As described elsewhere in this disclosure, a communication protocol message (e.g., an EH message) may include two parts: a header and a payload. Two types of messages, payload messages and control messages, may be used. Table 5 below illustrates an exemplary EH message.

TABLE 3

Exemplary EH Message

| Parameter | Description |
| --- | --- |
| Version (uint8) | EH header - describes which |
| # objects (uint8) | objects may be included in |
| Size (uint) | the EH message payload |
| SegmentID (int) | and the size of each of them. |
| Type + length array + size in bytes [# of objects] (4 bytes) | |
| Payload (EH object) | EH payload - may include RB objects, |
| Payload (EH object) | segment description object. |
| Payload (EH object) | |

In some embodiments, the payload data may be arranged in the same order as it appears in the header (e.g., type+ length fields). The protocol between the constructor and re-constructor may include two types of messages: EH payload control and EH payload data. The payload control message may include two types of objects transmitted separately: Segments in EH and Reference change point. Payload data messages may be slots that store all other types of events, as described in the following descriptions of the different EH message parts and examples. Segments may include the "new segment" description (see Table 7 below) unless they contain data from previously reported new segments. In some embodiments, only the first EH packet of a segment may be included in the "Segment Description" object.

The EH header may describe the content within the EH message payload. It may be used as a dictionary for parsing the message payload and re-constructing the EH data. As described elsewhere in this disclosure, an EH message may include data of one edge segment or a portion thereof. Inclusion of a partial edge segment in an EH message may happen due to constraints/limitations of the transport layer used to carry the EH data (e.g., CAN, Serial Peripheral Interface (SPI), ETHERNET, etc.). Table 6 illustrates an exemplary EH header.

TABLE 4

Exemplary EH Header

| Version | Description |
| --- | --- |
| # objects (uint8) | Number of EH objects that the EH message may contain |
| Size (uint) | Size of payload in current slot. |
| SegmentID (int) | ID of edge segment included in this EH message. |
| Type + length array + size in bytes [# of objects] (4 bytes) . . . | List of object descriptors (e.g., 4 bytes each). The object descriptors may specify type, length, and total bytes for each of the objects in the message. The length of this list may be the value of the #objects field. For fixed size objects, the length array may represent the number of objects in the slot. |

In some embodiments, EH objects may be the elements comprised in the EH message payload. These objects help the constructor and re-constructor side describe the edge segments contained in the EH at any point. An object may be RB elements.

The constructor may send SegmentInEH object every time the list of included edge segments in the EH radius changes with a new segment added, or an old segment removed. The SegmentInEH object may include a vector of segmentID (uint32 each) listing the edge segment IDs that may be covered in the EH radius. It may be sent in a separate slot (which the reconstructor may use for data update and not for data storage). The re-constructor may delete any received segmentID that may be not included in the list.

A segment descriptor may describe an edge segment. This description may be sent by the constructor in every first EH message of an edge segment. Table 7 illustrates exemplary new segment descriptors.

TABLE 7

New Segment Descriptor

| Data Type | Description |
| --- | --- |
| EdgeID (unit32) | ID of original edge |
| SegmentID (unit32) | ID allocated by the constructor for this segment |
| Tstart (float) | Segment start point in the edge (in meters) |
| Tend (float) | Segment end point in the edge (in meters) |
| #ofLanes (uint8) | Number of lanes in this segment |
| Reserved (uint8) | For alignment |
| Reserved (uint8) | For alignment |
| Reserved (uint8) | For alignment |

A spline container may contain data of a single spline (e.g., a road edge, a lane mark, a drivable path, etc.). Table 8 illustrates an exemplary spline object.

TABLE 5

Spline object

| Data Type | | Description |
|---|---|---|
| SplineID (int) | | Original RB ID of this spline |
| U to meter (float) | | 1 m length in u |
| [controlPoints] | X (float) | Control points array |
| | Y (float) | |
| | Z (float) | |
| knots [length = num rolPoints + 4] | v (float) | Knots array |

The Drivable Path (DP) profile object may be an array of values along the DP spline. The data within a profile may be the average speed on that point (longitudinal position) on the DP. Each "v" point in the array may describe a longitudinal point on the spline. Table 9 illustrates an exemplary Drivable Path Profile object.

TABLE 6

Drivable Path Profile (DrivablePathProfile)

| Data Type | Description |
|---|---|
| SplineID (int) | Original RB ID of the related DP spline |
| [v_spline_coordinate] (float array) | Array of points on spline in "v" units |
| [Ave80Speed] (float array) | The 80 percentile of the avg speed at that point |

The Lane Mark Changed Points object may contain an array of "v" points on the spline where a change in lane marking may be presented. For each value in the v_spline_coordinate array, a tuple of (type, color) may be presented in the change-events array. Table 10 illustrates an exemplary Lane Mark Changed Points object.

TABLE 7

Lane Mark Change Points Object (LaneMarkChangePoint)

| Data Type | Description |
|---|---|
| SplineID (int) | Original RB ID of the related lane mark spline |
| [v_spline_coordinate] (float array) | Array of positions on spline in "v" units (same units as spline knots) |
| [change_events] (array of enums * 2) | Array of lane mark events, for example, changed from dash to solid |

Exemplary event types are listed in Table 11 below.

TABLE 8

Event Types

| Event type | Enumerators |
|---|---|
| Lane mark type | LANE_MARK_UNKNOWN = 0 |
| | LANE_MARK_DASH |
| | LANE_MARK_SOLID |
| | LANE_MARK_DOUBLE_SOLID |
| | LANE_MARK_DOUBLE_DASH |
| | LANE_MARK_DASH_SOLID |
| | LANE_MARK_SOLID_DASH |
| | LANE_MARK_DECELERATION |
| | LANE_MARK_NON_SEMANTIC |
| | LANE_MARK_VIRTUAL |
| | LANE_MARK_GENERIC_DOUBLE |

TABLE 8-continued

Event Types

| Event type | Enumerators |
|---|---|
| Color | UNKNOWN = 0 |
| | WHITE |
| | YELLOW |
| | BLUE |

The Road Edge Change Points object may contain an array of "v" points on the spline at which RE type change occurs. An exemplary Road Edge Changed Points object is illustrated in Table 12 below.

TABLE 9

Road Edge Change Points Objects (RoadEdgeChangePoint)

| Data Type | Description |
|---|---|
| SplineID (int) | Original RB ID of the related lane mark spline |
| [v_spline_coordinate] (float array) | Array of positions on spline in "v" units (same units as spline knots) |
| [change_events] (array of enums) | Array of road edge events, for example, changed from guardrail to concrete etc. |

Exemplary supported types are illustrated in Table 13 below.

TABLE 10

Road Edge Change Points Objects - Supported Types

| Event type | Enumerators |
|---|---|
| Road Edge type | ROAD_EDGE_UNKNOWN = 0 |
| | ROAD_EDGE_GUARDRAIL, |
| | ROAD_EDGE_CONCRETE, |
| | ROAD_EDGE_CURB, |
| | ROAD_EDGE_NO_STRUCTURE, |
| | ROAD_EDGE_PARKING_CAR, |
| | ROAD_EDGE_PARKING_ENTRANCE |

The Sign Landmark object may describe traffic signs and traffic lights. An EH message may contain an array of such objects. The system type and traffic sign may refer to the type of sign as mapped in the Traffic Sign Recognition (TSR) sensing technology ENUMs list. Table 14 illustrates an exemplary Sign Landmark object.

TABLE 11

Sign Landmark Object [SignLandmark]

| Data Type | | Description |
|---|---|---|
| ObjectID (int) | | Original RB ID of sign |
| systemType (uint8) | | Type of traffic sign |
| Reserved (uint8) | | |
| trafficSignType (uint16) | | Sub-type of traffic sign |
| Location | X (float) | Location point in map NED coordinates |
| | Y (float) | |
| | Z (float) | |
| Size | W (float) | Width in meters |
| | H (float) | Width in meters |

The pole landmark object may represents one or more poles. An EH message may contain an array of such objects. Table 15 illustrates an exemplary pole landmark object.

TABLE 12

Pole Landmark Object [PolesLandmark]

| Data Type | | Description |
|---|---|---|
| ObjectID (int) | | Original RB ID of pole |
| systemType (uint8) | | |
| Reserved (uint8) | | Padding Byte (alignment |
| trafficSignType (uint16) | | |
| location1 | X (float) | Location of pole bottom |
| | Y (float) | |
| | Z (float) | |
| location2 | X (float) | Location of pole upper edge |
| | Y (float) | |
| | Z (float) | |

Lane topology may describe the relations between lanes (DPs). Each lane may have successors, predecessors, and neighbors. Lanes and DP may be equivalent in the roadbook. In some embodiments, each lane may have one DP and each DP may belong to one lane. In some embodiments, if a lane split occurs, a lane may have more than one successor, and when lanes merge, a lane may have more than one predecessor. In some embodiments, the array size for successor/predecessor IDs may be currently 3.

Table 16 illustrates a DpSuccessor object. Table 17 illustrates a DpPredecessor object.

TABLE 13

DpSuccessor Object

| Data Type | Description |
|---|---|
| DpId (int) | This DP ID |
| Successor_Id [int] | Other DP ID |

TABLE 14

DpPredecessor Object

| Data Type | Description |
|---|---|
| DpId (int) | This DP ID |
| Predecessor_Id [int] | Other DP ID |

Lane neighbors may be the lanes to the right and left of a lane. A lane neighbor may be defined from u=x to u=y ("u" of this DP). A lane may have more than one neighbor at one of its sides (in different "u" intervals). Table 18 illustrates an exemplary DpNeighbors object.

TABLE 15

DpNeighbors Object

| Data Type | Description |
|---|---|
| DpId (int) | This DP ID |
| otherDPid (int) | The DP neighbor ID |
| From (float32) | U value on DP |
| To (float32) | U value on DP |
| Direction (int8) | DP position referenced to ego (left/right) |
| Oncoming (bool) | Equals 1 if the DP in the opposite driving direction. |

Direction may use a set of three enum values to position a DP in reference to the ego DP: "From" and "to" values describe the congruent part of the spline where the lane neighbors object may be relevant; Invalid=−1, right=0, left=1; The "U" value may be used as a descriptor for the longitudinal position on the spline when U=0 may be located at the beginning of the DP spline.

The DpBorders object may describe the congruence of a lane mark spline, or road edge spline, to the DP. This object may define the interval of the DP and the border spline (road edge or lane mark) where the two splines may be tangent. Table 19 illustrates an exemplary DpBorders object.

TABLE 16

LaneBorder Object [DpBorders]

| Data Type | Description |
|---|---|
| dPId (int) | This DP ID |
| borderId | Border Spline ID |
| dpStartU (float) | U on DP when border relation starts |
| dpEndU (float) | U on DP when border relation ends |
| BorderSratU (float) | U on border spline when border relation starts |
| BorderEndU (float) | U on border spline when border relation ends |
| Direction (int8) | Right = 0, Left = 1 |
| borderSplineType(uint8) | LaneMark = 0, RoadEdge = 1 |

Figure 36:
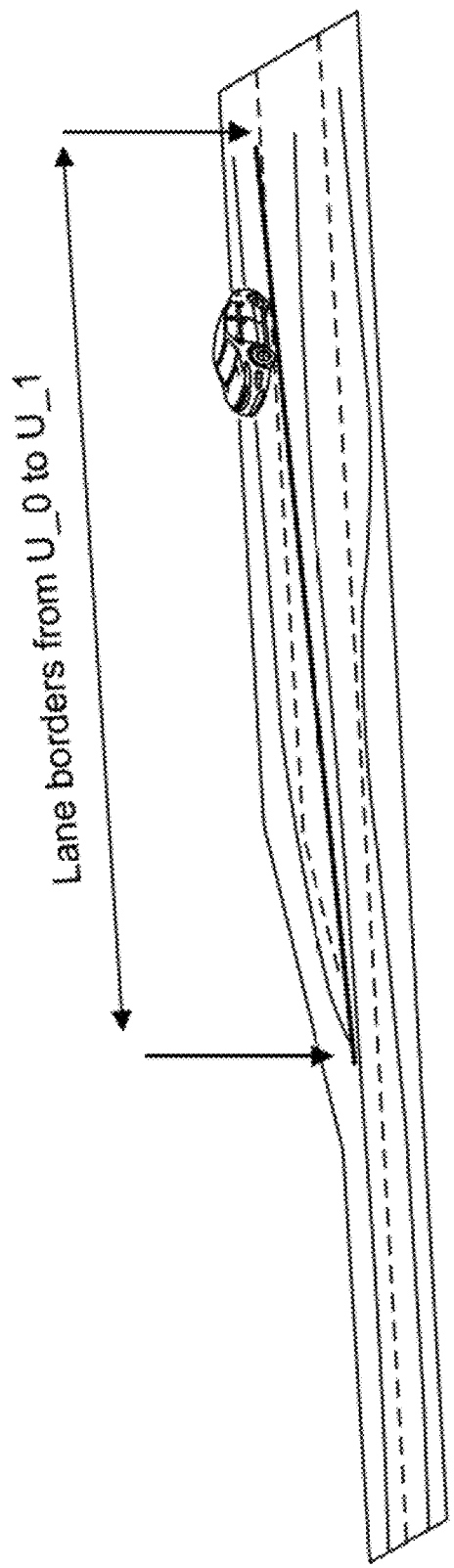
FIG. 36 is a schematic diagram of exemplary lane borders, consistent with disclosed embodiments.

In some embodiments, all "U" values may correspond to spline points where borders may be shared. FIG. 36 is a schematic diagram of exemplary lane borders, consistent with disclosed embodiments.

In some embodiments, an object of a lane intersection point type may define a split/merge point by its X-Y-Z coordinates in the RB coordinate system. "Dps out" and "Dps in" may be always expressed in terms of a maximum size of two items where a "−1" value in the dpId field signals the end of array (when there may be fewer than three items). Table 20 illustrates an exemplary LaneIntersectionPoints object.

TABLE 17

LaneIntersectionPoints Object Description

| Object | | Description |
|---|---|---|
| dpsIn [2] | DP id(int) | Arrays always in max length of 2 |
| | U (float) | |
| dpsOut [2] | DP id(int) | Arrays always in max length of 2 |
| | U (float) | |
| X (float) | | |
| Y (float) | | |
| Z (float) | | |
| numDpsIn (uint8) | | Actual num Dps in |
| numDpsOut (uint8) | | Actual num Dps in |

Table 21 illustrates an exemplary Reference Point Change Event object.

TABLE 18

Reference Point Change Event Object (ReferencePointChangeEvent)

| Data Type | Description |
|---|---|
| PLT_time (uint32) | |
| T | tX (double) |
| | tY (double) |
| | tZ (double) |
| R | Roll (double) |
| | Pitch (double) |
| | Yaw (double) |
| GPS Reference | Longitude (double) |
| | Latitude (double) |
| | Altitude (double) |

Map Coordinate System Origin Point Change Event

Figure 37:
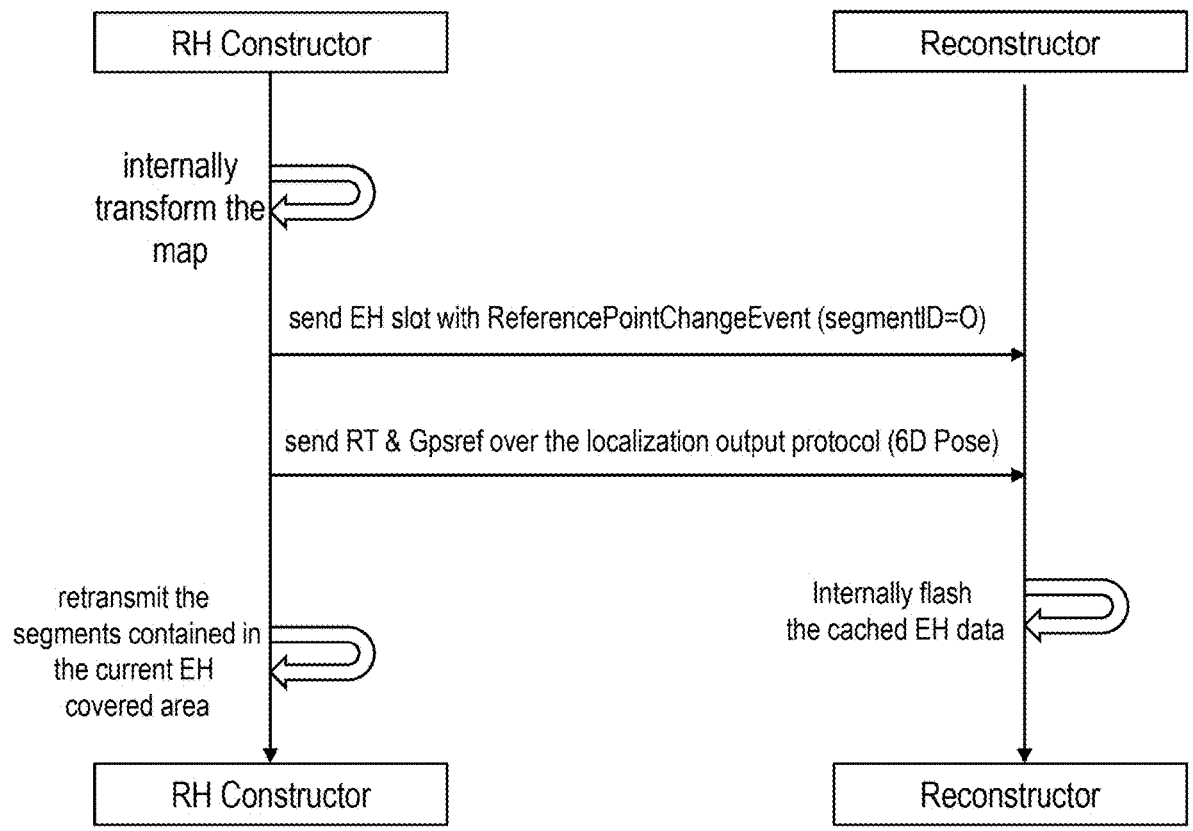
FIG. 37 illustrates an exemplary process for changing an electronic horizon coordinate system, consistent with disclosed embodiments.

To avoid precision errors producing an accumulated bias over distances, the one or more EH processors may dynamically change the map coordinate system's origin point. This may happen when the vehicle's distance from the origin point becomes larger than a predetermined threshold. All the map objects may be transformed at this point according to the new coordinates system. When this event occurs, the one or more EH processors may send the ReferencePointChangeEvent object to signal that map coordinates have been changed. EH previous segments may be flashed on the re-constructor side and transmitted by the constructor in the new coordinate system. When the change occurs, the localization output changes to a "not localized" state. FIG. 37 illustrates an exemplary process for changing the EH coordinates system, consistent with disclosed embodiments.

Table 19 below describes the type values and the meaning of the length value for each of the EH objects that may be used in the disclosed systems and methods. The objects having a length of control points vector may define the form of a spline (e.g., control points amount) in the object definition in a header.

TABLE 19

Object Descriptors

| Type (enum/uint8) | Meaning of Length (uint8) |
|---|---|
| NEW_SEGMENT_DESCRIPTION = 2 | Always max 1 |
| SEGMENT_IN_EH | Length of SegmentID vector |
| SPLINE_LANE_MARK | Length of controlPoints vector |
| SPLINE_ROAD_EDGE | Length of controlPoints vector |
| SPLINE_DRIVABLE_PATH | Length of controlPoints vector |
| LANE_MARK_CHANGE_POINT | Length of v_spline_coordinate vector |
| DRIVALBE_PATH_PROFILE | Length of v_spline_coordinate vector |
| SIGN_LANE_MARK | Number of SignLandmarks |
| POLES_LANE_MARK | Number of PolesLandmarks |
| REFERENCE_POINT_CHANGE_EVENT | Always max 1 |
| ROAD_EDGE_CHANGE_POINT | Length of v_spline_coordinate vector |
| DPSUCCESSOR | Num of successors |
| DPPREDECESSOR | Num of predecessors |
| DPNEIGHBORS | Num of neighbors |
| DPBORDERS | Num of borders |
| LANEINTERSECTOPNPOINTS | Number of lane intersection points |

By way of example, three exemplary EH Messages are provided in Table 23, Table 24, and Table 25 below for illustration purposes, which should not be construed as limiting examples.

TABLE 20

Exemplary Message with Segment Descriptor
(First Message in Edge Segment)

Version = 1.0
# of objects = 5
Size = 640 B
SegmentID == SegmentID of new Segment
(included in the segmentInEH vector that forms part of this message)
New Segment Description 1
DrivablePathSpline 32
DrivablePathProfile 25
SignLandmark 3
New Segment Description
DrivablePathSpline[32 control points and 36 knots]
DrivablePathProfile[25 v_spline_coordinate and 25 Ave80Speed]
SignLandmark
SignLandmark
SignLandmark

TABLE 21

Exemplary Message Without Segment Descriptor
(Not First Message in Edge Segment)

Version = 1.0
# of objects = 4
Size = 320 B
SegmentID == one SegmentID already contained in SegmentsInEH List
Version = 1.0
SegmentsInEH 3
DrivablePathSpline 32
DrivablePathProfile 25
SignLandmark 3
SegmentsInEH [3 segmentIds]
DrivablePathSpline [32 control points, and 36 knots]
DrivablePathProfile [25 v_spline_coordinate and 25 Ave80Speed]
SignLandmark
SignLandmark

TABLE 22

Exemplary Control message - segments in EH update.

Version = 1.0
# of objects = 3
Size = 96 B
SegmentID == one SegmentID already contained in SegmentsInEH List
SegmentsInEH 3
SegmentsInEH [3 segmentIds]

Map Localization for Control

The disclosed systems and methods may use a "localization for control" engine to use the map elements to provide sampled road geometry and lane semantics data in a close range of a vehicle. This localization information may be used to improve the control application by understanding the road ahead. This disclosure describes exemplary logic and process for "Localization for control" (which may also be referred herein as "L4C") by which building blocks may be extrapolated from the map and transferred via the relevant protocols described herein. The L4C localization control interface may transmit map elements that are relatively close to the vehicle location in the vehicle coordinate system (e.g., having the center of the vehicle or the center of the onboard lidar system as the origin). In some embodiments, the L4C protocol may communicate road segments geometry data categorized into different types, which may include 3D sampled points over splines, lane assignment data, split/ merge points, stop points, or the like, or a combination thereof. These technologies may form a complementary set applicable to different vehicle control applications that rely on map data and drive profile.

In some embodiments, the L4C may create an abstraction of the road geometry to reveal the structure of the lanes in the route ahead. The L4C may be enabled by default but it may be dependent on localization of the vehicle in the Roadbook to calculation and output of data. Running at frame rate [36 Hz], the L4C protocols may provide a basic logic for customer functions such as lane keeping, lane change, and other ACC functions. However, in some instances, since the protocol's map content may be limited, it may be recommended to use the EH output protocol for complicated implementations.

In some embodiments, the algorithmic element may be output as two or more interfaces with a supplementary protocol designed to reduce bandwidth consumption. For example, road edges, lane marks and drivable paths' traces may be sent as a subset of sampled, three-dimensional points (taken from the map-sourced splines), which may be separated into two protocols to enable higher flexibility on the SPI level. In some embodiments, using pre-defined configurable parameters, the amount of covered lanes may be varied by changing at least one of: the distance the points grid should cover, the number of lanes to output, enable/ disable lane marks and/or road edges data, the number of points on each spline, the distance between the points, enabling speed-dependent distance between points, or points filtering as a function of the angle between consecutive points. For close lane assignment, the protocol may provide a description of the lanes map (a tree) in a predetermined number of (e.g., 50) meters ahead of the vehicle.

Sampled Splines Points

Map points may include 3D sampled points of the DP, LM, and RE splines in the vehicle coordinate system. The points output may be based on a predefined set of properties which may be configurable in the development phase. Each project can determine the number of splines (lanes) to sample and output. For example, using this information an adequate configuration may be saved for:

maxNumofDPs=5 [0,5]
  maxNumofLMs=6 [0,6]
  maxNumofREs=4 [0,4]

Each spline with its successor splines may be described by a maximum of 30 points. Table 26 illustrates an exemplary control points object.

TABLE 26

Control Points Object Description

| Control Point [ ] | X (uint16) |
| | Y (uint16) |
| | Z (uint16) |
| | Attribute_1 (uint8) |
| | Attribute_2 (uint8) |

In some embodiments, in case the number of points limit was reached (as set by the points configuration) the logic of discarding excess points may discard the highest index and sub index first (no priority for left/right indexes), while spline type priority to discard may be as follows: 1. RE; 2. LM; and 3. DP.

Attribute fields may store semantic data which varies according to the type of spline the points may be representing. Table 27 illustrates exemplary attribute fields.

TABLE 27

Exemplary Attribute Fields

| Dataset | Point type | Drivable Path | Lane Mark | Road Edge |
|---|---|---|---|---|
| Attribute_1 | [8bit] | Common speed [kph] | MSB LSB [1bit] [1bit] [1bit][5bit] [Cha.] [Start] [End] [Type] | MSB LSB [1bit] [1bit] [1bit][5bit] [Cha.] [Start] [End] [Type] |
| Attribute_2 | [8bit] | None | [4bit] [4bit] [color] [width] | None None |

The description of the attributes are as follows:

"Cha."—changed, may indicate if the presented 3D point has indicated a change in one of the following parameters: "Start"—may be point may be start of spline; "End"—may be point may be end of spline; "Type"—type of LM/RE; "Color"—color of Lane mark; and Width—width of lane markings in 10 cm bins.

"Common speed"—For drivable path type points, the Attribute_1 value may store the measured crowd speed in km/h.

The points may be output to the protocol according to the configuration described elsewhere in this disclosure. The order of buffer utilization may be ego, neighbors, and neighbors of neighbors, which may include various types such as drivable paths, lane marks, road edges, etc. Each set of points may be output with additional information that covers spline ID, type, indexes, sub-index driving direction, lane left/right indication, or the like, or a combination thereof. In some embodiments, if Ego is 0, the left lanes may be −1 and −2, and the right lanes may be 1, 2, 3, etc.

Splines Indexing

The Roadbook may cover all types of scenarios (including junctions) where a spline can split into multiple splines heading in different directions. Information on consecutive splines and their IDs may be given in the sub-indexes, which may be part of every spline description.

Figure 38:
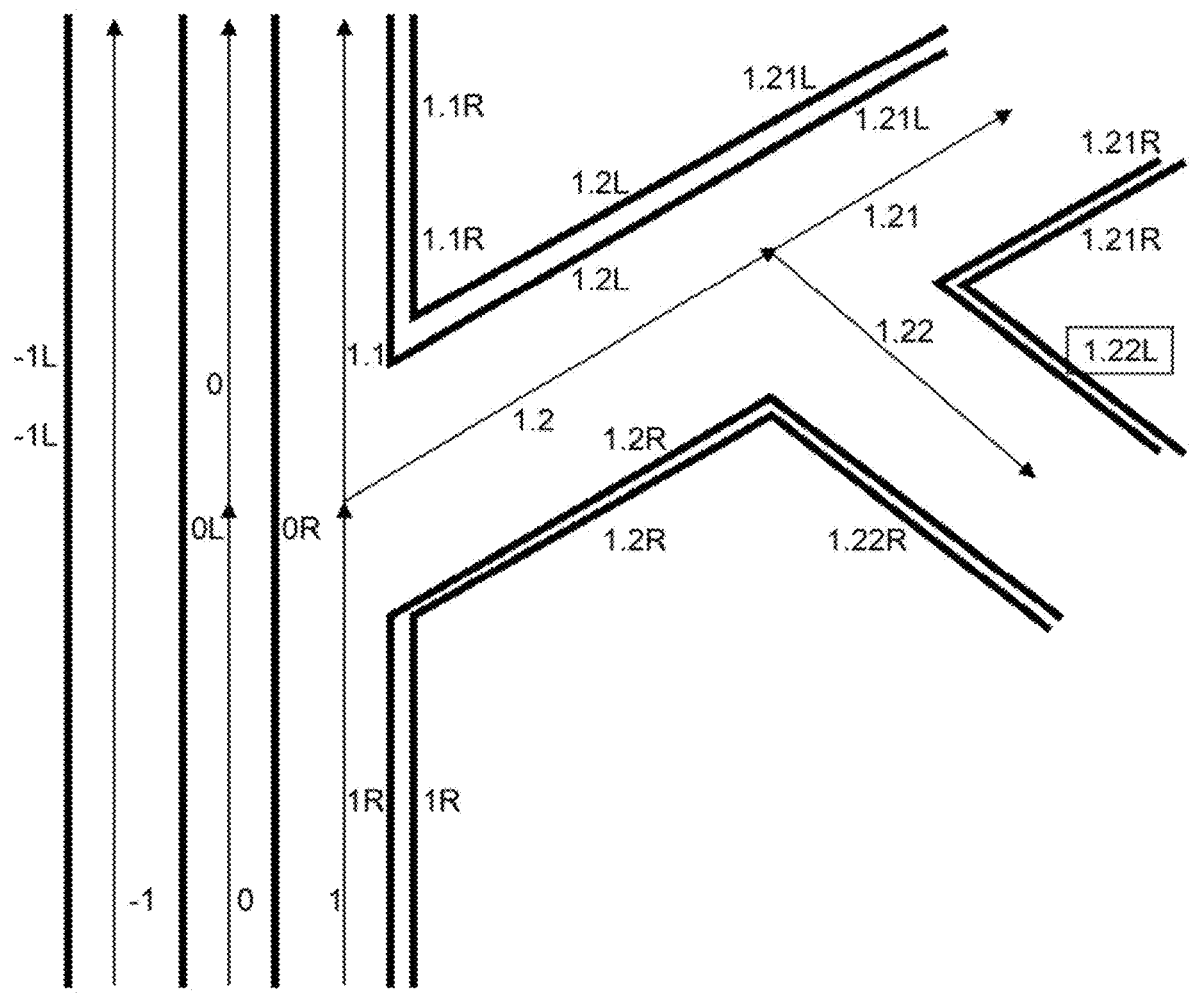
FIG. 38 is a schematic diagram of exemplary indexes and sub-indexes of splines associated with road segments, consistent with disclosed embodiments.

FIG. 38 is a schematic diagram of exemplary indexes and sub-indexes of splines associated with road segments, consistent with disclosed embodiments. As illustrated in FIG.

38, the vehicle may be driving in the center of the main road and it may be located in a current frame. It may receive information on the lanes forming the road to the right (DP, LM, RE) and also on splits that may be further ahead. The limitation may be the distance and/or the max number of points that could be transmitted (whichever may be reached first).

In some embodiments, every spline may include at least one of an index, a sub-index, or a left/right indication, which may provide information relating to the location of the lane relative to the vehicle position (as illustrated in FIG. 38). All the splines belonging to a lane may get the index of the lane. Landmarks that might be related to two lanes may get the index of one of these lanes. In some embodiments, in case RE is not adjacent to an indexed lane it may be assigned with the max index configured. For example, assuming that there are 4 lanes on the left of the ego lane (i.e., the lane in which the host vehicle travels) and only 3 dps may be configured (0, 1, −1), the left RE will be assigned index −1L.

In some embodiments, in a case of lane split, the index of the forked lanes and their relative splines may remain the same as the original lanes from where they forked, but a different sub-index indicates the fork. For example, as illustrated in FIG. 38, lane index 1 forks into two lanes. Both lanes get index 1, but the right one gets sub-index 2 and the left one gets sub-index 1. In FIG. 38*m*, the digits indicating the sub-index value may be the ones after the decimal point, but in the actual protocol the index and sub-index may be two separate fields. The "index" and sub-index may describe a lane indexing, so all of the splines of the same lane may get the same index and sub-index. If a lane with sub-index 2 also forks into two lanes their index remains 1, but one of them may get sub-index 21 and the other may get sub-index 22.

Figure 39:
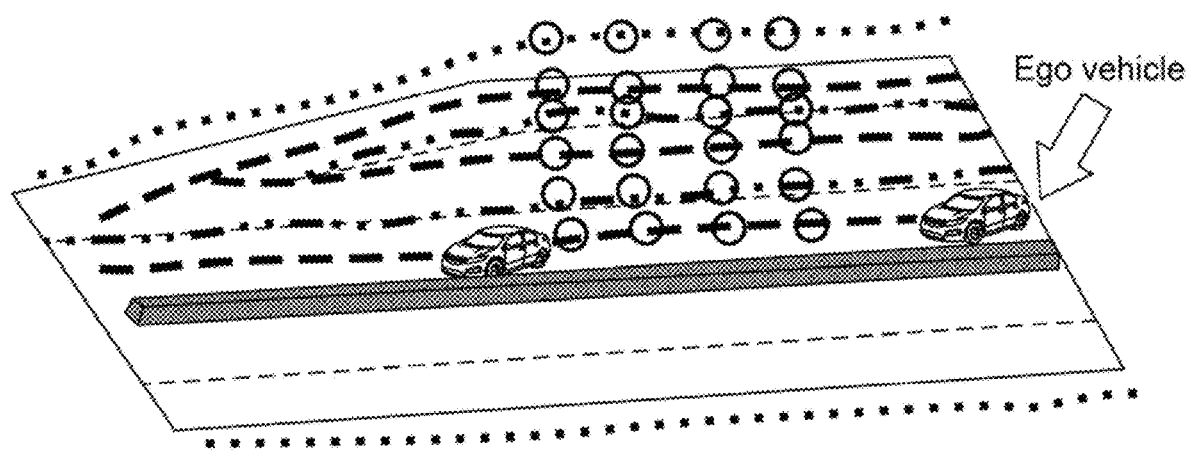
FIG. 39 is a schematic diagram of an exemplary drivable path projection of ten points per spline in set distances of a predetermined number of meters, consistent with disclosed embodiments.

In some embodiments, a left/right indication, which may indicate whether the spline borders the lane at its right or left side, may be used for road edge and lane mark splines. FIG. 39 is a schematic diagram of an exemplary DP projection of 10 points per spline in set distances of a predetermined number of meters, consistent with disclosed embodiments.

Figure 40:
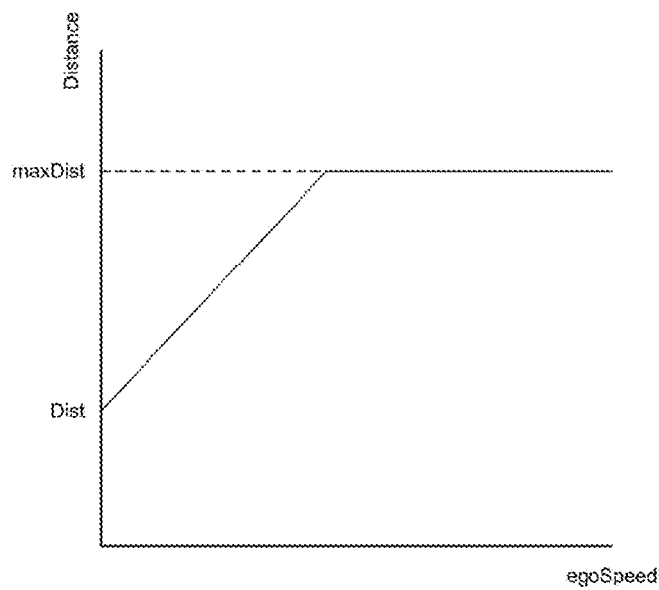
FIG. 40 is a schematic diagram illustrating exemplary relationship between the dynamic distance between points and the ego speed, consistent with disclosed embodiments.

In some embodiments, when the dynamic distance between points are enabled, the distance between points be determined, as follows:

1) At speed=0 the distance=distanceBetweenPoints; or
2) At speeds>0 the distance will follow Equation (1) below:

$$\text{Distance} = \text{Minimum}\left(dist + \frac{maxDist - dist}{30} * egospeed, maxDist\right), \quad (1)$$

where dist=distanceBetweenPoints, maxDist=maxDistanceBetweenPoints. Secondary lanes may behave similarly; i.e., dist=distanceBetweenPointsSecondaryLanes. FIG. 40 is a schematic diagram illustrating exemplary relationship between the dynamic distance between points and the ego speed, consistent with disclosed embodiments.

Lane Assignment

The lane assignment message may describe the topology between lanes as a tree structure, where the root of the tree may be the location of the vehicle in the ego lane. The message may include a list of lanes, where each lane may include a sub list of right neighbor lanes, left neighbor lanes, and a sub list of successor lanes. In some embodiments, the lane assignment message may also include a Boolean indication of whether this lane is in the driving direction or an oncoming lane. In some embodiments, the data in the protocol itself may be not sorted in any form except for the actual objects. Nevertheless, each lane may contain enough information to correctly position it on the illustrated map surface.

Table 28 illustrates an exemplary Lane Object.

TABLE 28

| | Lane Object Description | |
|---|---|---|
| | Names | Description |
| Data Types | egoDpId(int) | DP ID of the ego lane |
| | uInEgoId(float) | "U" value on the DP spline of the vehicle location of the ego lane |
| | LateralDistFromDp(float) | Lateral distance from DP on ego lane (right negative, left positive) |
| Lanes | dpId (int) | DP ID of this lane |
| | distanceFromVehicle(float) | Driving distance of the start of this lane from the vehicle |
| | length(float) | Length of lane in meters |
| | leftNeighborsIds[int] | Const max size of 3. A value "−1" indicates there may be no spline in that index. |
| | rightNeighborsIds[int] | Const max size of 3. A value "−1" indicates there may be no spline in that index. |
| | successorsIds[int] | Const max size of 3. A value "−1" indicates there may be no spline in that index. |
| | isOncomig(bool) | "True" if lane may be opposite to vehicle driving direction |
| | meanWidth | Lane width in meters |

Drivable Path Stop Points

Stop lines in front of intersections or crosswalks may be mapped in the Roadbook and indicated by a line in front of the stop line. The DP spline and the stop line marking may share the 3D intersection points in the protocol. Table 29 illustrates an exemplary DP Stop Points Object.

TABLE 29

| DP Stop Points Object Description | |
| --- | --- |
| DP Stop Point | Spline ID (uint8) |
| | X (uint16) |
| | Y (uint16) |
| | Z (uint16) |

Intersection Points

Figure 41:
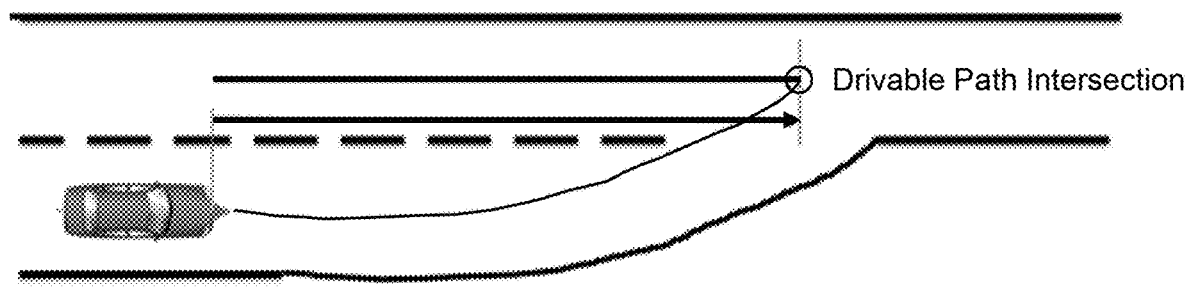
FIG. 41 is a schematic diagram of exemplary drivable path merge points, consistent with disclosed embodiments.

Intersection points may be a description common to both merge and split points. In some embodiments, since these points have similar attributes, it may be possible to use the same object to describe them. Merge/split points may be semantic information nodes that may be calculated and presented at the DP intersections/splits. In common with other RB data, this information may be derived from the most common driving profile. The configuration of the relevant distance for which a project requires this projection, and the amount of points to be presented, may be pre-defined using the following properties: enableStopPoints [bool]—True/False; and stopPointsDistance [uint]—Max val. may be 200 meters. Table 30 illustrates an exemplary Intersection Points Object. FIG. 41 is a schematic diagram of exemplary drivable path merge points, consistent with disclosed embodiments.

TABLE 8

| Intersection Points Object Description | |
| --- | --- |
| Merge Point/Split Point | numDpsIn(uint8) |
| | numDpsOut(uint8) |
| | X (uint16) |
| | Y (uint16) |
| | Z (uint16) |
| | DPid_0(uint8) |
| | DPid_1(uint8) |
| | DPid_2(uint8) |
| | DPid_3(uint8) |

Electronic Horizon: Variable Header and Object Payload

As described elsewhere in this disclosure, at least one EH processor of a host vehicle may be programmed to receive map data (e.g., REM map tiles from server 2701) and receive output provided by one or more vehicle sensors (e.g., a motion sensor, a camera, a GPS device, etc.). The EH processor may also be programmed to localize the vehicle and determine an appropriate electronic horizon for the vehicle (including e.g., where the vehicle may travel in a predetermined time of period) based on the received map data and the output provided by the sensor(s). In some embodiments, the electronic horizon may also include map information for a particular location or region. Additionally, determining am electronic horizon may include a consideration of the geometry of a vehicle's path to determine the density of the points to provide a vehicle (e.g., direct or straight-line routes may not need as many points) and may provide denser information for a ego-lane where a vehicle travels as opposed to neighboring lanes. Further the electronic horizon may include information about speed (e.g., average speed or legal speed), the type of lane etc.

By way of example, referring back to FIG. 35, an EH processor of vehicle 3501 may determine the location of vehicle 3501 relative to the map based on output provided by one or more onboard sensors. The EH processor may also determine an area 3502 (i.e., an electronic horizon) covering the road segments that the vehicle may travel in, for example, 10 seconds. In some embodiments, the EH processor may also generate a navigation information packet including information associated with the determined electronic horizon (e.g., area 3502 illustrated in FIG. 35). The EH processor may further transmit the navigation information packet to a navigation system processor, which may be responsible for buffering and updating the received electronic horizon information based as new navigation packets are received from the EH processor. The navigation system processor may also cause the host vehicle to navigate based on the received navigation information packet.

In some embodiments, the navigation information packet generated by the EH processor may include a header portion and a payload portion. By way of example, Table 5, discussed earlier, illustrates an exemplary navigation information packet, which may be in the form of a message communicated between an EH processor and a navigation system processor according to the EH protocol described elsewhere in this disclosure. The navigation information packet may include a header portion and a payload portion. As described elsewhere in this disclosure, the header portion may be used as a dictionary for parsing the payload portion and re-constructing the EH data. For example, the header portion may specify what information is included in the payload portion. By way of example, Table 6, discussed earlier, illustrates an exemplary header portion of a navigation information packet. The header portion may include information such as the number of the object(s) included in the payload portion, the size of each of the object(s), the segment ID associated with each of the object(s), the description of each of the object(s), etc.

The payload portion may include information relating to each of the object(s) associated with the road segments in the EH. As described elsewhere in this disclosure, the object(s) specified in the payload portion may include one or more map elements associated with the road segments, such as a spline object (e.g., a lane mark, a road edge, a drivable path, etc.), a pole object, a traffic sign object, a number-of-lanes object (indicating the number of the lanes associated with a road segment), relation between splines and lanes (which spline belongs to which lane), a drivable path profile, an average speed and/or legal speed in points on a drivable path spline, lane mark change points (one lane mark type changed to another lane mark type), a lane mark color (which may include paired information about the changed lane mark), road edge type change points, a lane topology, and lane borders. For example, the payload portion may include a spline object (e.g., a drivable path, a road edge, a lane mark, etc.). A spline object may include a predetermined set of points relative to the spline, including, for example, points on a drivable path at predetermined intervals ahead of a current host vehicle position (e.g., 1 second, 2 seconds, 5 seconds, etc., ahead of the current host vehicle position). The same may be true for drivable paths in adjacent lanes. The predetermined intervals may be selectable or may vary with the vehicle speed. Detailed descriptions of information relating to an object included in the payload portion have been provided elsewhere in this disclosure, which are not repeated here for brevity purposes.

In some embodiments, the size of the payload portion of the navigation information packet may vary, depending on the object(s) included in the payload portion. For example, as illustrated in Table 5, discussed earlier, the payload portion of the navigation information packet in this example may include three objects. The payload portion of a different navigation information packet may include more or less objects, the size of the payload portion of that navigation information packet may be different from the payload portion illustrated in Table 5. One of the advantages of having a variable-sized payload portion (and a variable-sized navigation information packet) is to provide flexibility and to reduce the processing cost. A standardized navigation packet designed to cover all possible scenarios and encountered objects may be huge, and most fields would be empty during update events. The disclosed systems and methods provide solutions for communicating the electronic horizon information (e.g., drivable paths, encountered objects and positions, etc.) in a packet customized to convey the relevant information.

Figure 42:
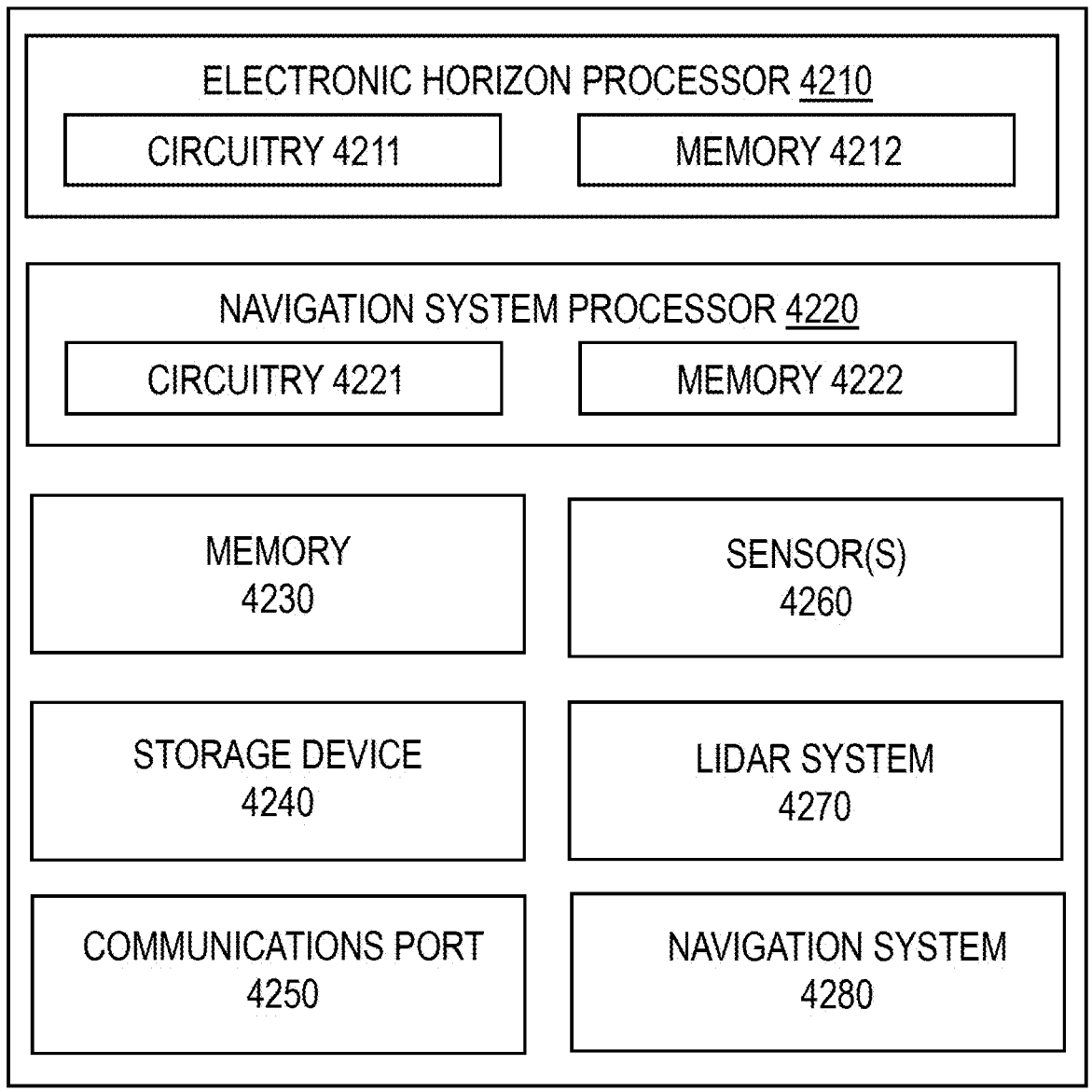
FIG. 42 is a block diagram illustrating exemplary components of a vehicle, consistent with disclosed embodiments.

FIG. 42 illustrates exemplary components of vehicle 2702 configured to perform the functions thereof described herein. As illustrated in FIG. 42, vehicle 2702 may include one or more electronic horizon processor 4210, one or more navigation system processors 4220, a memory 4230, a storage device 4240, a communications port 4250, one or more sensors 4260, a lidar system 4270, and a navigation system 4280.

Electronic horizon processor 4210 may be configured to perform one or more functions of an EH processor (and/or the EH constructor) described in this disclosure. Electronic horizon processor 4210 may include a microprocessor, pre-processors (such as an image preprocessor), a graphics processing unit (GPU), a central processing unit (CPU), support circuits, digital signal processors, integrated circuits, memory, or any other types of devices suitable for running applications or performing a computing task. In some embodiments, electronic horizon processor 4210 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In some embodiments, electronic horizon processor 4210 may include circuitry 4211 and memory 4212. Memory 4212 may store instructions that, when executed by circuitry 4211, may cause electronic horizon processor 4210 to perform the functions of electronic horizon processor 4210 described herein. Circuitry 4211 may include any one or more of the examples described herein.

Navigation system processor 4220 may be configured to perform one or more functions of a navigation system processor (and/or an EH reconstructor) described in this disclosure. In some embodiments, navigation system processor 4220 may include circuitry 4221 and memory 4222. Memory 4222 may store instructions that, when executed by circuitry 4221, may cause navigation system processor 4220 to perform the functions of navigation system processor 4220 described herein. Circuitry 4221 may include any one or more of the examples described herein.

Vehicle 2702 may include a memory 4230 that may store instructions for various components of vehicle 2702. For example, memory 4230 may store instructions that, when executed by electronic horizon processor 4210 (and/or navigation system processor 4220), may be configured to cause electronic horizon processor 4210 (and/or navigation system processor 4220) to perform one or more functions described herein. Memory 4230 may include any number of random-access memories, read-only memories, flash memories, disk drives, optical storage, tape storage, removable storage, and other types of storage. In one instance, memory 4230 may be separate from electronic horizon processor 4210 and/or navigation system processor 4220. In another instance, memory 4230 may be integrated into electronic horizon processor 4210 and/or navigation system processor 4220. In some embodiments, memory 4230 may include software for performing one or more computing tasks, as well as a trained system, such as a neural network, or a deep neural network.

Storage device 4240 may be configured to store various data and information for one or more components of vehicle 2702. Storage device 4240 may include one or more hard drives, tapes, one or more solid-state drives, any device suitable for writing and read data, or the like, or a combination thereof. Storage device 4240 may store map data, including, for example, data of one or more map segments, which may be accessed by electronic horizon processor 4210 and/or navigation system processor 4220. In some embodiments, storage device 4240 may store a map database. Electronic horizon processor 4210 may retrieve data of one or more map segments from the map database. For example, electronic horizon processor 4210 and/or navigation system processor 4220 may retrieve map data associated with a map segment.

Communications port 4250 may be configured to facilitate data communications between vehicle 2702 and one or more components of the disclosed systems described herein via a network. For example, communications port 4250 may be configured to receive data from and transmit data to a server via one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

Sensor 4260 may be configured to collect information relating to vehicle 2702 and/or the environment of vehicle 2702. Sensor 4260 may include one or more of an image sensor (e.g., a camera), a radar device, a lidar device, a speed sensor, an acceleration sensor, a brake sensor, a suspension sensor, a positioning device (e.g., a Global Positioning System (GPS) device), an accelerometer, a gyro sensor, a speedometer, or the like, or a combination thereof. For example, vehicle 2702 may include an image sensor (e.g., a camera) configured to capture one or more images of its environment, which may include representation of an object (or at least a portion thereof). In some embodiments, vehicle 2702 may include one or more image sensors similar to image capture device 122, image capture device 124, and/or image capture device 126 described elsewhere in this disclosure. As another example, vehicle 2702 may include a GPS device configured to collect positioning data associated with positions of vehicle 2702 over a period of time.

LIDAR system 4270 may include one or more LIDAR units. In some embodiments, the one or more LIDAR units may be positioned on a roof of vehicle 2702. Such a unit may include a rotating unit configured to gather LIDAR reflection information within a 360-degree field of view around vehicle 2702 or from any sub-segment of the 360-degree field of view (e.g., one or more FOVs each representing less than 360 degrees). In some embodiments, a LIDAR unit may be positioned at a forward location on vehicle 2702 (e.g., near the headlights, in the front grill, near the fog lamps, in a forward bumper, or at any other suitable location). In some cases, one or more LIDAR units installed on a forward portion of vehicle 2702 may collect reflection information from a field of view in an environment forward of vehicle 2702. The data collected by LIDAR system 4270 may be provided to electronic horizon processor 4210. Alternatively or additionally, the data may be transmitted to a server and/or a database via a network, as described elsewhere in this disclosure.

Any suitable type of LIDAR unit may be included on vehicle 2702. In some cases, LIDAR system 4270 may include one or more flash LIDAR units (e.g., 3D flash LIDAR) where an entire LIDAR field of view (FOV) is illuminated with a single laser pulse, and a sensor including rows and columns of pixels to record returned light intensity and time of flight/depth information. Such flash systems may illuminate a scene and collect LIDAR "images" multiple times per second. Scanning LIDAR units may also be employed. Such scanning LIDAR units may rely on one or more techniques for dispersing a laser beam over a particular FOV. In some cases, a scanning LIDAR unit may include a scanning mirror that deflects and directs a laser beam toward objects within the FOV. Scanning mirrors may rotate through a full 360 degrees or may rotate along a single axis or multiple axes over less than 360 degrees to direct the laser toward a predetermined FOV. In some cases, LIDAR units may scan one horizontal line. In other cases, a LIDAR unit may scan multiple horizontal lines within an FOV, effectively rastering a particular FOV multiple times per second.

The LIDAR units in LIDAR system 4270 may include any suitable laser source. In some embodiments, the LIDAR units may employ a continuous laser. In other cases, the LIDAR units may rely upon pulsed laser emissions. Additionally, any suitable laser wavelength may be employed. In some cases, a wavelength of between about 600 nm to about 1000 nm may be used.

The LIDAR unit(s) in LIDAR system 4270 may also include any suitable type of sensor and provide any suitable type of output. In some cases, sensors of the LIDAR units may include solid state photodetectors, such as one or more photodiodes or photomultipliers. The sensors may also include one or more CMOS or CCD devices including any number of pixels. These sensors may be sensitive to laser light reflected from a scene within the LIDAR FOV. The sensors may enable various types of output from a LIDAR unit. In some cases, a LIDAR unit may output raw light intensity values and time of flight information representative of the reflected laser light collected at each sensor or at each pixel or sub-component of a particular sensor. Additionally or alternatively, a LIDAR unit may output a point cloud (e.g., a 3D point cloud) that may include light intensity and depth/distance information relative to each collected point). LIDAR units may also output various types of depth maps representative of light reflection amplitude and distance to points within a field of view. LIDAR units may provide depth or distance information relative to particular points within an FOV by noting a time at which light from the LIDAR's light source was initially projected toward the FOV and recording a time at which the incident laser light is received by a sensor in the LIDAR unit. The time difference may represent a time of flight, which may be directly related to the round trip distance that the incident laser light traveled from the laser source to a reflecting object and back to the LIDAR unit. Monitoring the time of flight information associated with individual laser spots or small segments of a LIDAR FOV may provide accurate distance information for a plurality of points within the FOV (e.g., mapping to even very small features of objects within the FOV). In some cases, LIDAR units may output more complex information, such as classification information that correlates one or more laser reflections with a type of object from which the laser reflection was acquired.

Navigation system 4280 may be configured to assist a driver of vehicle 2702 to operate vehicle 2702. Alternatively or additionally, navigation system 4280 may include an autonomous vehicle navigation system configured to control the movement of vehicle 2702 as described elsewhere in this disclosure. For example, navigation system 4280 may be configured to control vehicle 2702 based on instructions received from navigation system processor 4220. By way of example, navigation system processor 4220 may cause navigation system 4280 to control vehicle 2702 to navigate along a target trajectory based on the navigation information packet received from electronic horizon processor 4210.

In some embodiments, an electronic horizon processor 4210 and a navigation system processors 4220 may be integrated into one processor configured to perform the functions of the electronic horizon processor and the navigation system processor described in this disclosure.

FIG. 43 is a flowchart showing an exemplary process 4300 for navigating a vehicle, consistent with disclosed embodiments. One or more steps of process 4300 may be performed by a vehicle (e.g., vehicle 2702), a device (e.g., vehicle device 2703) associated with the host vehicle, at least one processor (e.g., an electronic horizon processor), and/or a server (e.g., server 2701). While the descriptions of process 4300 provided below use vehicle 2702 (or one or more components thereof) as an example, one skilled in the art would appreciate that one or more steps of process 4300 may be performed by a server and/or a vehicle device. For example, in an embodiment, a system for navigating a vehicle includes at least one processor (e.g., an electronic horizon processor) comprising circuitry and a memory. The memory includes instructions that when executed by the circuitry cause the at least one processor to perform one or more operations, such as any of the operations discussed herein and/or in connection with FIG. 43. As another example, in another embodiment, a non-transitory computer readable medium contains instructions that, when executed by at least one processor (e.g., an electronic horizon processor), may cause the at least one processor to perform one or more operations, such as any of the operations discussed herein and/or in connection with FIG. 43.

At step 4301, at least one electronic horizon processor (e.g., electronic horizon processor 4210) accesses a map representative of at least a road segment on which the host vehicle travels or is expected to travel. For example, the at least one electronic horizon processor may be programmed to receive a map from storage device 4240 and/or memory 4230. Alternatively or additionally, the at least one electronic horizon processor may receive the map data from a server (e.g., server 2701) and/or a database (e.g., database 2704), which may be remotely located relative to vehicle 2702, via network 2705. In some embodiments, the map accessed by the at least one electronic horizon processor may represent a sub-segment of a larger map available on a map server (e.g., server 2701) remotely located relative to the host vehicle.

In some embodiments, the accessed map may include a plurality of three-dimensional splines associated with one or more road segments, and the three-dimensional splines may represent one or more of: a drivable path for the host vehicle, a road edge, or a lane mark.

In some embodiments, the accessed map is generated based on crowd-sourced drive information collected from a plurality of vehicles that traversed the road segment on which the host vehicle travels or is expected to travel prior to the host vehicle (as described elsewhere in this disclosure).

In some embodiments, the accessed map may include a plurality of three-dimensional point locations specified in a map coordinate system associated with the accessed map (e.g., a geographic coordinate system such as GPS coordinate system). One or more of the objects included in the payload portion of the navigation packet may include a three-dimensional point location specified in a coordinate system associated with the host vehicle (e.g., a coordinate system local to the host vehicle). For example, the coordinate system associated with the host vehicle may have the position of one of the one or more cameras of the host vehicle (or the center of the host vehicle) as the origin of the coordinate system.

At step 4302, the at least one electronic horizon processor (e.g., electronic horizon processor 4210) receives an output provided by at least one vehicle sensor (e.g., one or more sensors 4260). In some embodiments, the at least one vehicle sensor may include one or more cameras configured to capture images of an environment of the host vehicle. For example, vehicle 2702 may include one or more cameras similar to image capture device 122, image capture device 124, and image capture device 126 described above, which may be configured to capture images of an environment of the host vehicle. The received output may include at least one image captured by the one or more cameras.

In some embodiments, the at least one vehicle sensor may also include other types of sensors, including, for example, a speed sensor, an acceleration sensor, a GPS receiver, a radar sensor, a LIDAR sensor, or the like, or a combination thereof.

At step 4303, the at least one electronic horizon processor (e.g., electronic horizon processor 4210) localizes the host vehicle relative to the map based on analysis the at least one image captured by the one or more cameras. For example, the at least one electronic horizon processor may determine the position of the host vehicle relative to the mapped drivable path based on an identification of one or more mapped landmarks represented in the at least one captured image and a comparison of an image position of the one or more mapped landmarks in the at least one captured image with an expected image position of the one or more mapped landmarks associated with at least one position along the drivable path. In some embodiments, the mapped drivable path is represented in the map as a three-dimensional spline. Alternatively or additionally, the at least one electronic horizon processor may determine a position of the host vehicle relative to a mapped drivable path based on an identification of one or more mapped landmarks represented in two or more captured images and based on a motion history of the host vehicle during a time period between when the two or more captures images were acquired. Alternatively or additionally, the at least one electronic horizon processor may localize the host vehicle relative to the map based on other methods or processes for localizing a vehicle described herein (e.g., the methods described earlier in connection with FIGS. 25A, 25B, 25C, and 25D).

At step 4304, the at least one electronic horizon processor (e.g., electronic horizon processor 4210) determines an electronic horizon for the host vehicle based on the localization of the host vehicle relative to the map. For example, referring back to FIG. 35, the at least one electronic horizon processor of vehicle 2702 (which may be similar to vehicle 3501 illustrated in FIG. 35) may determine the position of vehicle 2702 relative to the map illustrated in FIG. 25 and determine an area 3502 covered by an electronic horizon radius based on the relative position of vehicle 2702.

In some embodiments, the at least one electronic horizon processor may determine the electronic horizon, at least in part, based on the current speed of the host vehicle and/or the travel direction of the host vehicle. For example, the at least one electronic horizon processor may obtain the current speed provided by an onboard speed sensor (which may be one of the at least one vehicle sensor). The at least one electronic horizon processor may determine the electronic horizon based on the current speed of the host vehicle. For example, the at least one electronic horizon processor may determine the electronic horizon that is associated with a portion of the map accessible to the host vehicle within a predetermined time interval under the current speed. The predetermined time interval may be in a range of 0.1 seconds to 10 minutes. In some embodiments, the predetermined time interval may be up to 1 second, 2 seconds, 5 seconds, 10 seconds, or 1 minute. Alternatively or additionally, the at least one electronic horizon processor may determine the electronic horizon that is associated with a predetermined spatial envelope around the host vehicle (e.g., one or more envelopes described earlier in connection with FIGS. 28A, 28B, 28C, 28D, 28E, 28F, 28G, and 28H).

At step 4305, the at least one electronic horizon processor (e.g., electronic horizon processor 4210) generates a navigation information packet including information associated with the determined electronic horizon. For example, referring to FIG. 35, the at least one electronic horizon processor may obtain map information relating to the road segment(s) included in area 3502 (i.e., the electronic horizon determined at step 4204) and generate a navigation information packet including the information relating to one or more objects associated with the road segment(s). The navigation information packet may include a header portion and a payload portion. The header portion may specify what information is included in the payload portion. The payload portion may include information relating to one or more objects associated with the road segment(s). In some embodiments, the payload portion may be variable-sized.

In some embodiments, the header portion of the navigation information packet may include information identifying objects included in the payload portion, a size of each of the objects included in the payload portion, an indication of a number of objects included in the payload portion, or the like, or a combination thereof. By way of example, Table 5 and Table 6, discussed above, illustrate various types of information that may be included in a header portion, the detailed descriptions of which are repeated here for brevity purposes.

The payload portion may include one or more objects associated with the road segment(s) included in the determined electronic horizon. The objects included in the payload portion may include one or more of: a spline object, a drivable path profile object, a lane mark changed points object, a road edge changed point object, a sign landmark object, a pole landmark object, a lane topology object, a drivable path border object, a lane merge point object, a lane split point object, or a reference point change event object. In some embodiments, one or more objects included in the payload portion may be generated by the at least one electronic horizon processor (e.g., electronic horizon processor 4210) based on the determined electronic horizon. For example, one or more objects included in the payload portion may be generated by the at least one electronic horizon processor (e.g., electronic horizon processor 4210) based on features associated with the accessed map that are included within the determined electronic horizon.

In some embodiments, the at least one electronic horizon processor (e.g., electronic horizon processor 4210) may be configured to generate an updated navigation information packet after detecting a change in one or more (or a group) of mapped features implicated by the determined electronic horizon for the host vehicle. For example, the at least one electronic horizon processor may detect a change in the position of a traffic sign (i.e., an object included in the electronic horizon) based on the image analysis of one or more images captured by an onboard camera. The at least one electronic horizon processor may generate an updated navigation information packet based on the detected change in the position of the traffic sign.

At step 4306, the at least one electronic horizon processor (e.g., electronic horizon processor 4210) outputs the generated navigation information packet to one or more navigation system processors (e.g., navigation system processor 4220). The one or more navigation system processors may be configured to cause the host vehicle to execute at least one navigational maneuver based on the information included in the navigation information packet. For example, one or more navigation system processors may be configured to cause navigation system 4280 to execute at least one navigational maneuver based on the information included in the navigation information packet (e.g., a drivable path along a road segment). The at least one navigational maneuver includes one or more of: maintaining a current speed of the host vehicle; maintaining a current heading direction of the host vehicle; changing a heading direction of the host vehicle; changing a speed of the host vehicle; accelerating the host vehicle; or braking the host vehicle.

Electronic Horizon: Edge Segmentation Between Road Nodes

As described elsewhere in this disclosure, one or more electronic horizon processors may provide one or more navigation information packets including map and/or navigational information to one or more navigation system processors. The one or more navigation system processors may cause a host vehicle to navigate based on the provided map and/or navigational information. In some cases, a navigation packet covering an entire road segment (which may also be referred herein as an edge) between nodes (e.g., roundabouts, intersections, merges, splits, etc.) may be large, as a road segment may extend for fairly long distances between such nodes, and many landmarks and other objects typically included in the navigation packet may be encountered. Such an approach may place a memory burden on both the constructor side (i.e., the electronic horizon processor) and the re-constructor side (i.e., the navigation system processor). The disclosed systems and methods may divide an edge into more manageable sub-segments. For example, each sub-segment may include, for example, about 100 meters of a road edge between nodes. By way of example, at least one electronic horizon processor may generate a navigation information packet and transmit the navigation information packet to a navigation system processor. As described elsewhere in this disclosure, a navigation information packet may include a SegmentInEH object (e.g., SegmentsInEH object 3321 illustrated in FIG. 33), which may be a vector of segmentIDs (e.g., 32-bit unsigned integer each) listing the map segment IDs (and/or one or more subsegment IDs) that are covered in the potential travel envelope of vehicle 2702. The SegmentsInEH object may indicate when a certain road edge subsegment can be deleted from a buffer (e.g., when the road edge subsegment is no longer included in the electronic horizon list of accessible road subsegments). For example, vehicle 2702 (or a component thereof) may delete from its local memory data associated with SegmentsInEH that is not included in the list.

FIG. 44 is a flowchart showing an exemplary process for navigating a vehicle, consistent with disclosed embodiments. One or more steps of process 4400 may be performed by a vehicle (e.g., vehicle 2702), a device (e.g., vehicle device 2703) associated with the host vehicle, at least one processor (e.g., an electronic horizon processor), and/or a server (e.g., server 2701). While the descriptions of process 4400 provided below use vehicle 2702 (or one or more components thereof) as an example, one skilled in the art would appreciate that one or more steps of process 4400 may be performed by a server and/or a vehicle device. For example, in an embodiment, a system for navigating a vehicle includes at least one processor (e.g., an electronic horizon processor) comprising circuitry and a memory. The memory includes instructions that when executed by the circuitry cause the at least one processor to perform one or more operations, such as any of the operations discussed herein and/or in connection with FIG. 44. As another example, in another embodiment, a non-transitory computer readable medium contains instructions that, when executed by at least one processor (e.g., an electronic horizon processor), may cause the at least one processor to perform one or more operations, such as any of the operations discussed herein and/or in connection with FIG. 44.

At step 4401, the at least one electronic horizon processor (e.g., electronic horizon processor 4210) accesses a map representative of a road (or a road segment) on which the host vehicle travels or is expected to travel. In some embodiments, step 4401 may be similar to step 4301 of process 4300 described above. For example, the at least one electronic horizon processor may be programmed to receive a map from storage device 4240 and/or memory 4230. Alternatively or additionally, the at least one electronic horizon processor may receive the map data from a server (e.g., server 2701) and/or a database (e.g., database 2704), which may be remotely located relative to vehicle 2702, via network 2705. In some embodiments, the map accessed by the at least one electronic horizon processor may represent a sub-segment of a larger map available on a map server (e.g., server 2701) remotely located relative to the host vehicle.

In some embodiments, in the map, the road may be represented as an internode road segment between two mapped nodes, and in the map, the internode road segment may be further divided into a plurality of internode road sub-segments. As described elsewhere in this disclosure, a mapped node may include a roundabout, an intersection, a lane split, a lane merge (or the like) represented in a map. An edge may be a road between two mapped nodes. An edge segment may be a logical unit containing map data. For example, an edge may be divided into a plurality of edge segments (e.g., edge segments illustrated in FIG. 35). An edge segment may be further be divided into a plurality of subsegments. Dividing edges into sub-segments may reduce memory consumption at both sides (constructor and reconstructor) since an edge segment can be quite long in some cases. Alternatively or additionally, the accessed map may include a plurality of three-dimensional splines, which may represent one or more of: a drivable path for the host vehicle, a road edge, or a lane mark.

In some embodiments, the accessed map is generated based on crowd-sourced drive information collected from a plurality of vehicles that traversed the road segment on which the host vehicle travels or is expected to travel prior to the host vehicle (as described elsewhere in this disclosure).

In some embodiments, the map accessed by the at least one electronic horizon processor may represent a sub-segment of a larger map available on a map server (e.g., server 2701) remotely located relative to the host vehicle.

At step 4402, the at least one electronic horizon processor (e.g., electronic horizon processor 4210) receives an output provided by at least one vehicle sensor. In some embodiments, step 4402 may be similar to step 4302 of process 4300 described above. For example, the at least one vehicle sensor may include one or more cameras configured to capture images of an environment of the host vehicle. By way of example, vehicle 2702 may include one or more cameras similar to image capture device 122, image capture device 124, and image capture device 126 described above, which may be configured to capture images of an environment of the host vehicle. The received output may include at least one image captured by the one or more cameras.

In some embodiments, the at least one vehicle sensor may also include other types of sensors, including, for example, a speed sensor, an acceleration sensor, a GPS receiver, a radar sensor, a LIDAR sensor, or the like, or a combination thereof.

At step 4403, the at least one electronic horizon processor (e.g., electronic horizon processor 4210) localizes the host vehicle relative to the map based on analysis of the at least one image captured by the one or more cameras. For example, at least one electronic horizon processor may localize the host vehicle relative to at least one mapped feature (and/or at least one mapped object) based on analysis of the at least one image captured by the one or more cameras. In some embodiments, step 4403 may be similar to step 4303 of process 4300 described above.

In some embodiments, the at least one mapped feature relative to which the host vehicle is localized may include a drivable path for the host vehicle represented in the map. In some embodiments, the mapped drivable path may be represented in the map as a three-dimensional spline. The at least one electronic horizon processor may localize the host vehicle relative to a mapped drivable path based on analysis of the at least one image captured by the one or more cameras. By way of example, at least one electronic horizon processor may determine a position of the host vehicle relative to a mapped drivable path based on an identification of one or more mapped landmarks represented in the at least one captured image and a comparison of an image position of the one or more mapped landmarks in the at least one captured image with an expected image position of the one or more mapped landmarks associated with at least one position along the drivable path. Alternatively or additionally, the localization of the host vehicle relative to the at least one mapped feature may include determining a position of the host vehicle relative to a mapped drivable path based on an identification of one or more mapped landmarks represented in two or more captured images and based on a motion history of the host vehicle during a time period between when the two or more captures images were acquired.

At step 4404, the at least one electronic horizon processor (e.g., electronic horizon processor 4210) determines an electronic horizon for the host vehicle based on the localization of the host vehicle. For example, the at least one electronic horizon processor may determine an electronic horizon for the host vehicle based on the localization of the host vehicle relative to the at least one mapped feature. In some embodiments, step 4404 may be similar to step 4304 of process 4300 described above. For example, the at least one electronic horizon processor may determine the electronic horizon, at least in part, based on the current speed of the host vehicle and/or the travel direction of the host vehicle. For example, the at least one electronic horizon processor may obtain the current speed provided by an onboard speed sensor (which may be one of the at least one vehicle sensor). The at least one electronic horizon processor may determine the electronic horizon based on the current speed of the host vehicle. For example, the at least one electronic horizon processor may determine the electronic horizon that is associated with a portion of the map accessible to the host vehicle within a predetermined time interval under the current speed. The predetermined time interval may be in a range of 0.1 seconds to 10 minutes. In some embodiments, the predetermined time interval may be up to 1 second, 2 seconds, 5 seconds, 10 seconds, or 1 minute. Alternatively or additionally, the at least one electronic horizon processor may determine the electronic horizon that is associated with a predetermined spatial envelope around the host vehicle (e.g., one or more envelopes described earlier in connection with FIGS. 28A, 28B, 28C, 28D, 28E, 28F, 28G, and 28H).

At step 4405, the at least one electronic horizon processor (e.g., electronic horizon processor 4210) determines a set of internode road sub-segments that are included in the electronic horizon. For example, the at least one electronic horizon processor may obtain all internode road sub-segments in the map area corresponding to the electronic horizon, and select all the internode road sub-segments as the set of internode road sub-segments.

In some embodiments, the determined set of internode road sub-segments may include two or more internode road sub-segments. Alternatively, the determined set of internode road sub-segments includes only one internode road sub-segment.

In some embodiments, the determined set of internode road sub-segments that are included in the electronic horizon may include at least one internode road-subsegment that located only partially within an envelope associated with the electronic horizon.

In some embodiments, each of the plurality of internode road sub-segments in the map may represent a section of the internode road segment having less than a predetermined maximum length.

At step 4406, the at least one electronic horizon processor (e.g., electronic horizon processor 4210) generates one or more navigation information packets. In some embodiments, the one or more navigation information packets may include information associated with the set of internode road sub-segments included in the electronic horizon. Alternatively or additionally, the one or more navigation information packets may include other types of information described in this disclosure (e.g., a spline object, a drivable path profile object, a lane mark changed points object, etc.). In some embodiments, step 4406 may be similar to step 4305 of process 4300 described above.

In some embodiments, at least one navigation information packet may be generated for each of the internode road sub-segments included in the electronic horizon.

In some embodiments, each of the one or more navigation information packets may include a header portion and a variable-sized payload portion (as described elsewhere in this disclosure). The header portion may specify what information is included in the variable-sized payload portion. For example, the header portion of a navigation information packet may identify one or more objects included in the variable-sized payload portion. By way of example, Table 6, discussed earlier, illustrates an exemplary header portion of a navigation information packet. The header portion may include information such as at least one of the number of the object(s) included in the payload portion, the size of each of the object(s), the segment ID associated with each of the object(s), the description of each of the object(s), etc. In some embodiments, the object(s) included in the variable-sized payload portion may be generated by the at least one processor based on the determined electronic horizon. For example, the object(s) included in the variable-sized payload portion may be generated by the at least one processor based on features associated with the accessed map that are included within the determined electronic horizon. In some embodiments, the object(s) included in the variable-sized payload portion include one or more of: a spline object, a drivable path profile object, a lane mark changed points object, a road edge changed point object, a sign landmark object, a pole landmark object, a lane topology object, a drivable path border object, a lane merge point object, a lane split point object, or a reference point change event object.

In some embodiments, the one or more navigation packets may include a road sub-segment list object representative of the internode road sub-segments included in the determined electronic horizon. In some embodiments, changes in the road sub-segment list object map prompt one or more navigation system processors (e.g., navigation system processor 4220) to delete information associated with road sub-segments no longer included in a received road sub-segment list object. For example, the at least one electronic horizon processor may transmit to the navigation system processor a navigation information packet including an updated segmentIDs list. The navigation system processor may delete any sub-segment having a segmentID that is not included in the list and was already received from one or more previous navigation information packets.

At step 4407, the at least one electronic horizon processor (e.g., electronic horizon processor 4210) outputs the generated one or more navigation information packets to one or more navigation system processors configured to cause the host vehicle to execute at least one navigational maneuver based on the information included in the navigation information packet. In some embodiments, step 4407 may be similar to step 4306 of process 4300 described above. For example, one or more navigation system processors may be configured to cause navigation system 4280 to execute at least one navigational maneuver based on the information included in the navigation information packet (e.g., a drivable path along a road segment). The at least one navigational maneuver may include one or more of: maintaining a current speed of the host vehicle; maintaining a current heading direction of the host vehicle; changing a heading direction of the host vehicle; changing a speed of the host vehicle; accelerating the host vehicle; or braking the host vehicle.

Electronic Horizon: Dynamic Change of Map Origin

In some cases, when a vehicle's distance from an origin point becomes larger than a defined threshold, precision errors may produce an accumulated bias over the distance. To avoid this type of bias, the disclosed systems and methods may dynamically change the origin point of a map coordinate system, and one or more map objects may be transformed in the new coordinates system accordingly. In one embodiment, at least one electronic horizon processor may send a ReferencePointChangeEvent object to at least one navigation system processor, indicating that map coordinates have been changed. The previous segments of the electronic horizon may be flashed on the re-constructor side (e.g., a memory or a buffer accessible by a navigation system processor). The at least one navigation system processor may also transmit the segments in the new coordinate system to the navigation system processor. When the change in the map coordinate system occurs, the localization output may change to a "not localized" state. In some embodiments, at least one electronic horizon processor and at least navigation system processor may coordinate for communicating segments in a new coordinate system according to the process illustrated in FIG. 37.

Figure 45:
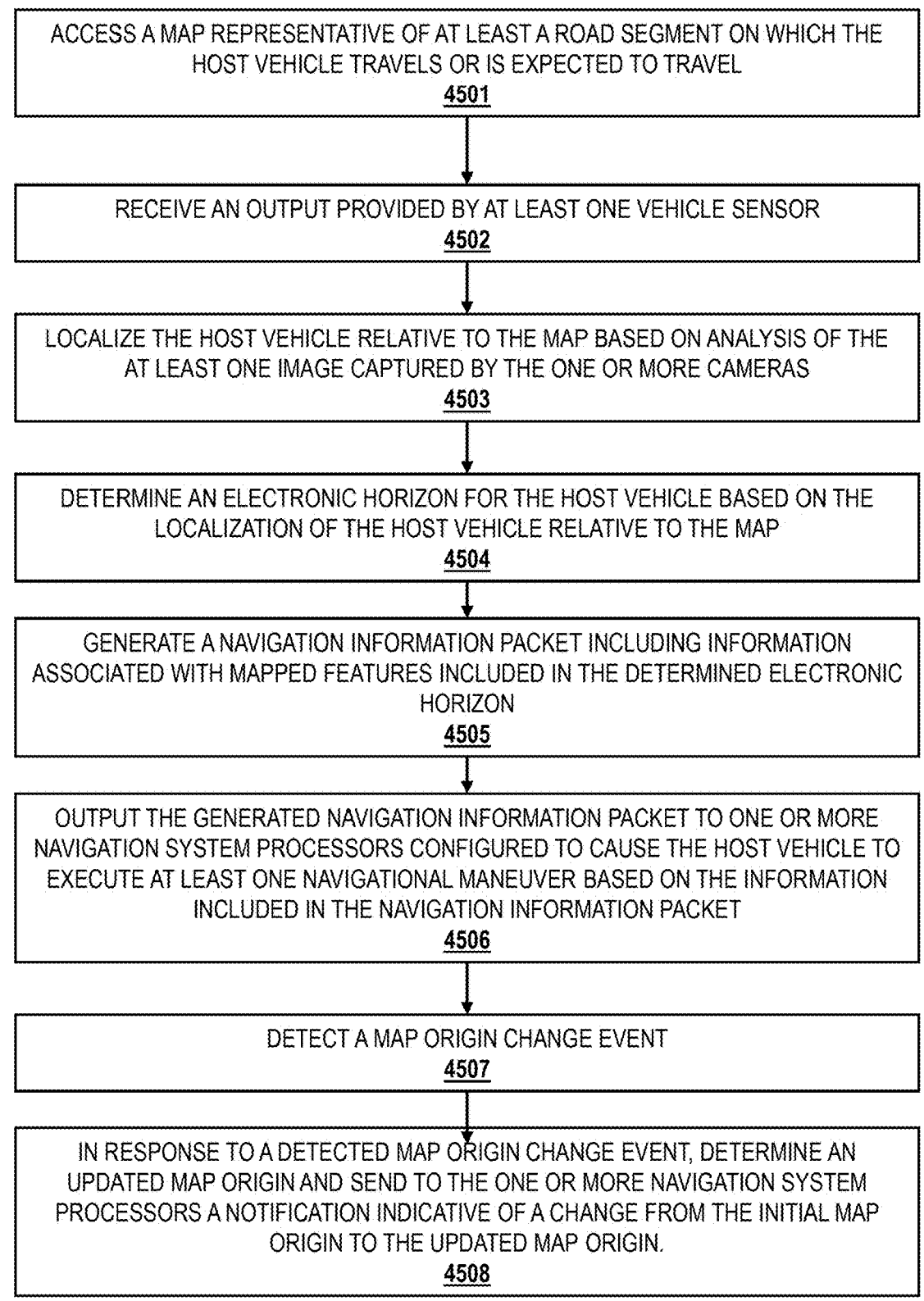
FIG. 45 is a flowchart showing an exemplary process for navigating a vehicle, consistent with disclosed embodiments.

FIG. 45 is a flowchart showing an exemplary process for navigating a vehicle, consistent with disclosed embodiments. One or more steps of process 4500 may be performed by a vehicle (e.g., vehicle 2702), a device (e.g., vehicle device 2703) associated with the host vehicle, at least one processor (e.g., an electronic horizon processor), and/or a server (e.g., server 2701). While the descriptions of process 4500 provided below use vehicle 2702 (or one or more components thereof) as an example, one skilled in the art would appreciate that one or more steps of process 4500 may be performed by a server and/or a vehicle device. For example, in an embodiment, a system for navigating a vehicle includes at least one processor (e.g., an electronic horizon processor) comprising circuitry and a memory. The memory includes instructions that when executed by the circuitry cause the at least one processor to perform one or more operations, such as any of the operations discussed herein and/or in connection with FIG. 45. As another example, in another embodiment, a non-transitory computer readable medium contains instructions that, when executed by at least one processor (e.g., an electronic horizon processor), may cause the at least one processor to perform one or more operations, such as any of the operations discussed herein and/or in connection with FIG. 45.

At step 4501, at least one electronic horizon processor (e.g., electronic horizon processor 4210) accesses a map representative of at least a road segment on which the host vehicle travels or is expected to travel. Points in the map may be referenced relative to an initial map origin. In some embodiments, step 450 may be similar to step 430 of process 4300 described above. For example, the at least one electronic horizon processor may be programmed to receive a map from storage device 4240 and/or memory 4230. Alternatively or additionally, the at least one electronic horizon processor may receive the map data from a server (e.g., server 2701) and/or a database (e.g., database 2704), which may be remotely located relative to vehicle 2702, via network 2705. In some embodiments, the map accessed by the at least one electronic horizon processor may represent a sub-segment of a larger map available on a map server (e.g., server 2701) remotely located relative to the host vehicle.

In some embodiments, the accessed map may include a plurality of three-dimensional splines, wherein the three-dimensional splines represent one or more of: a drivable path for the host vehicle, a road edge, or a lane mark.

In some embodiments, the accessed map is generated based on crowd-sourced drive information collected from a plurality of vehicles that traversed the road segment on which the host vehicle travels or is expected to travel prior to the host vehicle (as described elsewhere in this disclosure).

In some embodiments, the map accessed by the at least one electronic horizon processor may represent a sub-segment of a larger map available on a map server (e.g., server 2701) remotely located relative to the host vehicle.

At step 4502, the at least one electronic horizon processor (e.g., electronic horizon processor 4210) receives an output provided by at least one vehicle sensor. In some embodiments, step 4502 may be similar to step 4302 of process 4300 described above. For example, the at least one vehicle sensor may include one or more cameras configured to capture images of an environment of the host vehicle. By way of example, vehicle 2702 may include one or more cameras similar to image capture device 122, image capture device 124, and image capture device 126 described above, which may be configured to capture images of an environment of the host vehicle. The received output may include at least one image captured by the one or more cameras.

In some embodiments, the at least one vehicle sensor may also include other types of sensors, including, for example, a speed sensor, an acceleration sensor, a GPS receiver, a radar sensor, a LIDAR sensor, or the like, or a combination thereof.

At step 4503, the at least one electronic horizon processor (e.g., electronic horizon processor 4210) localizes the host vehicle relative to the map based on analysis of the at least one image captured by the one or more cameras. In some embodiments, step 4503 may be similar to step 4303 of process 4300 described above. For example, the at least one electronic horizon processor may determine the position of the host vehicle relative to the mapped drivable path based on an identification of one or more mapped landmarks represented in the at least one captured image and a comparison of an image position of the one or more mapped landmarks in the at least one captured image with an expected image position of the one or more mapped landmarks associated with at least one position along the drivable path. In some embodiments, the mapped drivable path is represented in the map as a three-dimensional spline. Alternatively or additionally, the at least one electronic horizon processor may determine a position of the host vehicle relative to a mapped drivable path based on an identification of one or more mapped landmarks represented in two or more captured images and based on a motion history of the host vehicle during a time period between when the two or more captures images were acquired. Alternatively or additionally, the at least one electronic horizon processor may localize the host vehicle relative to the map based on other methods or processes for localizing a vehicle described herein (e.g., the methods described earlier in connection with FIGS. 25A, 25B, 25C, and 25D).

At step 4504, the at least one electronic horizon processor (e.g., electronic horizon processor 4210) determines an electronic horizon for the host vehicle based on the localization of the host vehicle relative to the map. In some embodiments, step 4504 may be similar to step 4304 of process 4300 described above. For example, referring back to FIG. 35, the at least one electronic horizon processor of vehicle 2702 (which may be similar to vehicle 3501 illustrated in FIG. 35) may determine the position of vehicle 2702 relative to the map illustrated in FIG. 25 and determine an area 3502 covered by an electronic horizon radius based on the relative position of vehicle 2702.

In some embodiments, the at least one electronic horizon processor may determine the electronic horizon, at least in part, based on the current speed of the host vehicle and/or the travel direction of the host vehicle. For example, the at least one electronic horizon processor may obtain the current speed provided by an onboard speed sensor (which may be one of the at least one vehicle sensor). The at least one electronic horizon processor may determine the electronic horizon based on the current speed of the host vehicle. For example, the at least one electronic horizon processor may determine the electronic horizon that is associated with a portion of the map accessible to the host vehicle within a predetermined time interval under the current speed. The predetermined time interval may be in a range of 0.1 seconds to 10 minutes. In some embodiments, the predetermined time interval may be up to 1 second, 2 seconds, 5 seconds, 10 seconds, or 1 minute. Alternatively or additionally, the at least one electronic horizon processor may determine the electronic horizon that is associated with a predetermined spatial envelope around the host vehicle (e.g., one or more envelopes described earlier in connection with FIGS. 28A, 28B, 28C, 28D, 28E, 28F, 28G, and 28H).

At step 4505, the at least one electronic horizon processor (e.g., electronic horizon processor 4210) generates a navigation information packet including information associated with mapped features included in the determined electronic horizon. In some embodiments, step 4505 may be similar to step 4305 of process 4300 (and/or step 4406 of process 4400) described above. For example, the at least one electronic horizon processor may generate a navigation information packet that includes a header portion and a payload portion. In some embodiments, the payload portion of the navigation information packet may be variable-sized. The header portion may specify what information is included in the payload portion. For example, the header portion of a navigation information packet may identify one or more objects included in the variable-sized payload portion. By way of example, Table 6, discussed earlier, illustrates an exemplary header portion of a navigation information packet. The header portion may include information such as at least one of the number of the object(s) included in the payload portion, the size of each of the object(s), the segment ID associated with each of the object(s), the description of each of the object(s), etc. In some embodiments, the object(s) included in the variable-sized payload portion may be generated by the at least one processor based on the determined electronic horizon. For example, the object(s) included in the variable-sized payload portion may be generated by the at least one processor based on features associated with the accessed map that are included within the determined electronic horizon. In some embodiments, the object(s) included in the variable-sized payload portion include one or more of: a spline object, a drivable path profile object, a lane mark changed points object, a road edge changed point object, a sign landmark object, a pole landmark object, a lane topology object, a drivable path border object, a lane merge point object, a lane split point object, or a reference point change event object.

At step 4506, the at least one electronic horizon processor (e.g., electronic horizon processor 4210) outputs the generated navigation information packet to one or more navigation system processors configured to cause the host vehicle to execute at least one navigational maneuver based on the information included in the navigation information packet. In some embodiments, step 4506 may be similar to step 4306 of process 4300 described above. For example, one or more navigation system processors (e.g., navigation system processor 4220) may be configured to cause navigation system 4280 to execute at least one navigational maneuver based on the information included in the navigation information packet (e.g., a drivable path along a road segment). The at least one navigational maneuver may include one or more of: maintaining a current speed of the host vehicle; maintaining a current heading direction of the host vehicle; changing a heading direction of the host vehicle; changing a speed of the host vehicle; accelerating the host vehicle; or braking the host vehicle.

At step 4507, the at least one electronic horizon processor (e.g., electronic horizon processor 4210) detects a map origin change event. For example, the at least one electronic horizon processor may be programmed to detect a map origin change event when it detects that the host vehicle has traveled more than a predetermined distance from a point represented by the initial map origin. The predetermined distance may be in a range of 1 km to 100 km. For example, the predetermined distance may be 10 km, 20 km, 30 km, 40 km, or 50 km.

At step 4508, the at least one electronic horizon processor (e.g., electronic horizon processor 4210) determines an updated map origin and sends to the one or more navigation system processors a notification indicative of a change from the initial map origin to the updated map origin, in response to a detected map origin change event. For example, the at least one electronic horizon processor may be programmed to transmit a notification (e.g., a navigation information packet) including a ReferencePointChangeEvent object to the one or more navigation system processors, indicating that map coordinates have been changed.

In some embodiments, the notification sent to the one or more navigation system processors indicative of a change from the initial map origin to the updated map origin may include an updated navigation information packet including updates to the information associated with mapped features included in the determined electronic horizon. The updates to the information may be associated with the change from the initial map origin to the updated map origin. In some embodiments, the updates to the information associated with mapped features included in the determined electronic horizon may include transformations associated with a change in a map origin from the initial map origin to the updated map origin.

In some embodiments, the at least one electronic horizon processor may generate an updated navigation information packet after detecting a change in a group of mapped features implicated by the determined electronic horizon for the host vehicle. For example, the at least one electronic horizon processor may generate an updated navigation information packet including updates to the information associated with mapped features included in the determined electronic horizon in the new map coordinate system. The at least one electronic horizon processor may also transmit the updated navigation information packet to the one or more navigation system processors.

In some embodiments, after receiving the notification indicative of a change of the map origin point, the one or more navigation system processors may flash the cached electronic horizon data. For example, the one or more navigation system processors may delete from the buffer the data relating to the one or more objects included in an electronic horizon that were received from one or more previous navigation information packets.

Electronic Horizon: Navigation Using Points on Splines

The disclosed systems and methods may use crowd-sourced information collected from multiple drives to generate and/or refine maps associated with road segments. The maps may include trajectories (e.g., three-dimensional splines) that are available to vehicles (e.g., host or target/detected vehicles) traveling on a roadway associated with a map. The maps may also include detected objects (e.g., road signs, road edges, lane markings, bus stops, or any other recognizable feature associated with a roadway, etc.) and may associate the detected objects in the map with refined locations associated with one or more of the detected objects. The refined positions may be determined based on crowd-sourced location information determined during each of a plurality of individual drives along a road segment. The detected objects and their locations from the map may be used in navigating an autonomous or partially autonomous vehicle (e.g., by assisting in determining where a vehicle is located relative to a target trajectory from the map).

To generate a crowdsourced map, drive information may be collected from multiple drives along a road segment. This may include, for example, collecting drive information from one vehicle traveling in an area at different times and/or from multiple different vehicles traveling in an area. The collected information may then be aligned to promote accuracy in filling in holes in drive data sets (e.g., caused by occlusions during a particular drive, etc.), refining object locations, refining vehicle trajectories, etc. More details regarding maps and generating maps are provided below.

In some cases, a map (or at least a portion of a map) may be provided to a vehicle for use in navigation, and in some cases, the map features may be expressed in a map coordinate system relative to a predetermined origin. For example, the system generating the map may set a particular origin point relative to the map, and the target trajectories, detected objects, road edges, etc. may be referenced relative to the particular origin selected for the map. Consequently, in such cases, when a vehicle navigates using the map information, the navigation system of the vehicle may need to perform various calculations relative to the mapped features in order to effectively use the mapped features in navigating the vehicle. Such calculations may include, among other things, sampling of a target trajectory in map coordinates to determine points along the target trajectory where the vehicle is predicted to be after certain time intervals (e.g., 1 second, 2 seconds, 5 seconds, etc. from a present time). The vehicle navigation system may also calculate similar points with respect to trajectories associated with detected target vehicles, calculate distances to drivable paths associated with adjacent lanes, calculate distances to stop points, traffic lights, merge or split points, etc. In many cases, the calculations the host vehicle navigation system performs converting or expressing aspects of the received map information (which is expressed in a coordinate system relative to the map) into local coordinates that are relative to a coordinate system associated with the particular host vehicle.

Such calculations onboard a host vehicle can lead to certain challenges. For example, in some cases, these map transformation calculations may involve sophisticated processors associated with a host vehicle navigation system, which can add cost and complexity to the system. The calculations may require significant computing resources, which may otherwise be used for other navigational or vehicle-related tasks, and the calculations may be difficult to perform at a rate suitable for real-time navigation (e.g., full sets of point calculations relative to multiple road segment features multiple times per second). Additionally, requiring each host vehicle navigational system to perform the map calculations needed navigate relative to a map may increase the complexity of manufacturing a vehicle navigational system and/or may lead to non-uniform or sub-optimal usage of map information in navigating different host vehicles (especially those whose navigational systems or system components are developed by different sources).

Thus, there exists a need for navigational systems and/or navigational system map interfaces that may reduce or eliminate the burden of a host vehicle navigational system associated with relating certain map features expressed in map coordinates to an origin associated with the particular host vehicle. Such systems, for example, may convert certain map elements from map coordinates to vehicle coordinates (e.g., having an origin located at a position of a camera associated with the host vehicle). Such systems may also generate certain standard sets of points expressed in vehicle coordinates relative to map features stored in map coordinates (e.g., drivable paths along available lanes on a road segment, lane markings, road boundaries, etc.). Through automatic generation of such features in a vehicle coordinate system, the described systems and interfaces may alleviate the need for OEMs or other entities involved in developing vehicle navigational systems to develop sophisticated systems to analyze mapped features in map coordinates and do the calculations and conversions needed navigate relative to those features from a vehicle coordinate perspective.

Disclosed systems and methods may automatically provide map elements relatively close to the vehicle according to a vehicle coordinate system. The disclosed systems and methods may also provide various types of standard point sets in the vehicle coordinate system that may be useful in navigating a host vehicle. In some cases, the described systems may provide or generate data relative to mapped road segments in the form of 3D sampled points over splines representative of drivable paths, lane markings, road edges, road boundaries, etc. Such generated data may also include lane assignment information relative to the host vehicle, lane split/merge points, stop points at intersections, etc. This system and associated protocol may be referred to as localization for control in the attached documents. In some cases, the location for control protocol may output two or more main data types, including, for example, 1) road edges, lane marks, drivable path traces and a set of sampled 3D points relative to mapped splines representative of these road features; and 2) lane assignment information (e.g., indicators of an ego lane associated with the host vehicle and one or two lanes to the right and/or left of the ego lane). The output of the system may be configurable such that the number of sampled points to output may vary, the number of lanes for which assignment information may be provided may vary, distances between the sampled points may be varied, etc. Such coordinate points, which are relative to a vehicle's coordinate system, may allow for the vehicle to navigate autonomously. For example, the vehicle's navigation system may use the coordinate points for control functions, such as steering, braking, and acceleration.

Figure 46:
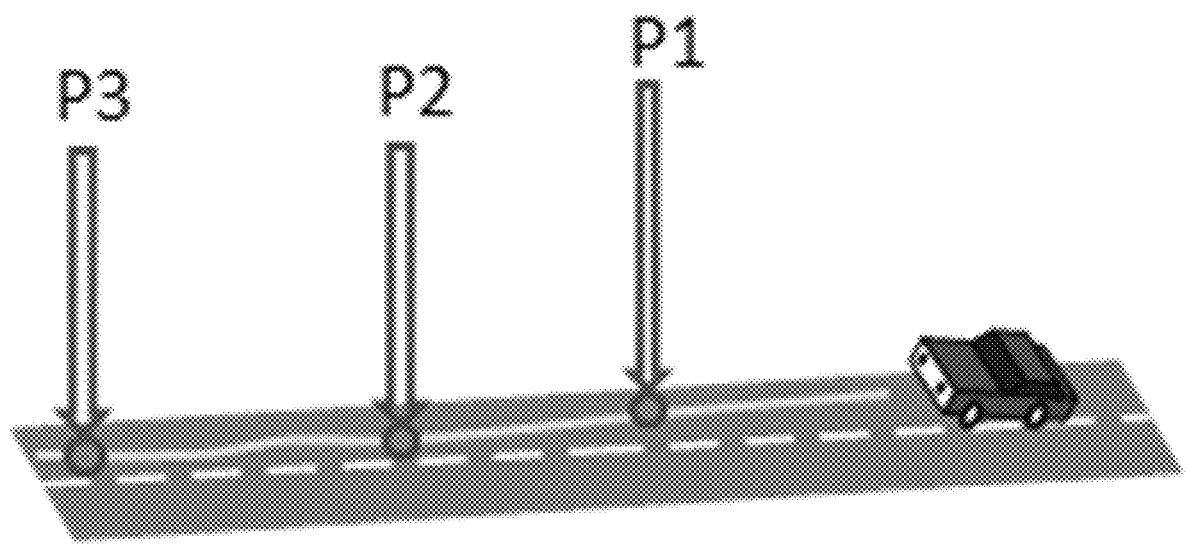
FIG. 46 is a schematic diagram illustrating exemplary predicted positions of a vehicle at various time points, consistent with disclosed embodiments.

In some embodiments, to abstract and correlate the control points data, additional information in the form of predicted points may be outputted by the protocol. The utilized values may include 3 points on the vehicle's drivable path in predefined times shifts. Accuracy level of those values may be in 1 mm level. FIG. 46 illustrates exemplary predicted positions P1, P2, and P3 of a vehicle at time points t0, t1, and t2, respectively. In some embodiments, t0, t1, and t2 are predefined time shifts.

In some embodiments, the points in a map may be 3D sampled points of the DP, LM, RE splines in the vehicle coordinate system. The points output may be based on a predefined set of properties, which may be configurable in the development phase. A navigation information packet may include a control point object. By way of example, Table 31 below illustrates an exemplary control point object.

TABLE 31

| Control points object description | |
| --- | --- |
| Control Point [ ] | U value [uint16] |
|  | X [uint16] |
|  | Y [uint16] |
|  | Z [uint16] |
|  | Spline ID [uint32] |

In some embodiments, each set of points may be outputted with additional data, such as the spline type [DP=0, LM=1, RE=2], the number of printed points on the spline (within a specific frame), a spline index—lane numbering relative to ego lane. (ego is 0, then left lanes are −1, −2 . . . . And right lanes are 1, 2, 3 etc.), an oncoming Boolean flag indicating a driving direction on the lane, etc.

To produce local coordinates, the vehicle's navigation system may process information collected from the environment of the vehicle. One or more sensors, such as cameras, radar, and LIDAR may collect information as the vehicle travels through the environment. The collection information may include the position of various detected objects in the environment of the vehicle, such as road signs, road edges, lane markings, bus stops, or any other recognizable feature associated with a roadway, etc. The vehicle's navigation system may then analyze the collected information and use the information in comparison to mapped information (e.g., representations of mapped features in a map expressed in map coordinates) and may determine coordinates for the detected objects that are relative to a coordinate system of the vehicle and/or may determine sets of 3D sampled points relative to mapped features such as drivable paths, etc., as described above. For example, such coordinate points may be output in a vehicle coordinate system in which a camera on board the vehicle is designated the origin of the coordinate system. The format of the points may thus be expressed as x, y, and z values relative to the host vehicle camera position used as the origin for expression of road features or sampled points in the vehicle coordinate system. By using a coordinate system that is local to the vehicle while it navigates, and by generating standard sets of information (e.g., 3D sampled points along drivable paths, etc., useful in navigating the vehicle), the vehicle's navigation system outside of the location for control hardware/interface may be required to perform fewer navigational calculations relative to mapped features during navigation of the vehicle, thus efficiently managing computing resources.

As discussed earlier, a map may include trajectories such as drivable paths, road edges, lane markings, etc., which may be represented by three-dimensional splines in the map. The map may also include location information for certain objects (e.g., road signs, road edges, lane markings, bus stops, or any other recognizable features associated with a roadway, etc.) located on or associated with a road system. The disclosed systems and methods may sample points on the splines and project those points onto a map in the vehicle's coordinate system. To do so, the disclosed systems and methods may use a rotation translation matrix to transform points from a map coordinate system (e.g., coordinates relative to a map) into a vehicle coordinate system.

For example, x, y, and x may represent the location of the vehicle in the map. A translation of those points may result in coordinates relative to the vehicle's coordinate system. As one example, when a sensor onboard the vehicle detects lane marks, road edges, and/or a drivable path, the disclosed systems and methods may insert points on these lines.

Furthermore, the disclosed systems and methods make use of a longitudinal component. This technique may be used to sample a spline to arrive at the x, y, z points discussed above. For example, an algorithm may be used to evaluate a longitudinal parameter and to calculate x, y, and z points relative to the spline at a particular longitudinal value.

In order for the vehicle to navigate based on, for example, a three-dimensional spline relative to a map, the vehicle's navigation system may need to make various calculations. The disclosed systems and methods include a map interface and protocol system that relieves other navigational computing systems (e.g., those provided by OEMs, etc.) from having to sample the splines to generate sampled points in the vehicle coordinate system used during navigation, which is an expensive computational process, especially under the time constraints of real-time driving and navigation.

In some embodiments, points may be structured in arrays with indices identifying what they represent. For example, in some cases, a sampled set of points may represent a road edge, lane marking, drivable path, etc. In some embodiments, each array of points may be associated with a different road feature. Additionally or alternatively, the system may output an identifier of the original spline that the points belong to (which may be useful in enabling a client navigational system to correlate between supplied arrays of points and mapped features in map coordinates supplied according to the electronic horizon protocol). In some cases, a camera-based navigational system may detect lane marks, road edges, etc. and may be provided with a target trajectory representative of the mapped drivable path associated with the ego lane of the host vehicle. The disclosed system may use the mapped information (e.g., maps) to calculate sets of points in the vehicle coordinate system relative to these mapped features that are also detected by the camera-based navigational system. These points may then be used by the navigational system in controlling the path of the host vehicle to follow the target trajectory, change lanes, stay within road boundaries, etc.

As discussed, the disclosed systems may output sampled points for various road features. These arrays of points may be associated with the host vehicle ego lane. The arrays of points, however, may also be associated with lanes to the left or right of the host vehicle lane and may also be associated with lanes traveling in the opposite direction to or intersecting with the host vehicle lane. In such cases, the arrays of sampled points for drivable paths, lane markings, etc. associated with other lanes may be indicated through one or more indices (e.g., +1 for one lane to the right, +2 for two lanes to the right, −1 for one lane to the left, −2 for two lanes to the left, etc.). Each array of points may be associated with a different road feature. Such information can be useful in navigating the host vehicle through a lane change maneuver, as the host vehicle may have available sampled points for a drivable path in a target lane prior to making the lane change maneuver. Such information may also assist the host vehicle in navigating relative to detected target vehicles, as the host vehicle systems may be able to determine or predict a path one or more target vehicles will travel based on mapped and sampled drivable paths for adjacent or intersecting lanes. The mapped and sampled information may also be useful when the host vehicle is collecting information relating to a road segmenting (e.g., automatically determining and reporting on an average speed traveled within a certain lane by the host vehicle, target vehicles, etc.).

Other types of points associated with road features may be important for vehicle navigation. Such points, for example, may include lane split or merge points and/or vehicle stop points at traffic lights or intersections (e.g., at any point at which a drivable path crosses a stop line), among others. In some cases, these points may fall between or within the spacing associated with sampled points along a road feature spline. Therefore, the disclosed systems may be configured to output these types of points, among others, in addition to the sampled points along one or more splines stored in a map. Such points may be used in navigating relative to lane splits/merges or stop points even beyond where such points and/or the associated road features may be detected by an onboard camera. At merge/split points and/or stop points, the disclosed systems and methods may provide point locations with a high degree of accuracy (e.g., 1 cm accuracy) in view of the crowd-sourced nature by which these types of points were determined and mapped.

The output points of the presently described system and system interface may be user configurable. For example, a distance between points may be selected or controlled based on vehicle speed. At slower speeds, the disclosed systems and methods may use a closer sample spacing. On the other hand, at faster speeds, the disclosed systems and methods may increase space to "see" further down road for control. For example, the system may provide more points at faster speeds. The sampled points may be client selectable or user selectable. For example, the sampled points may correspond to locations along a drivable path where the host vehicle is projected to be at 1 second, 2 seconds, 3 seconds, etc. Other spacings, such as 0.5 seconds, 1.5 seconds, 2.5 seconds, or any other regular or irregular spacings may also be used.

FIG. 47 is a flowchart showing an exemplary process for navigating a vehicle, consistent with disclosed embodiments. One or more steps of process 4700 may be performed by a vehicle (e.g., vehicle 2702), a device (e.g., vehicle device 2703) associated with the host vehicle, at least one processor (e.g., an electronic horizon processor), and/or a server (e.g., server 2701). While the descriptions of process 4700 provided below use vehicle 2702 (or one or more components thereof) as an example, one skilled in the art would appreciate that one or more steps of process 4700 may be performed by a server and/or a vehicle device. For example, in an embodiment, a system for navigating a vehicle includes at least one processor (e.g., an electronic horizon processor) comprising circuitry and a memory. The memory includes instructions that when executed by the circuitry cause the at least one processor to perform one or more operations, such as any of the operations discussed herein and/or in connection with FIG. 47. As another example, in another embodiment, a non-transitory computer readable medium contains instructions that, when executed by at least one processor (e.g., an electronic horizon processor), may cause the at least one processor to perform one or more operations, such as any of the operations discussed herein and/or in connection with FIG. 47.

At step 4701, at least one electronic horizon processor (e.g., electronic horizon processor 4210) accesses a map representative of at least a road segment on which the host vehicle travels or is expected to travel. The map may include one or more splines representative of road features associated with the road segment. In some embodiments, a spline may represent at least one of one or more of: a drivable path for the host vehicle, a road edge, or a lane mark. For example, the one or more splines may include a representation of the drivable path for the host vehicle, and the drivable path for the host vehicle may be associated with an ego lane of the road segment in which the host vehicle is located. Alternatively or additionally, the one or more splines may include a representation of one or more potential drivable paths for the host vehicle, and the one or more potential drivable paths may be associated with lanes of the road segment different from an ego lane of the road segment in which the host vehicle is located. Alternatively or additionally, the one or more splines may include a representation of a road edge associated with the road segment. Alternatively or additionally, the one or more splines may include a representation of a lane mark associated with the road segment.

In some embodiments, step 4701 may be similar to step 4301 of process 4300 described above. For example, the at least one electronic horizon processor may be programmed to receive a map from storage device 4240 and/or memory 4230. Alternatively or additionally, the at least one electronic horizon processor may receive the map data from a server (e.g., server 2701) and/or a database (e.g., database 2704), which may be remotely located relative to vehicle 2702, via network 2705. In some embodiments, the map accessed by the at least one electronic horizon processor may represent a sub-segment of a larger map available on a map server (e.g., server 2701) remotely located relative to the host vehicle.

In some embodiments, the accessed map may include a plurality of three-dimensional splines associated with one or more road segments, and the three-dimensional splines may represent one or more of: a drivable path for the host vehicle, a road edge, or a lane mark.

In some embodiments, the accessed map is generated based on crowd-sourced drive information collected from a plurality of vehicles that traversed the road segment on which the host vehicle travels or is expected to travel prior to the host vehicle (as described elsewhere in this disclosure).

In some embodiments, the accessed map may include a plurality of three-dimensional point locations specified in a map coordinate system associated with the accessed map (e.g., a geographic coordinate system such as GPS coordinate system). One or more of the objects included in the payload portion of the navigation packet may include a three-dimensional point location specified in a coordinate system associated with the host vehicle (e.g., a coordinate system local to the host vehicle). For example, the coordinate system associated with the host vehicle may have the position of one of the one or more cameras of the host vehicle (or the center of the host vehicle) as the origin of the coordinate system.

At step 4702, the at least one electronic horizon processor (e.g., electronic horizon processor 4210) receives an output provided by at least one vehicle sensor. In some embodiments, step 4702 may be similar to step 4302 of process 4300. For example, the at least one vehicle sensor may include one or more cameras configured to capture images of an environment of the host vehicle. By way of example, vehicle 2702 may include one or more cameras similar to image capture device 122, image capture device 124, and image capture device 126 described above, which may be configured to capture images of an environment of the host vehicle. The received output may include at least one image captured by the one or more cameras.

In some embodiments, the at least one vehicle sensor may also include other types of sensors, including, for example, a speed sensor, an acceleration sensor, a GPS receiver, a radar sensor, a LIDAR sensor, or the like, or a combination thereof.

At step 4703, the at least one electronic horizon processor (e.g., electronic horizon processor 4210) localizes the host vehicle relative to the map or a feature thereof (e.g., a drivable path) for the host vehicle represented among the one or more splines. The localization may be based on analysis of the at least one image captured by the one or more cameras. In some embodiments, step 4703 may be similar to step 4303 of process 4300 and/or step 4403 of process 4400 described above. For example, the at least one electronic horizon processor may localize the host vehicle relative to a drivable path based on analysis of the at least one image captured by the one or more cameras. By way of example, the at least one electronic horizon processor may determine a position of the host vehicle relative to a mapped drivable path based on an identification of one or more mapped landmarks represented in the at least one captured image and a comparison of an image position of the one or more mapped landmarks in the at least one captured image with an expected image position of the one or more mapped landmarks associated with at least one position along the drivable path. Alternatively or additionally, the localization of the host vehicle relative to the at least one mapped feature may include determining a position of the host vehicle relative to a mapped drivable path based on an identification of one or more mapped landmarks represented in two or more captured images and based on a motion history of the host vehicle during a time period between when the two or more captures images were acquired.

At step 4704, the at least one electronic horizon processor (e.g., electronic horizon processor 4210) determines a set of points associated with the one or more splines based on the localization of the host vehicle relative to the drivable path for the host vehicle. For example, the at least one electronic horizon processor may be programmed to determine a set of points including one or more predicted locations of the host vehicle relative to the drivable path for the host vehicle (e.g., the predicted locations P1, P2, and P3 of the host vehicle illustrated in FIG. 46). Alternatively or additionally, the one or more predicted locations of the host vehicle may be associated with predetermined future time intervals (e.g., every 0.5 seconds, 1 second, 2 seconds, 5 seconds, 10 seconds, 30 seconds, 1 minute, 5 minutes, etc.). In some embodiments, the one or more predicted locations of the host vehicle may be determined based on a current speed of the host vehicle. Alternatively or additionally, the one or more predicted locations of the host vehicle may be determined based on a planned speed profile of the host vehicle (e.g., the average speed and/or the speed limit on that point (the longitudinal position) on a drivable path).

In some embodiments, the determined set of points may include a point location associated with an intersection of the drivable path for the host vehicle with a stop line represented in the accessed map. Alternatively or additionally, the determined set of points may include a point location associated with a lane split feature of the road segment.

Alternatively or additionally, the determined set of points may include a point location associated with a lane merge feature of the road segment.

Alternatively or additionally, the determined set of points may include a point location associated with an intersection of a potential drivable path for the host vehicle, in a lane different from an ego lane in which the host vehicle is located, with a stop line represented in the accessed map. Alternatively or additionally, the determined set of points may include three-dimensional points referenced a coordinate system relative to the host vehicle. For example, the determined set of points may include three-dimensional points referenced a coordinate system having an origin associated with one of the one or more cameras.

At step 4705, the at least one electronic horizon processor (e.g., electronic horizon processor 4210) generates a navigation information packet. The generated navigation information packet may include information associated with the one or more splines and the determined set of points relative to the one or more splines. In some embodiments, a navigation information packet may include other types of information described in this disclosure. For example, a navigation information packet may include a header portion and a payload portion. The header portion may specify what information is included in the payload portion. The payload portion may include information relating to one or more objects associated with the road segment(s). In some embodiments, the payload portion may be variable-sized. In some embodiments, the header portion of the navigation information packet may include information identifying objects included in the payload portion, a size of each of the objects included in the payload portion, an indication of a number of objects included in the payload portion, or the like, or a combination thereof. By way of example, Table 5 and Table 6, discussed above, illustrate various types of information that may be included in a header portion, the detailed descriptions of which are repeated here for brevity purposes. The payload portion may include one or more objects associated with the road segment(s) included in the determined electronic horizon. The objects included in the payload portion may include one or more of: a spline object, a drivable path profile object, a lane mark changed points object, a road edge changed point object, a sign landmark object, a pole landmark object, a lane topology object, a drivable path border object, a lane merge point object, a lane split point object, or a reference point change event object. In some embodiments, one or more objects included in the payload portion may be generated by the at least one electronic horizon processor (e.g., electronic horizon processor 4210) based on the determined electronic horizon. For example, one or more objects included in the payload portion may be generated by the at least one electronic horizon processor (e.g., electronic horizon processor 4210) based on features associated with the accessed map that are included within the determined electronic horizon.

In some embodiments, the navigation information packet may correlate the one or more splines with lanes of travel associated with the road segment. For example, the navigation information packet may identify an ego lane of travel in which the host vehicle is located. In some embodiments, the navigation information packet may index one or more additional lanes of travel relative to the ego lane (e.g., the indexes and/or sub-indexes illustrated in FIG. 38 discussed above). In some embodiments, the navigation information packet may include a Boolean value associated with at least one lane of travel, and the Boolean value may indicate whether a travel direction associated with the at least one lane of travel is in a same direction as a travel direction associated with the ego lane.

At step 4706, the at least one electronic horizon processor (e.g., electronic horizon processor 4210) outputs the generated navigation information packet to one or more navigation system processors configured to cause the host vehicle to execute at least one navigational maneuver based on the information included in the navigation information packet. In some embodiments, step 4706 may be similar to step 4306 of process 4300 described above. For example, one or more navigation system processors may be configured to cause navigation system 4280 to execute at least one navigational maneuver based on the information included in the navigation information packet (e.g., a drivable path along a road segment). The at least one navigational maneuver may include one or more of: maintaining a current speed of the host vehicle; maintaining a current heading direction of the host vehicle; changing a heading direction of the host vehicle; changing a speed of the host vehicle; accelerating the host vehicle; or braking the host vehicle.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for navigating a host vehicle, the system comprising:
   at least one processor comprising circuitry and a memory, wherein the memory includes instructions that when executed by the circuitry cause the at least one processor to:
   access map information representative of at least a road segment on which the host vehicle travels or is expected to travel, wherein the map information includes one or more splines representative of a drivable path;
   receive an output provided by at least one vehicle sensor, wherein the at least one vehicle sensor includes one or more cameras configured to capture images of an environment of the host vehicle, and wherein the received output includes at least one image captured by the one or more cameras;
   localize the host vehicle relative to the drivable path based on analysis of the at least one image captured by the one or more cameras and based on the map information including the one or more splines representing the drivable path;
   determine, based on the localization of the host vehicle relative to the drivable path represented by the one or more splines, a set of points ahead of a current location of the host vehicle, wherein the set of points includes one or more predicted locations of the host vehicle;
   generate a navigation information packet including information associated with the set of points relative to the one or more splines; and
   output the generated navigation information packet to one or more navigation system processors configured to cause the host vehicle to execute at least one navigational maneuver based on the set of points.

2. The system of claim 1, wherein the one or more splines include a representation of the drivable path for the host vehicle, and wherein the drivable path for the host vehicle is associated with an ego lane of the road segment in which the host vehicle is located.

3. The system of claim 1, wherein the one or more splines include a representation of one or more potential drivable paths for the host vehicle, and wherein the one or more potential drivable paths are associated with lanes of the road segment different from an ego lane of the road segment in which the host vehicle is located.

4. The system of claim 1, wherein the one or more splines include a representation of a road edge associated with the road segment.

5. The system of claim 1, wherein the one or more splines include a representation of a lane mark associated with the road segment.

6. The system of claim 1, wherein the one or more predicted locations of the host vehicle included in the set of points are relative to the drivable path for the host vehicle.

7. The system of claim 6, wherein the one or more predicted locations of the host vehicle are determined based on a current speed of the host vehicle.

8. The system of claim 6, wherein the one or more predicted locations of the host vehicle are determined based on a planned speed profile of the host vehicle.

9. The system of claim 6, wherein the one or more predicted locations of the host vehicle are associated with predetermined future time intervals.

10. The system of claim 1, wherein the set of points includes one or more predicted locations of the host vehicle relative to a drivable path for at least one lane of the road segment different from an ego lane in which the host vehicle is located.

11. The system of claim 1, wherein the set of points includes a point location associated with an intersection of the drivable path for the host vehicle with a stop line represented in the accessed map.

12. The system of claim 1, wherein the set of points includes a point location associated with a lane split feature of the road segment.

13. The system of claim 1, wherein the set of points includes a point location associated with a lane merge feature of the road segment.

14. The system of claim 1, wherein the set of points includes a point location associated with an intersection of a potential drivable path for the host vehicle, in a lane different from an ego lane in which the host vehicle is located, with a stop line represented in the accessed map.

15. The system of claim 1, wherein the accessed map is generated based on crowd-sourced drive information collected from a plurality of vehicles that traversed the road segment prior to the host vehicle.

16. The system of claim 1, wherein the accessed map is received by the electronic horizon processor from a map server remotely located relative to the host vehicle.

17. The system of claim 1, wherein the accessed map represents only a sub-segment of a larger map available on a map server remotely located relative to the host vehicle.

18. The system of claim 1, wherein localization of the host vehicle relative to the drivable path for the host vehicle includes determining a position of the host vehicle relative to the drivable path for the host vehicle based on an identification of one or more mapped landmarks represented in the at least one captured image and a comparison of an image position of the one or more mapped landmarks in the at least one captured image with an expected image position of the one or more mapped landmarks associated with at least one position along the drivable path for the host vehicle.

19. The system of claim 1, wherein the localization of the host vehicle relative to the drivable path for the host vehicle includes determining a position of the host vehicle relative to the drivable path for the host vehicle based on an identification of one or more mapped landmarks represented in two or more captured images and based on a motion history of the host vehicle during a time period between when the two or more captures images were acquired.

20. The system of claim 1, wherein the at least one navigational maneuver includes one or more of: maintaining a current speed of the host vehicle; maintaining a current heading direction of the host vehicle; changing a heading direction of the host vehicle; changing a speed of the host vehicle; accelerating the host vehicle; or braking the host vehicle.

21. The system of claim 1, wherein the at least one vehicle sensor includes a speed sensor.

22. The system of claim 1, wherein the at least one vehicle sensor includes a GPS receiver.

23. The system of claim 1, wherein the set of points include three-dimensional points referenced a coordinate system relative to the host vehicle.

24. The system of claim 23, wherein an origin of the coordinate system is associated with one of the one or more cameras.

25. The system of claim 1, wherein the navigation information packet correlates the one or more splines with lanes of travel associated with the road segment.

26. The system of claim 25, wherein the navigation information packet identifies an ego lane of travel in which the host vehicle is located.

27. The system of claim 26, wherein the navigation information packet indexes one or more additional lanes of travel relative to the ego lane.

28. The system of claim 26, wherein the navigation information packet includes a Boolean value associated with at least one lane of travel, and wherein the Boolean value indicates whether a travel direction associated with the at least one lane of travel is in a same direction as a travel direction associated with the ego lane.

29. A non-transitory computer readable medium containing instructions that when executed by at least one processor, cause the at least one processor to perform operations comprising:

accessing map information representative of at least a road segment on which a host vehicle travels or is expected to travel, wherein the map information includes one or more splines representative of a drivable path;

receiving an output provided by at least one vehicle sensor, wherein the at least one vehicle sensor includes one or more cameras configured to capture images of an environment of the host vehicle, and wherein the received output includes at least one image captured by the one or more cameras;

localizing the host vehicle relative to drivable path based on analysis of the at least one image captured by the one or more cameras and based on the map information including the one or more splines representing the drivable path;

determining, based on the localization of the host vehicle relative to the drivable path represented by the one or more splines, a set of points ahead of a current location of the host vehicle, wherein the set of points includes one or more predicted locations of the host vehicle;

generating a navigation information packet including information associated with the set of points relative to the one or more splines; and outputting the generated navigation information packet to one or more navigation system processors configured to cause the host vehicle to execute at least one navigational maneuver based on the set of points.

* * * * *

UNITED STATES PATENT AND TRADEMARK OFFICE
CERTIFICATE OF CORRECTION

| | |
|---|---|
| PATENT NO. | : 11,615,563 B2 |
| APPLICATION NO. | : 17/656031 |
| DATED | : March 28, 2023 |
| INVENTOR(S) | : Yehonatan Goldman et al. |

It is certified that error appears in the above-identified patent and that said Letters Patent is hereby corrected as shown below:

In the Claims

Claim 1, Column 135, Line 5, "that when" should read as --that, when--.

Claim 1, Column 135, Line 6, "circuity cause" should read as --circuitry, cause--.

Claim 29, Column 137, Line 14, "that when" should read as --that, when--.

Claim 29, Column 138, Line 5, "to drivable" should read as --to the drivable--.

Signed and Sealed this
Fourth Day of July, 2023

Katherine Kelly Vidal
*Director of the United States Patent and Trademark Office*